(12) United States Patent
Cowburn et al.

(10) Patent No.: US 7,812,935 B2
(45) Date of Patent: Oct. 12, 2010

(54) OPTICAL AUTHENTICATION

(75) Inventors: Russell Paul Cowburn, London (GB); James David Ralph Buchanan, London (GB); Peter Robert Seem, London (GB)

(73) Assignee: Ingenia Holdings Limited (VG)

( * ) Notice: Subject to any disclaimer, the term of this patent is extended or adjusted under 35 U.S.C. 154(b) by 424 days.

(21) Appl. No.: 11/615,581

(22) Filed: Dec. 22, 2006

(65) Prior Publication Data

US 2007/0165208 A1    Jul. 19, 2007

Related U.S. Application Data

(60) Provisional application No. 60/753,633, filed on Dec. 23, 2005, provisional application No. 60/745,257, filed on Apr. 20, 2006.

(30) Foreign Application Priority Data

Dec. 23, 2005  (GB)  ................................. 0526422.1
Apr. 20, 2006  (GB)  ................................. 0607867.9
Dec. 14, 2006  (GB)  ................................. 0526662.2

(51) Int. Cl.
    *G06K 9/74*    (2006.01)
(52) U.S. Cl. ........................... 356/71; 356/341; 356/343
(58) Field of Classification Search ....................... None
    See application file for complete search history.

(56) References Cited

U.S. PATENT DOCUMENTS 3,781,109 A    12/1973   Mayer, Jr. et al.

(Continued)

FOREIGN PATENT DOCUMENTS

CN    1588847    3/2005

(Continued)

OTHER PUBLICATIONS

Haist et al., "Optical detection of random features for high security applications," Optics Communications, 147:173-179 (1998).

(Continued)

*Primary Examiner*—Gregory J Toatley, Jr.
*Assistant Examiner*—Juan D Valentin
(74) *Attorney, Agent, or Firm*—McDonnell Boehnen Hulbert & Berghoff LLP

(57)    ABSTRACT

An apparatus for determining a signature from an article in a reading volume of the apparatus. The apparatus can comprise a source operable to generate a coherent beam and a beam directing member operable to direct the coherent beam into the reading volume. The apparatus may also comprise a detector arrangement for collecting signals created by scatter of the coherent beam within the reading volume, wherein different ones of the signals relate to scatter from different parts of the reading volume, the detector arrangement having a numerical aperture greater than a predetermined minimum and a processor operable to determine a signature for an article in the reading volume from the collected signals. Use of such apparatus can be repeated whenever required to test authenticity of the article. Using this system, it has been discovered that it is essentially pointless to go to the effort and expense of making specially prepared tokens, since unique characteristics are measurable in a straightforward manner from a wide variety of every day articles.

63 Claims, 71 Drawing Sheets

U.S. PATENT DOCUMENTS

| | | | |
|---|---|---|---|
| 4,179,212 A | 12/1979 | Lahr | |
| 4,218,674 A | 8/1980 | Brosow et al. | |
| 4,423,415 A | 12/1983 | Goldman | |
| 4,544,266 A | 10/1985 | Antes | |
| 4,568,936 A | 2/1986 | Goldman | |
| 4,599,509 A | 7/1986 | Silverman | |
| 4,738,901 A | 4/1988 | Finkel et al. | |
| 4,748,316 A | 5/1988 | Dickson | |
| 4,785,290 A | 11/1988 | Goldman | |
| 4,817,176 A | 3/1989 | Marshall et al. | |
| 4,820,912 A | 4/1989 | Samyn | |
| 4,920,385 A | 4/1990 | Clarke et al. | |
| 4,929,821 A | 5/1990 | Kocznar et al. | |
| 5,054,066 A | 10/1991 | Riek et al. | |
| 5,059,776 A | 10/1991 | Antes | |
| 5,120,126 A | 6/1992 | Wertz et al. | |
| 5,133,601 A | 7/1992 | Cohen | |
| 5,142,578 A | 8/1992 | Matyas et al. | |
| 5,194,918 A | 3/1993 | Kino | |
| 5,243,405 A | 9/1993 | Tichenor et al. | |
| 5,325,167 A | 6/1994 | Melen | |
| 5,384,717 A | 1/1995 | Ebenstein | |
| 5,451,759 A | 9/1995 | Hoshino et al. | |
| 5,453,840 A | 9/1995 | Parker | |
| 5,485,312 A | 1/1996 | Horner | |
| 5,488,661 A | 1/1996 | Matsui | |
| 5,510,199 A | 4/1996 | Martin | |
| 5,521,984 A | 5/1996 | Denenberg | |
| 5,546,462 A | 8/1996 | Indeck et al. | |
| 5,637,854 A | 6/1997 | Thomas | |
| 5,647,010 A | 7/1997 | Okubo et al. | |
| 5,673,338 A | 9/1997 | Denenberg et al. | |
| 5,687,002 A | 11/1997 | Itoh | |
| 5,760,386 A | 6/1998 | Ward | |
| 5,767,988 A | 6/1998 | Dobbs et al. | |
| 5,784,463 A | 7/1998 | Chen et al. | |
| 5,790,025 A | 8/1998 | Amer | |
| 5,886,798 A | 3/1999 | Staub et al. | |
| 5,903,721 A | 5/1999 | Sixtus | |
| 5,912,974 A | 6/1999 | Holloway et al. | |
| 6,029,150 A | 2/2000 | Kravitz | |
| 6,141,119 A | 10/2000 | Tseng et al. | |
| 6,182,892 B1 | 2/2001 | Angelo | |
| 6,223,166 B1 | 4/2001 | Kay | |
| 6,280,797 B1 | 8/2001 | Kuczynski et al. | |
| 6,314,409 B2 | 11/2001 | Schneck et al. | |
| 6,332,663 B1 | 12/2001 | Puzio | |
| 6,365,907 B1 | 4/2002 | Staub | |
| 6,389,151 B1 | 5/2002 | Carr | |
| 6,390,368 B1 | 5/2002 | Edwards | |
| 6,466,329 B1 | 10/2002 | Mukai | |
| 6,473,165 B1 * | 10/2002 | Coombs et al. | 356/71 |
| 6,560,355 B2 | 5/2003 | Graves et al. | |
| 6,563,129 B1 | 5/2003 | Knobel | |
| 6,584,214 B1 | 6/2003 | Pappu | |
| 6,621,916 B1 | 9/2003 | Smith et al. | |
| 6,741,360 B2 | 5/2004 | D'Agraives | |
| 6,760,472 B1 | 7/2004 | Takeda et al. | |
| 6,779,720 B2 | 8/2004 | Lewis | |
| 6,850,147 B2 | 2/2005 | Prokoski et al. | |
| 6,882,738 B2 | 4/2005 | Davis et al. | |
| 6,928,552 B1 | 8/2005 | Mischenko et al. | |
| 6,950,094 B2 | 9/2005 | Gordon et al. | |
| 6,955,141 B2 | 10/2005 | Santanam et al. | |
| 6,961,449 B2 | 11/2005 | Mil'shtein | |
| 6,970,573 B2 | 11/2005 | Carr et al. | |
| 6,977,791 B2 | 12/2005 | Zhu et al. | |
| 7,002,675 B2 | 2/2006 | Macgibbon | |
| 7,071,481 B2 | 7/2006 | Nekrasov et al. | |
| 7,076,084 B2 | 7/2006 | Davis et al. | |
| 7,080,041 B2 | 7/2006 | Nagel | |
| 7,082,216 B2 | 7/2006 | Jones et al. | |
| 7,111,321 B1 | 9/2006 | Watts, Jr. et al. | |
| 7,119,662 B1 | 10/2006 | Horiguchi et al. | |
| 7,143,949 B1 | 12/2006 | Hannigan | |
| 7,164,810 B2 | 1/2007 | Schnee et al. | |
| 7,170,391 B2 | 1/2007 | Lane | |
| 7,200,868 B2 | 4/2007 | Mattox et al. | |
| 7,221,445 B2 | 5/2007 | Earthman | |
| 7,222,361 B2 | 5/2007 | Kemper | |
| 7,277,183 B2 | 10/2007 | Deck | |
| 7,333,629 B2 | 2/2008 | Patton et al. | |
| 7,346,184 B1 | 3/2008 | Carr et al. | |
| 7,353,994 B2 | 4/2008 | Farrall | |
| 7,389,530 B2 | 6/2008 | Raghunath et al. | |
| 7,497,379 B2 | 3/2009 | Chen | |
| 7,506,365 B2 | 3/2009 | Hirano et al. | |
| 7,567,349 B2 * | 7/2009 | Tearney et al. | 356/479 |
| 7,577,844 B2 | 8/2009 | Kirovski | |
| 7,602,904 B2 | 10/2009 | Juels et al. | |
| 7,605,940 B2 | 10/2009 | Silverbrook et al. | |
| 7,647,279 B2 | 1/2010 | Bourrieres et al. | |
| 7,684,069 B2 | 3/2010 | Kashiwazaki | |
| 2002/0091555 A1 | 7/2002 | Leppink | |
| 2002/0111837 A1 | 8/2002 | Aupperle | |
| 2002/0116329 A1 | 8/2002 | Serbetcioglu et al. | |
| 2003/0012374 A1 | 1/2003 | Wu et al. | |
| 2003/0018587 A1 | 1/2003 | Althoff | |
| 2003/0028494 A1 | 2/2003 | King et al. | |
| 2003/0035539 A1 | 2/2003 | Thaxton | |
| 2003/0118191 A1 | 6/2003 | Wang | |
| 2003/0156294 A1 | 8/2003 | D'Agraives | |
| 2003/0178487 A1 | 9/2003 | Rogers | |
| 2003/0219145 A1 | 11/2003 | Smith | |
| 2003/0231806 A1 | 12/2003 | Troyanker et al. | |
| 2004/0059952 A1 | 3/2004 | Newport | |
| 2004/0101158 A1 | 5/2004 | Butler | |
| 2004/0199765 A1 | 10/2004 | Kohane et al. | |
| 2005/0044385 A1 | 2/2005 | Holdsworth | |
| 2005/0060171 A1 | 3/2005 | Molnar | |
| 2005/0101841 A9 | 5/2005 | Kaylor et al. | |
| 2005/0108057 A1 | 5/2005 | Cohen et al. | |
| 2005/0122209 A1 | 6/2005 | Black | |
| 2005/0178841 A1 | 8/2005 | Jones et al. | |
| 2005/0217969 A1 | 10/2005 | Coombs et al. | |
| 2006/0022059 A1 | 2/2006 | Juds | |
| 2006/0104103 A1 | 5/2006 | Colineau et al. | |
| 2006/0166381 A1 | 7/2006 | Lange | |
| 2006/0294583 A1 | 12/2006 | Cowburn et al. | |
| 2007/0025619 A1 | 2/2007 | Cowburn et al. | |
| 2007/0027819 A1 | 2/2007 | Cowburn | |
| 2007/0028093 A1 | 2/2007 | Cowburn et al. | |
| 2007/0028107 A1 | 2/2007 | Cowburn et al. | |
| 2007/0028108 A1 | 2/2007 | Cowburn et al. | |
| 2007/0036470 A1 | 2/2007 | Piersol et al. | |
| 2007/0053005 A1 | 3/2007 | Cowburn | |
| 2007/0113076 A1 | 5/2007 | Cowburn et al. | |
| 2007/0115497 A1 | 5/2007 | Cowburn | |
| 2007/0136612 A1 | 6/2007 | Asano et al. | |
| 2007/0153078 A1 | 7/2007 | Cowburn | |
| 2007/0162961 A1 | 7/2007 | Tarrance et al. | |
| 2007/0164729 A1 | 7/2007 | Cowburn et al. | |
| 2007/0188793 A1 | 8/2007 | Wakai | |
| 2007/0192850 A1 | 8/2007 | Cowburn | |
| 2007/0271456 A1 | 11/2007 | Ward et al. | |
| 2008/0002243 A1 | 1/2008 | Cowburn | |
| 2008/0016358 A1 | 1/2008 | Filreis et al. | |
| 2008/0044096 A1 | 2/2008 | Cowburn | |
| 2008/0260199 A1 | 10/2008 | Cowburn | |
| 2008/0294900 A1 | 11/2008 | Cowburn | |
| 2009/0016535 A1 | 1/2009 | Cowburn | |
| 2009/0083372 A1 | 3/2009 | Teppler | |
| 2009/0283583 A1 | 11/2009 | Cowburn | |
| 2009/0290906 A1 | 11/2009 | Cowburn | |

| | | | |
|---|---|---|---|
| 2009/0303000 A1 | 12/2009 | Cowburn | |
| 2009/0307112 A1 | 12/2009 | Cowburn | |
| 2010/0007930 A1 | 1/2010 | Cowburn | |
| 2010/0008590 A1 | 1/2010 | Cowburn | |

FOREIGN PATENT DOCUMENTS

| | | |
|---|---|---|
| DE | 19632269 | 2/1997 |
| DE | 19612819 | 10/1997 |
| DE | 10155780 | 5/2003 |
| EP | 0234105 | 9/1987 |
| EP | 0278058 | 8/1988 |
| EP | 0480620 | 4/1992 |
| EP | 0570162 | 11/1993 |
| EP | 0590826 | 4/1994 |
| EP | 0691632 | 1/1996 |
| EP | 1273461 | 1/2003 |
| EP | 1286315 | 2/2003 |
| EP | 1388797 | 2/2004 |
| EP | 1418542 | 5/2004 |
| EP | 1434161 | 6/2004 |
| EP | 1507227 | 2/2005 |
| EP | 1577812 | 9/2005 |
| EP | 1616711 | 12/2005 |
| EP | 1990779 | 11/2008 |
| GB | 1319928 | 3/1972 |
| GB | 1458726 | 12/1976 |
| GB | 2097979 | 11/1982 |
| GB | 2221870 | 2/1990 |
| GB | 2228821 | 9/1990 |
| GB | 2304077 | 12/1997 |
| GB | 2346110 | 1/2000 |
| GB | 2346111 | 1/2000 |
| GB | 2411954 | 9/2005 |
| GB | 2417074 | 2/2006 |
| GB | 2417592 A | 3/2006 |
| GB | 2417707 | 3/2006 |
| GB | 2426100 | 11/2006 |
| GB | 2428846 | 2/2007 |
| GB | 2428948 | 2/2007 |
| GB | 2429092 | 2/2007 |
| GB | 2429097 | 2/2007 |
| GB | 2431759 | 5/2007 |
| GB | 2433632 | 6/2007 |
| GB | 2434642 | 8/2007 |
| GB | 2462059 | 7/2008 |
| JP | 07210721 | 8/1995 |
| JP | H08-003548 | 1/1996 |
| JP | 09218910 | 8/1997 |
| JP | H11-224319 | 8/1999 |
| JP | 2000140987 | 5/2000 |
| JP | 2003-150585 | 5/2003 |
| JP | 2004171109 | 6/2004 |
| JP | 2005217805 | 8/2005 |
| KR | 20050023050 | 3/2005 |
| NL | 8002604 | 12/1981 |
| NL | 9401796 C | 10/1994 |
| RU | 2043201 | 9/1995 |
| RU | 2065819 | 8/1996 |
| WO | 89/00742 | 1/1989 |
| WO | 91/11703 | 8/1991 |
| WO | 91/19614 | 12/1991 |
| WO | 98/22745 | 11/1993 |
| WO | 95/24691 | 9/1995 |
| WO | 96/36934 | 11/1996 |
| WO | 97/24699 | 7/1997 |
| WO | 00/45344 | 8/2000 |
| WO | 00/46980 | 8/2000 |
| WO | 00/65541 | 11/2000 |
| WO | 01/18754 | 3/2001 |
| WO | 01/43086 | 6/2001 |
| WO | 01/86574 | 11/2001 |
| WO | 01/86589 | 11/2001 |
| WO | 02/16112 | 2/2002 |
| WO | 02/16114 | 2/2002 |
| WO | 02/50790 | 6/2002 |
| WO | 2004/025548 | 3/2004 |
| WO | 2004/025549 | 3/2004 |
| WO | WO2004/057525 | 7/2004 |
| WO | 2004/070667 | 8/2004 |
| WO | 2004/097826 | 11/2004 |
| WO | 2004/109479 | 12/2004 |
| WO | 2005/004039 | 1/2005 |
| WO | 2005/004797 | 1/2005 |
| WO | 2005/027032 | 3/2005 |
| WO | 2005/088517 | 3/2005 |
| WO | 2005/048256 | 5/2005 |
| WO | 2005/078651 | 8/2005 |
| WO | 2005/086158 | 9/2005 |
| WO | 2005088533 | 9/2005 |
| WO | 2005/122100 | 12/2005 |
| WO | 2006/021083 | 3/2006 |
| WO | 2006/132584 | 12/2006 |
| WO | 2007/012815 | 2/2007 |
| WO | 2007/012821 | 2/2007 |
| WO | 2007/028799 | 3/2007 |
| WO | 2007/072048 | 6/2007 |
| WO | 2007/080375 | 7/2007 |
| WO | 2007/111548 | 10/2007 |
| WO | 2007/144598 | 12/2007 |
| WO | 2009/141576 | 11/2009 |
| WO | 2010/004281 | 1/2010 |
| WO | 2010/004282 | 1/2010 |

OTHER PUBLICATIONS

Buchanan, James, "Fingerprinting Documents and Packaging," Nature 436, Jul. 28, 2005, p. 475.
International Search Report for Great Britain patent application No. GB0607867.9, Aug. 2006.
Kravolec, "Plastic Tag Makes Foolproof ID," Technology Research News, Oct. 2, 2002.
Anderson, R., "Security Engineering: A Guide to Building Dependable Distributed Systems," Wiley 2001, pp. 251-252.
Zhang, D., "Shape-Based Image Retrieval Using Generic Fourier Descriptor," Signal Processing. Image Communication, Ellsevier Science Publishers, Amsterdam, NL, Nov. 2002.
Derrode, S., "Robust and Efficient Fourier-Mellin Transform Approximations for Gray-Level Image Reconstruction and Complete Invariant Description," Computer Vision and Image Understanding, Academic Press, San Diego, CA, Jul. 2001.
Ravikanth, P, "Physical One-Way Functions," Thesis at the Massachusetts Institute of Technology, pp. 1-154, Mar. 2001.
Chen, Y., "Certifying Authenticity via Fiber-Infused Paper," Apr. 2005.
Kirovski, D., "Toward an Automated Verification of Certificates of Authentication," 2004.
Smalley, "Plastic Tag Makes Foolproof ID," TRN, 2 pages.
Written Opinion for PCT/GB2007/000015 dated May 4, 2007.
International Search Report for PCT/GB2009/001702 dated Oct. 23, 2009.
UK Search Report for GB0812772.2 dated Nov. 6, 2008.
UK Search Report for GB0812773 dated Mar. 2009.
UK Search Report for GB0812773 dated Nov. 2008.
International Search Report for PCT/GB2007/002173 dated Sep. 19, 2007.
Search Report for GB0720673.3 dated Mar. 28, 2008.
G.J. Simmons, A survey of information authentication, In <i>Contemporary Cryptology, The Science of Information Integrity</i>, pp. 379-419 IEEE Press (1992).
International Search Report for PCT/GB2005/0009222 dated Jun. 10, 2005.
Pappu et al., "Physical one-way functions," Science, American Association for the Advancement of Science, vol. 297, No. 5589, pp. 2026-2030 (2002).

Cowburn, Russell, "Nanotechnology-Security and Brand Protection Applications 01," Smart Brand and Product Protection Conference 2005, Apr. 8, 2005 to Apr. 9, 2005, pp. 1-4, London, UK.

Van Renesse R.L., "Optical inspection techniques for security instrumentation," Proceedings of SPIE-The International Society for Optical Engineering, Vo. 2659, pp. 159-167 (Mar. 1996).

Anonymous, "Discs and paper get biometric identifiers," IEEE Review, vol. 50, No. 12, p. 23, (Dec. 2004).

Wilkes, Sally, "Fighting Fraud: Document Biometrics," Materials World, vol. 12, No. 12, pp. 29-30 (Dec. 2004).

Smith et al., "Microstructure Based Indicia," Laboratories Escher Group, pp. 1-5 (1999).

El-Khamy S. E. et al., "The FBG stream cipher," Proceedings of the 24th Radio National Science Conference (NRSC 2007) IEEE Cairo, Egypt, pp. 1-8 (Mar. 2007).

Hao F. et al., "Combining crypto with biometrics effectively," IEEE Transactions on Computers IEEE USA, 55(9):1081-1088 (Sep. 2006).

International Search Report for Great Britain Patent Application No. GB0711461.4 dated Sep. 21, 2007.

International Search Report and Written Opinion for PCT/GB2008/002020 dated Jun. 16, 2009.

Huss G. et al., "Spatial filtering efficiency of single-mode optical fibers for stellar interferometry applications: phenomenological and numerical study," Optics Communications, North-Holland Publishing Co., Amsterdam, NL, 244:209-217 (Sep. 23, 2004).

Kvasnik et al., "Image recognition using surface scattered light in a coherent optical processor," Image Processing and its Applications, University of Manchester Institute of Science and Technology UK, pp. 361-364 (1992).

* cited by examiner

Baseline

Paper tilted by 0.06 degrees

Baseline

Sample shifted by 40μm

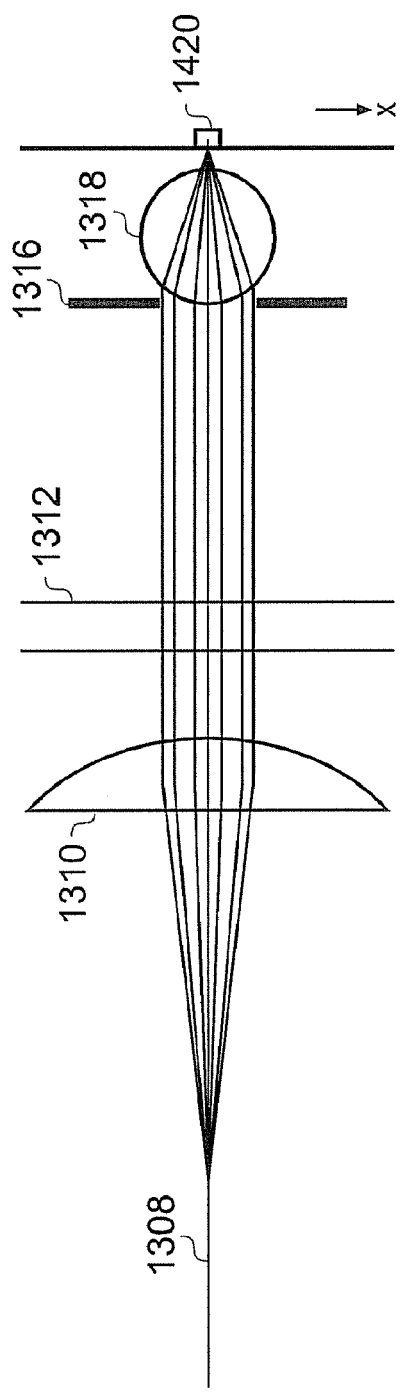
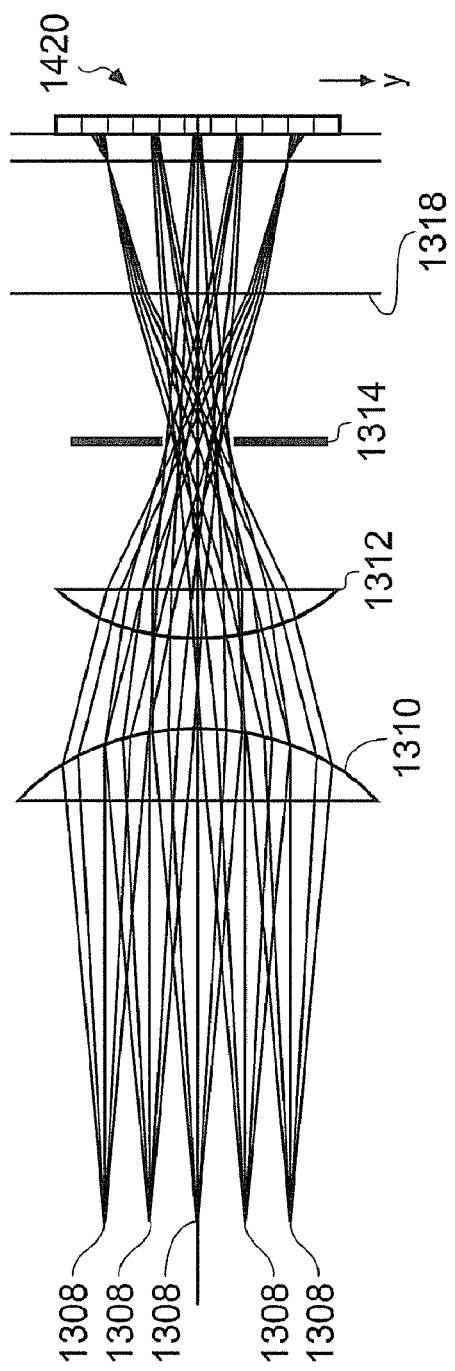

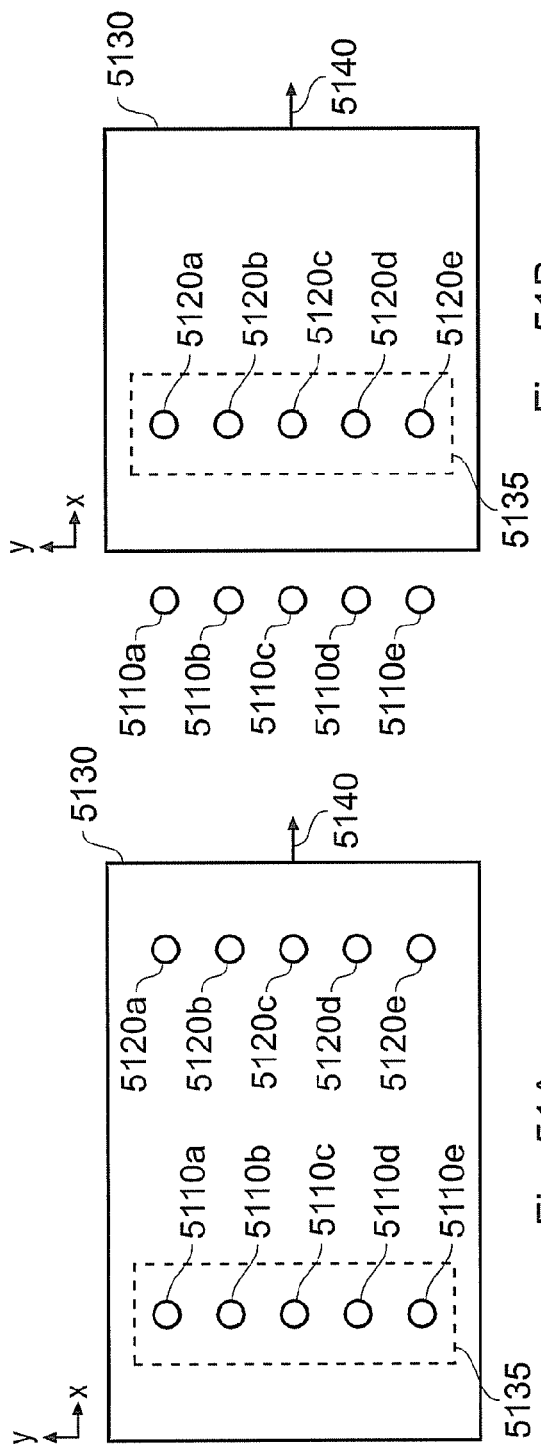
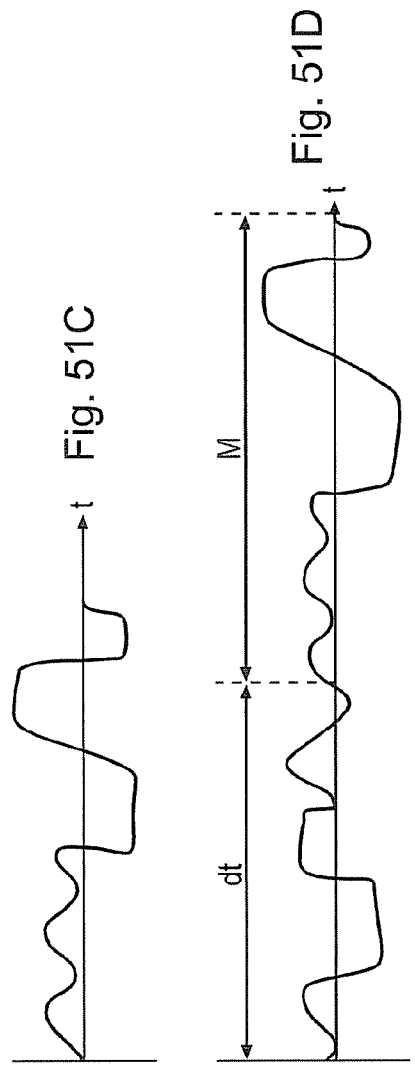
Fig. 51A
Fig. 51B
Fig. 51C
Fig. 51D

OPTICAL AUTHENTICATION

RELATED APPLICATIONS

This application claims priority to and incorporates by reference U.S. provisional application Nos. 60/753,633, filed on Dec. 23, 2005, and 60/745,257, filed Apr. 20, 2006, and Great Britain patent application numbers GB 0526422.1 filed on Dec. 23, 2005, GB 0526662.2 filed on Dec. 23, 2005, and GB 0607867.9 filed on Apr. 20, 2006.

FIELD

The present invention relates to authentication and in particular, but not exclusively to methods and apparatus for authentication of an article.

BACKGROUND

Many traditional authentication security systems rely on a process which is difficult for anybody other than the manufacturer to perform, where the difficulty may be imposed by expense of capital equipment, complexity of technical know-how or preferably both. Examples are the provision of a watermark in bank notes and a hologram on credit cards or passports. Unfortunately, criminals are becoming more sophisticated and can reproduce virtually anything that original manufacturers can do.

Because of this, there is a known approach to authentication security systems which relies on creating security tokens using some process governed by laws of nature which results in each token being unique, and more importantly having a unique characteristic that is measurable and can thus be used as a basis for subsequent verification. According to this approach tokens are manufactured and measured in a set way to obtain a unique characteristic. The characteristic can then be stored in a computer database, or otherwise retained. Tokens of this type can be embedded in the carrier article, e.g. a banknote, passport, ID card, important document. Subsequently, the carrier article can be measured again and the measured characteristic compared with the characteristics stored in the database to establish if there is a match.

Within this general approach it has been proposed to use different physical effects. One effect that has been considered is to measure a magnetic response characteristic from depositions of magnetic materials, where each sample has a unique magnetic response as a result of naturally occurring defects in the magnetic material which form in an irreproducible manner PCT/GB03/03917. Another effect that has been considered in a number of prior art documents is to use laser speckle from intrinsic properties of an article to provide a unique characteristic.

GB 2 221 870 A discloses a method in which a security device, such as an ID card, effectively has a token embossed on it. The form of the token is a structured surface derived from a master. The speckle pattern from the light scattering structure is unique to the master and therefore can be measured to prove authenticity of the token on the security device. The token on the security device is measured in a reader which has a laser for generating a coherent beam of a size roughly equal to the token (2 mm diameter) and a charged coupled device (CCD) array detector for measuring the speckle pattern created by the interference between the various reflections of the laser light from the token. The resulting data is recorded. For verification, a security device can be placed in the reader and its recorded speckle pattern signal compared against a similar recorded signal from a reference device created from the same master.

U.S. Pat. No. 6,584,214 describes an alternative to using speckle patterns in reflection from a specially prepared surface structure, in which speckle patterns are instead used in transmission from a specially prepared transparent token. The preferred implementation of this technique is to prepare epoxy tokens of dimension approximately 1 cm×1 cm in which glass spheres are embedded. The tokens are prepared by mixing the glass spheres in a colloidal suspension in a liquid polymer, which is then cured to fix the positions of the glass spheres. The unique ensemble of glass spheres is then probed using a coherent laser beam in transmission with a CCD array detector positioned to measure the speckle pattern. In a modification of this approach, a known identifier is encoded on a reflective surface which is then stuck to one side of the token. The probing light passes through the token, is reflected by the known identifier and passes through the token again. The glass spheres thus modify the speckle pattern so that a unique hashed key is generated from the known identifier.

R Anderson (in a letter in response to the article "Plastic tag makes foolproof ID" Technology Research News, 2 Oct. 2002) briefly reports that in the 1980's workers at Sandia National Laboratories in the US experimented with special banknote paper which was impregnated with chopped-up optical fibres. A speckle pattern could be measured from the optical fibres and a digitally signed version of this printed as a barcode on the side of the note. However, Anderson reports that this idea could not be made to work properly, because the optical fibres were too fragile and the speckle pattern changed rapidly when the banknote was circulated owing to wear. This meant that the speckle pattern measured from the optical fibres in a used banknote no longer matched the barcode, so the banknote could no longer be authenticated from the speckle pattern in the intended manner.

Anderson on page 251 of his 2001 text book (R Anderson "Security Engineering: a guide to building dependable distributed systems" Wiley 2001, pages 251-252 ISBN 0-471-38922-6) also briefly refers to what appears to be a similar scheme to that described by his letter which is used for monitoring arms control agreements. Anderson observes that many materials have surfaces that are unique or that can be made so by eroding them with a small explosive charge. This is said to make it easy to identify capital equipment such as heavy artillery, where identifying each gun barrel is enough to prevent cheating by either party to an arms control agreement. Anderson reports that the surface pattern of the gun barrel is measured using laser speckle techniques, and either recorded in a log or attached to the device as a machine-readable digital signature.

Instead of using laser speckle, there is a more-straightforward group of proposed schemes that simply image an article at high resolution and use this high resolution image as the unique characteristic, which can then be re-imaged subsequently for verification of authenticity. This may be regarded as an adaptation of the conventional approach used for fingerprint libraries held by police forces.

U.S. Pat. No. 5,521,984 proposes using an optical microscope to take an image of a small area of a valuable article, such as a painting, sculpture, stamp, gem or specific document.

Anderson on page 252 of his 2001 text book reports that postal systems were considering schemes of this kind based on direct imaging of envelopes with a microscope. It is reported that an image of the paper fibres of an envelope is made, a pattern extracted, and recorded in the postal franking mark, which is digitally signed.

U.S. Pat. No. 5,325,167 proposes imaging the grain structure of toner particles on a part of a valuable document following a similar scheme.

Through this previous work, there are various desirable features that are apparent for an ideal verification scheme.

The reported magnetic or speckle based techniques appear to be capable of providing high security levels, but require special materials to be prepared for practical implementation to ensure long-term stability of the probed structure. In many cases, integration of a token into the article to be secured is non-trivial. Particularly, integration of a resin token or a magnetic chip in paper or cardboard is not easy and involves significant cost. For integration with paper or cardboard, any token should ideally be printable. Additionally, there is also an inherent security risk of an attachable token-based approach in that the token is potentially detachable and attachable to a different article.

The reported direct imaging techniques have the advantage that they obtain their digital signature directly from the article, obviating the need for special tokens. However, their intrinsic security is low. For example they are vulnerable to fraudulent access to the stored image data which may allow fabrication of an article that could be verified incorrectly as being authentic, or to forging by simply using a high resolution printer to print an image of what would be seen under a microscope when viewing the relevant part of the genuine article. The security level of direct imaging techniques also scales with the volume of the image data, forcing use of expensive high resolution imaging equipment for higher security levels. This may be acceptable in some applications, such as postal sorting or banknote verification, but in many applications will be unacceptable.

Additionally, James D. R. Buchanan et al in "Forgery: 'Fingerprinting' documents and packaging", Nature 436, 475-475 (28 Jul. 2005) describe a system for using reflected laser light from an article to uniquely identify the article with a high degree of reproducibility not previously attained in the art. Buchanan's technique samples reflections from an article surface a number of times at each of multiple points in the surface to create a signature or "fingerprint" for the article.

SUMMARY

The present invention has been made, at least in part, in consideration of problems and drawbacks of conventional systems.

The present invention resulted from the inventor's work on applying optically based authentication techniques, where article uniqueness is provided by unreproducible elements in the surface of an article (see Buchanan. supra).

As part of this work, it was discovered that the reflected or transmitted pattern from an article includes components at two greatly different angular frequencies. The high angular frequency component (which is what is traditionally referred to as "speckle") is extremely sensitive to perturbations in the relative positioning of the target article and incident laser. Depending upon the material of the article and the nature of the laser, a complete change in the reflected pattern can occur at angular perturbations of as little as 0.1 degrees from the intended angular incidence. However, the low angular frequency component (the "non-speckle" component) is very resilient to such angular perturbation.

On further investigation, it was established that many unprepared surfaces, such as surfaces of various types of paper, cardboard and plastic, show the same effect. Moreover, it has been established by the inventor that a unique characteristic can be determined solely from the non-speckle contributions. Thus, whilst the speckle effect does create a unique signature, the non-speckle elements can be used to provide a more reliable and reproducible signature than is the case with speckle alone.

It has thus been discovered that it is possible to gain all the advantages of speckle based techniques without having to use a specially prepared token or specially prepare an article in any other way. In particular, many types of paper and cardboard have been found to give unique characteristic scattering signals from a coherent light beam, so that unique digital signatures can be obtained from almost any paper document or cardboard packaging item. Also, by employing a system having the characteristics described herein, whereby each single target region is sampled at a high numerical aperture, the robustness of the system to angular misalignment of the target and interference from background illumination can be significantly improved. Further, by adopting a system which takes samples from a large target surface area, the robustness of the system to translational misalignment of the target can be significantly improved.

Most of the above-described previous speckle readers used for security devices appear to be based on illuminating the whole of a token with a collimated, i.e. unfocused, laser beam and imaging a significant solid angle portion of the resultant speckle pattern with a CCD [GB 2 221 870, U.S. Pat. No. 6,584,214], thereby obtaining a speckle pattern image of the token made up of a large array of data points.

The reader used by the inventor does not operate in this manner. In fact, the detector of the present invention cannot use an unfocussed beam which covers the majority of the target area, as this obscures the low angular frequency non-speckle component such that only the speckle part to be read. The beam is of course understood to have a finite area upon incidence with a target surface, but the larger this incidence area, the greater the obscuring of the non-speckle component of the reflections.

The reader used by the inventor of the present application reads the non-speckle component over a solid angle large enough to average out the more unreliable speckle part of the reflected or refracted light. In so doing the signature generated by the reader can effectively ignore the speckle component of the reflected or refracted light and thus create a signature which is reproducible for a given article even where positioning perturbations of the article relative to the reader occur between different scans of the article.

From one viewpoint a scanner of the present invention operates to sample individual "pixels" or points of one or more reflection images from a surface. Each photodetector in the scanner samples a different reflection image. By sampling a single point at a time, reflection content from other points on the surface do not interfere with the sampled data. Thereby low frequency components in the reflection image can be recorded, thus allowing the position sensitive speckle (high frequency) component to be largely ignored. Each location on the surface from which the reflection image is sampled represents a different "pixel" in each reflection image.

In one example, a reader is provided which has a single photodetector to collect signal components reflected from an article surface. The laser beam incident upon the surface is focussed to a spot covering only a small part of the surface. Signal is collected from different localised areas of the surface as the beam and surface are moved relative one another. The characteristic response from the article is thus made up of independent measurements from a large number (typically hundreds or thousands) of different localised areas on the article surface. Although a single photodetector is used in this example, further photodetectors can be added to obtain higher security levels.

According to one aspect of the invention there is thus provided an apparatus for determining a signature from an article arranged in a reading volume. The apparatus can comprise a source operable to generate a coherent beam and a beam directing member operable to direct the coherent beam into the reading volume. The apparatus can also comprise a detector arrangement for collecting signals created by scatter of the coherent beam within the reading volume, wherein different ones of the signals relate to scatter from different parts of the reading volume, the detector arrangement having a numerical aperture greater than a predetermined minimum and a processor operable to determine a signature for an article in the reading volume from the collected signals. Thereby a signature can be determined for an article in a manner which avoids overdependence upon an angular positioning sensitive high angular frequency component of the reflected signals. This same effect also provides resilience to surface degradations which may have the effect of imparting an effective angular perturbation of the optical relative to the surface. For example, water on a surface can appear to alter the angle of the surface. By using a large numerical aperture in the detector, a low angular frequency component in the reflected signal can be emphasised relative to the high angular frequency component which makes up traditional speckle signal. The low angular frequency component of the reflected signal is much less sensitive to angular perturbations of the target than the traditional speckle high angular frequency component.

In some embodiments, it is ensured that different ones of the data points relate to scatter from different parts of the reading volume by causing different parts of the reading volume to be illuminated at different times and measuring scatter from points undergoing localised illumination at a given time. By adopting such an arrangement, the system can be resilient to translational perturbation of the target relative to the apparatus. Sufficient data can be obtained from the scatter from only a part of the total target area to robustly and reliably determine a match condition to a pre-stored signature.

In some embodiments, a scanner may be provided which is operable to scan a strip across the reading volume, with the strip being divided into multiple target regions, each of which is sampled in parallel. In some such embodiments, a single common optical system can capture light relating to each target region at the same numerical aperture, hence ensuring that all captured points are treated equally.

In some embodiments, it is ensured that different ones of the data points relate to scatter from different parts of the reading volume by providing a rasterising system for causing the coherent beam to move over the reading volume. The rasterising system may utilise movable mirrors and/or movable prisms to reflect and/or refract the beam. Alternatively, a drive system could be provided to cause the beam and surface to be moved relative to one another. Alternatively, the drive could be manual in a low cost reader. For example, the operator could scan the beam over the reading volume by moving a carriage on which the article is mounted across a static beam. A focusing arrangement may be provided for bringing the coherent beam into focus in the reading volume. The focusing arrangement may be configured to bring the coherent beam to an elongate focus, in which case the rasterising system and/or drive is preferably configured to move the coherent beam relative to the reading volume in a direction transverse to the major axis of the elongate focus. An elongate focus can conveniently be provided with a cylindrical lens, or equivalent mirror arrangement.

In some embodiments, the predetermined minimum is greater than approximately 0.1025. In other embodiments, the predetermined minimum is greater than approximately 0.05. Increasing the numerical aperture decreases the dependence upon the high frequency component of the reflected signals.

In some embodiments, the apparatus may have a reading range of between 0 m and 10 m. In other embodiments, the reading range may be more or less limited in both absolute and relative extent. Where the reading range has a large extent, the apparatus may further comprise a focussing member operable to focus the coherent beam at a distance within in the reading volume.

In some embodiments, the beam directing member can be operable to raster the coherent beam through the reading volume. Thereby an area of the article much larger than a focus area of the article may be read.

In some examples, apparatus may be configured to read reflected signals from an article moving through the reading volume. Thereby an area of the article much larger than a focus area of the article may be read.

In some examples, a single photodetector may be provided. This photodetector may be operable to detect a signal reflected back along the path of the coherent beam. Thereby a compact reader apparatus with a long reading range may be provided.

In other examples, a plurality of photodetectors may be provided, each operable to detect signals reflected at respectively different angles to the path of the coherent beam. Thereby a more difficult to spoof signature may be obtained.

In some examples, the beam directing member may be operable to direct the coherent beam onto the reading volume so that it will strike an article with near normal incidence.

In some examples, the processor can be operable to include in the signature a contribution from a comparison between signals received from a single detector channel. The comparison may involve a cross-correlation.

In some examples, the apparatus can further comprise a database of previously recorded signatures, wherein the apparatus is operable to access the database and perform a comparison to establish whether the database contains a match to the signature of an article that has been placed in the reading volume. The apparatus may be allowed to add a signature to the database if no match is found.

In some examples, the processor may be further operable to determine a thumbnail signature of the article by digitising an amplitude part of a Fourier transform of the collected signals. The apparatus may be further operable to store the signature with its thumbnail digital signature in a database. The signature may be stored with its thumbnail signature in the database conditional on there being no match between it and any signature already stored in the database.

In some examples, there may also be provided a database of previously recorded signatures and their thumbnail signatures and a comparator operable to search the database to seek at least one candidate match by performing a comparison between the determined thumbnail signature and the previously recorded thumbnail signatures; and to determine for any candidate match whether there is a match by performing a comparison between the determined signature and the at least one previously recorded signatures. The comparator may be further operable to determine for each match a confidence level based on degree of similarity between the determined signature and the previously recorded signature found to have a match. The comparator may also be operable to split the determined signature into blocks of contiguous data and to perform a comparison operation between each block and respective blocks of the stored signature. The comparator may additionally be operable to compare an attribute of a comparison result from each block comparison to an expected attribute of the block comparison to determine a compensation value for use in determining a comparison result; and wherein the comparison unit is further operable to determine a similarity result between the determined signature and the stored signature, using the compensation value to adjust the determined signature. The comparator may also be operable to compare an actual cross-correlation peak location of a comparison result between a block of the determined signature and the corresponding block of the stored signature to an expected cross correlation peak location to determine the compensation value for use in determining a comparison result. The comparator may also be operable to determine the compensation value by estimating a function of best fit to the cross-correlation peak locations for each of the block comparisons, the function of best fit representing an average deviation from the expected cross-correlation peak locations.

In some examples the comparator may be operable to calculate a similarity result for each compared block. The comparator can also be operable to compare the similarity result for at least one predetermined block to a predetermined similarity threshold. Additionally, the comparator can be operable to return a negative comparison result in the event of the similarity result for the at least one predetermined block being below a predetermined similarity threshold, regardless of a similarity result for the signatures as a whole.

Such apparatus can be used in order to populate a database with signatures by reading a succession of articles, in order to verify authenticity of an article and/or in order to ascertain whether an article has been tampered with.

An article may be verified by a method comprising determining a signature for the article using an apparatus as set out above, comparing the signature so determined to a record signature for an article, and determining a verification result in dependence upon a similarity between the signature and the record signature.

In some embodiments, it can be ensured that different ones of the data points relate to scatter from different parts of the reading volume, in that the detector arrangement includes a plurality of detector channels arranged and configured to sense scatter from respective different parts of the reading volume. This can be achieved with directional detectors, local collection of signal with optical fibres or other measures. With directional detectors or other localised collection of signal, the collected light does not need to be focused. Directional detectors could be implemented by focusing lenses fused to, or otherwise fixed in relation to, the detector elements. Optical fibres may be used in conjunction with microlenses.

The reader may further comprise a housing for accommodating at least a part of the detector arrangement and having a reading aperture through which the beam may be directed into the reading volume. For field use, it is envisaged that the reader will be a self-contained unit based around a housing with a reading aperture. An article to be authenticated, e.g. by a customs officer or trading standards officer, can then be made the target of the beam passing through the reading aperture. The reading aperture may be covered by a transparent window to avoid ingress of dirt into the optical components.

Other forms of the reader may be more suitable for production line use. For example, the reader may further comprise an article conveyor for moving an article past the coherent beam, or more likely a succession of similar articles. In a production environment, the reader may be static and the articles moved through the reading volume. For example, packaging boxes of perfume may pass by on a conveyor at a set height and intersect a horizontal laser beam.

A physical location aid for positioning an article of a given form in a fixed position in relation to the reading volume may be useful in some circumstances. Alternatively, a pattern matching system for locating a predetermined scan area of an article may be used. It will be appreciated that only a small portion of an article, such as an item of packaging or a piece of paper, or a passport, needs to be used to obtain the signature, although the entire article may be used if desired. Consequently it is important when re-reading an article for authentication that the same part of the article is measured as was done originally. To assist this some form of location aid may be useful.

Various detector arrangements could be used.

It is possible to make a reader where the detector arrangement consists of only a single detector channel. Other embodiments use a detector arrangement that comprises a group of detector elements angularly distributed and operable to collect a group of data points for each different part of the reading volume, preferably a small group of a few detector elements. Security enhancement is provided when the signature incorporates a contribution from a comparison between data points of the same group. This comparison may conveniently involve a cross-correlation.

Although a working reader can be made with only one detector channel, there are preferably at least 2 channels. This allows cross-correlations between the detector signals to be made, which is useful for the signal processing associated with determining the signature. It is envisaged that between 2 and 10 detector channels will be suitable for most applications with 2 to 4 currently being considered as the optimum balance between apparatus simplicity and security.

The use of cross-correlations of the signals obtained from the different detectors has been found to give valuable data for increasing the security levels and also for allowing the signatures to be more reliably reproducible over time. The utility of the cross-correlations is somewhat surprising from a scientific point of view, since surface reflection patterns are inherently uncorrelated (with the exception of signals from opposed points in the pattern). In other words, for a speckle pattern there will by definition be zero cross-correlation between the signals from the different detectors so long as they are not arranged at equal magnitude angles offset from the excitation location in a common plane intersecting the excitation location. The value of using cross-correlation contributions therefore indicates that an important part of the scatter signal is not speckle. The non-speckle contribution could be viewed as being the result of direct scatter, or a diffuse scattering contribution, from a complex surface, such as paper fibre twists.

Incorporating a cross-correlation component in the signature is also of benefit for improving security. This is because, even if it is possible using high resolution printing to make an article that reproduces the contrast variations over the surface of the genuine article, this would not be able to match the cross-correlation coefficients obtained by scanning the genuine article.

It can therefore be advantageous to mount the source so as to direct the coherent beam onto the reading volume so that it will strike an article with near normal incidence. By near normal incidence means 5, 10 or 20 degrees. Alternatively, the beam can be directed to have oblique incidence on the articles. This may have a negative influence in the case that the beam is scanned over the article.

It is also noted that in the readers described in the detailed description, the detector arrangement is arranged in reflection to detect radiation back scattered from the reading volume. However, if the article is transparent or translucent, the detectors could be arranged in transmission.

The invention allows it to be ascertained whether an article has been tampered with. This is possible if adhesively bonded transparent films, such as adhesive tape, cover the scanned area used to create the signature. If the tape must be removed to tamper with the article, e.g. to open a packaging box, the adhesive bonding can be selected so that it will inevitably modify the underlying surface. Consequently, even if similar tape is used to reseal the box, this will be detectable.

The invention provides a method of identifying an article made of paper or cardboard, comprising: exposing the paper or cardboard to coherent radiation; collecting a set of data points that measure scatter of the coherent radiation from intrinsic structure of the paper or cardboard; and determining a signature of the article from the set of data points.

By intrinsic structure we mean structure that the article inherently will have by virtue of its manufacture, thereby distinguishing over structure specifically provided for security purposes, such as structure given by tokens or artificial fibres incorporated in the article.

By paper or cardboard we mean any article made from wood pulp process. The paper or cardboard may be treated with coatings or impregnations or covered with transparent material, such as cellophane. If long-term stability of the surface is a particular concern, the paper may be treated with an acrylic spray-on transparent coating, for example.

The invention may be particularly useful for paper or cardboard articles from the following list of examples:

valuable documents such as share certificates, bills of lading, passports, intergovernmental treaties, statutes, driving licences, vehicle roadworthiness certificates, any certificate of authenticity any document for tracing or tracking purposes, e.g. envelopes for mail systems, banknotes for law enforcement tracking packaging of vendable products brand labels on designer goods, such as fashion items packaging of cosmetics, pharmaceuticals, or other products CD's and DVD's either on the disk itself, e.g. near the centre, or on the case.

The invention also provides a method of identifying an article made of plastic, comprising: exposing the plastic to coherent radiation; collecting a set of data points that measure scatter of the coherent radiation from intrinsic structure of the plastic; and determining a signature of the article from the set of data points.

If the plastic is opaque to the coherent radiation, the scatter will be from intrinsic surface structure of the plastic, whereas if the plastic is transparent, the scatter may arise from any part of the article impinged upon by the coherent radiation.

The invention is considered to be particularly useful for plastic articles from the following list of examples:

plastic packaging, for example of pharmaceuticals

ID cards, including bank cards, staff ID cards, store cards—including the signed strip on an ID card, especially a bank or store card Particularly useful applications may be scanning over the signed strip of an ID card, i.e. after signing, so that digital signature used for authenticity is specific to the signed card and is formed from a combination of the person's signature and the surface structure of the underlying strip.

In the case of an ID article bearing a photograph of a person (which may be a plastic ID card or a pass from other material such as a paper passport) it may be useful for the reader to scan over the photograph part of the ID card (separate from scanning the cover or a blank page) as a test that no tampering has occurred. This is because, if a coating or adhesive film is used to attach a photograph to the ID article, it must be removed by a forger in order to fix a fake photograph into the ID article. This type of forgery would be identified by a reader implementing the present invention, since the new photograph would have a different surface structure.

It is expected that any other material type will be identifiable by the invention provided that it has suitable surface structure. Material types that have very smooth surfaces at a microscopic level may be unsuitable as may be opaque materials that have a very deep and/or unstable surface (e.g. fleece material).

The invention also allows identification of articles of a variety of different types, including packaging, documents, and clothing.

The invention provides a method of identifying a product by its packaging, comprising: exposing the packaging of the product to coherent radiation; collecting a set of data points that measure scatter of the coherent radiation from intrinsic structure of the packaging; and determining a signature of the product from the set of data points.

The relevant part of the packaging exposed to the coherent radiation may be made of paper, cardboard, plastic (e.g. cellophane shrink wrap), metal or other material with suitable intrinsic surface or internal structure. The article may be contained in the packaging, and optionally the packaging may be sealed in a tamper-proof manner. Alternatively, the packaging may be an appendage to the article, such as a tag secured with a connector that cannot be released without being visibly damaged. This may be especially useful for pharmaceutical products, cosmetic goods and perfume, and spare parts for aircraft or land or water vehicles, for example.

The invention provides a method of identifying a document, comprising: exposing the document to coherent radiation; collecting a set of data points that measure scatter of the coherent radiation from intrinsic structure of the document; and determining a signature of the document from the set of data points.

The invention also provides a method of identifying an item of clothing or footwear by a tag secured thereto, comprising: exposing the tag to coherent radiation; collecting a set of data points that measure scatter of the coherent radiation from intrinsic structure of the tag; and determining a signature of the tag from the set of data points. The tag may be the normal unmodified brand tag, e.g. plastic, cardboard, attached to the clothing or footwear.

The invention also provides a method of identifying a disk, such as a CD or DVD, comprising: exposing the disk to coherent radiation; collecting a set of data points that measure scatter of the coherent radiation from the disk; and determining a signature of the disk from the set of data points.

In summary, the signature can in some cases be obtained from something ancillary to a vendable product, such as its packaging, and in other cases obtained from the object itself, such as from surface structure of a document, or a vendable product. The invention may find many practical applications, for example to control grey market importation or counterfeiting. For such applications, portable readers could be used by customs officers or trading standards officers.

The signature is envisaged to be a digital signature in most applications. Typical sizes of the digital signature with current technology would be in the range 200 bits to 8 k bits, where currently it is preferable to have a digital signature size of about 2 k bits for high security.

Another aspect of the invention provides a method of labelling an article with a signature characteristic of its intrinsic structure, comprising: obtaining the signature by applying any of the above methods of identification; and marking the article with a label that encodes the signature according to a machine-readable encoding protocol.

The signature is preferably encoded in the label using an asymmetric encryption algorithm. For example, the label may represent a cryptogram decipherable by a public key in a public key/private key encryption system. Alternatively, the signature may be encoded in the label using a symmetric encryption algorithm.

It is highly convenient for many materials, especially paper and cardboard, if the label is an ink label applied with a printing process.

The label may be visible, e.g. a bar code, or invisible, e.g. embodied as data in a smart chip when the article is a smart card.

The invention also relates to an article labelled according to the above labelling method.

Aspects of the present invention also provide a method of improving the search speed for databases containing very large numbers of digital signature records. The method involves storing not only a digitised representation of the scanned signature in the database, but also a so-called thumbnail representation of the signature. This may include a subset of the signature and/or digitised representation of a part of the Fourier transform of the scanned signature. When an article is rescanned, the rescan data is processed to form a thumbnail from the rescan data. Thus, where a subset type thumbnail is employed, the same subset is taken of the rescan signature. This thumbnail is then used to search the database against stored thumbnails for the stored signatures in the database. Any stored signature identified by this thumbnail search can then be compared to the full rescan signature to determine the presence or otherwise of a match. Thereby, a full search against every signature in the database can be avoided.

Where a Fourier based thumbnail is used, the rescan data is Fourier transformed. The transform is then expressed in polar co-ordinates, i.e. amplitude and phase (as opposed to expressing the Fourier transform in real and imaginary components). The amplitude information is used for searching, but not the phase information which can be discarded. Namely, the database is searched for a match between the Fourier transform amplitude spectrum of the new scan and the Fourier transform amplitude spectrum stored as a thumbnail in each database record. If there is a matching database record for the article, a match between thumbnails should be found regardless of any bit shift between the new scan and the database scan. Specifically, there is no need to repeat the match for different assumed bit shifts as would otherwise be necessary to take account of an unknown bit shift between the original scan and the rescan caused by the article inevitably have a different relative position on the reader when it is re-scanned.

The search is therefore speeded up by a factor of approximately equal to the maximum assumed repositioning error between the original scan and the re-scan for verification divided by the scan length per datum (l/n), as compared with the simple method of comparing full signatures, i.e. comparing signatures in real space (as opposed to frequency space). This factor will typically be in the range 10-50, depending on the relevant parameter values. The increased search speed is at the expense of increasing the database size slightly by needing to store the amplitude spectrum of the Fourier Transform of each record as a thumbnail.

This search method works for the following reasons. A pseudo-random bit sequence, when Fourier transformed, carries some of the information in the amplitude spectrum and some in the phase spectrum. Any bit shift only affects the phase spectrum, however, and not the amplitude spectrum. Amplitude spectra can therefore be matched without any knowledge of the bit shift. Although some information is lost in discarding the phase spectrum, enough remains in order to obtain a rough match against the database. This allows one or more putative (i.e. candidate) matches to the target to be located in the database. Each of these putative matches can then be compared properly using the conventional real-space method against the new scan.

The scan can be performed in order to obtain and store a digital signature for the article, e.g. at the point of manufacture of an article or at the point of document creation. In this case, the digital signature is stored with its thumbnail digital signature in a database. To avoid duplicate entries, the digital signature is preferably stored with its thumbnail digital signature in the database conditional on there being no match between it and any digital signature already stored in the database. The article may additionally be labelled with a machine-readable marking, such as a barcode, that encodes an approximate record locator to assist finding the digital signature in the database.

The scan can also be performed at a later time for article verification. In this case, the verification method will further comprise: providing a database of previously recorded signatures and their thumbnail digital signatures; searching the database to seek at least one candidate match by performing a comparison between the determined thumbnail digital signature and the previously recorded thumbnail digital signatures; and determining for any candidate match whether there is a match by performing a comparison between the determined digital signature and the at least one previously recorded digital signatures. For each match a confidence level may additionally be determined based on degree of similarity between the determined digital signature and the previously recorded digital signature found to have a match. This can be useful to present to the user. If an approximate record locator marking is provided on the article, the verification method will include reading the machine-readable marking on the article to obtain the approximate record locator, and using the approximate record locator to seek the at least one candidate match in the database.

In apparatuses for populating the database, e.g. apparatuses used by a brand owner, or government authorities, the data acquisition and processing module is further operable to store the digital signature with its thumbnail digital signature in a database. To avoid duplicate entries, this may be conditional on there being no match between it and any digital signature already stored in the database.

In apparatuses for verifying the authenticity of articles, e.g. field-use readers, the apparatus will further comprise: a database of previously recorded signatures and their thumbnail digital signatures; and a search tool operable to (i) search the database to seek at least one candidate match by performing a comparison between the determined thumbnail digital signature and the previously recorded thumbnail digital signatures; and (ii) determine for any candidate match whether there is a match by performing a comparison between the determined digital signature and the at least one previously recorded digital signatures. The search tool may be further operable to determine for each match a confidence level based on degree of similarity between the determined digital signature and the previously recorded digital signature found to have a match.

There can also be provided a database, typically resident on a carrier medium such as a server or other system, comprising a plurality of records, each comprising: a digital signature of an article obtained by digitising a set of data points obtained from the article; and a thumbnail digital signature of the article obtained by either selecting a subset of the bits of the signature or digitising an amplitude part of a Fourier transform of the set of data points. There may also be provided a search tool operable to: search the above-described database for candidate matches by performing a comparison between an input thumbnail digital signature and the thumbnail digital signatures held in the database. The search tool can also be operable to determine for any candidate match whether there is a match by performing a comparison between the input digital signature and the digital signature held in the record of the candidate match. Especially for large databases, the search tool may be operable to search the database for candidate matches using an approximate record locator.

It will be understood that the database can be remote from the system or integral with the system, or indeed distributed.

The database may be part of a mass storage device that forms part of the reader apparatus, or may be at a remote location and accessed by the reader through a telecommunications link. The telecommunications link may take any conventional form, including wireless and fixed links, and may be available over the internet. The data acquisition and processing module may be operable, at least in some operational modes, to allow the signature to be added to the database if no match is found. This facility will usually only be allowed to authorised persons for obvious reasons.

When using a database, in addition to storing the signature it may also be useful to associate that signature in the database with other information about the article such as a scanned copy of the document, a photograph of a passport holder, details on the place and time of manufacture of the product, or details on the intended sales destination of vendable goods (e.g. to track grey importation).

Reader apparatuses as described above may be used in order to populate a database with signatures by reading a succession of articles, e.g. in a production line, and/or in order subsequently to verify authenticity of an article, e.g. in field use.

Viewed from some aspects, the present invention provides an article identification method comprising: determining a signature from an article based upon an intrinsic characteristic of the article as discussed above; and comparing the determined signature to a stored signature. The method can also comprise splitting the determined signature into blocks of contiguous data, and performing a comparison operation between each block and respective blocks of the stored signature. Thus a higher level of granularity in verifying the article can be achieved.

In some embodiments the method can also comprise comparing an attribute of a comparison result from each block comparison to an expected attribute of the block comparison to determine a compensation value for use in determining a comparison result. The method can also comprise determining a similarity result between the determined signature and the stored signature, using the compensation value to adjust the determined signature. Thus an article damaged by stretching or shrinking can be successfully identified. Also, a non-linear signature determination can be accommodated without losing identification accuracy. Thus a variety of physical alignment deviations during a signature generation step can be compensated for to allow a correct comparison result to be achieved.

In some embodiments the comparing of an attribute of a comparison result from each block comparison to an expected attribute of the block comparison comprises comparing an actual cross-correlation peak location of a comparison result between a block of the determined signature and the corresponding block of the stored signature to an expected cross correlation peak location to determine the compensation value for use in determining a comparison result. Thus the expected result can be used to work out physical alignment deviations of the article during scanning.

In some embodiments the determining of the compensation value comprises estimating a function of best fit to the cross-correlation peak locations for each of the block comparisons, the function of best fit representing an average deviation from the expected cross-correlation peak locations. Thus an average deviation from the expected position can be used for the compensation. The average deviation may be measured in many ways, and may result in a function of best fit which is one of a variety of functions, which can include a straight line function, an exponential function, a trigonometric function and an $x^2$ function.

In some embodiments, the method further comprises comparing the determined signature to a plurality stored signatures. A closest match result between the determined signature and the plurality of stored signatures can be found. Also, a no-match result can be found if the determined signature has determined therefor a similarity result lower than a predetermined threshold for each of the stored signatures. Thus an item can be compared to a database of item signatures to determine whether that item is a member of that database. This can be used to determine the authenticity of a variety of articles, such as products, value transfer tokens, value transfer authorisation tokens, entitlement tokens and access tokens.

In some embodiments, the method can also comprise calculating a similarity result for each compared block. In some embodiments the method can also comprise is comparing the similarity result for at least one predetermined block to a predetermined similarity threshold and returning a negative comparison result in the event of the similarity result for the at least one predetermined block being below a predetermined similarity threshold, regardless of a similarity result for the signatures as a whole. Thus a critical portion of an article can be identified and a positive match be required for authenticity verification of the article for the critical portion as well as the signature as a whole.

Viewed from a second aspect, the present invention provides a system for identifying an article. The system can comprise a signature determination unit operable to determine a signature from an article based upon an intrinsic characteristic of the article and a comparison unit operable to compare the determined signature to a stored signature. The comparison unit can be operable to split the determined signature into blocks of contiguous data and to perform a comparison operation between each block and respective blocks of the stored signature. Thus a high granularity analysis of the article signature can be performed.

In some embodiments, the comparison unit can be further operable to compare an attribute of a comparison result from each block comparison to an expected attribute of block the comparison to determine a compensation value for use in determining a comparison result. The comparison unit can be further operable to determine a similarity result between the determined signature and the stored signature, using the compensation value to adjust the determined signature. Thus an article damaged by stretching or shrinking can be successfully identified. Also, a non-linear signature determination can be accommodated without losing identification accuracy. Thus a variety of physical alignment deviations during a signature generation step can be compensated for to allow a correct comparison result to be achieved.

In some embodiments, the comparison unit can be operable to calculate a similarity result for each compared block. The comparison unit can also be operable to compare the similarity result for at least one predetermined block to a predetermined similarity threshold and to return a negative comparison result in the event of the similarity result for the at least one predetermined block being below a predetermined similarity threshold, regardless of a similarity result for the signatures as a whole. Thus a critical part of an article can be identified and subjected to a higher level of scrutiny than other areas of an article.

Further aspects and embodiments of the present invention will be apparent from the following detailed description.

BRIEF DESCRIPTION OF THE DRAWINGS

For a better understanding of the invention and to show how the same may be carried into effect reference is now made by way of example to the accompanying drawings in which:

FIG. 13 shows a schematic raytrace illustration of the passage of light through the assembly of FIG. 12;

FIG. 14 shows a schematic raytrace illustration of the passage of light through the assembly of FIG. 12;

FIGS. 20b and 20c shows schematically scanning paths for the apparatus of FIG. 20a;

FIGS. 51*a* to 51*d* illustrate an inter-scanner system for determining velocity relative to a target;

Figure 1:
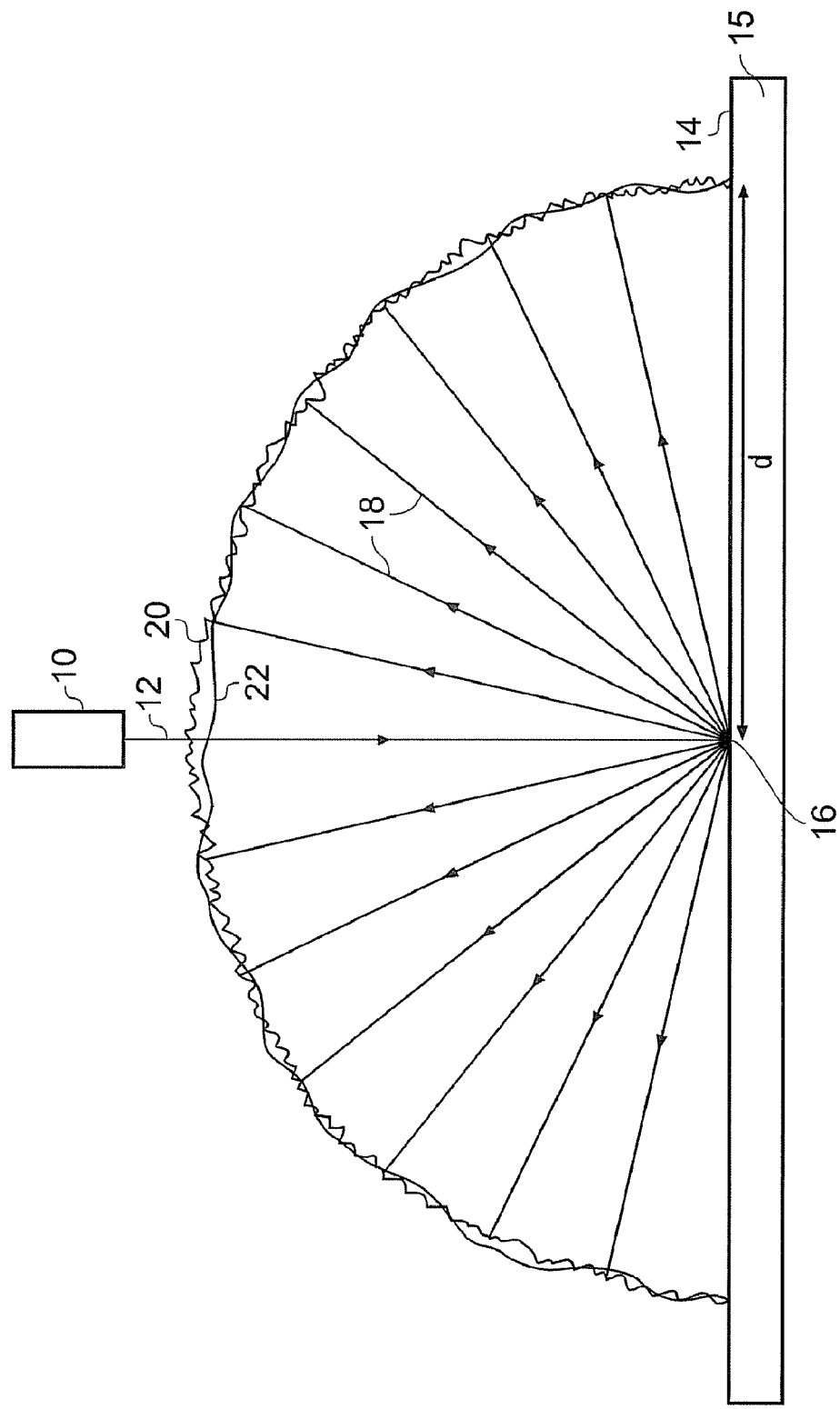
FIG. 1 is a schematic view of focussed coherent light reflecting from a surface.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a schematic view of focussed coherent light reflecting from a surface. As shown in the Figure, a coherent beam generator 10 generates a coherent light beam 12 which is directed toward a surface 14 of an article 15. The coherent beam generator 10 may include a laser light source (not shown) and a focussing element (not shown) for focussing the laser beam onto the surface.

The focussed coherent light beam 12 hits the surface at position 16, causing reflections therefrom which are illustrated as light beams 18. As the skilled reader will appreciate, the illustrated beams 18 are merely illustrative and in fact an infinite number of light beams will reflect from position 16 in all planes normal to the plane of the surface 14. This reflected light, when viewed at a constant distance d from position 16 may be considered to form a hemisphere of reflected light. In the two-dimensional image of FIG. 1 may be thought of as a semicircle with radius d.

The reflected light contains information about the surface 14 at position 16. This information may include information about surface roughness of the surface 14 on a microscopic level. This information is carried by the reflected light in the form of the wavelength of features in the observed pattern of reflected light. By detecting these wavelength features, a fingerprint or signature can be derived based on the surface structure of the surface 14 at the position 16. By measuring the reflections at a number of positions on the surface 14, the fingerprint or signature can be based on a large sample of the surface, thereby making it easier, following re-reading of the surface at a later date, to match the signature from the later reading to the signature from the initial reading.

As is shown in FIG. 1, the reflected light 18 includes information at two main angular wavelength or angular frequency regions. The high angular frequency (short wavelength) information is that which is traditionally known as speckle and is represented by the small wavelength line 20. This high angular frequency component typically has an angular periodicity of the order of 0.5 degrees. The low angular frequency (long wavelength) information is represented by the long wavelength line 22. This low angular frequency component typically has an angular periodicity of the order of 15 degrees.

Figure 2:
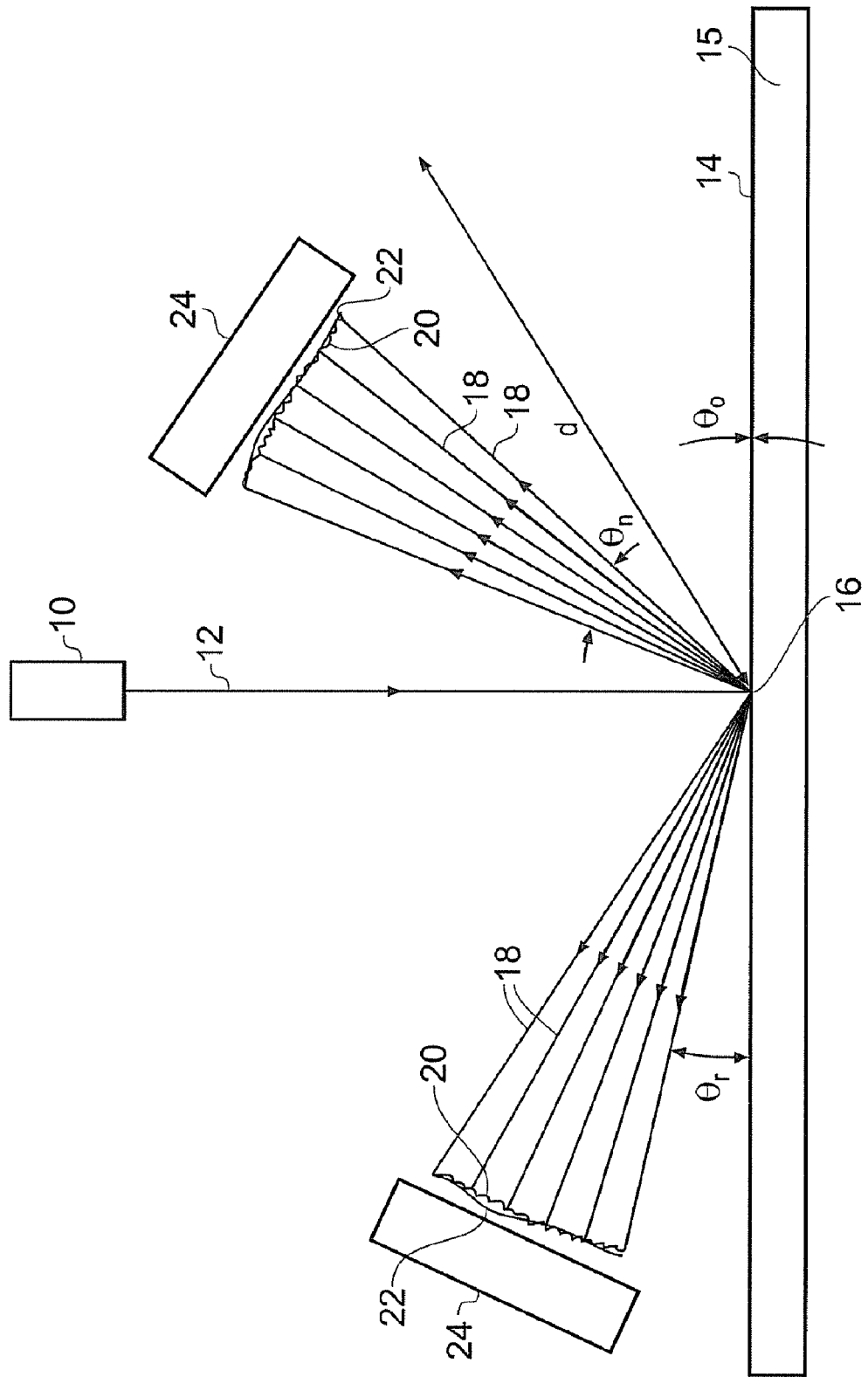
FIG. 2 is a schematic view of a detector arrangement for detecting focussed coherent light reflecting from a surface.

FIG. 2 shows a schematic view of a detector arrangement for detecting focussed coherent light reflecting from a surface. As shown in FIG. 2, a focussed coherent beam generator 10 outputs a focussed coherent light beam 12 which is incident on a surface 14 of an article 15 at a position 16. This causes reflected light 18 to be reflected from the position 16 carrying surface information in the form of wavelength perturbations in the reflected beams 18.

In FIG. 2, the reflected light beams 18 have been shown only in positions corresponding to the angular locations of photodetectors 24. Two photodetectors are shown in FIG. 2 for ease of explanation and clarity of the Figure. However, only one photodetector is required for the system to operate correctly. Alternatively, more photodetectors may be provided, for example in one example four photodetectors may be provided. Each photodetector collects reflected light over a solid angle $\theta_n$. It is assumed in the present discussion that each photodetector collects light over a square or circular area. The solid angle of light collection can vary between different photodetectors 24. Each photodetector 24 measures reflected light having a minimum angle from the surface 14 of $\theta_r$. Thus the light detected by a given photodetector 24 includes the reflected beams having an angle relative to the surface 14 of between $\theta_r$ and $\theta_r+\theta_n$. As will be discussed in greater detail below, there can be advantages in making a system resistant to spoofing in having detector channels separated by the largest possible angle. This would lead to making the angle $\theta_r$ as small as possible.

As will be appreciated, the solid angle $\theta_n$ over which a photodetector 24 detects reflected light may also be represented as a Numerical Aperture (NA) where:

$$NA=\sin(\phi)$$

where $\phi$ is the half-angle of the maximum cone of light that can enter or exit the detector. Accordingly, the numerical aperture of the detectors in the present example is:

$$NA=\sin(\theta_n/2)$$

Thus, a photodetector having a large numerical aperture will have the potential to collect a greater amount of light (i.e. more photons), but this has the effect of averaging more of the reflected information (speckle) such that the sum of all captured information speckle is weaker. However, the long angular wavelength component is less affected by the averaging than the short angular wavelength (traditional speckle) component, so this has the effect of the improving ratio of long wavelength to short wavelength reflected signal.

Although it is shown in FIGS. 1 and 2 that the focussed coherent beam 12 is normally incident on the surface 14, it will be appreciated that in practice it can be difficult to ensure perfectly normal incidence. This is especially true in circumstances where a low cost reader is provided, where positioning is performed by a user with little or no training or where positioning of the article is out of control of a user, such as on commercial processing environment including, for example conveyors transporting articles, and any circumstance where the distance from the reader to the article is such that there is no physical contact between reader and article. Thus, in reality it is very likely that the incident focussed coherent light beam will not strike the article from a perfect normal.

Figure 3A:
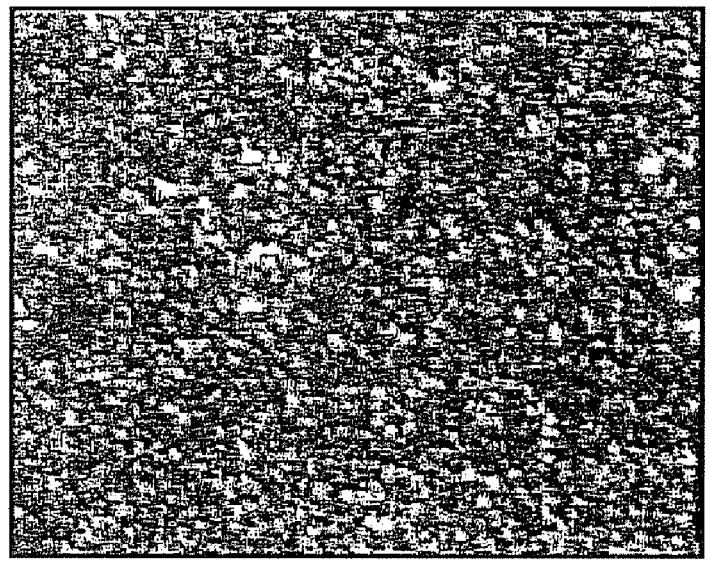
FIG. 3 is a graphical representation on the effect of target inclination on detector results.
Figure 3B:
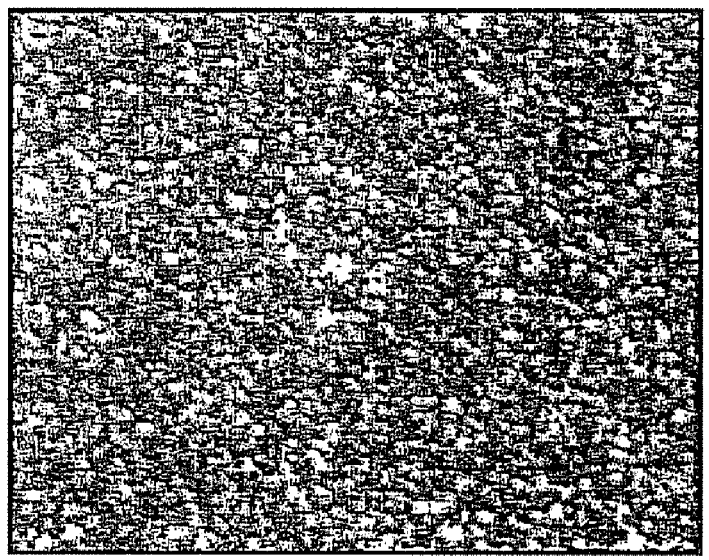

It has been found that altering the angle of incidence by only fractions of a degree can have a significant effect on the reflected speckle pattern from a surface. For example, FIG. 3a shows an image of a conventional speckle pattern from a piece of ordinary white paper such as might be used with a conventional printer or photocopier. FIG. 3b shows an image of the speckle pattern of that same piece of paper under identical illumination conditions with the piece of paper tilted by 0.06 degrees relative to its position in the image in FIG. 3a. It is immediately clear to any observer that the speckle pattern has changed significantly as a result of this extremely small angular perturbation in the surface. Thus, if a signature were to be generated from the each of the respective data sets from these two images, a cross-correlation between those two signatures would provide a result much lower than would normally be expected from a cross-correlation between two signatures generated from scanning the same target.

It has also been found that when the angle is repeatedly increased by a small amount and the measurements taken and cross-correlations performed between each new measurement and the baseline original measurement (with zero offset angle), that the cross-correlation result drops off rapidly as the offset angle starts to increase. However, as the angle increases beyond a certain point, the cross-correlation result saturates, causing a plot of cross-correlation result against offset angle to level off at an approximately constant cross-correlation value. This effect is provided by the low frequency component in the reflected light. What is happening is that the high frequency speckle component of the reflected light quickly de-couples as the perturbation in incident angle increases. However, once the angle increase by a certain amount, the effect of the traditional speckle (high frequency) component becomes less than the effect of the low frequency component. Thus, once the low frequency component becomes the most significant factor in the cross-correlation result, this component (which is much more incident angle tolerant) causes the cross-correlation result to saturate despite further increases in incident angle perturbation.

Figure 4:
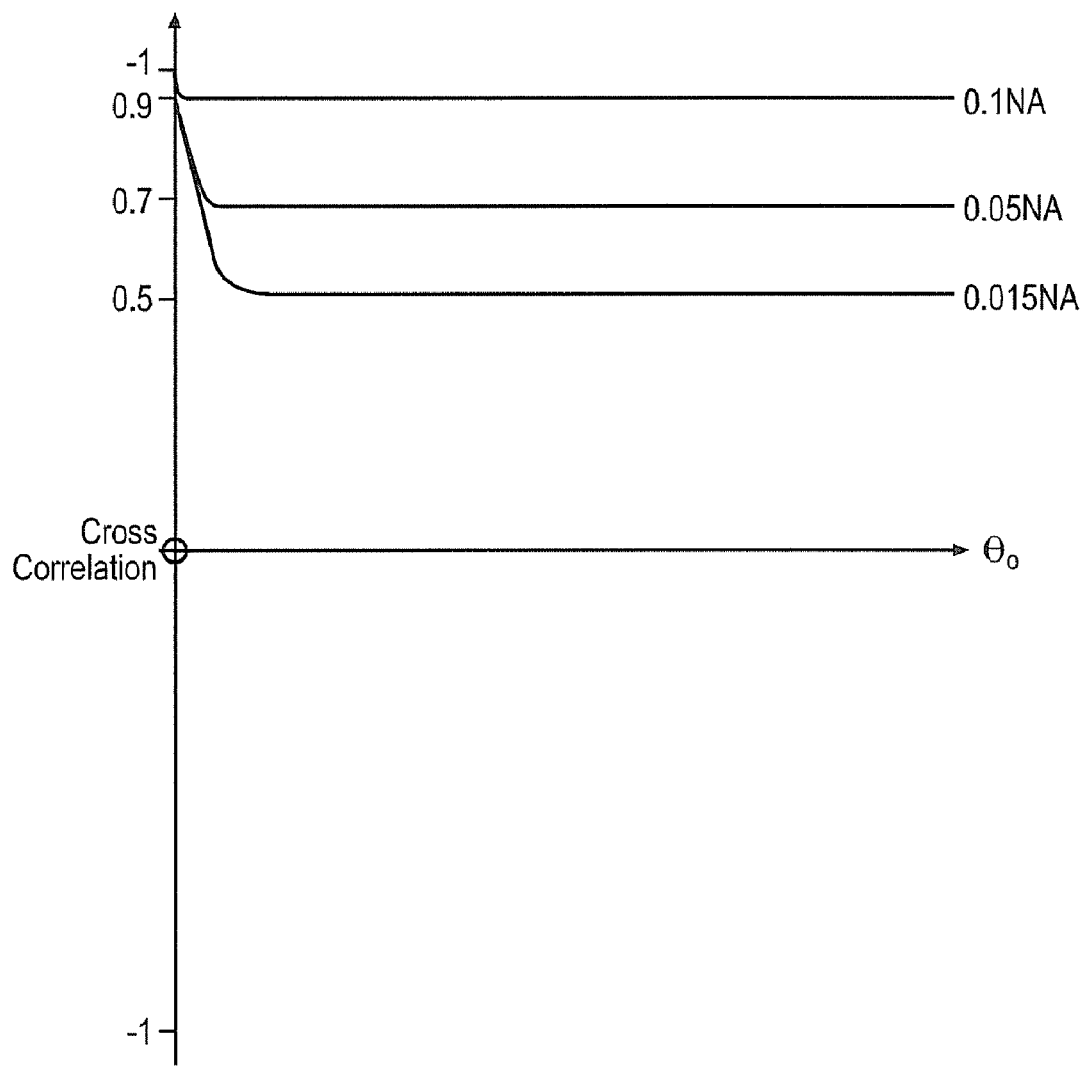
FIG. 4 is a schematic plot of showing the effect of detector numerical aperture on detector results.

This phenomenon is illustrated in FIG. 4, where a schematic plot of cross correlation result against offset angle is shown at various different numerical aperture values for the photodetector. As can be seen from FIG. 4, at a numerical aperture of 0.06 (solid angle of approximately 6.88 degrees) the cross correlation result drops off rapidly with increasing angle until a cross-correlation result of approximately 0.5 is reached. The cross-correlation result saturates at this value.

It has also been found that increasing the numerical aperture of the photodetector causes the low frequency component of the reflected light to take precedence over the high frequency component sooner in terms of incident angle perturbation. This occurs because over a larger solid angle (equivalent to numerical aperture) the effect of the low frequency component becomes greater relative to the high frequency "traditional speckle" component as this high frequency component is averaged out by the large "reading window".

Thus, as shown in FIG. 4, the curves representing higher numerical aperture saturate at respectively higher cross correlation result values. At a numerical aperture of 0.05 (full cone angle of approximately 5.7 degrees), the graph saturates at a cross correlation result of approximately 0.7. At a numerical aperture of 0.1 (full cone angle of approximately 11.4 degrees), the graph saturates at a cross correlation result of approximately 0.9.

Figure 5:
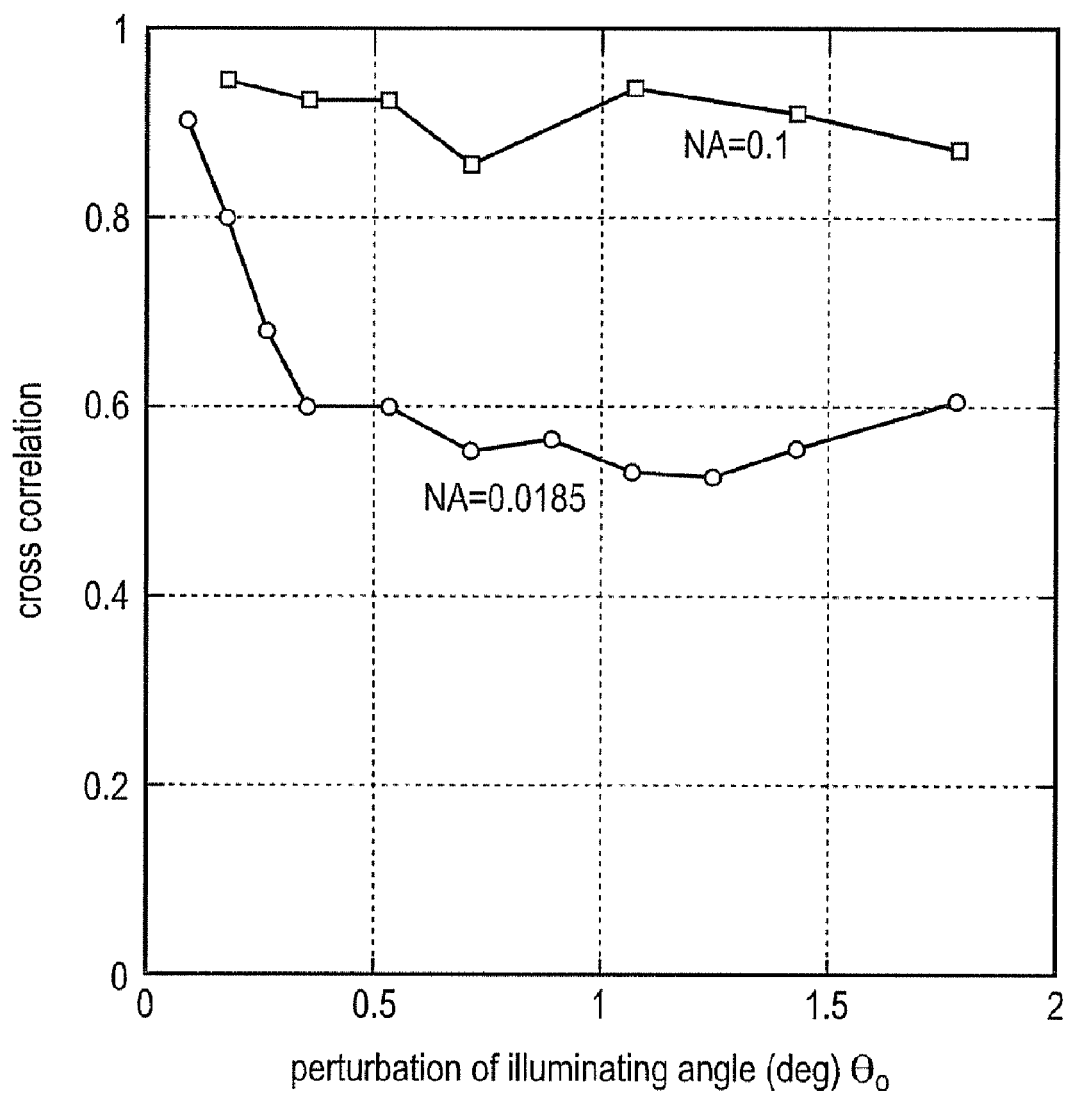
FIG. 5 is a plot of experimental figures showing the effect of detector numerical aperture on detector results.

A plot of some experimental results demonstrating this phenomenon is shown in FIG. 5. These results were taken under identical illumination conditions on the same surface point of the same article, with the only alterations for each photodetector being there alteration in the incident light beam away from normal. The cross correlation result is from a cross-correlation between the collected information at each photodetector at each incident angle perturbation value and information collected with zero incident angle perturbation. As can be seen from FIG. 5, with a photodetector having a numerical aperture of 0.074 (solid angle of 8.48 degrees), the cross correlation result rapidly drops to 0.6 with an increase in incident angle perturbation from 0 to 0.5 degrees. However, once this level is reached, the cross correlation result stabilises in the range 0.5 to 0.6.

With a photodetector having a numerical aperture of 0.4 (solid angle of 47.16 degrees), the cross correlation result almost instantly stabilises around a value of approximately 0.9. Thus at this numerical aperture, the effect of speckle is almost negligible as soon as any deviation from a normal incident angle occurs.

Thus, it is apparent that a reader using a photodetector according to this technique can be made extremely resistant to perturbations in the incident angle of a laser light beam between different readings from the same surface point.

To address, inaccurate repositioning of an article between scans, the systems of the present examples can take measurements from a large number of points on the target. Thus, as long as some of the points from a validation scan match to the points used in a record scan, a match can successfully be detected.

Figure 6A:
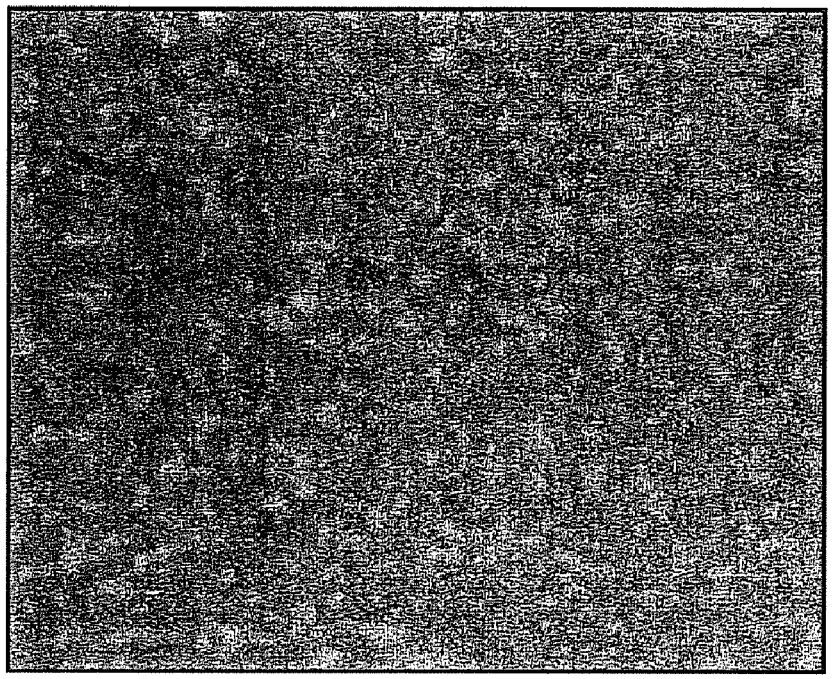
FIGS. 6A and B illustrate the effect of translational mispositioning on detector results.
Figure 6B:
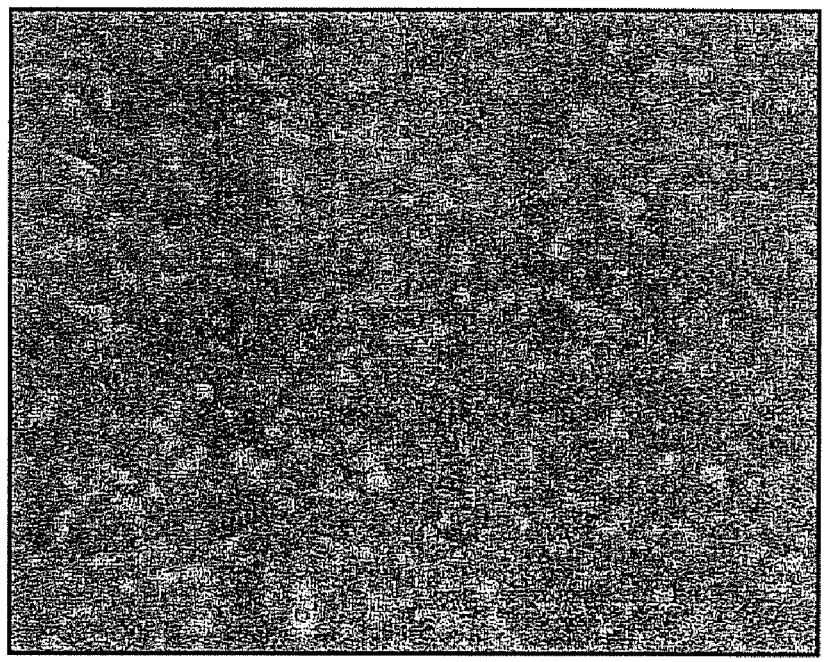

FIGS. 6a and 6b shows the effect of translational mispositioning of the same sheet of paper as was to capture the images in FIGS. 3a and 3b. Again, these images are normal speckle images, the image of FIG. 6a showing the speckle image from a normally incident coherent beam with the paper in a first location. The image of FIG. 6b shows the speckle image from a normally incident coherent beam at a translational offset of 40 microns, which is less than the beam width (which was a 5 mm wide unfocussed beam). As can be seen from FIGS. 6a and 6b, this very small translational perturbation of the surface causes a very different speckle image. When data was collected at the same positions using a photodetector (rather than the imaging detector used to capture the image data shown in FIGS. 6a and 6b), the cross-correlation result between the data from the position in FIG. 6a and the data from the position in FIG. 6b was only 0.55. This demonstrates that systems developed to make use of the well-known "traditional" speckle (the high angular frequency component) with imaging-type detectors cannot make use of the low angular frequency reflected component which the examples of the present disclosure make possible.

Figure 7:
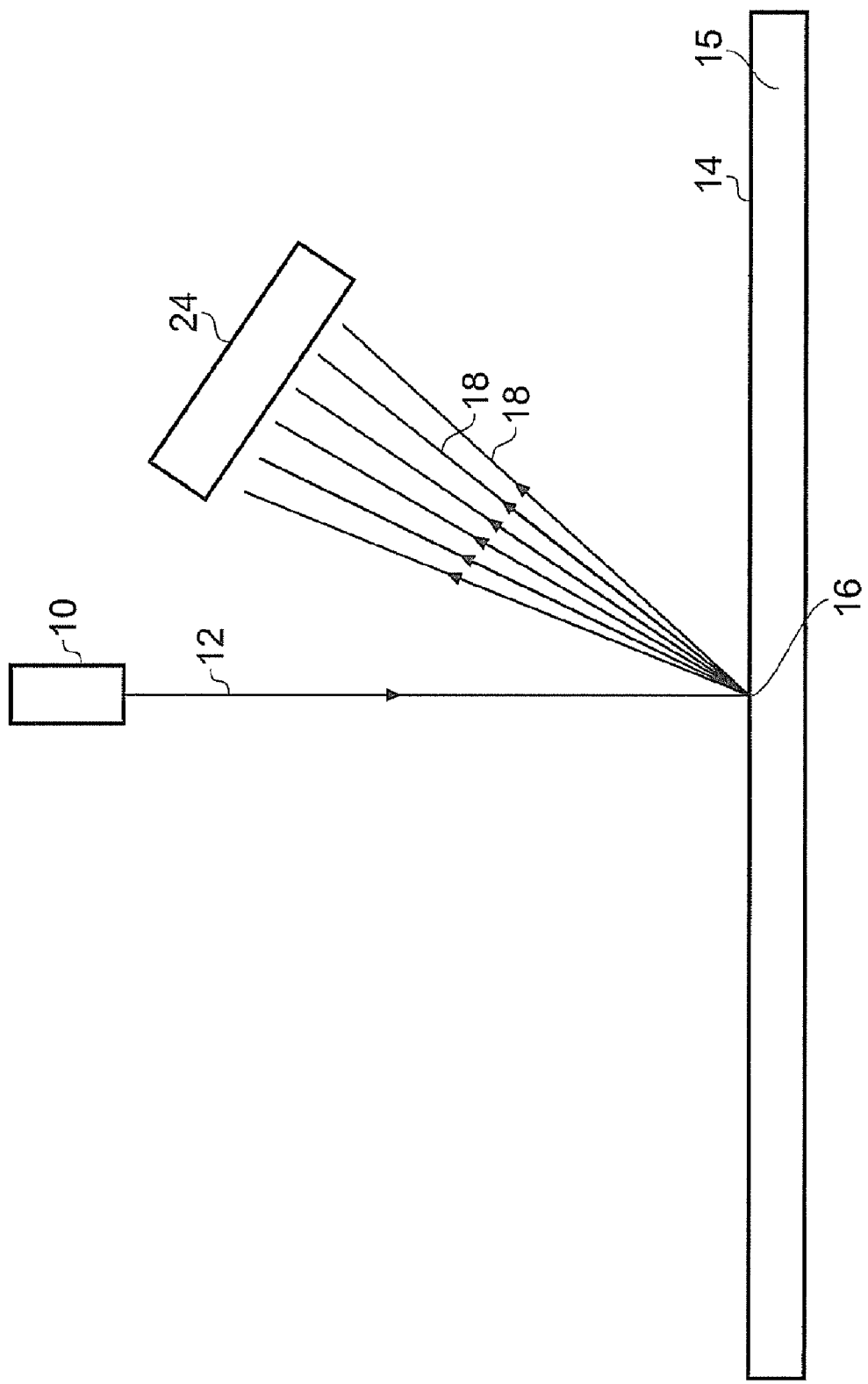
FIG. 7 shows a schematic illustration of a detector apparatus.
Figure 8:
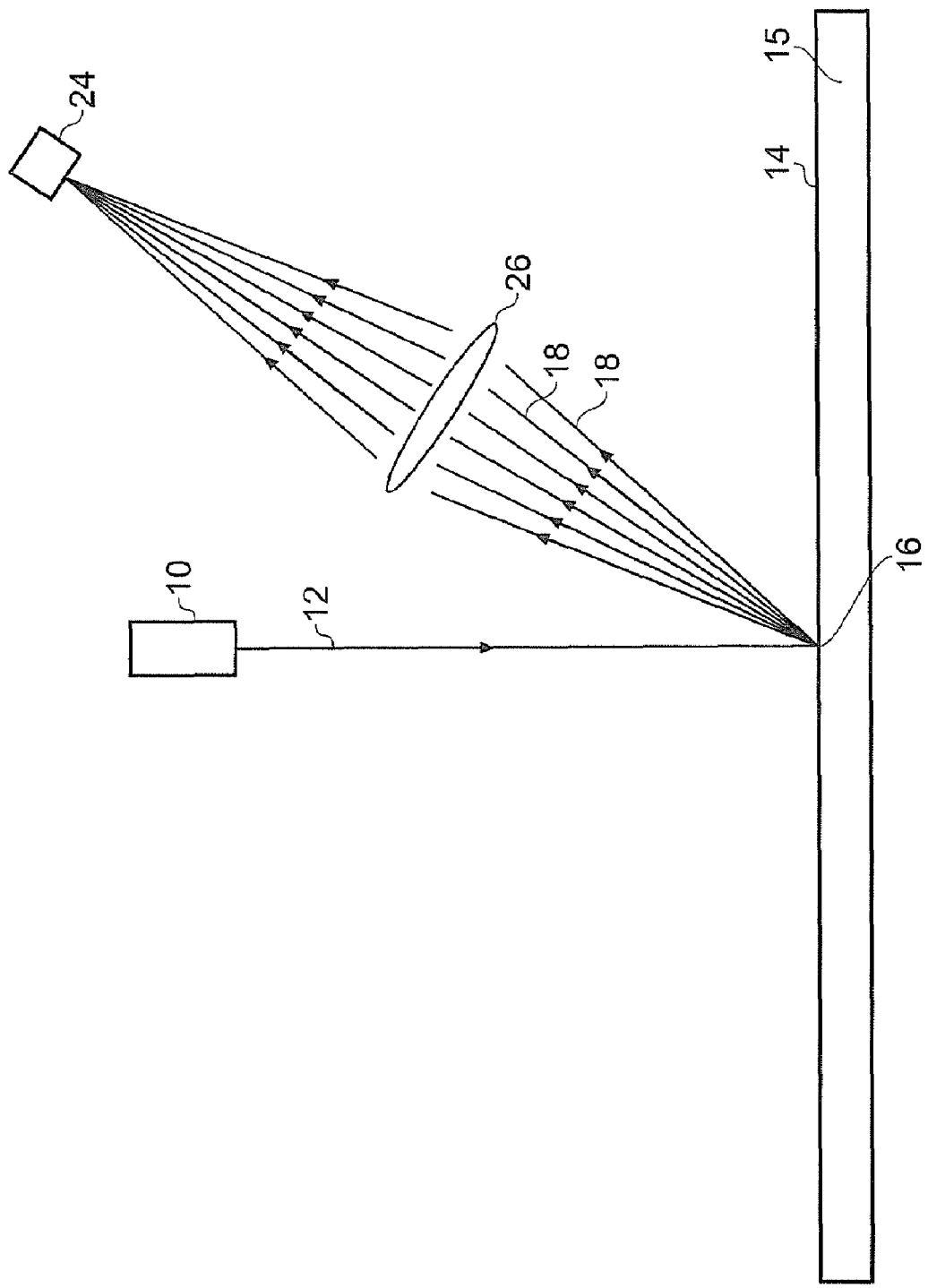
FIG. 8 shows a schematic illustration of a detector apparatus.

To get a photodetector to collect data over a large numerical aperture can be achieved in two optically equivalent ways. The first is to have a large photodetector able to read over the entire numerical aperture, such as is illustrated in FIG. 2 above, and in FIG. 7. The second is to provide a smaller photodetector and use a lens having the required numerical aperture to focus the reflected light down to the photodetector. This alternative is shown in FIG. 8, where a lens 26 is provided to focus the reflected light 18 onto the photodetector 24. In terms of photodetector data recordal these two arrangements are optically identical.

It should be noted that a two-dimensional imaging sensor cannot be used to collect the data in a manner which allows use of the low frequency component of the reflected light to calculate a signature for the article surface. It is necessary to use a photodetector such as a photodiode to collect the data. A photodetector may be considered to be a transducer operable upon incidence of an optical signal to produce an electrical signal containing the same information as the optical signal. In contrast, an imaging sensor creates a representation of a pattern detected light, often using an array of photodetectors. Thus, in the context of the present examples, a photodetector may be considered to be a sensor which samples light reflected from one point of an image at a time, whereas an imaging sensor samples light reflected from multiple points of an image at a time. Also, it is therefore possible to achieve the same effect as an imaging sensor by recording every pixel of an image using a photodetector and stitching the pixels together to create an image, although it will be understood that the image is therefore composed of data collected at different times and is thus an image that can never be viewed at any given point in time—it must be constructed from multiple, temporally separated, data captures.

Thus there has now been described a technique for obtaining the information held by reflections of a coherent beam incident on surface for use in identifying the article of which the surface is a part. These techniques can be used in a variety of ways to implement various authentication and/or security systems.

Thus, there will now be described various examples of apparatus usable in a system which scans a surface of an object to create an identifier for that object using at least a low angular frequency component of reflections of coherent light from the surface. In some such systems it may be desirable to provide robustness to positioning accuracy of the target surface relative to the scan apparatus. It may also be desirable to use the system with a high degree of certainty for objects having macroscopically shiny surfaces, such as glossy paper and plastics. On such surfaces, the physical roughness of the surface is typically rather lower than on macroscopically matt surfaces such as "normal" paper as may be used for printed materials in an office and for monetary instruments such as cheques or bankers drafts.

As has been discussed above, it is thus clear that the large numerical aperture may provide increased resistance to angular mispositioning of the target relative to the scanner.

In order to provide robustness to translational mispositioning of an object relative to the scanner between two or more different scans of that object, i.e. maintaining a highly reliable ability to verify that the object is the same object on both scans, a larger scan area on the target surface may be used. In particular, it may be desirable to provide a large scan area dimension in each direction in which target object mispositioning may occur. The greater the scanner area, the greater the amount of information which can be made available for the identification, and greater the amount of information that can be omitted (through mispositioning) yet still provide a reliable scan result.

The apparatus and methods described below all provide systems which can be used to create object identifiers ("fingerprints" or "signatures") with a high degree of reproducibility even where angular and/or translational mispositioning of the target relative to scanner occurs between different scans of the object and/or where the object has a shiny surface.

Figure 9:
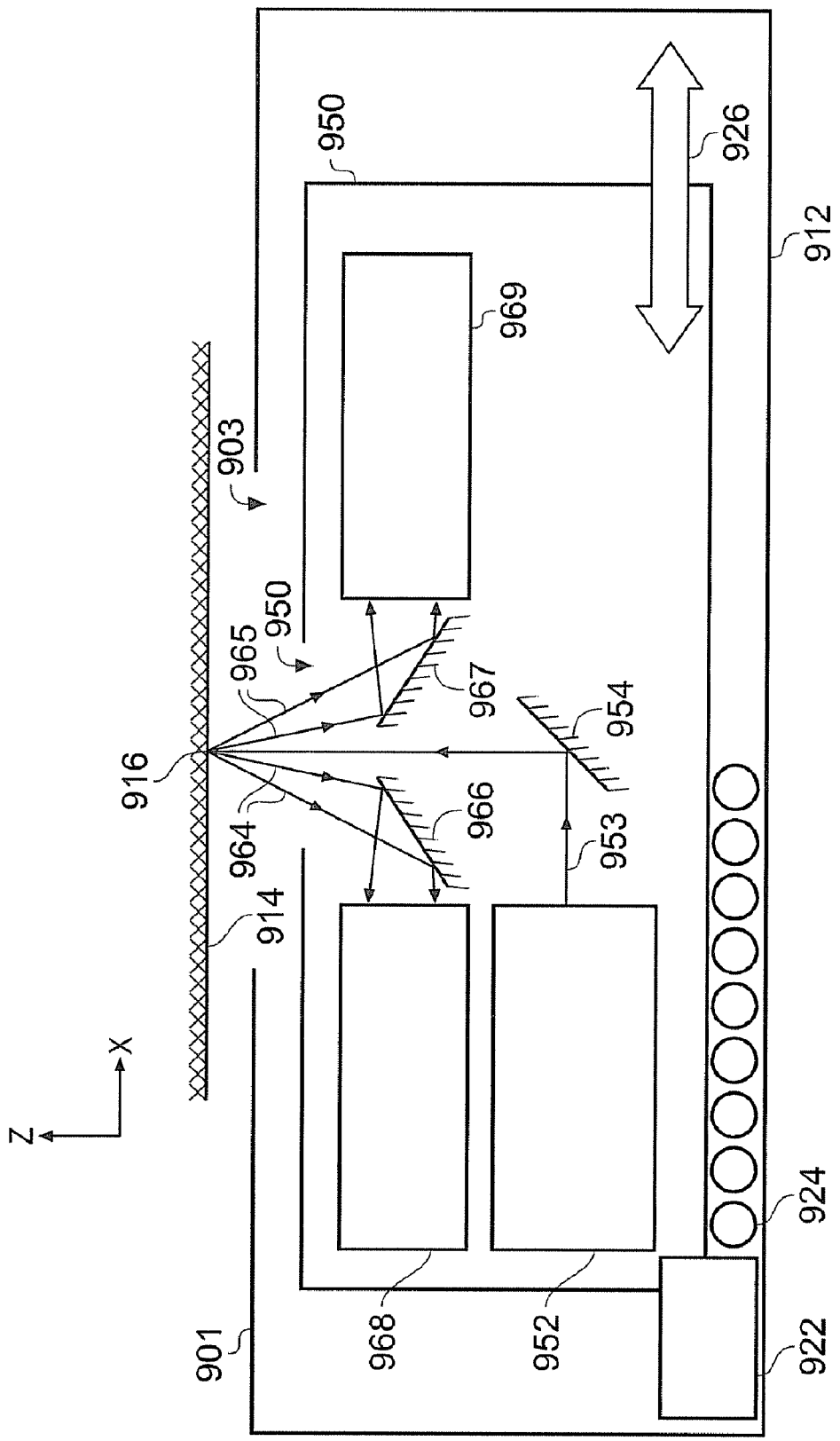
FIG. 9 shows a schematic sectional view though an example scanner apparatus.

Shown in FIG. 9 is a schematic side view through a first example of a surface reading apparatus 901 operable to collect information describing a surface for use in creating a signature for that surface, which signature can be used in an authentication system where the identity of the surface is checked.

The reader apparatus 901 can read from an object in a reading volume therefor. The reading volume is the region from in which the coherent beam can be caused to impact a surface and to reflect back and provide usable data at the sensor modules 968, 969. Thus the reading volume can be considered to be formed by a reading aperture 950 which is an opening in a housing 950. In the present example, the housing 950 contains the main optical components of the apparatus. The reading aperture 950 and/or a corresponding opening 903 in the reader apparatus 901 may be covered by an optically transparent material (not shown) such as glass or transparent plastic in order to prevent or restrict ingress of dust or other foreign bodies into the optical assemblies within the housing 950.

Figure 11:
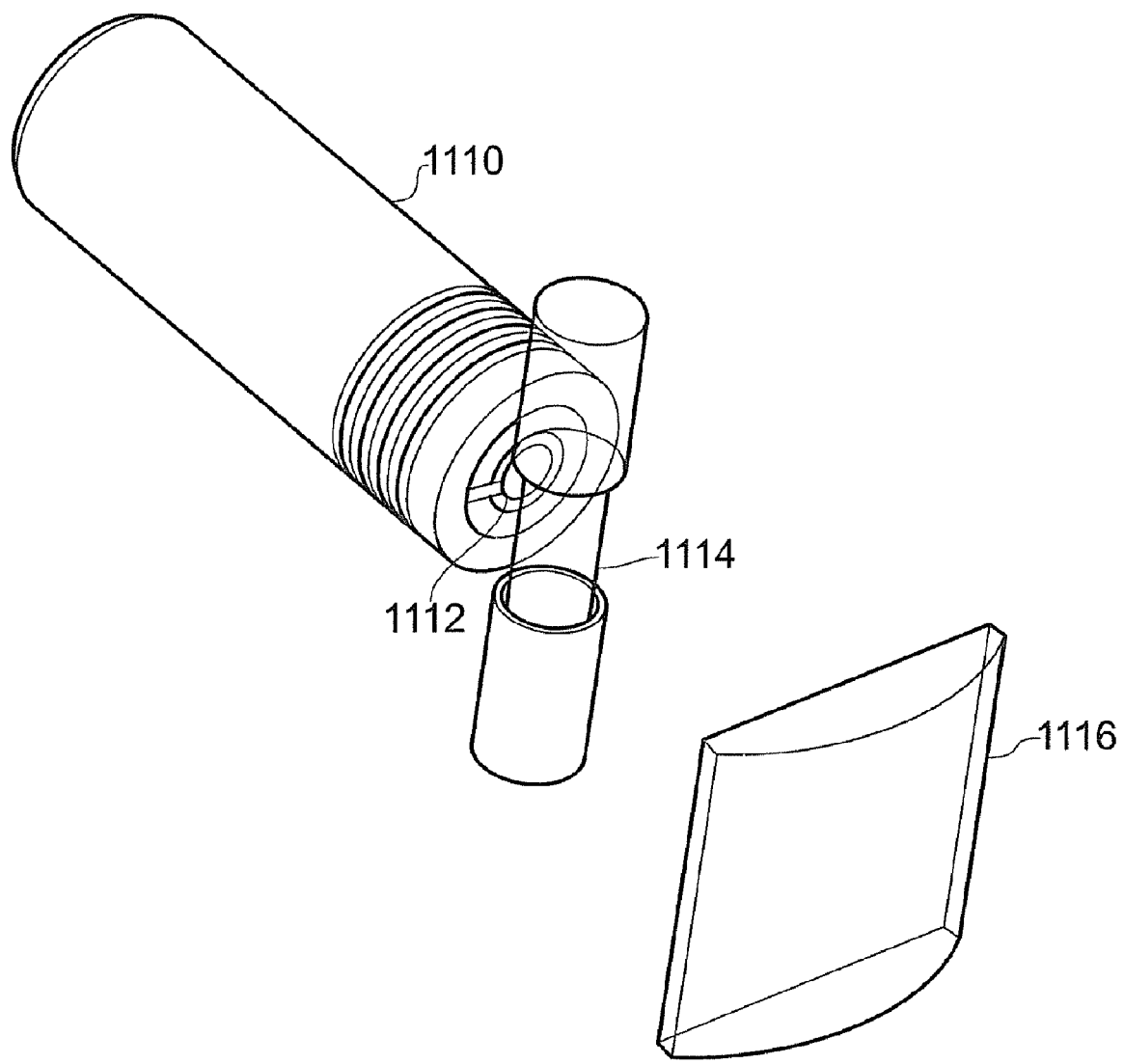
FIG. 11 shows a schematic perspective illustration of a beam spreader.
Figure 12:
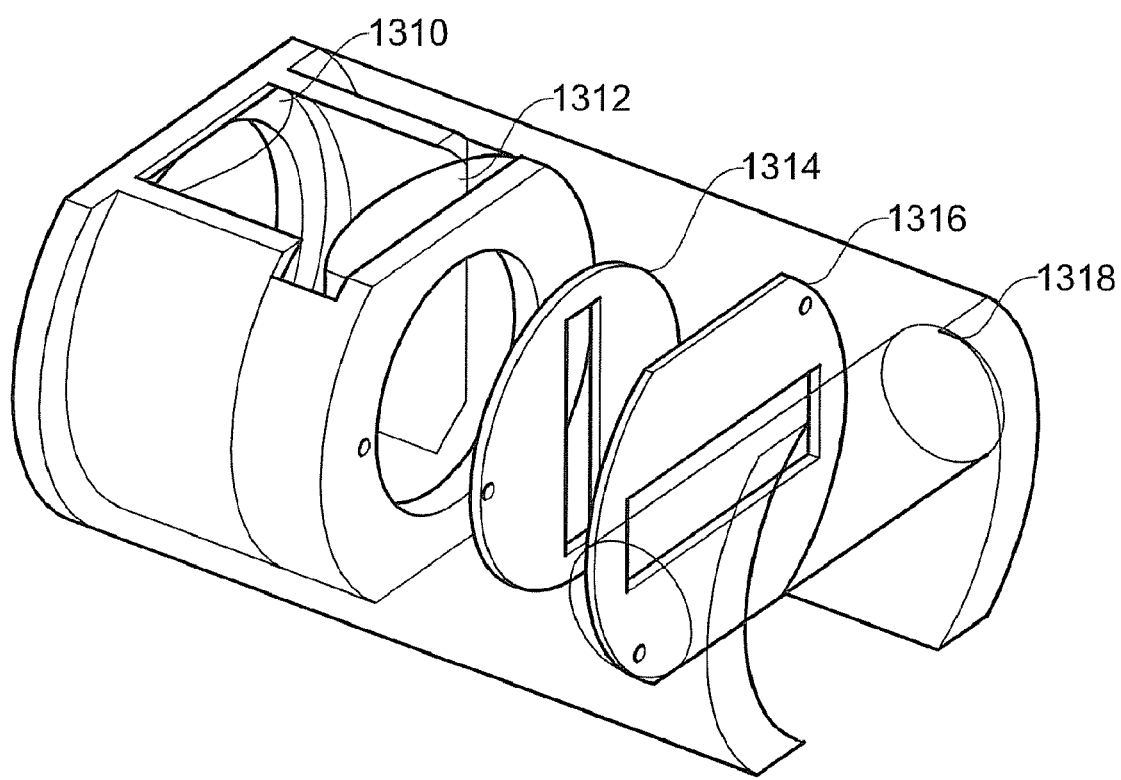
FIG. 12 shows a schematic perspective illustration of a detector apparatus optical assembly.

As shown in FIG. 9, the reader apparatus optical subsystem housing 950 includes a laser source 952 operable to generate a focussed coherent light beam. The output beam 953 of the laser source 952 is directed by a mirror 954 toward a target area 916 on a target surface 914. Additional focussing elements may be inserted after the beam 953 is reflected by the mirror 954 if desired. In the present example, the focussed coherent beam is in fact focussed within the laser source 952 to an elongate focus extending in the y direction (perpendicular to the plane of the drawing) and lying in the plane of the reading aperture. In one example, the extent of the beam in the z-direction is approximately 22 mm. The extent of the beam in the x-direction may be 50 micrometres. An example of a suitable optical arrangement to create such a beam is illustrated in FIGS. 11 and 12 (described below).

The focussed beam of coherent light then impacts the target surface 914 at area 916. Some of the light reflected from the target re-enters the reader apparatus 950. Specifically, the light (illustrated in FIG. 9 by ray lines 964, 965) which reflects at angles corresponding to the alignment of mirrors 966 and 967 is reflected from those mirrors into respective light sensor modules 968, 969. The light sensor modules 968, 969 have an optical arrangement (described in more detail below) and sensors operable to create an electrical signal proportional to the light reflected from the target surface at point 916. In the present example, the light sensor modules are arranged to receive reflected signal from the same positions in the reading volume, such that for each target surface point, data is collected for two separate reflected angle ranges. As will become apparent, by sampling each point on a target from more than one angular range, the system becomes more resistant to spoofing.

The arrangement shown in FIG. 9 uses various mirrors to direct the various light beams from and to the light generation and detection elements. As will be appreciated, this arrangement schematically illustrates a convenient compact reader apparatus which allows the optical modules to be arranged so as to achieve an overall compact configuration. Thus, as will be further appreciated, alternative mirror configurations may be adopted to alter the configuration of the reader. If desired, the mirrors can be omitted altogether and the modules aligned to the optical paths to and from the target.

In the present example, where the coherent beam incident on the target surface has an elongate focus, each light sensor module 968, 969 is operable to obtain data relating to multiple positions along the line of incidence of the coherent beam on the target, thus enabling data capture for multiple target points from a given coherent beam incidence position. In one example, each light sensor module can collect data relating to 22 adjacent points, each corresponding to approximately 1 mm length of the incident beam 953. The optical assembly within each light sensor module 968, 969 is, in the present example configured to provide an optically identical passage of reflected light from the target surface to a sensor corresponding to each position on the target from which data is to be collected. Also, to ensure that each sensor receives only reflected light corresponding to a respective target surface position, the optical assembly also ensures that only light reflected in the plane of x and z (i.e. normal to the y-axis, being the plane of the paper in FIG. 9) is sampled. These features will be described in greater detail below with reference to FIGS. 13, 14 and 15.

Referring again to FIG. 9, a drive motor 922 is arranged in the housing 901 for providing linear motion of the optics subassembly 950 via suitable bearings 924 or other means, as indicated by the arrow 926. The drive motor 922 thus serves to move the coherent beam linearly in the x direction over the reading aperture 903 so that the beam 953 is scanned in a direction transverse to the major axis of the elongate focus. Since the coherent beam 953 is dimensioned at its focus to have a cross-section in the xz plane (plane of the drawing) that is much smaller than a projection of the reading volume in a plane normal to the coherent beam, i.e. in the plane of the housing wall in which the reading aperture is set, a scan of the drive motor 922 will cause the coherent beam 953 to sample many different parts of the reading volume under action of the drive motor 922. Thus many points along the target surface 914 can be sampled.

Figure 10:
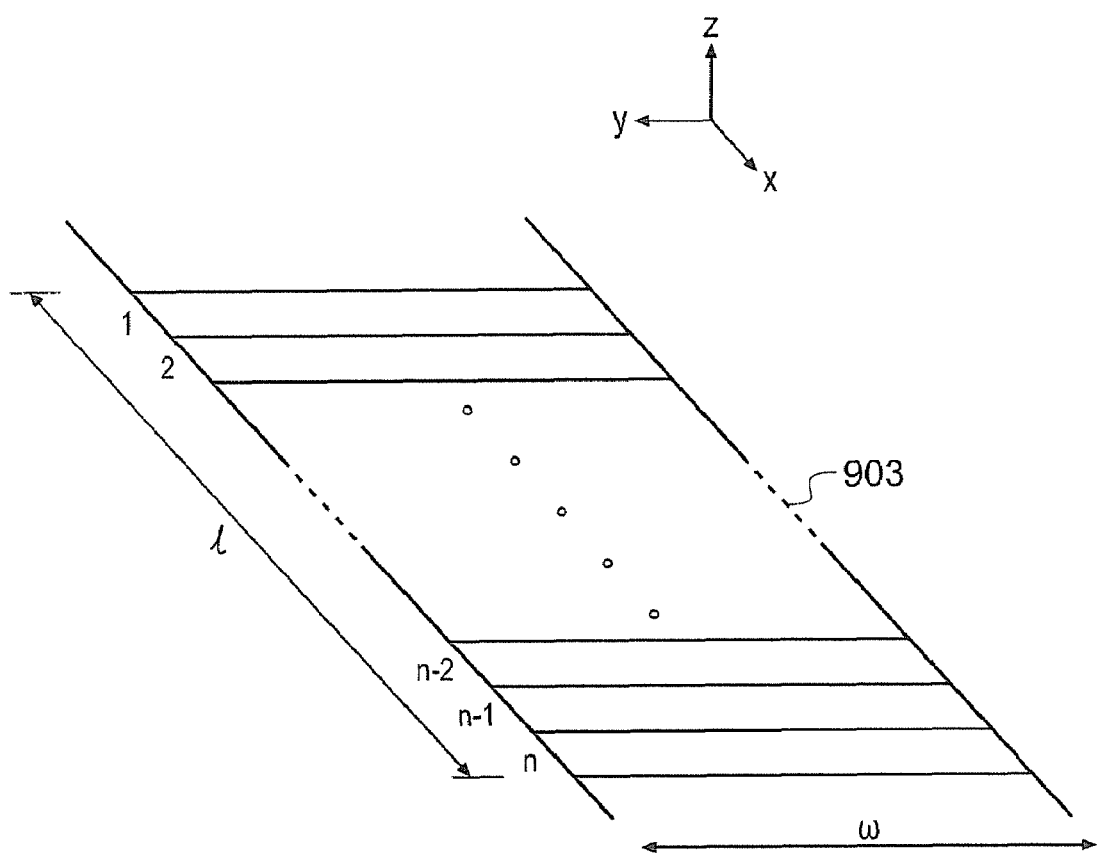
FIG. 10 shows a schematic illustration of an incidence pattern of a coherent beam onto a target.

FIG. 10 is included to illustrate this sampling and is a schematic perspective view showing how the reading area is sampled n times by scanning an elongate beam across it. The sampling positions of the focused laser beam as it is scanned along the reading aperture under action of the drive is represented by the adjacent rectangles numbered 1 to n which sample an area of length 'l' and width 'w'. Data collection is made so as to collect signal at each of the n positions as the drive is scanned along the aperture. Consequently, a sequence of data points are collected that relate to scatter from the n different illustrated parts of the reading volume. In order to provide additional data about the movement of the optics subassembly 950 by the motor 922, the motor may be equipped with rotary encoder to measure its rotational speed and acceleration. By knowing the gearing ratio applied to the output of the motor for driving the optics subassembly 950, it is possible to determine the speed and acceleration of the optics subassembly 950 relative to a target object in the reading volume. The rotary encoder could be provided by, for example, a reed-switch based encoder or an optical encoder.

In some examples, instead of using a rotary encoder on the motor, a linear encoder may be used in conjunction with distance marks (not shown) which may be formed on the inside of the housing 901 adjacent the aperture 903 along the x direction, i.e. the scan direction. In one example such marks may be spaced by 300 micrometres. Such distance marks can be sampled a dedicated linear encoder emitter/detector (such as those used in barcode applications) or by one or more sensors within each optical sensor module 968, 969 and can be used for linearisation of the data in the x direction, as is described in more detail further below.

In one example, the scan apparatus may be configured to read from 22 points in the y direction for every scan position in the x-direction, and readings may be taken from a total of approximately 1500 x-direction positions. In one example, a reading is taken at approximately every 35 microns along a 50 mm scan length, thereby providing 1429 x-direction reading positions. Thus, with two detectors reading at each x,y position in the reading volume, a total of 62876 data points would be obtained, upon which the signature for the surface region may be based. As will be described in greater detail below, in some examples fewer than all of these data points may be selected from generation of the signature for the target.

A typical range of values for the number of capture data points depending on desired security level, article type, number of detector channels "k" (no of sensors reading from each surface point) and other factors is expected to be 250<k×n<10,000. It has also been found that increasing the number of detectors k also improves the insensitivity of the measurements to surface degradation of the article through handling, printing etc. In practice, with the prototypes used to date, a rule of thumb is that the total number of independent data points, i.e. k×n, should be 500 or more to give an acceptably high security level with a wide variety of surfaces. The total number of data points used for signature generation can be decreased to permit faster processing where a lower level of security is acceptable. On the other hand, the total number of data points used for signature generation can be increased significantly to provide a higher level of security, particularly in situations where a large amount of article surface degradation is likely. Examples of such a situation might include large metallic machine parts or drums (such as fuel or chemical containing cylinders), which may sit outside for lengthy periods of time and get rusty, such that the potential surface degradation is enormous. For such applications, a value of k×n in the range 100,000 to 1,000,000 might be appropriate.

Referring now to FIG. 11, the optical arrangement used to generate the elongate focus of the incident beam 953 will be briefly described.

In the present example, the beam dimensions of 22 mm×50 micrometres is created using a beam expander arrangement as depicted in FIG. 11. Beam expanders are well known in the fields of optical lenses. The beam expander of the present example differs from the majority of such conventional devices in that it expands the beam in only one dimension, whilst maintaining focus in the other dimension. In one example, this is achieved using cylindrical lenses.

FIG. 11 shows a schematic three-dimensional view of the major optical elements in the beam expander arrangement.

As shown in FIG. 11, the laser source 952 includes a laser diode 1110 operable to generate a coherent light beam. First, a circular convex lens 1112 provides a distance focus to the coherent beam, which distance focus determines (in the absence of any other focus adjustment lenses provided elsewhere in the optical path) the size of the beam in the x-direction at the point of incidence of the beam onto a target in the reading volume. In the present example, convex lens 1112 is integral with the laser diode 1110.

Once the coherent beam has passed though the circular focussing lens 1112, it is passed though a short focal length cylindrical lens 1114 such as a glass rod. This causes the beam to focus on a point close to the rod in the y-direction, but to remain unaffected in the x-direction. Once past the point of focus, (designated 1215 in FIG. 12 below) the beam spreads out in the y-direction until it reaches a long local length cylindrical lens 1116 which operates to make the beam parallel in the y-direction, again leaving the beam unaffected in the x-direction.

The distance focus in the x-direction can be altered using the convex lens 1112 or a further cylindrical lens somewhere after the beam expander (not shown). The further cylindrical lens would be arranged to adjust the x-direction focus and leave the y-directions expanded beam unaffected.

Referring now to FIGS. 12, 13, 14 and 15, the optical arrangement used within each light sensor module 968, 969 will be described in greater detail.

Each light sensor module 968, 969 includes an optical arrangement configured to focus the reflected light 264, 265 onto a photodetector for each sampling region on a target surface in the reading volume. In the present example, a integrated circuit photodetector array chip is used to provide a line of adjacent photodetectors. The optical arrangement causes each photodetector in the array to receive light reflected from a respective different part of the reading volume. An example of a suitable integrated circuit array is the Thales 10220NW22 linear photodiode array. This particular integrated circuit package allows the output from each diode in the array to be individually measured simultaneously. This package has 22 individual photodiodes arranged in a linear array, each diode being very lightly smaller than 1 mm square, and having a small space between each diode such that the diodes are spaced at 1 mm centres.

FIG. 12 shows a schematic three-dimensional view of the major optical elements in the sensor arrangement.

As shown in FIG. 12, the first optical element which the reflected light 964, 965 passes through is a circular convex lens 1310 to collimate the light (i.e. cause the diverging rays of light to become parallel). This first lens 1310 of the present example is sufficiently large that all of the reflected light arriving at the lens is captured with a minimum numerical aperture of 0.2.

Next, a cylindrical lens 1312 is used to cause the light to converge in the y-axis without affecting the light in the x direction.

The light is then meets a pair of orthogonally arranged slot apertures. The first slot aperture 1314 has the major axis of the slot perpendicular to the axis of the circular lens 1312. This has the effect of removing any light which was captured with a numerical aperture greater than the selected minimum numerical aperture of the circular lens 1310 in the y-axis.

The second slot aperture 1316 has the major axis of the slot parallel to the axis of the circular lens 1312. This has the effect of removing any light which was captured with a numerical aperture greater than the selected minimum numerical aperture of the circular lens 1310 in the x-axis.

Following the second slot aperture 1316, a cylindrical lens 1318 is used to focus the light in the x-axis down to the sensor array (not shown in FIG. 13, designated 1420 in FIG. 14 below). Thus the cylindrical lens 1318 has its axis perpendicular to the axis of cylindrical lens 1312. The light is already focussed in the y-axis by function of the first cylindrical lens 1312. This second cylindrical lens 1318 also provides a function of demagnifying the light by a factor of approximately 5. This means that any error in positioning of a target in the z-direction of the reading volume has its effect demagnified by a factor of 5. In the present example where each sensor in the array is approximately 1 mm square, this allows a z-axis positioning error of up to 5 mm before the reflected light fails to strike the sensor.

Thus, it is relatively important that the distance to the target surface in the reading volume is fairly accurately controlled. This can be controlled using conventional focussing techniques, including the well known optical imaging technique of relaying. Any such techniques, when used on the reflected light from the target surface, need to arranged so as not to restrict the effective numerical aperture at the sensor.

A raytrace type illustration of the optical assembly is shown in FIGS. 13 and 14. The reflections from the reading volume are schematically depicted as point sources 1308 in FIGS. 13 and 14. FIG. 13 shows a view in the plane of the x-direction and FIG. 14 shows a view in the plane of the y-direction. Thus the effects of the cylindrical lenses and the slot apertures on the beam can clearly be seen. For the sake of clarity, only five points of reflection from the reading volume are shown in FIG. 14, although it will be understood that a larger number of points may be sampled using such a system.

By means of this arrangement, it is ensured that the light reflected from the reading volume is captured at the same numerical aperture for each sensor in the sensor array. Thus the information captured by the array about each sampling point in the reading volume is based on the same amount of reflected light that has followed an optically identical path as for all of the other sensors in the array. By means of this effect, a single optical arrangement can be used to sample many points in the reading volume simultaneously with the same optical characteristics.

Were a conventional optical system used to perform this operation, the sensors receiving light which arrived at the centre of the first lens would receive more light (i.e. from a larger numerical aperture) than the sensors receiving light which arrived toward the edge of the first lens. The arrangement of the present example avoids this situation in which the resulting samplings of reflected light would be distorted by the variable collection apertures.

Thus, a single optical arrangement may be used in each light sensor module 968, 969 whilst enabling data to be captured relating to a number of points in the reading volume simultaneously. Thereby, a large area of a target surface presented in the reading volume for scanning may be read without requiring multiple passes of a scanning head over the reading volume. Thus a large target area may be scanned quickly in a single pass of the scan head over the target.

Figure 15:
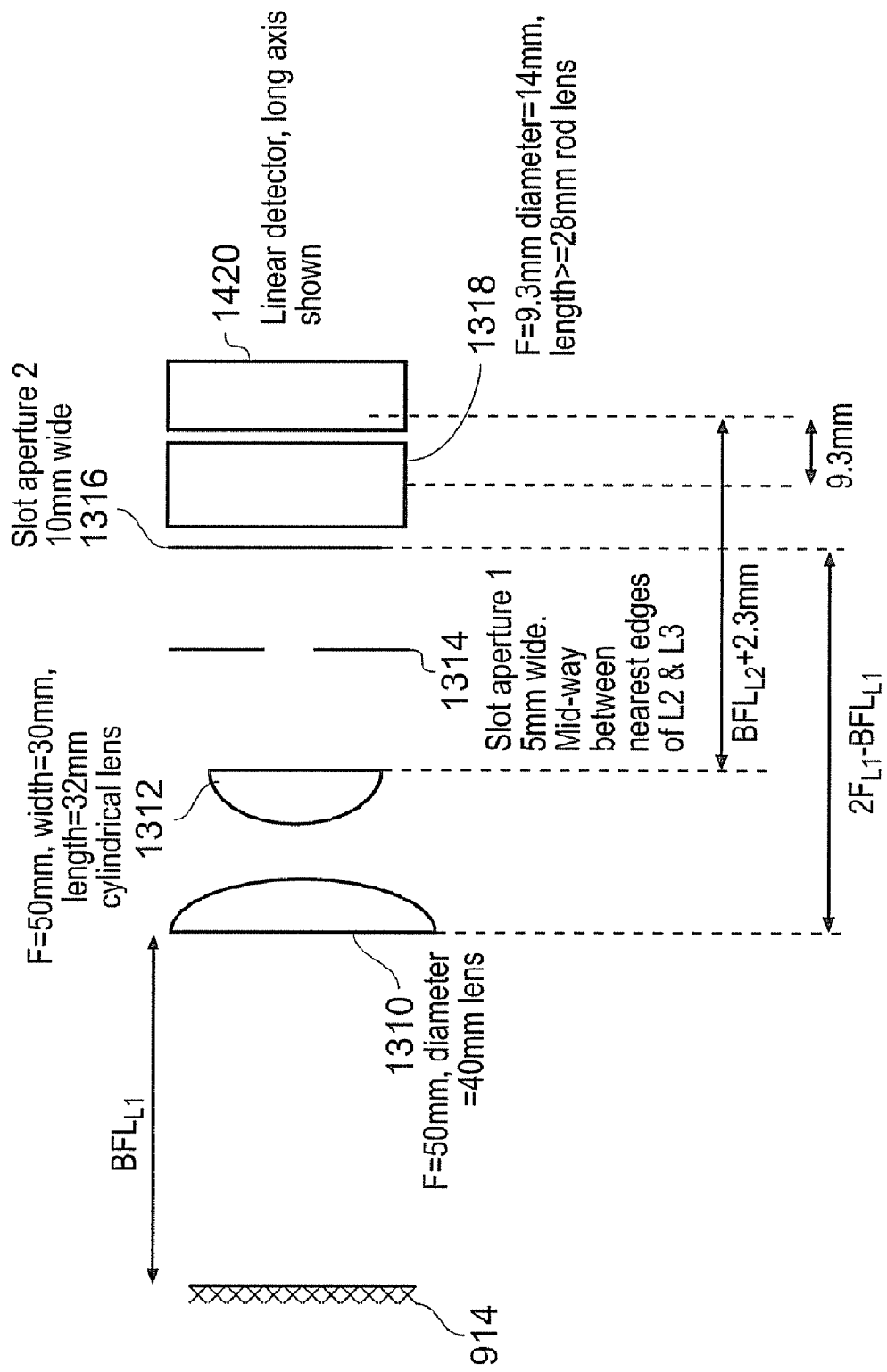
FIG. 15 shows a schematic illustration of the assembly of FIG. 12.

FIG. 15 shows a schematic representation of the optical elements in the light sensor module 968, 969 with details of relative distances and sizes of the elements for one example system.

As shown in FIG. 15, the target surface 914 is arranged in the reading volume at a distance of $BFL_{L1}$ from the first lens 1310 in the detector arrangement. The first lens 1310 of the present example is a circular lens having a focal length of 50 mm and a diameter of 40 mm. The second lens 1312 of the present example is a cylindrical lens having a focal length of 50 mm, a width of 30 mm and a length of 32 mm.

The first slot aperture 1314 of the present example has a slot 5 mm wide and is positioned midway between the nearest edges of the second lens 1312 and the third lens 1318. The second slot aperture of the present example has a slot 10 mm wide and is positioned at a distance behind the front edge of first lens 1310 defined by two times the focal length of first lens 1310 minus the target range $BFL_{L1}$.

The third lens 1318 of the present example is a cylindrical rod lens having a focal length of 9.3 mm, a diameter of 14 mm and a length greater than or equal to 28 mm. The detector array 1420 is then positioned adjacent the third lens at a distance of 9.3 mm from the centre axis of the third lens to the back of each photodiode such that the light is spot focussed onto each photodiode in the array. The detector array 1420 is also positioned at a distance from the nearest edge of second lens 1312 to the back of each photodiode of $BFL_{L1}$ plus 2.3 mm. This 2.3 mm is the necessary adjustment to compensate for the focal length alteration of second lens 1312 caused by the thickness of third lens 1318. Although third lens 1318 is arranged not to alter the focus of the light in the y-direction, it does have the effect of altering the focal length of second lens 1312 in the same way that a square prism would. This effect is visible in the raytrace of FIG. 14 where it can be seen that the beams are slightly altered by their passage through third lens 1318.

In some examples, a laser interference filter may be inserted into the optical path within the light sensor module. Such a filter could be inserted almost anywhere in the light sensor module, the only restriction being the thickness of the filter itself. Such filters may typically be expected to be approximately 6 mm thick, such that a sufficiently large gap between other components is necessary to fit the filter. Such a filter might be particularly appropriate for systems which are expected to be used in areas where a large amount of background illumination is present. A laser interference filter may be provided by a semi-reflective material which only transmits light within a certain passband. For example, if the laser source provides a coherent beam with a wavelength of 635 nm, there could be provided a laser interference filter with a passband of 625-645 nm, thereby preventing light outside this passband from reaching the photodetectors. Use of such a filter can enable the scan device to provide a good performance even in the presence of extensive background illumination without the need for a high powered laser source to provide the coherent beam. By keeping the laser power output below levels defined in relevant regulatory provisions, a scanner device can be produced without regulatory restriction.

In some examples, it may be desirable to ensure that the captured light is imperfectly focussed on the sensors in the sensor array. By so doing, it is possible to avoid aliasing occurring due to the spaces between the sensors of the array. This can be achieved by simply defocusing sufficiently for each neighbouring sensor to receive a small amount of the light which is intended to be incident on a given sensor.

Whether or not such an anti-aliasing system is used, it may, in some examples, be desired or appropriate to apply a filter to the signal output from the sensors. Such a filter can perform a degree of inter-channel (lateral or y-direction) smearing and can be performed in hardware or software and can be effected before or after analog to digital conversion of the signals. By using such a smearing filter, the z-direction range of the system can be desensitised (i.e. provide greater resistance to positional error). However such a system has a side-effect of reducing the signal strength of the captured data, effectively attenuating the signature.

Figure 16:
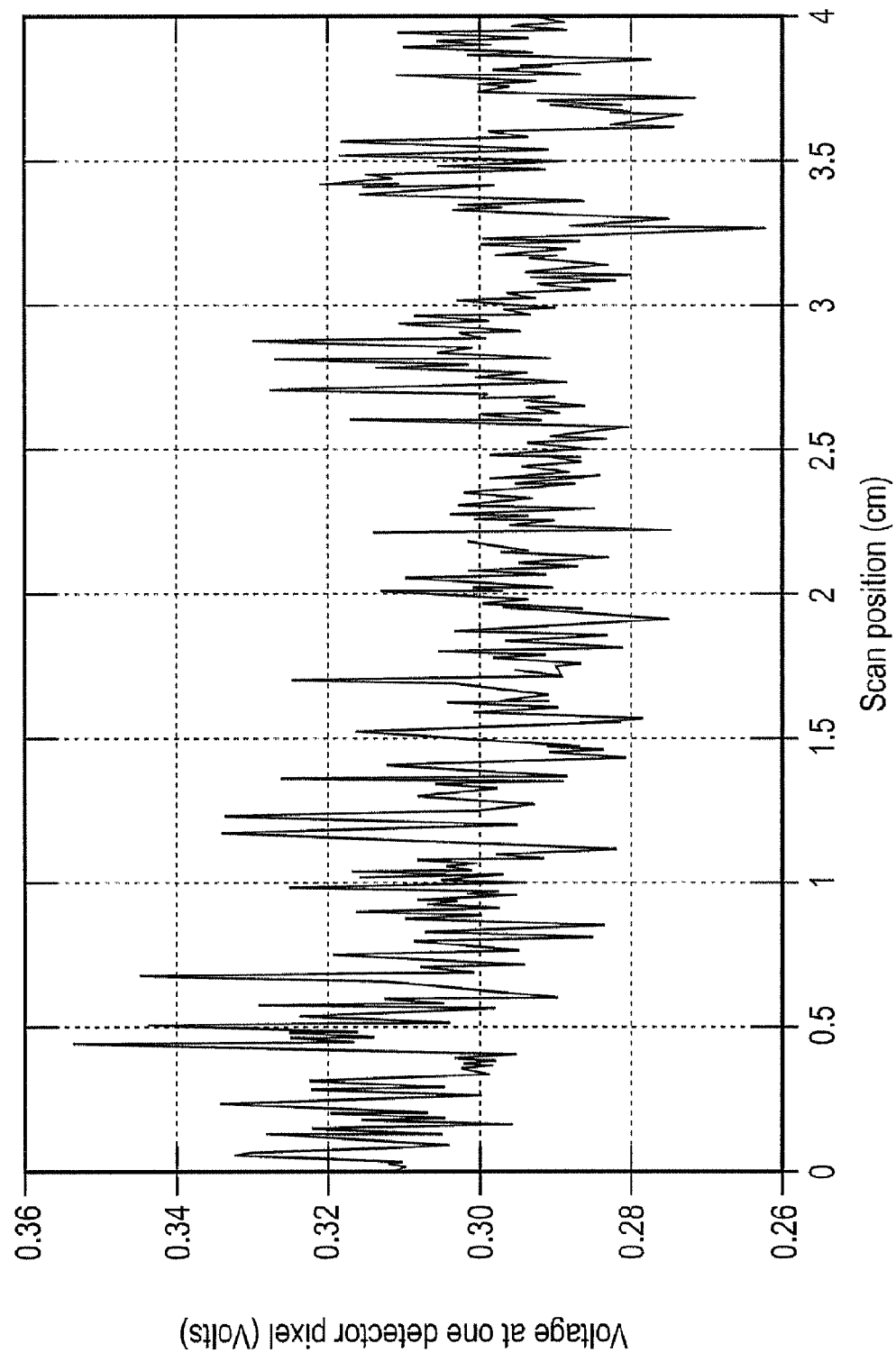
FIG. 16 shows an example detector signal level output.

An example of the signal strength at one of the photodiodes in the detector array 1420 with change in scan position in the x-direction is shown in FIG. 16. As is clear from this graph, the variation in the signal (i.e. the intensity change) is around 10% voltage difference over time. That is, from a baseline of approximately 0.3V a maximum adjacent peak to adjacent peak variation of approximately 0.03V is output. Compared to known systems, such as that disclosed in Buchanan et al's Nature paper discussed above, where the intensity change is approximately 0.5% (see FIG. 1a of Buchanan) the system of the present example provides a tenfold improvement in intensity change signal strength at the sensor.

This greatly enhanced signal strength at the sensor therefore makes a system based on an optical assembly similar to those described above much more robust in terms of its ability to resolve the surface details of a shiny surface such as glossy paper or plastic.

Thus it is also apparent that the optical system of the above examples, which provides a high numerical aperture for image sampling, can also be applied to a system where only a single sensor is used per optical assembly. Thereby a significant improvement in sensor output over known systems can be achieved.

Where a multiple detector system is used in addition to the large numerical aperture, a large area of a target surface arranged in the reading volume can be read simultaneously to effect a quick scan of the target.

Although the above examples include a 22 sensor array in each light sensor module, other array sizes could be used. However, a sensory array of the order of 22 sensors in size provides a good balance between obtaining data relating to a large area on the target and having too much data to process easily and cheaply using commercially available processors/ASICs/DSPs. A number of sensors can be selected based on desired target area to cover in a single scan and available data processing power.

Although the above examples use a 1-D photodiode array, other sensor arrays could be used. For example, an array could be constructed from a number of discrete photodetectors or using a number of photodetector array packages to build an array of the desired size. Also, alternative detector technologies could be used. For example, a detector type typically used in imaging sensors could be used, if one were available with sensor elements of a size usable with the optical system of the present examples. A conventional CCD (charge-coupled device) array, for example, typically has sensor elements approximately 60 microns square. Such small detectors would, in the optical system of the present examples, require extremely accurate range positioning of the target in the reading volume to obtain useful data therefore. However, a CCD array with sensor elements having a width of the order of 1 mm could be used, assuming that the high noise associated with CCDs could be addressed. In one example, a CCD array having elements 1 mm in width (y-direction) and about 50 µm in length (x-direction). Such a sensor structure could provide improvements in the capture of conventional imaging type data from a target surface, thereby providing improvements for pattern matching type operations. In other examples, alternative photodetectors such as phototransistors could be used instead of photodiodes.

Although the above described examples have sensor elements approximately 1 mm square in size, other sensor sizes could be used. The 5:1 defocusing effect of the rod lens in the optical assembly sets the constant of proportionality between the sensor size and the maximum z-direction range inaccuracy that can be tolerated whilst giving a useful output. Thus a smaller sensor size would allow the scan head to be made smaller, but would require greater positioning accuracy. Conversely, a larger sensor size would permit greater positioning inaccuracy, but would require a larger scan head.

Figure 17:
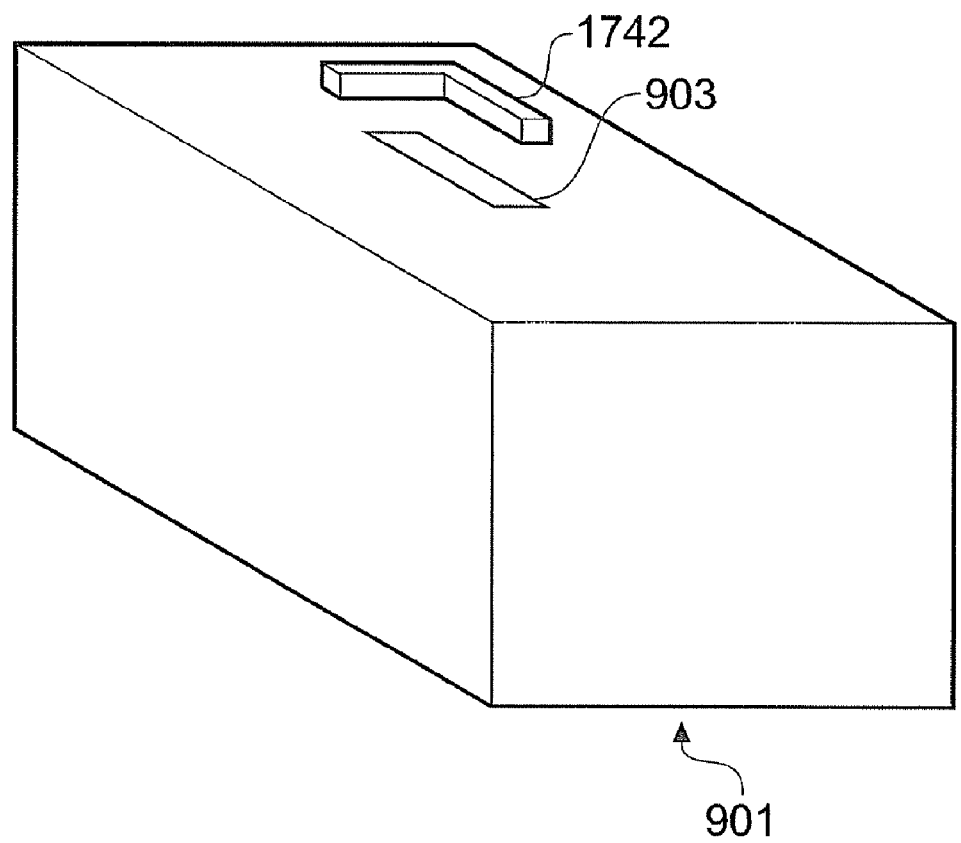
FIG. 17 shows a schematic illustration of a detector apparatus housing.

In the above described examples, the scan head is moved relative to the reading volume and any object arranged therein by mechanisms within the scan apparatus. To assist in accurate repositioning of an object in the reading volume between different scan operations, a guide can be provided. FIG. 17 shows a schematic representation of a scan apparatus 901 having a reading aperture 903 therein. The scan apparatus 901 also has a positioning guide 1742 formed thereon to assist with positioning of an article relative to the reading volume. In alternative examples, a positioning guide may be omitted, as will be described in greater detail below.

Figure 18:
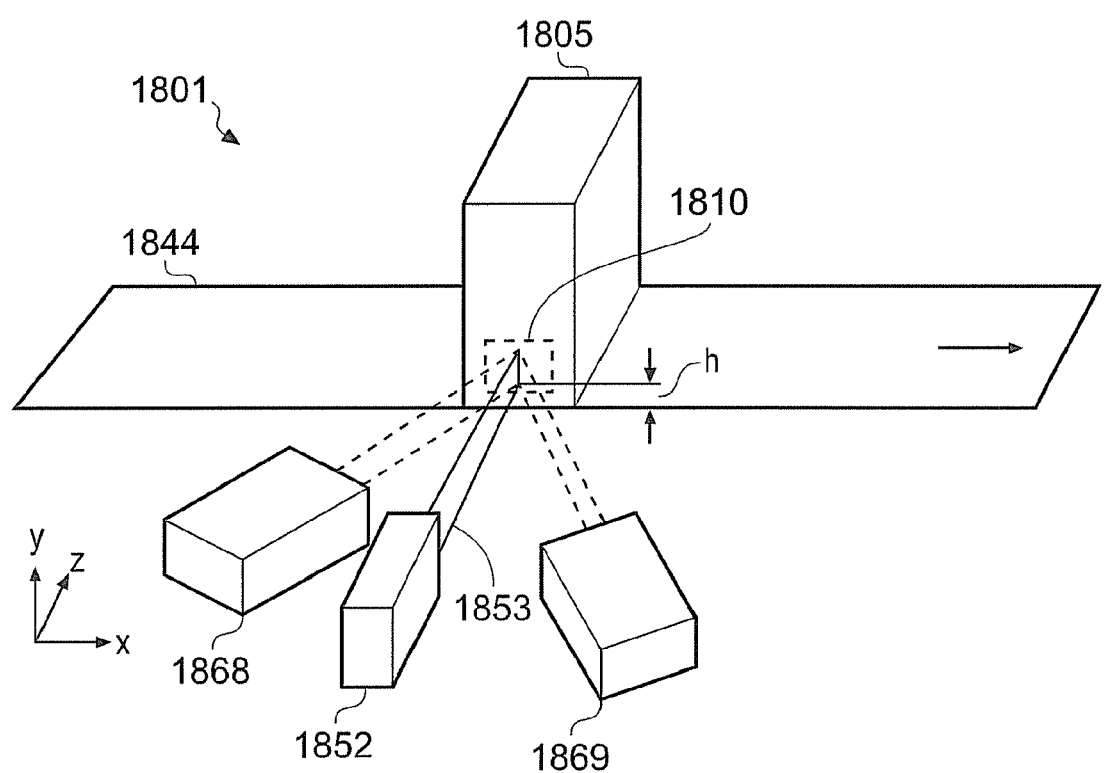
FIG. 18 shows a schematic perspective illustration of a processing line scanner apparatus.

With reference to FIG. 18, there will now be described an example of an arrangement whereby a scan head such as those described in the above examples can be used to scan an object passing a fixed position scan head, such as might occur in a production line or processing line environment.

FIG. 18 shows a schematic perspective view of an example of a scanning apparatus 1801 intended for screening batches of articles, for example in a processing line environment. The reader is based on a conveyor belt 1844 on which articles of packaging can be placed, only one article 1805 being illustrated for simplicity of representation. A reading area 1810 on the article 1805 is scanned by a static laser beam 1853 as the article 1805 passes on the conveyor belt 1844. The laser beam 1853 is generated by a laser source 1852 arranged fixed in position beside the conveyor belt 1844. The laser source 1852 has an integral beam focusing arrangement (not shown) for producing an elongate beam which extends in the y direction and which travels in the z direction (i.e. horizontal to the floor) to pass over the conveyor belt 1844 at a height 'h', thereby intersecting with the article 1805 at a height 'h' to scan over the reading area 1810. Although only one article is shown, it will be appreciated that a stream of similar articles can be conveyed and scanned in succession as they pass through the beam 1853. The light reflected from the reading area 1810 can be detected at light sensor modules 1868 and 1869.

The functional components of the conveyor-based reader apparatus are similar to those of the stand-alone reader apparatus described further above. The only difference of substance is that the article is moved rather than the laser beam, in order to generate the desired relative motion between scan beam and article.

It is envisaged that the conveyor-based reader can be used in a production line or warehouse environment for populating a database with signatures by reading a succession of articles. As a control, each article may be scanned again to verify that the recorded signature can be verified. This could be done with two systems operating in series, or one system through which each article passes twice. Batch scanning could also be applied at point of sale (POS), or using a reader apparatus that was based on POS equipment components. Where such a re-scanning system is employed, a smearing filter as discussed above could be used. The smearing filter could be used to smear the data captured on the first scan to the extent that only every other channel need be monitored on the validation (re-scan) scan.

By way of illustration of the data rates that could be expected from a processing line type system, it will be assumed that a measurement is desired from each sensor every 35 microns in the scan direction. If it assumed the processing line is moving at 4 m/s, which is the speed of the fasted processing lines currently in use—such as a gluer/folder machine for making up cartons, then one sample will be needed from each sensor every 8.7 microseconds. This equates to a data rate from the sensor of approximately 110 ksamples/second, which is well within the capabilities of commercially available processor ICs (integrated circuits), ASICs (application specific integrated circuits) and DSPs (digital signal processors). Assuming that an analog component such as an op-amp is used to amplify the sensor signal before analog to digital conversion, and that approximately 10× amplification is required, this means that the op-amps would need a GF (gain bandwidth product) rating of 1.1 MHz (110 kHz×10) which is achievable even with a cheap op-amp. Also, assuming that the input line to the op-amp includes a resistor and an op-amp to ground (see FIG. 22 below), then if the resistor has a value of 22 kΩ, then for time between samples of 9 microseconds (approximate period of 110 kHz signal) a capacitance of 40 pF, which is a commercially available capacitance value. Thus the sensor arrangement shown in FIG. 18 would be operable with all processing lines currently exploited commercially.

As will be appreciated, the above described examples would necessarily become bulky where a large reading range is desired. This is due to the laws of physics defining the size of the optical components necessary to achieve the desired numerical aperture at the sensors. In order to at least partially address this issue, the light sensor modules can be arranged to view light returning up the path of and/or adjacent the path the incident beam. An example arrangement of such a system will now be described with reference to FIG. 19.

Figure 19:
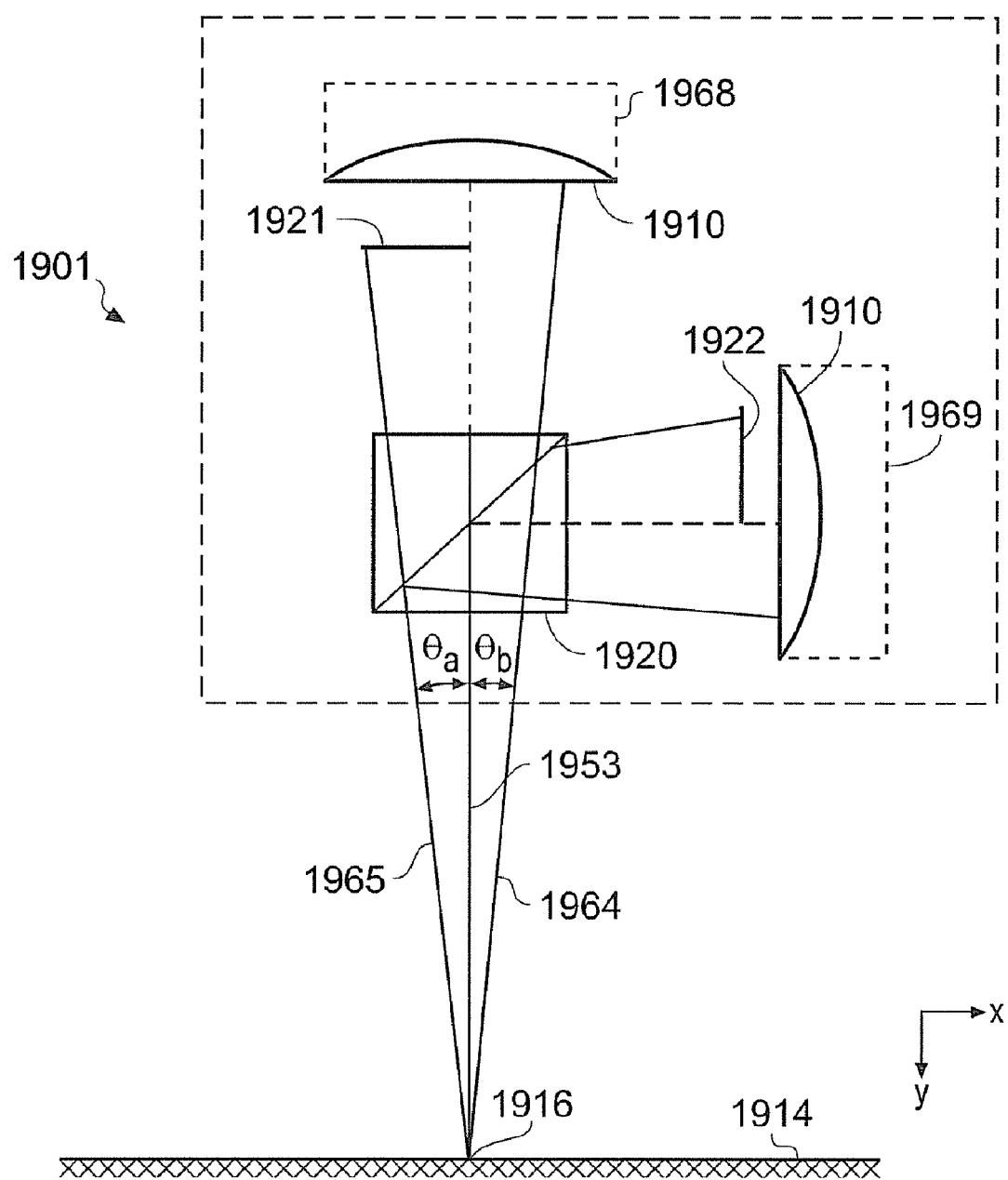
FIG. 19 shows an example of a distance reading scanner apparatus.

FIG. 19 shows a schematic representation of a reader apparatus 1901 in which the light sensors receive light reflected back toward the laser source.

As shown in FIG. 19, a coherent beam 1953, which may have an elongate focus extending in the y-direction, is directed into a target region 1916 of a target surface 1914. For the sake of simplicity a laser source is not shown in the Figure. The laser source could be placed anywhere within the system, using mirrors and/or prisms as necessary to direct the beam along line 1953.

The extent of the reflected light collected by the reader apparatus is shown by lines 1964, 1965. The reflected light enters a beam splitter 1920, which splits the reflected light into two beams, one directed toward each of two light sensor modules 1968, 1969. In order to provide that each light sensor module receives reflected light from a different angular range, to provide antispoofing capability as will be discussed below, one half of the beam is stopped from reaching the light sensor modules 1968, 1969 by respective blanking members 1921, 1922. These are arranged such that the reflected light in angular range $\theta_a$ reaches detector light sensor module 1969 and the reflected light in angular range $\theta_b$ reaches detector light sensor module 1968.

In order to provide that the light reaching the sensor or sensor array in each light sensor module is collected at the same numerical aperture, each light sensor module is configured as though it were receiving light from the entire width of the reflected beam. To illustrate, the collimating lens 1910 of each light sensor module is shown in FIG. 9. Thus it can be seen that, if it were not for the presence of stop members 1921, 1922, each light sensor module would receive light from across the entire angular range of the reflected light.

Given the size constraints applied in achieving the desired numerical aperture, the optical assembly required for each light sensor module can quickly become large and unwieldy. Thus, in some examples it is envisaged that a maximum reading range for a handheld scanner might be of the order of 50 cm, which would require a lens diameter of 10 cm for a numerical aperture of 0.1. For applications where a very long reading range is required, such that the lenses become large, it is possible to use a Fresnel lens to reduce the weight of the required lenses. As the system of the present example averages the reflected light over relatively coarse detectors (1 mm squared), any reduction in absolute image quality which might be caused by a Fresnel lens has little or no effect on the captured data. As will be appreciated, larger reading distances can be achieved, with consequently larger reader unit sizes. If a gantry or vehicle mounted unit were to be created, a maximum reading distance of a several metres could be achieved simply by scaling up the optical arrangements.

For all of the reader apparatuses described above where an adjustable focus range is provided, the range to the target surface can be measured by any means capably of providing a sufficiently accurate range measurement to enable to the optical subsystems to be focussed to the desired range with a degree of accuracy sufficient to ensure that the received light falls on the sensor elements of the light sensor modules. Examples of suitable range determination systems may include a rangefinder to enable one or more focussing lenses to be used to adjust the focus of the beam to the correct range. In one example the rangefinder may be a laser rangefinder, in another example, the rangefinder may be a physical measuring element, such as a telescopic rod. In another example, the rangefinding can be performed by processing of the reflected beam from the scanner. A measurement of the autocorrelation function of the reflected beam received at the detector can indicate the degree of focus at the target surface, allowing focus adjustments to be made accordingly.

In some examples it may be desirable to scan an object which does not lend itself to scanning of a rectangular area. An example of such an object might be a circular object such as the top of a can or bottle, or a security seal. To address such a situation, a scanner may be configured to read a circular target area by rotational motion of the scan head relative to the target. An example of a suitable system is illustrated in FIG. 20.

Figure 20A:
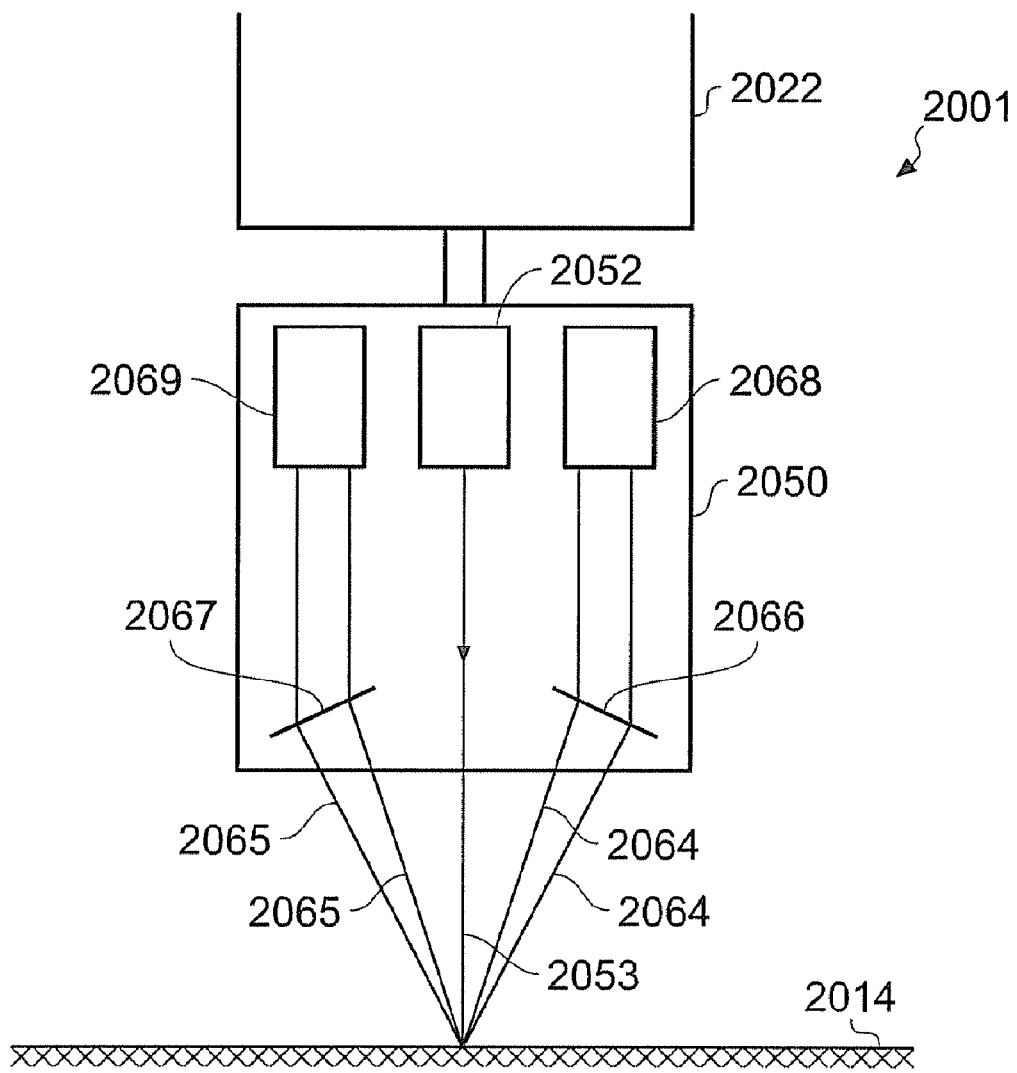
FIG. 20a shows a schematic illustration of a rotary scanner apparatus.

FIG. 20*a* shows a schematic illustration of a scanner system arranged for rotary scanning, so as to scan from a circular scan area. It will be appreciated that use of such a reader apparatus is not limited to the scanning of a circular target.

The reader apparatus 2001 shown in FIG. 20*a* includes a rotation motor 2022 operable to cause a scan head 2050 relative to a target surface 2014. The scan head 2050 includes a laser source 2052 operable to direct a coherent beam 2053 with elongate focus onto the target surface. Reflected light 2064, 2065 is then redirected using beam splitters, mirrors or prisms 2066, 2067 to light sensor modules 2068, 2069.

Figure 20B:
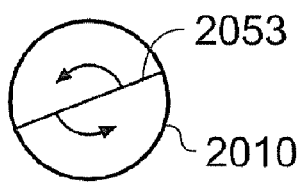

FIG. 20*b* shows an example of a coherent beam incidence pattern on a circular scan area 2010. In this example, the coherent beam 2053 has elongate focus thus is incident in the form of a line on the scan area 2010. In the present example, the incidence line of coherent beam 2053 extends across the diameter of the circular scan area 2010 and is then caused to rotate about the centre of the circular scan area as indicated by the arrows, thus scanning the entire scan area.

Figure 20C:
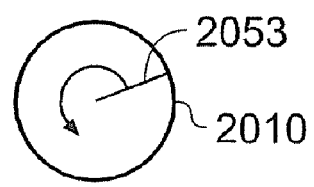

FIG. 20*c* shows an example of a coherent beam incidence pattern on a circular scan area 2010. In this example, the coherent beam 2053 has elongate focus thus is incident in the form of a line on the scan area 2010. In the present example, the incidence line of coherent beam 2053 extends across the radius of the circular scan area 2010 and is then caused to rotate about the centre of the circular scan area as indicated by the arrow, thus scanning the entire scan area.

Now, with reference to FIGS. 21 and 22, examples of a data capture processing circuit suitable for use with a 22 element sensor array, such as that used in the example reader apparatuses described above, will now be discussed.

Figure 21:
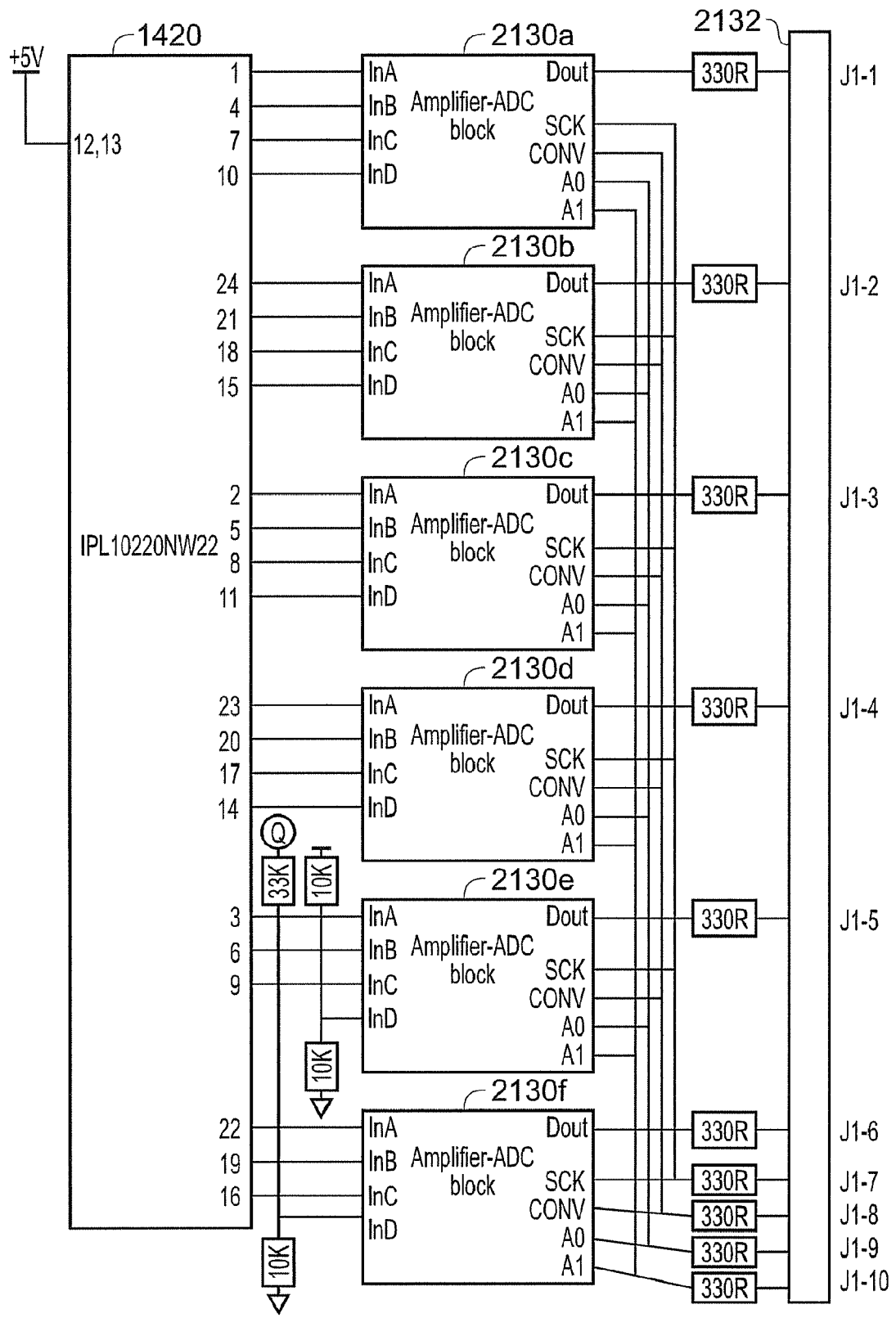
FIG. 21 shows a schematic circuit diagram for a detector data collection circuit.

FIG. 21 shows a schematic circuit diagram for the data capture processing circuitry of the present example. The sensor array 1420 has one output relating to each of the 22 sensor elements in the array. This output is an analog voltage directly proportional to the amount of light incident on the sensor element. See FIG. 16 above for an example signal output from an individual sensor element as it receives reflected light from different parts of a target surface.

In the present example, the output from each sensor element is input into a respective amplifier and analog to digital converter (ADC) block 2130. The amplifier-ADC blocks 2130*a*-*f* of the present example each receive the output of four different sensor elements within the sensor array 1420. As 22 is not exactly divisible by 4, two of the amplifier-ADC blocks 2130*e*, 2130*f* have a "spare" input which spare inputs are in the present example are used to monitor the health of the power supply to the circuit. As can be seen in FIG. 21, the spare input to block 2130*e* is connected to a voltage divider which provides a voltage equal to 50% of the supply voltage. As the circuit of the present example uses a nominal 5V supply rail, the input to the block 2130*e* should therefore be 2.5V. This can be monitored for power supply instabilities using the amplifier-ADC block 2130*e*. The "spare" input to block 2130*f* is used to monitor the raw input voltage to the circuit, indicated in FIG. 21 by "Q". In the present example, the supply voltage is nominally 12V and may be supplied by a mains transformer or by a battery. The voltage divider on this input reduces the nominal 12V Q value to 2.79V for monitoring via the amplifier-ADC block. Monitoring the Q value can, in the example of a battery powered system, provide an early warning of battery failure as most batteries start to provide a reduced output voltage some time before becoming completely discharged. As the desired values of these two power system monitor lines are approximately ten times greater than the sensor outputs, these inputs are not amplified in the amplifier-ADC blocks 2130*e* and 2130*f*. Thus (with reference to FIG. 22 below) these two inputs are connected directly to the inputs of the multiplexer, thereby bypassing the amplification stage.

Each amplifier-ADC block 2130 is internally multiplexed such that each block has a single output line, which can carry a signal proportional to the output from any one of the four input lines. These outputs are connected in the present example to a connection header 2132 to enable the sensor circuit assembly to be connected to a data processing device operable to use the data from the sensor array for analysis and signature generation.

Figure 22:
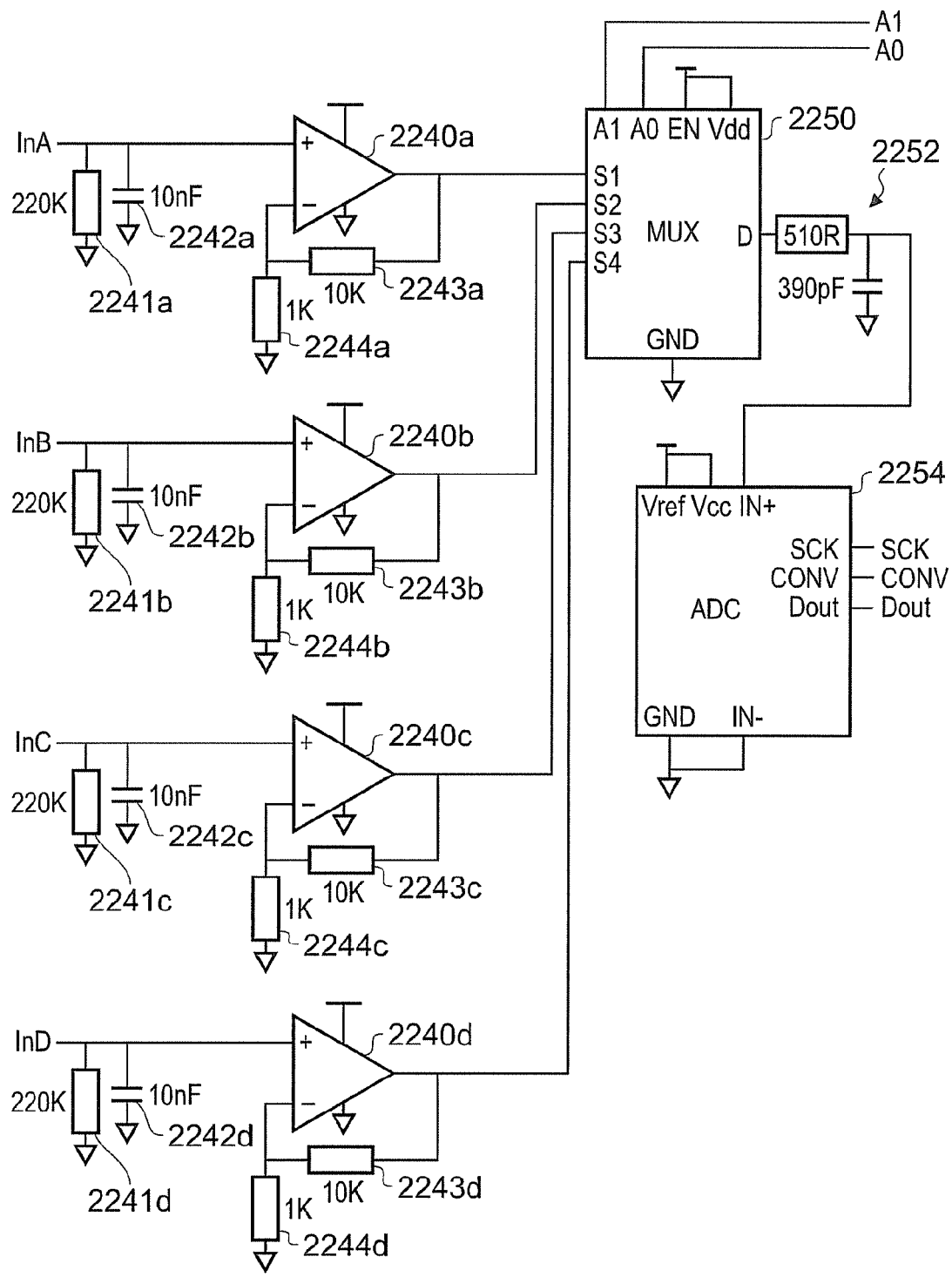
FIG. 22 shows a schematic circuit diagram for a part of the circuit of FIG. 21

The structure of the amplifier-ADC blocks 2130 is illustrated schematically in FIG. 22. Each input to the amplifier-ADC block 2130 is connected to the non-inverting input of an op-amp 2240. An example of a suitable op-amp is the Analog Devices™ AD6808 precision low noise CMOS quad rail-to-rail input/output operational amplifier. Each op-amp 2240*a*-*d* is protected by a ground return resistor 2241*a-d* and a ground return capacitor 2242*a-d*. Suitable values for these components may be 220 kΩ for the resistors and 10 nF for the capacitors. In some examples, resistor and/or capacitor packages may be used to provide these components instead of using discrete components.

Each op-amp 2240*a-d* also has a feedback resistor 2243*a-d* and an inverting input grounding resistor 2244*a-d*. In the present example, the feedback resistors 2243*a-d* have a value of 10 kΩ and the inverting input grounding resistors 2244*a-d* have a value of 1 kΩ. In some examples, resistor packages may be used to provide these components instead of using discrete components. Thereby a gain of 11 is achieved by each op-amp 2240*a-d*. Thus, with an output from the photodiodes of approximately 0.3V, the amplified signals have a level of about 3.3V The output from each op-amp circuit is then fed to a four input multiplexer 2250. An example of a suitable multiplexer is the Analog Devices™ ADG704 low voltage 4Ω, 4 input multiplexer. This multiplexer is responsive to two control inputs A1, A0 (which are connected to the connection header 2132) to determine which of the inputs is output from the multiplexer 2250.

The multiplexer 2250 is then filtered by RC low pass filter circuit 2252. This low pass filter is recommended in the data sheet of the ADC used in one implementation (Linear Technology™ LTC1864, element 2254 discussed below) and is therefore shown in the Figure in accordance with good circuit design practice. This filter ensures that the signal contains no unwanted high frequency effects. In the present example, where the RC circuit has a resistance of 510Ω and a capacitance of 390 pF, the 3 dB point of low pass filter 2252 is approximately 800 kHz.

The filtered output from the multiplexer is then passed to an analog to digital converter (ADC) 2254. An example of a suitable ADC is the Linear Technology™ LTC1864 16 bit micropower ADC. This particular device is a low power serial output device. The ADC has two control inputs, SCK which provides a clock signal to the ADC and CONV which is used to trigger a sample and hold on the data input to perform an analog to digital conversion. The converted signal is then output on serial data output Dout. SCK, CONV and Dout are connected to the connection header 2132 for connection to an external control and data processing system.

Referring again to the example data rates discussed with reference to FIG. 18 above, the ADC of the present example processes each analog signal output from the sensor array into a 16 bit value. The analog signal values arrive at 110 kHz, which implies a new signal reading every 8.7 μs. Thus, the serial ADC of the present example will output one bit every 540 ns, such that the bit rate of the digital signal will be approximately 1.8 Mbits/s. This is the data rate for one detector channel. Thus, if at any one time up to six different detector channels are monitored (i.e. one per ADC), then the data rate will be approximately 10.8 Mbits/s. If all 22 detector channels are monitored simultaneously, the data rate will rise to approximately 39.6 Mbits/s. Thus it can be seen that capturing data from any one channel is well within the capabilities of any conventional desktop computer of 2006 specification. Likewise, monitoring up to one detector from each ADC is still well within the capabilities of most such computer systems. Monitoring all 22 channels is well within the capabilities of specialist data capture hardware for a desktop computer of 2006 specifications, but is likely beyond the capabilities of such a computer system without specialist data capture hardware. Thus using all 22 channels for signature generation is likely to be somewhat costly in terms of necessary hardware for a fast moving production line, but is still very possible. Also, since desktop computers tend to increase in speed over time, the cost of implementing such a data capture scheme on a fast moving production line will drop. In any case, even dedicated data capture hardware for a desktop computer costs only a tiny fraction of the cost of a high speed processing line at 2006 prices.

As will be appreciated, the op-amps may preferably be located with a minimum possible signal path length from the sensor array, so as to minimise the possibilities for signal attenuation or interference to the low signal level outputs from the photodiodes.

In some examples, the circuit shown in FIG. 21 could be implemented in whole or in part using a dedicated integrated circuit, such as an application specific integrated circuit (ASIC) or a filed programmable gate array (FPGA).

Thus there have now been described various examples of a scanner apparatus operable to direct coherent light onto a target surface arranged in a reading volume, to detect reflections from the reading volume using a high numerical aperture, thereby capturing large amounts of light, including low angular frequency components of that reflected light. The captured light can then be converted to a voltage representative of the light intensity reflected from a given point in the reading volume, which voltage can then be digitised for use in creating a signature for an item in the reading volume.

There will now be described a number of examples of alternative optical arrangements for capturing light reflected from a reading volume using optical arrangements configured to use rasterisation of a spot focussed coherent beam to provide reflections from a variety of points in the reading volume. These examples can also use a large numerical aperture detector to sample the reflected light.

Figure 23:
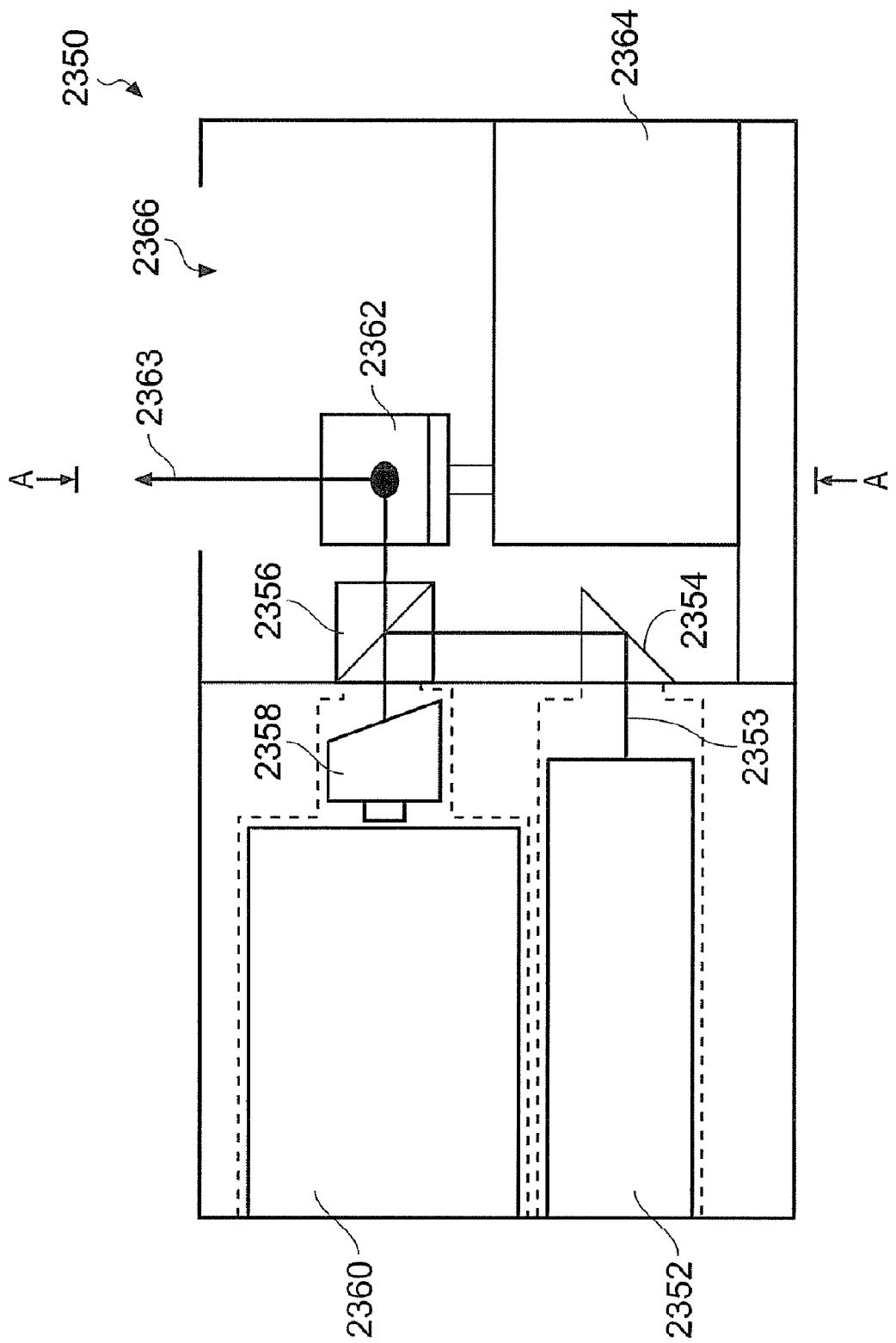
FIG. 23 shows a schematic sectional view though an example scanner apparatus.

Shown in FIG. 23 is an example of a surface reading apparatus operable to collect information describing a surface for use in creating a signature for that surface, which signature can be used in an authentication system where the identity of the surface is checked.

As shown in FIG. 23, a reader apparatus 2350 includes a laser diode 2352 operable to generate a coherent light beam. The output beam 2353 of the laser diode 2352 is directed by a mirror or prism 2354 to a beam splitting cube 2356 which deflects the laser beam onto a spinning angled mirror 2358 which causes the laser beam to be deflected to trace a circle with angular velocity equal to the spin speed to the mirror 2358. The spinning angled mirror 2358 is driven by a motor 2360. The deflected laser beam then passes back through the beam splitting cube 2356 to a movable mirror or prism which directs the beam 2363 out of an aperture 2366 in the reader 2350 and into a reading volume. The movable mirror or prism can be translationally moved by a scanning motor 2364 to cause the circular trace of the laser beam to move across the surface of an article in the reading volume.

In one example, the circular deflection of the laser beam may be achieved using a spinning prism. This has an advantage over a spinning mirror that the angle of incidence of the beam onto a target will be constant, whereas a spinning mirror can be expected to cause varying angles of incidence from one point on an article to the next. However, use of a spinning prism has a size implication on the scanner apparatus, as the prism needs to have a cross-section approximately twice the diameter of the desired circular trace of the laser beam. On the other hand, a spinning mirror can be much smaller than the desired circular trace of the laser beam. Also, if the angle of deflection created by the spinning mirror is small, the variation in angle of incidence upon the target article may also be expected to be small.

Figure 24:
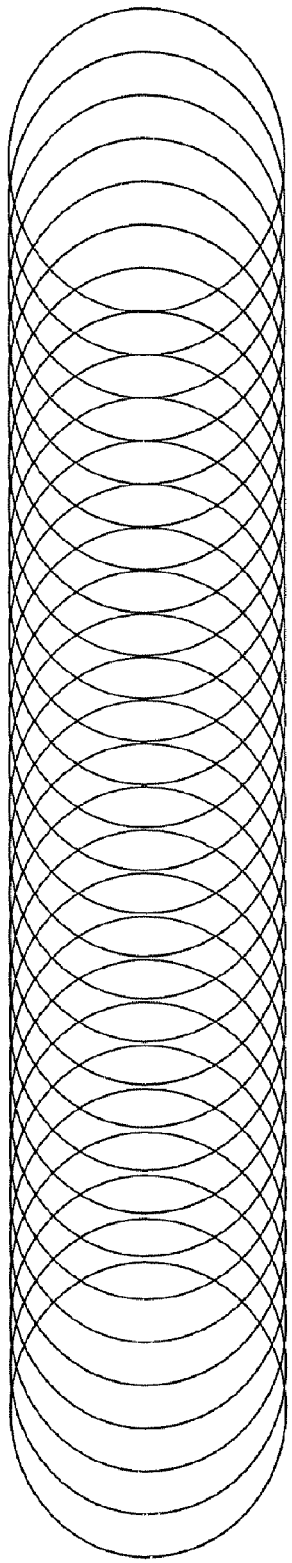
FIG. 24 shows a schematic illustration of an incidence path of a rastered beam.
Figure 25:
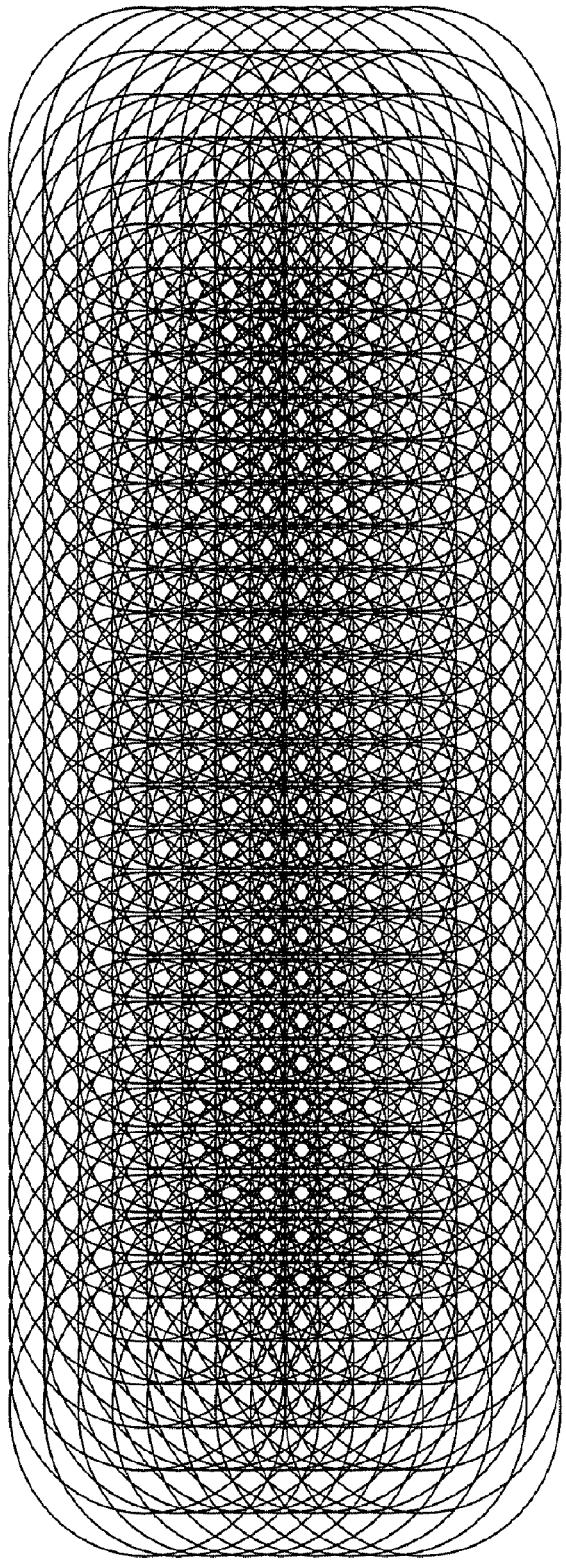
FIG. 25 shows a schematic illustration of an incidence path of a rastered beam.

Thus the trace of the laser beam 2363 on a target article in the reading volume can be expected to appear as shown in FIG. 24. If the beam is caused to move in two dimensions across the target (in addition to the circular motion), then the trace over a target surface in the reading volume may appear as shown in FIG. 25. Such movement could be caused by altering the angle of the movable mirror or prism 2362, or by using a scanning motor 2364 operable to move the movable mirror or prism 2362 in two dimensions.

If the focus spot size of the laser beam is selected to have a diameter no less than the translational distance moved by the beam centre between one circle and the next, then this rasterisation of the laser beam will cause a solid area of the target surface to be read in its entirety. By adopting such a scanning approach, the entire scan area can be sampled at equal to or greater than the minimum Nyquist criterion to avoid aliasing.

Figure 26:
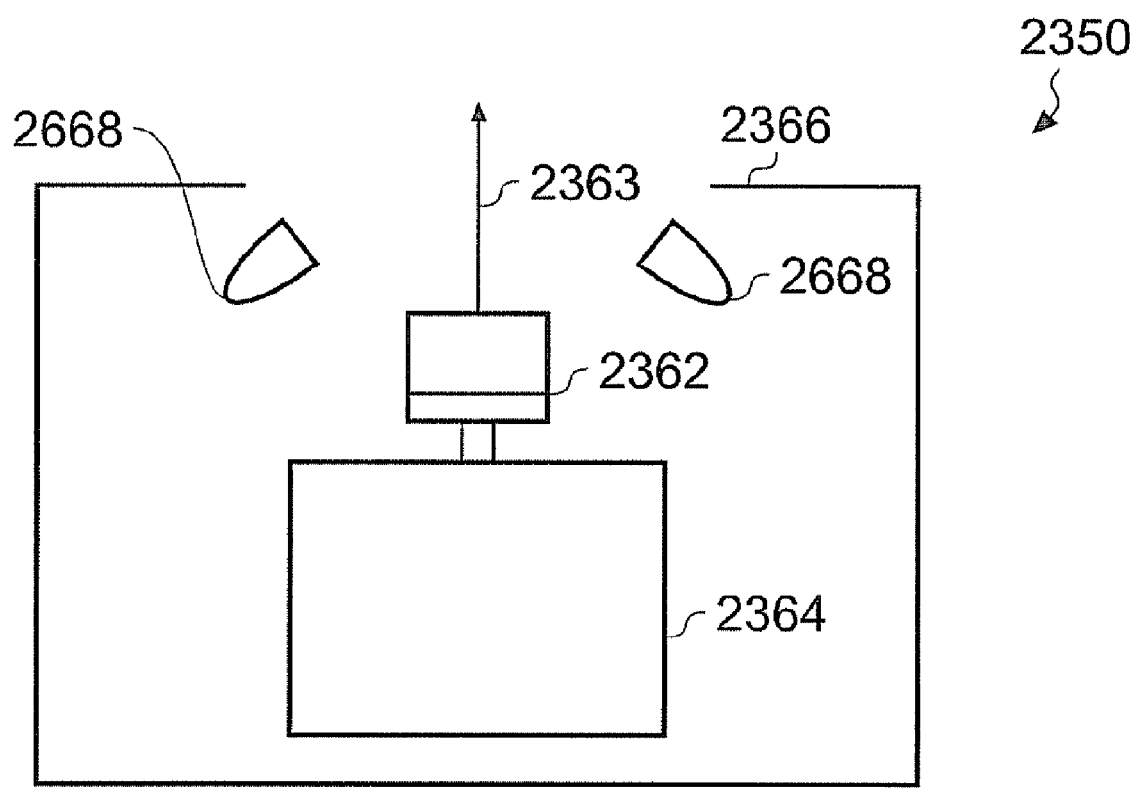
FIG. 26 shows a schematic sectional view though the scanner apparatus of FIG. 23.

FIG. 26 shows a schematic sectional view through the reader 2350, showing the location of the photodetectors which are provided to detect reflections from a target surface in the reading volume, for processing into a signature for that surface. The view of FIG. 26 is a view through the plane AA marked in FIG. 23. As shown, the reader 2350 of the present example has two photodetectors 2668 arranged so as to detect reflections from an article placed over the aperture 2366 (i.e. in the reading volume) in the reader 2350. In some examples, the photodetectors 2668 could be light sensor modules as described above with reference to FIGS. 13 to 15.

The reader of the present example is therefore appropriate for use in placing on the surface of an article, and taking a scan of that surface. In one example, the reader is configured to scan a substantially square or rectangular area of an article, with a side length in the range of approximately 30 mm to 40 mm. Such a capture area might result in approximately 90000 to 160000 data points being captured.

In alternative configurations, the rasterisation of the laser beam over the target surface could be effected using a linear scanning rasterisation process, for example using tiltable mirrors/prisms and/or scanning motors.

Figure 27:
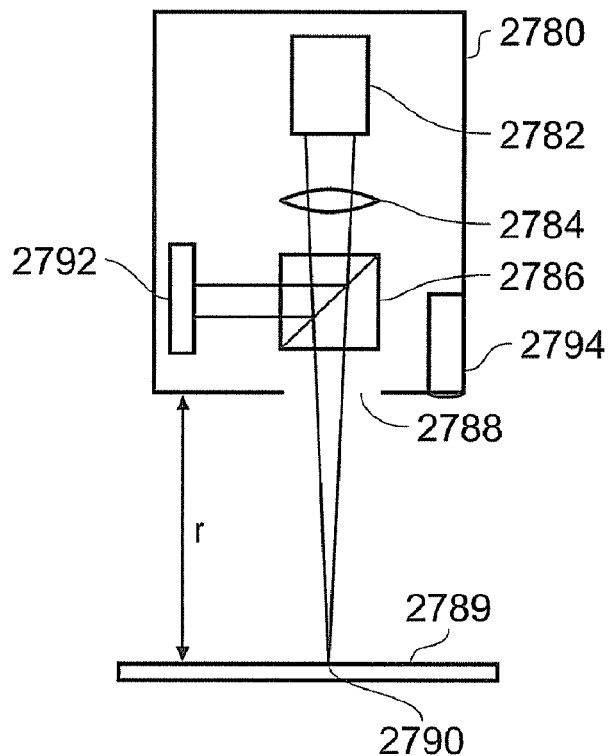
FIG. 27 shows a schematic sectional view though an example scanner apparatus.

FIG. 27 shows a schematic view of a further reader operable to read the surface of an article to create a signature therefrom. The reader of the present example is operable to read a signature from a surface even when the reader is up to a few metres away from the surface. The maximum reader to target distance is defined by the size of the optical arrangement used to capture the reflected light. In order to maintain a constant numerical aperture of the data capture apparatus, at least the first optical element of the reflected light sensor apparatus increases proportionally to the reader to target distance. Thus, to create an easily portable reader suitable for handheld use, the practicable maximum range may be approximately 1 metre. Where a less portable reader is desired or acceptable, the reading range may be increased as necessary.

As shown in FIG. 27, a reader 2780 includes a laser source 2782 operable to generate a laser beam. The laser beam can be focussed onto a target surface using a lens 2784. The focussed beam then passes though a beam splitter 2786 and though an aperture 2788 in the reader housing before travelling to the target surface 2789 where it is incident on the surface at a point 2790. The target surface is a distance r from the aperture of the detector. The reflections from the incident beam include those which return up the same path as the incident beam, and this reflected light is deflected by the beam splitter 2786 toward a photodetector 2792 within the reader 2780.

In order to accurately focus the laser beam onto the point 2790 on the target surface where the distance r is unknown, a rangefinder 2794 may be provided to enable the focussing lens 2784 to be used to adjust the focus of the beam to the correct range r. In one example the rangefinder may be a laser rangefinder, in another example, the rangefinder may be a physical measuring element, such as a telescopic rod. In another example, the rangefinding can be performed by processing of the reflected beam from the scanner. A measurement of the autocorrelation function of the reflected beam received at the detector can indicate the degree of focus at the target surface, allowing focus adjustments to be made accordingly.

In the reader 2780 of the present example, the laser beam can be rasterised over the target surface, so as to read a plurality of points 2790, in similar fashion to that described for the reader 2350 of FIG. 23. Such rasterisation could be effected by provision of a dedicated rasterisation arrangement of mirrors and/or prisms (not shown). Alternatively, the rasterisation could be effected by altering the angle of the focussing lens 2784 so as to adjust the position of the focus spot on the target surface.

The reader 2780 of the present example can therefore be presented for use as a handheld reader or "gun" usable by pointing the reader at a target surface and taking a reading.

Figure 28:
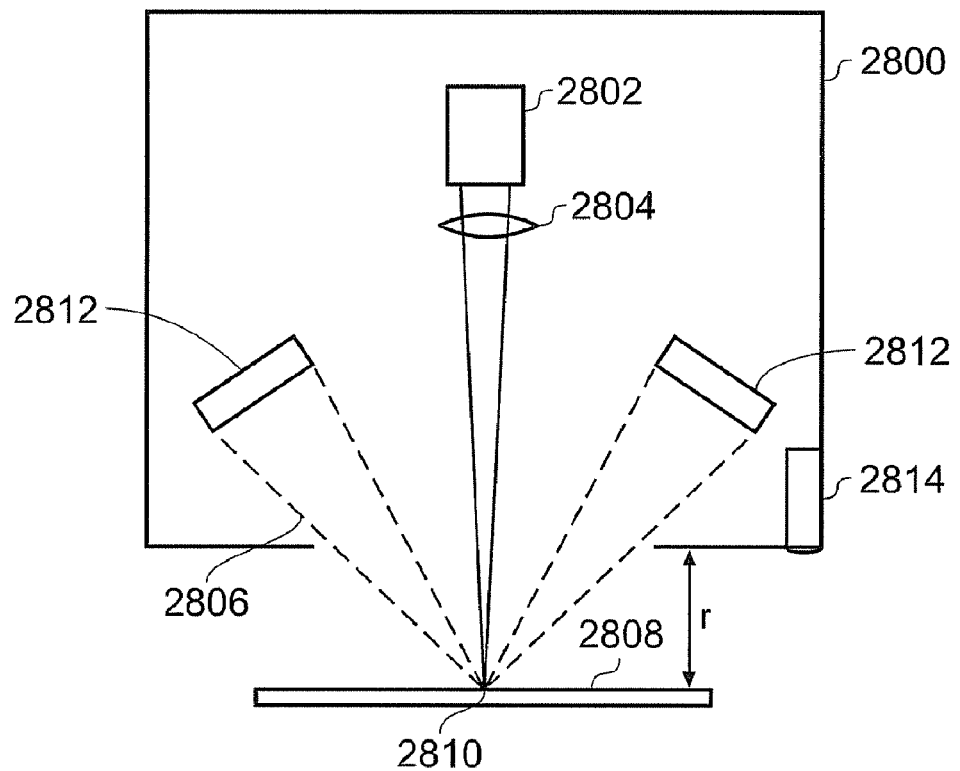
FIG. 28 shows a schematic sectional view though an example scanner apparatus.

Another example of a gun-type handheld reader is shown in FIG. 28. As shown, the reader 2800 includes a laser source 2802 operable to generate a laser beam. The laser beam can be focussed onto a target surface using a lens 2804. The focussed beam then passes though an aperture 2806 in the reader housing before travelling to the target surface 2808 where it is incident on the surface at a point 2810. The target surface is a distance r from the aperture of the detector. Reflections from the incident beam are detected by photodetectors 2812 within the reader 2800.

In order to accurately focus the laser beam onto the point 2810 on the target surface where the distance r is unknown, a rangefinder 2814 may be provided to enable the focussing lens 2804 to be used to adjust the focus of the beam to the correct range r. In one example the rangefinder may be a laser rangefinder, in another example, the rangefinder may be a physical measuring element, such as a telescopic rod. In another example, the rangefinding can be performed by processing of the reflected beam from the scanner. A measurement of the autocorrelation function of the reflected beam received at the detector can indicate the degree of focus at the target surface, allowing focus adjustments to be made accordingly.

In the reader 2800 of the present example, the laser beam can be rasterised over the target surface, so as to read a plurality of points 2810, in similar fashion to that described for the reader 2350 of FIG. 23. Such rasterisation could be effected by provision of a dedicated rasterisation arrangement of mirrors and/or prisms (not shown). Alternatively, the rasterisation could be effected by altering the angle of the focussing lens 2804 so as to adjust the position of the focus spot on the target surface.

One issue that might be considered to be a problem with handheld usage of a gun-type scanner is that of the user holding the reader sufficiently steadily during the scan operation. In one example, the beam may be rasterised using a spinning mirror inclined at 11° (i.e. the normal to the plane of the mirror is at 11° to the rotational axis of the mirror) and rotating at 3500 rpm at a range of 100 mm to the target surface. This will take a total of 4.85 seconds to scan an area of 40 mm×40 mm, which is clearly a long time for steady handheld usage. However, the scan may be considered as a plurality of scan lines each corresponding to a 90° arc of the laser path over the target surface. If the photodetector(s) samples the reflected light at a rate of 166 ksamples per second, each 90° arc scan line is captured in approximately 5 milliseconds, which is a sufficiently short enough time to capture the signal without "reader-shake" becoming a problem. Such a system would capture a data point every 45 microns along the laser beam path. If the laser beam is focussed to a 90 micron diameter spot, the results will provide a significant level of oversampling, which oversampled data can be used to calculate any reader-shake effects in the sampled data and to compensate in the event that the laser beam path over the target were to be affected by movement of the reader.

Readers of the type illustrated with reference to FIGS. 27 and 28 above can also be used in a processing line environment to scan items being moved along a conveyor for example. As will be appreciated, the reader design of FIG. 27 can be used at much greater target ranges r with only limited increase in the reader size. On the other hand, whilst the reader of FIG. 28 will necessarily increase in size as the range r increases by a much greater extent than for the reader of FIG. 27, the reader of FIG. 28 has the advantage of providing greater resistance to spoofing by provision of two photodetectors. If it is desired to capture data from two different angular reflection ranges of the target in order to increase the spoofing resistance of the signature, an arrangement similar to that described above with reference to FIG. 19 could be used. As will be explained in greater detail below, it may be possible to spoof a system where only a single photodetector is provided by printing an extremely high resolution pattern onto the target surface. This risk of spoofing can be mitigated by a number of techniques including keeping secret the portion of the surface which is used for the signature. Also, where the authentication system is used to track items along different parts of a processing line, for example, the opportunity for a spoofer to read the surface, generate the spoofing pattern, create a substitute article with a surface printed with the spoofing pattern, replace the original article with the substitute and remove the original article cab be expected to be extremely limited.

Figure 29:
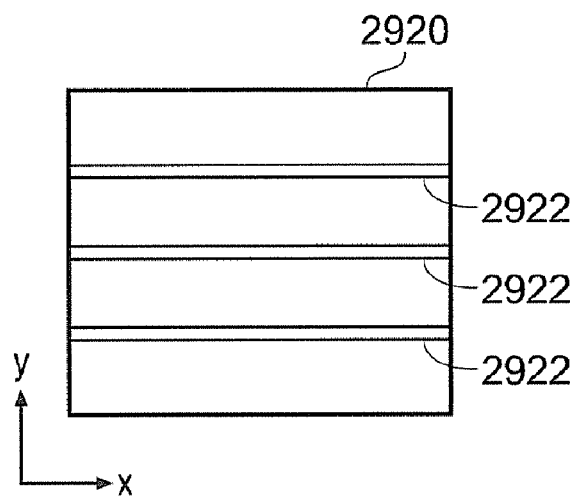
FIG. 29 shows a schematic illustration of a scan-line type incidence path.

In the context of a processing line, articles moving along the line may be moving too fast to perform a rasterised scan. In such circumstances, one or more lines within a scan area can be preselected as the lines to be read when generating the signature, with the remainder of the scan area not being represented in the signature. For example, as illustrated in FIG. 29, three scan lines 2922 may be selected across a scan area 2920 of 40 mm by 30 mm. The width of the lines can be determined by the focus of the laser beam or beams incident upon the scan area. If the beam(s) is spot focussed, then the width of the line 2922 will be the focus diameter of the spot. If the beam(s) is defocussed in the y-direction shown in FIG. 29 (i.e. focused into a line), then the width of the line 2922 will be the width of the laser beam line.

Figure 30:
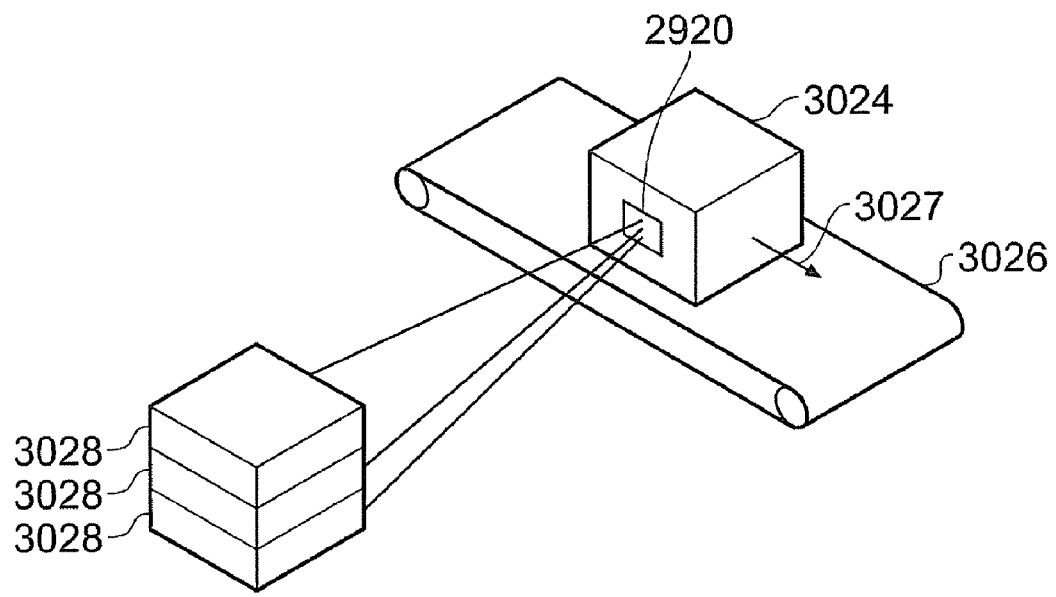
FIG. 30 shows a schematic view of an example scan-line type scanner apparatus.

In order to achieve this multi-line embodiment, a plurality of readers may be provided in a stacked arrangement, each reading from one line 2922 on the scan area 2920. Such an arrangement is illustrated in FIG. 30. Here an article 3024 having a scan area 3020 thereon is moved along a conveyor 3026 in the direction shown by arrow 3027. Each of three scanners 3028 projects a laser beam onto the scan area 3020, thereby scanning along three scan lines 3022 as the article 3024 is moved by the conveyor 3026.

Figure 31:
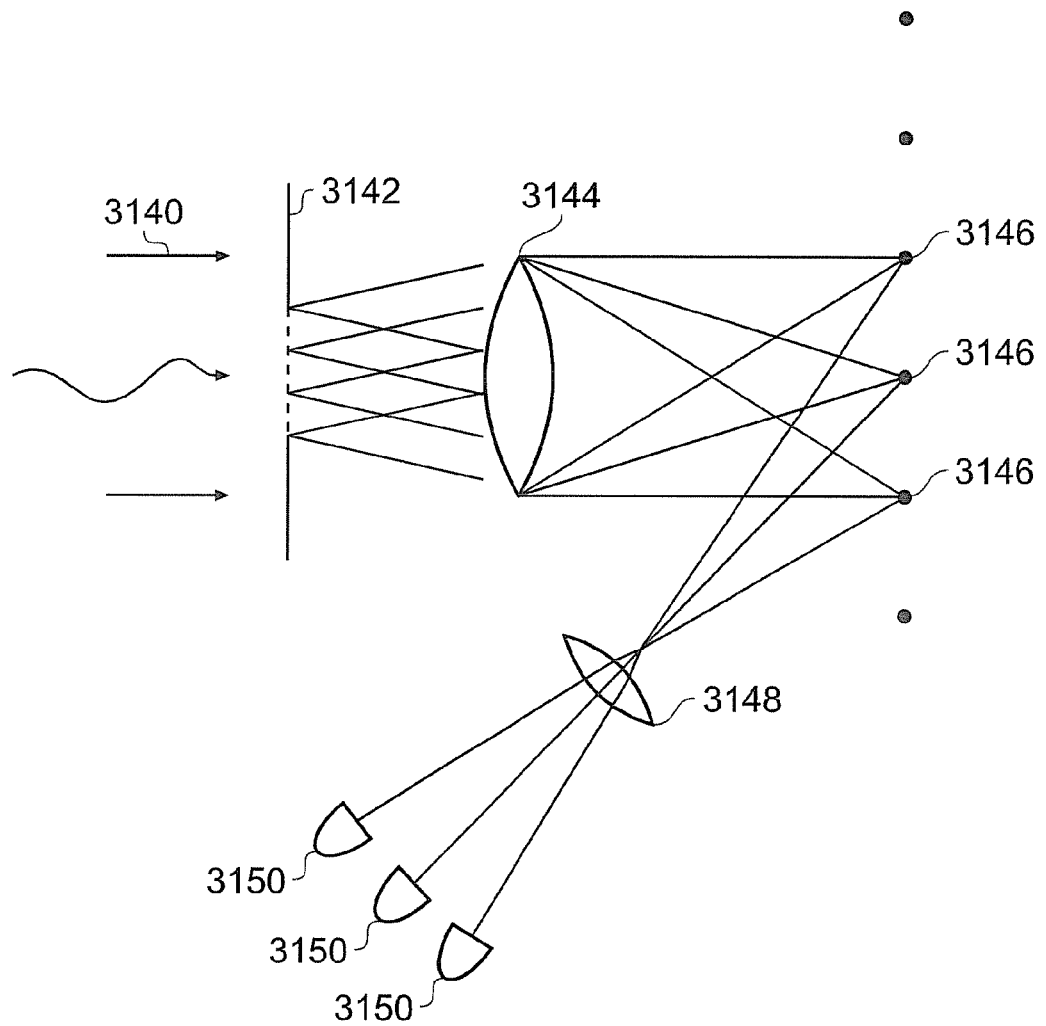
FIG. 31 shows a schematic view of an optical arrangement for creating a multiple scan-line system from a single light source.

In an alternative example, a single laser source generates a single beam which is split to create two or more scan beams using a diffraction grating. This is illustrated in FIG. 31. A laser beam 3140 can be directed onto a diffraction grating 3142, which creates an interference pattern as would normally be observed using a diffraction grating with coherent light. Using a lens 3144, the interference pattern can be used to create a number of focussed spots 3146 on a target surface. Reflections from these spots 3146 on the target surface can be focussed using a lens 3148 onto a plurality of photodetectors 3150. If the target surface is cause to move relative to the spots 3146, the detectors 3150 can read the information from the scan lines 3122.

In some examples, the processing line type system may be used in a production and/or warehouse environment for populating a database with signatures by reading a succession of articles. As a control, each article may be scanned again to verify that the recorded signature can be verified. This could be done with two systems operating in series (for example at different parts of the production line), or one system through which each article passes twice. Batch scanning could also be applied at point of sale (POS), or using a reader apparatus that was based on POS equipment components.

In one example, a series of scanner may be placed a locations along a processing line. These scanner can be used to determine whether any articles go missing along the length of the processing. Missing articles could, for example be stolen by workers or infiltrators to the processing line. Missing articles could be valuable articles, which might be substituted for imitation articles somewhere along the length of a processing line. Missing articles could be articles with valuable contents, where an article with valuable contents is switched for an equivalent article having no contents or non-valuable contents. An example of such might be a packaging line for high value goods such as cameras of microprocessors, where a person at the packaging line could swap full packages for empty packages, thereby allowing that person to steal the full package. Another example might be where hazardous material such as industrial pollutants is being processed before disposal. A regulatory authority could track containers of pollutant to ensure that they are being properly processed before disposal, so as to prevent an unscrupulous company from attempting to save money by sending empty containers for processing (thereby incurring no processing cost) and dumping the pollutant in the environment without following proper disposal procedures.

In one example, an article may be scanned on a processing line, for example during or after a manufacture or packaging process. The signature derived from that scan may be stored in an validation database. Later, once the article has left the processing line, the article may be rescanned to determine whether it is an authentic article. If the processing line scan used the scan line process illustrated with reference to FIG. 30 above, the signature derived therefrom will be representative of only those parts of the scan area which were covered by the scan lines. At a later rescanning, a rasterised scanner, such as described with reference to FIGS. 23, 27 and 28 above may be used. This scanner can then scan the entirety of the scan area, but only the information corresponding to the scan lines need be used to generate the signature for checking against the database signature. Using such a system also results in a smaller database size than if the signature were based upon the entire scan area, as the signature size is proportional to the amount of data encoded thereon (i.e. proportional to the scanned area used in the signature).

Also, it is entirely possible to mix and match between any of the scanners from FIGS. 9, 18, 19, 20, 23, 26, 27, 28, 30 or 31 to calculate a signature for a given article, and to use that signature for database population or for authenticity verification. For example, the system of FIG. 18 could be used to create a signature for database population, and a validation operative could use a scanner as shown in FIG. 23 for later authenticity verification.

Thus there have now been described a variety of examples of scanner systems which are operable to direct coherent light onto a target surface arranged in a reading volume, to detect reflections from the reading volume using a high numerical aperture, thereby capturing large amounts of light, including low angular frequency components of that reflected light. The captured light can then be converted to a voltage representative of the light intensity reflected from a given point in the reading volume, which voltage can then be digitised for use in creating a signature for an item in the reading volume.

As has been briefly mentioned above, in some examples, a select set of points or regions within the scan area may be used to create a signature for an article, regardless of the scanner type used to make the initial signature for the authentication database. Where a processing line type system is used, an elongate focus beam system or a multiple scan line system may be employed as variously discussed above. On slower moving processing lines and for systems where the article is stationary relative the reader an alternative scanner such as an elongate scan line system with motion stage or the rasterising scanner discussed above may be used. From the entire scan area, a predetermined set of regions or points may be preselected as the regions used to generate the signature, with scan data from other parts of the reading volume being disregarded. The locations of the selected points or regions can be kept secret by the organisation responsible for the signature of the item. This may be the originator of the item, for example the manufacturer of goods or the issuer of a document, or a third party security agency operating the signature system.

Once the set of data from the scan area which is to be used for creating the signature has been selected (this may of course be the entire scan area—the only downside of using the entire scan area is that the signature becomes proportionally larger, leading to increased database size), whether it is a set of lines crossing the scan area or some other regular or random pattern of points or regions within the scan area, an averaging function can be applied to the selected points from which data has been collected. In one example, this effectively takes the form of multiplying a 1-dimensional vector of data points by a random scrambling matrix. This provides information about the surface as a whole and is resistant to partial damage to the surface of the scan area yet does not increase the data volume for the signature. In one example, the scrambling matrix can be made up of integer (effectively digital) values +1, 0, −1, which makes the logic required to perform the multiplication operation simple but may artificially increase the bit error rate (BER) in the signature. In another example, the scrambling matrix can be made up of analog values with gaussian weights, which avoids any increase to the BER, but requires more complex logic to perform the multiplication calculations.

A number of techniques can be used to align the scanner to the scan area, to make rescanning of the same article more likely to produce a positive match result. One such technique is to provide a physical alignment guide for locating the scanner relative to the article. This may include a positioning guide on the scanner for locating the article into. It may include a positioning guide on the article for locating the scanner into. Alternatively, it may include a scanning frame into which both the article and scanner are located to ensure correct alignment. These systems all have advantages, such as reliable repositioning and ease of use. However, where a database contains signatures for articles of different shapes and sizes, a physical alignment may be inappropriate, especially if a single reader is to be used to read articles of more than one size or shape.

For this example, it may be suitable to direct the scanner to the surface of the article, and to capture the surface using the scanner and to use the captured data to build an "image" of the surface from the data captured at each distinct data point. This "image" can then be matched to a predetermined template of the expected surface image. A user can then move the scanner over the surface until a location match between the surface and the template is detected. A location match indication can be given to the user to indicate that the scanner should not be moved from that location. Once the location match is found, the scanner can read the scan area of the article using photodetectors to produce the signature.

Such an "image" can be constructed as follows. As the scan head moves relative to the surface, the output of a sensor will jump from approximately zero to approximately 0.3V where a transition from a light area to a dark area occurs. This result can be used to build something that appears to be a conventional image from the captured data. At this time any speckle-type content of the reflection can be ignored. This constructed "image" can be used for pattern recognition.

The "image" of the scan area created in this fashion is not a conventional image that can be captured using an conventional imaging sensor as it is constructed from light reflected from repeated localised illumination of the surface rather than from a single illumination of the surface. Thus, although the result appears to be a conventional "image", by virtue of the method of collection of the data, that same data can if analysed differently provide the speckle-type information which describes the structure of the surface, including the low angular periodicity component. When the data which is used to create the normal-looking image is analysed to reveal the variations between apparently identical regions in the signal (rather than look at the absolute value), the speckle-type information becomes apparent. The resulting "image" of the speckle-type data (i.e. an image showing the speckle-type information collected at each pixel, constructed from the individual data captures) is in the following referred to as an "inverse speckle image" as it is created from speckle-type reflections but cannot be captured using conventional speckle techniques. Thus, in the current context, an inverse speckle image is the "image" created when a set of speckle-type information data points is collected from a target, reading one pixel at each of a number of separate points on the target, using a localised illumination for each separate point. As discussed above, this differs from a "traditional" speckle image which is made from collecting data at lots of pixels from a single illumination of the entire target as a whole. The "inverse" speckle image therefore cannot be captured as "an image" and can only be created by assembling the data from the repeated one pixel captures of different points on the target at different times.

Figure 32:
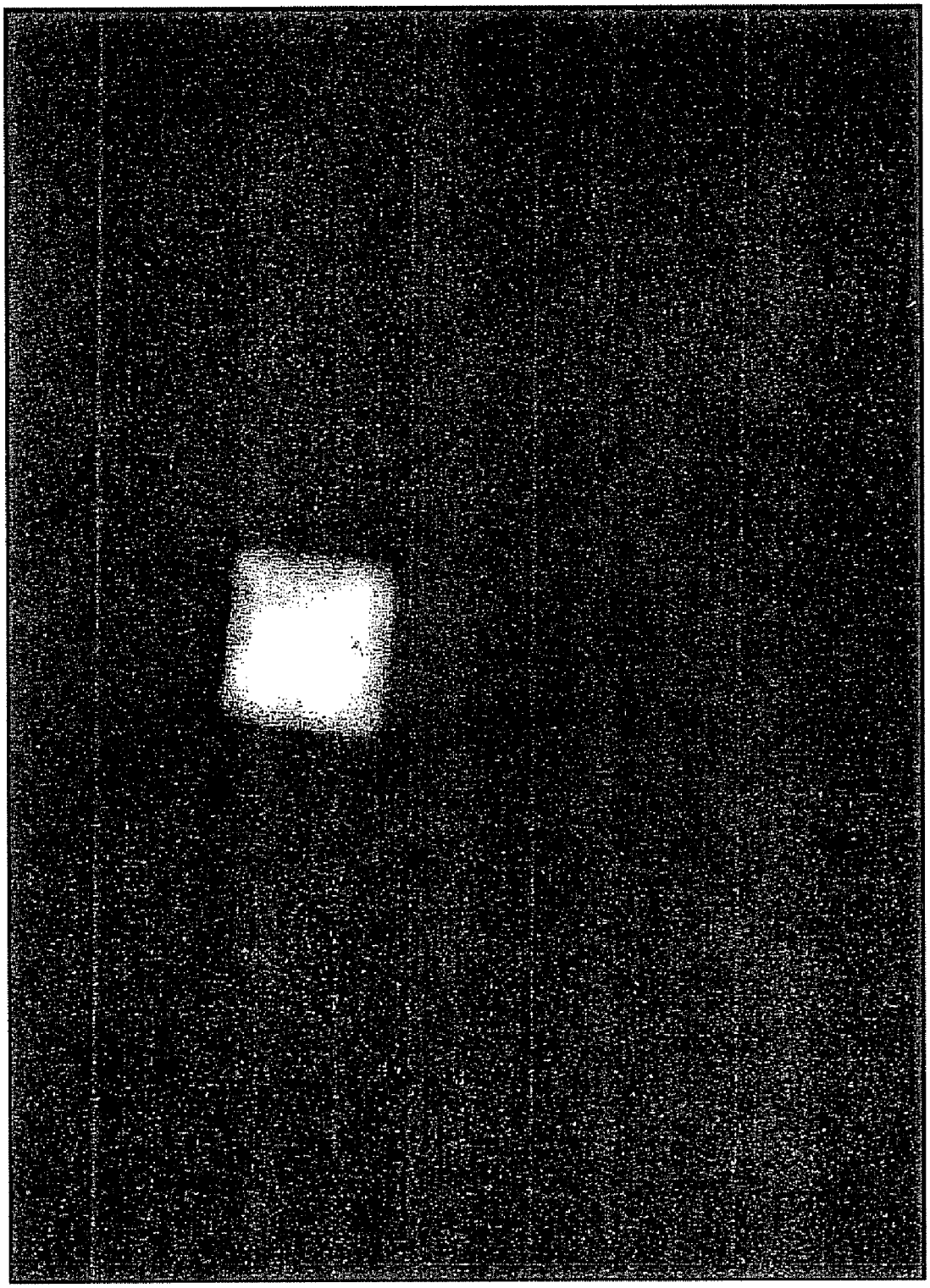
FIG. 32 shows a constructed pseudo-image of a dot on a sheet of paper.
Figure 33:
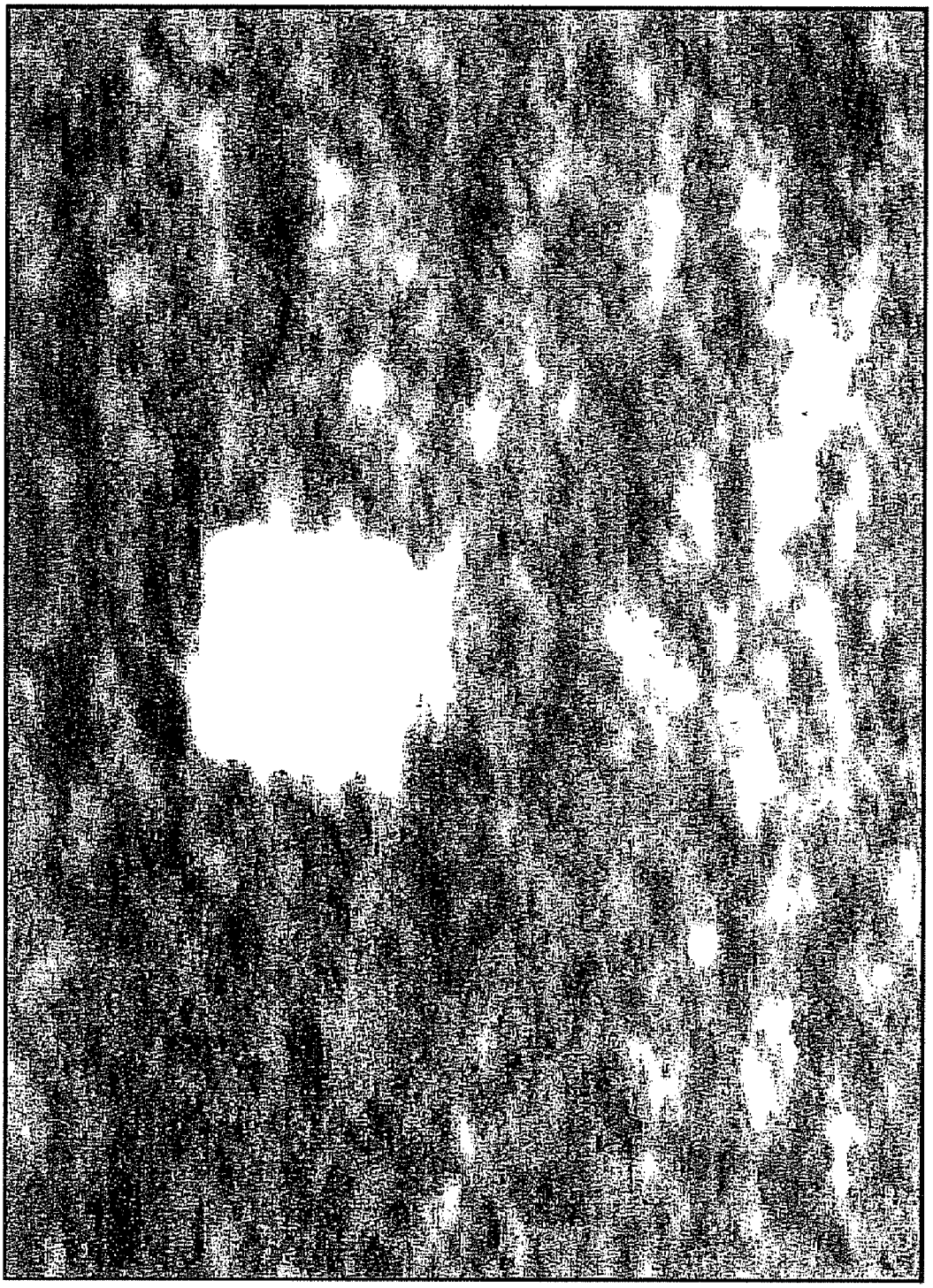
FIG. 33 shows the an inverse speckle image of the sheet of paper of FIG. 32.

An example of this is illustrated with reference to FIGS. 32 and 33. FIG. 32 shows an image of an area approximately 3 mm by 5 mm of a sheet of paper onto which a black ink dot of approximately 0.5 mm square has been printed. This image has been created by using the data collected using a scanner of the present examples, but having the contrast adjusted to see absolute values such that surface pattern or decoration on the surface is visible. In this figure, the area where the dot is not present is saturated at 1 (i.e. black), and the dot region is approaching a saturation of 0, but is not actually saturated—as can be seen in the figure the "white" dot is not actually white, rather it includes grey patterns.

Such an image element can be used to align the scanner to an expected surface pattern. As will be appreciated, the more identifiable the surface pattern, the more reliable the pattern matching operation will be. Once the scanner has aligned to the pattern, the image processing applied to the image can be changed so as to observe detail in the speckle pattern of the paper, ignoring the content of the dot. In the present example, where the majority of the image is the same "colour" this altered image processing includes adjusting the contrast of the image. This altered contrast image is shown in FIG. 33 and is the inverse speckle image for the surface. Here, the ink dot is saturated at 0 (white) and the plain paper shows a pattern of varying brightness, which includes the speckle information for the paper. As will be appreciated, this is represented here as an inverse speckle image for ease of understanding, however, the readers of the present examples in fact read the speckle image one point at a time, for example using a rasterised laser, in order to obtain not only the reflected speckle component, but the low frequency reflection component as well.

Patterns used for location matching to provide reader re-alignment can be specific location finding patterns or may be patterns which are normally present upon the article. Specifically provided patterns might include any form of shapes, images or characters that provide a recognisable template to match to. Such patterns could be specifically produced to provide a strong location matching response.

Existing patterns might include any pattern normally present upon the article. This will depend upon the article in question, but could include logos or other marketing indicia on an article. For example, on a carton of cigarettes, the scan area might be selected to include at least a part of the logo of the manufacturer, as that is something which would be reproduced on a counterfeit carton. In another example, the article may be a smart card such as a credit or debit card. On such a card, the scan area may be selected to include an issuer logo, such as the VISA™ logo, the MasterCard™ logo or the American Express™ logo. Where it is known in advance that an article is to be subjected to the scanning techniques described herein for authenticity verification, a suitable logo might be included on the article. This could then be used as an alignment mark. An example of such a logo might include the phrase "Secured by Ingenia". In some examples, image features could be used, such as bullseye type markings or patterns of squares. In some examples, one or more edges of the item could be used as alignment marks. Where such an imaging system is used for item positioning, a physical alignment locator such as that discussed with reference to FIG. 17 above can be omitted.

Where such an imaging system is used for item location, the template of the known surface marks can be used in two ways. The first is to return a signal indicative of item mispositioning to a user such that the user can reposition the item and re-scan. The other is to use the template to create an adjustment to the scan data to map the captured data onto the template and to use the adjusted scan data to create the signature. In some examples, this adjustment could be applied as part if the signature generation process.

The scanner unit may, in some circumstances, be operable to be rotated relative to a target. This may take the form of, for example, a finely controlled rotation stage or simply rotating a handheld reader. This rotation arrangement may be necessary as the property of the surface which causes the reproducible signature is highly dependent upon rotational alignment. Simply capturing data at an incorrect angle and using matrix processing to rotate the captured data does not provide the same result as rotating the target relative to the scan data before scanning. This further demonstrates that the scan data captures information relating to more than simply surface pattern.

This rotation issue is particularly applicable for validation scans, in that the alignment of the scanner relative to the target for a validation scan should match the alignment which was used for the original record scan so as to give the highest likelihood of avoiding a false negative result. In order to provide for knowing whether rotation is needed, a scanner unit may be modified to include a camera to take an image of the target, to check alignment before the scan takes place. Alternatively, the scanner may be operated a first time purely for the purposes of analysing the constructed image of the target (as discussed with reference to FIGS. 32 and 33 above) for rotation (as well as translational) alignment checking. If the alignment needs to be improved, the alignment can either be altered by an amount determined from the misalignment measured from the imaging scan (for example using a controlled rotation and/or translation stage) or the alignment may be altered on an approximate basis and another alignment scan be performed to check the new alignment. Once the alignment is sufficiently good, the scanner can be reoperated in a data capture mode to capture the actual surface scan data to determine the signature for the target surface.

As mentioned above, an alternative is to use a small camera integrated with the scanner unit to image the target scan area to determine if any rotational repositioning is required. An image of the target scan area from the camera can be compared to a stored template for the item type. By performing an image recognition comparison between the stored template and the captured image, an alignment result can be produced. The alignment result can be fed back, for example, to a user of a handheld device to indicate whether or not the alignment is good enough and if not what adjustment is required, or to provide adjustment instructions to a motor stage or similar automatically movable mount. In some examples, the camera image could be compared to a number of stored templates for different article types to find, not only the necessary adjustment but also, the article type.

Figure 34:
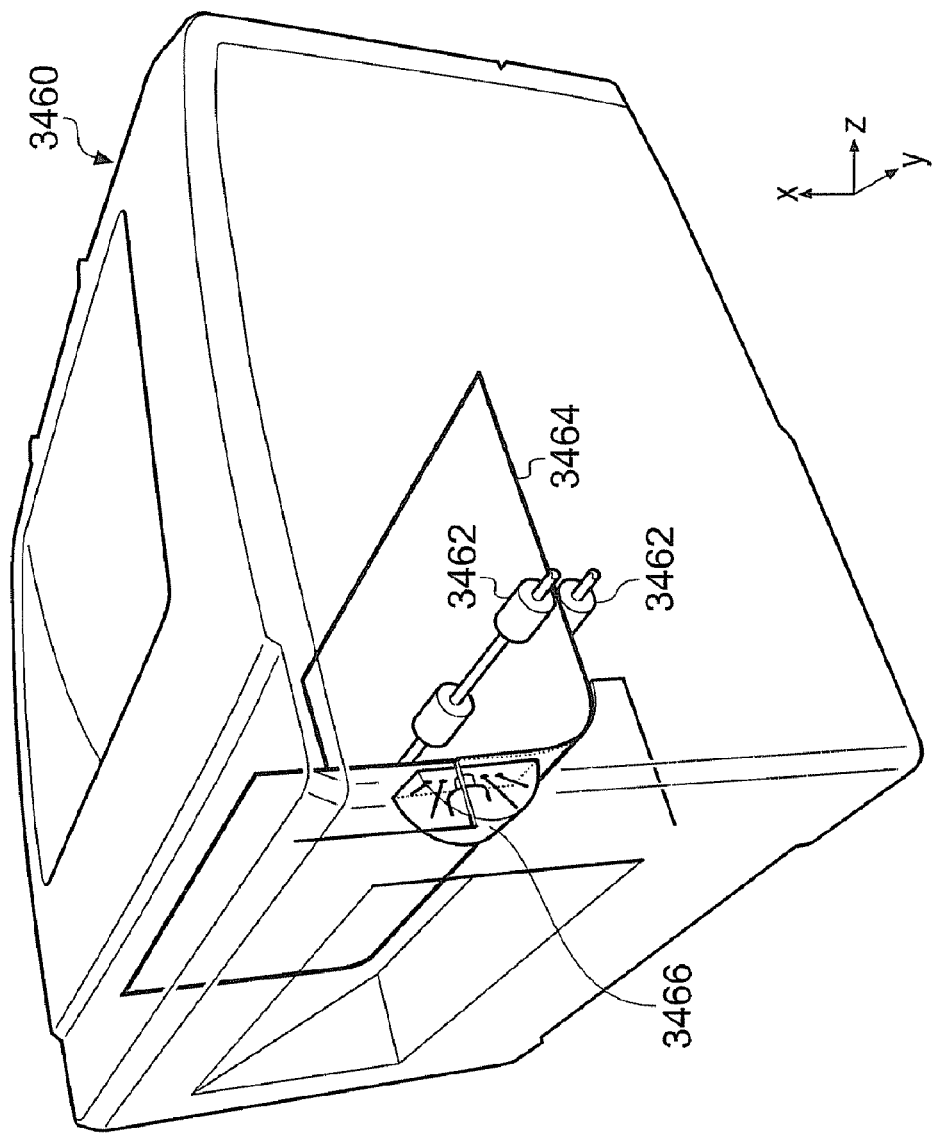
FIG. 34 shows a schematic sectional view though an example scanner apparatus in a printing apparatus.

In some examples, a scanner operable to gather the data for generating a signature may be included in a printing apparatus such as a laser printer, an inkjet printer, a thermal printer, a photocopier or a so-called multi-function device or MFD. In such an apparatus, a scan line system such as discussed with reference to FIGS. 9, 18, 19, 20, 30 or 31 above may be utilised. Alternatively, a rasterised scan system (such as discussed with reference to FIGS. 23, 26, 27 or 28 above) may be used, in dependence upon the rate of movement of a document through the printing apparatus. For example, a beam tracing a circular path may be moved laterally across a document as the document is moved longitudinally by the printing apparatus. In other examples, a scan head may be moved linearly back and forth across the document by a moving carriage, such as the carriage which transports a print head over the document in an inkjet type system. An example of a scan system incorporated into a laser printer type printing device is illustrated in FIG. 34. As shown, a printing device 3460 includes sheet transport elements 3462 for transporting a printing sheet 3464 through the device. At one point along the path of the sheet 3464 through the device 3460, a scanner unit 3466 is located to scan the sheet as it moves past the scanner unit 3466. As discussed above, the scanner unit 3466 may be configured to read from a number of lines in a scan area on the sheet 3464. Thereby a signature may be generated from a document created on a printing sheet by a printing device as part of the printing process for that document.

In a moving head type reprographics device, such as an inkjet printer, a scan head may be incorporated into a cartridge which can be carried by a print cartridge carrier of the device. In one example, the reprographics device is configured to allow more than one cartridge to be carried at any one time, thus enabling the scan to be made simultaneously with the printing of a document.

Figure 35:
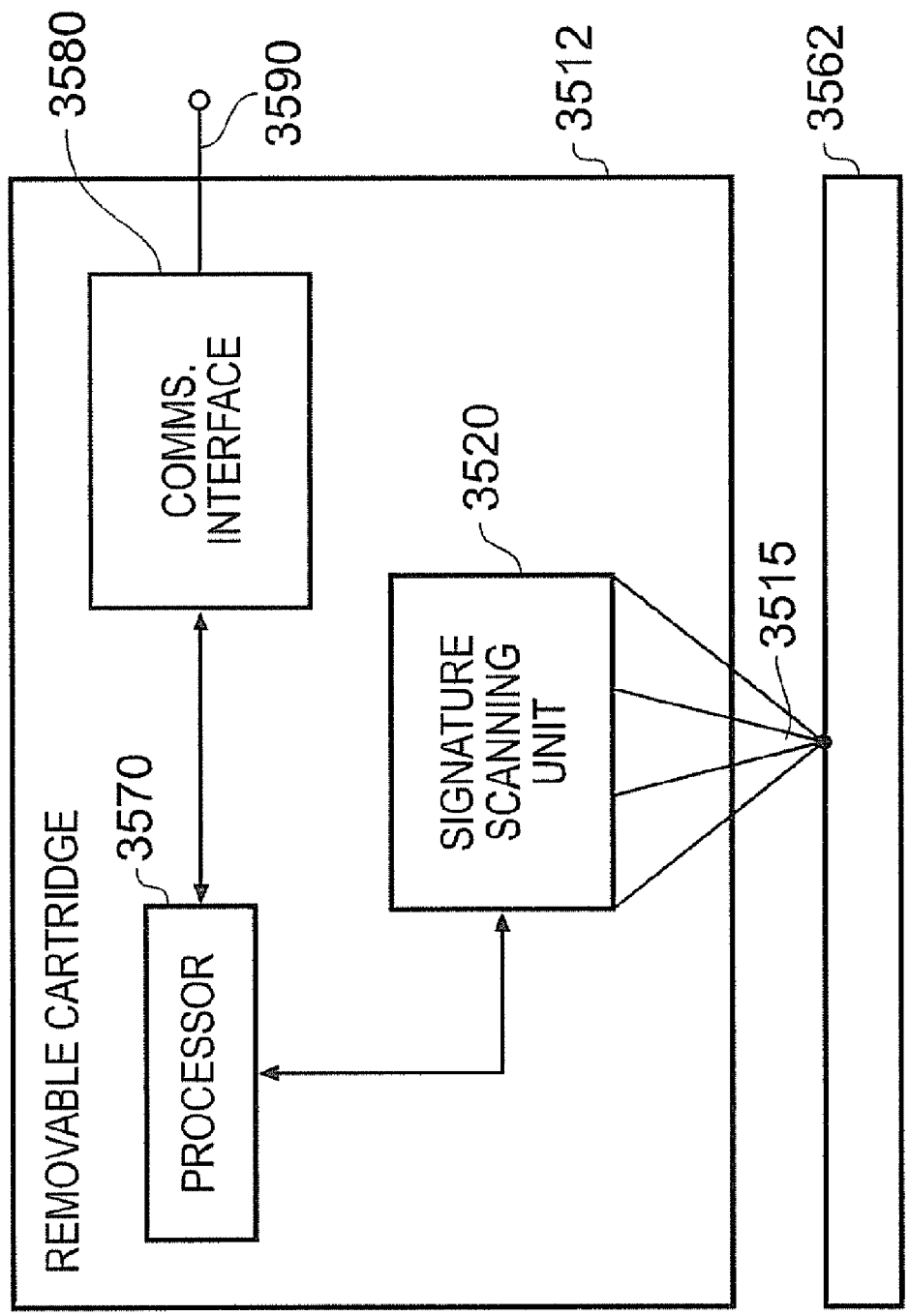
FIG. 35 shows a schematic example of a scanner apparatus for a reprographics device.

FIG. 35 is a schematic view of a removable cartridge 3512 for a reprographics device. The removable cartridge 3512 is shown in operation scanning an article 3562.

The removable cartridge 3512 may be of the type that is described in European Patent Application number EP 1 029 685 modified to include a signature scanning unit 3520 of the type described in greater detail below. The contents of EP 1 029 685 are hereby incorporated by reference into this specification in their entirety.

The removable cartridge 3512 includes a processor 3570 that is operable to control the signature scanning unit 3520 and to acquire data points for transmission through a communications interface 3580 to a connected computer (not shown) for generating the signature at the computer. The communications interface 3580 manages data transfer between the removable cartridge 3512 and the computer across a communications bus 3590. The communications bus 3590 may comprise a connector that is used ordinarily to pass print controls to a conventional cartridge and to indicate when a conventional cartridge is out of ink, toner, etc. In other examples, the communications bus 3590 may include a wireless data transfer channel. This could be an RF based system, such as one using the well-known Bluetooth™ standard, or an optical system, such as one using the well known IRDA standard.

Thus, a signature may be created for a document while it is being printed by a reprographics device. The scanner cartridge may be used in place of, for example, a colour ink cartridge in the reprographics device. Thus a simple control system such as, for example, an instruction to print a yellow dot may be used to instruct the cartridge to start scanning and a different instruction such as an instruction to print a blue dot may be used to instruct the cartridge to stop scanning. In other examples, a dedicated control protocol may be used to control the cartridge.

Thus there have now been described a variety of reader apparatus for generating signatures from an article surface. These reader apparatus can be used as part of article authentication systems, for example verifying an article alleged to be genuine as actually being genuine.

Figure 36:
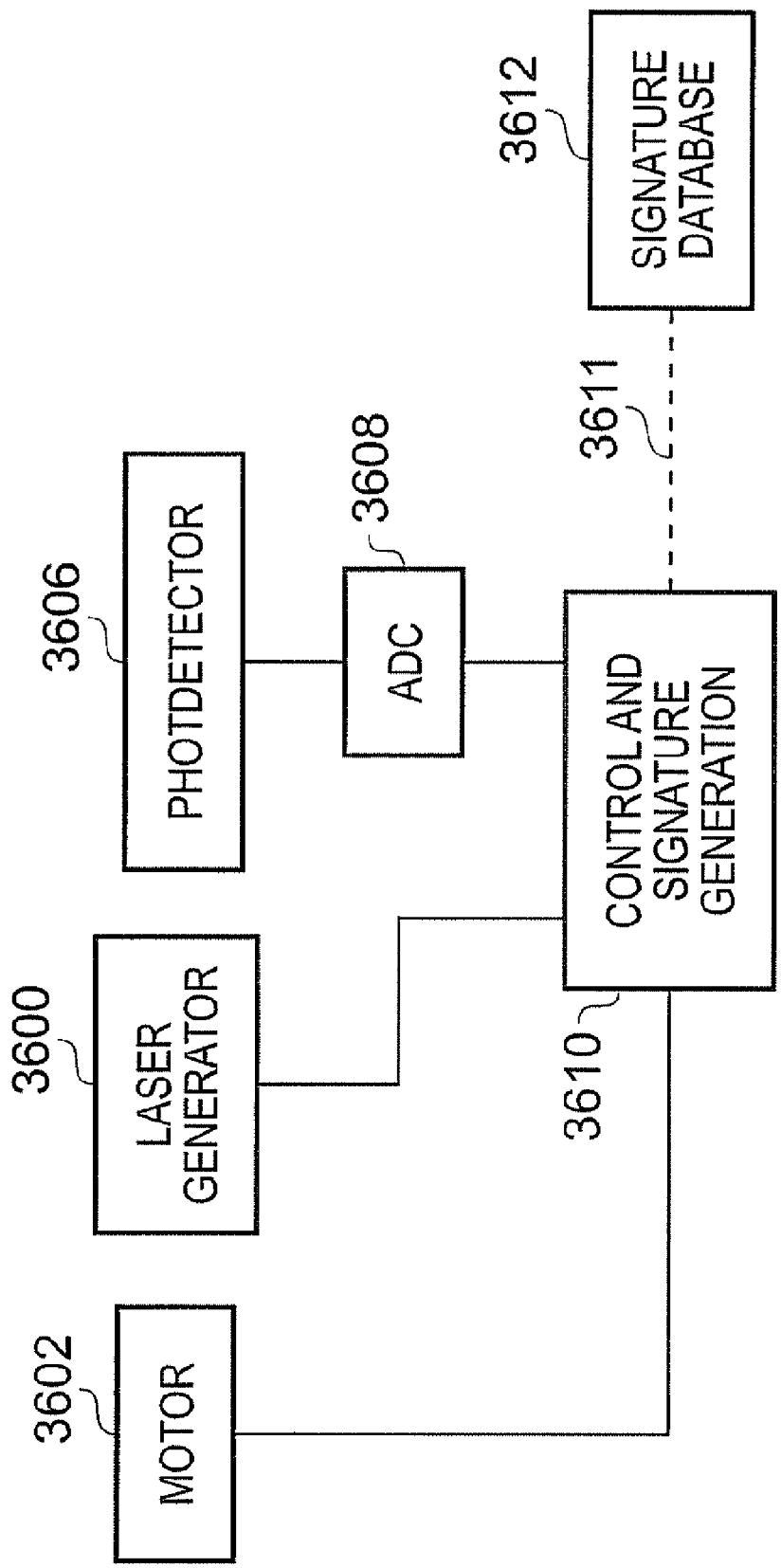
FIG. 36 shows a schematic block diagram of functional components of the apparatus of FIG. 35.

FIG. 36 is a block schematic diagram of logical components of a reader apparatus as discussed above. A laser generator 3600 and motor 3602 are controlled by a control and signature generation unit 3610. The laser generator may be any of the laser sources 954, 2052, 2352, 2782, 2802 described above. The motor may be any of the motors 922, 2022, 2360, 2364 described above. The control unit controls the motion of the beam over the target surface scan area using the motor(s). In some examples, more than one motor may be provided, for example in a raster system where one drives a spinning angled mirror and another drives a translational motor. In some examples, there may be no motor, for example where motion of the laser beam relative to the article is caused by motion of the article such as in a processing line type situation. In the case where the motion of the beam over the article is as a result of article motion, the beam control unit 204 may have knowledge of the expected relative speed of the reader to the article (i.e. the article speed along the processing line). If no such knowledge of an expected speed is available, then processing may be applied to the captured data to determine this speed. For example, where alignment marks 928 are present on the reader, the data captured from these marks can be used to calculate the speed. Other processing techniques may be also used, as will be described below.

As a result of knowing the beam movement characteristics relative to the scan area, the control 3610 is able to identify the location of a target surface scan area which is being targeted by the laser beam from the laser generator 3600 at any given time, such that at any given time laser beam current incidence location information can be available.

The reflections of the laser beam from the target surface scan area are detected by the photodetector 3606. As discussed above, more than one photodetector may be provided in some examples. The photodetector can be any of the detectors 1420, 2668, 2792, 2812, 3150 discussed above. The output from the photodetector 2606 is digitised by an analog to digital converter (ADC) 3608 before being passed to the control and signature generation unit 3610 for processing to create a signature for a particular target surface scan area. The ADC can be part of a data capture circuit such as that illustrated above with reference to FIGS. 21 and 22.

The control and signature generation unit 3610 can use the laser beam current incidence location information to determine the scan area location for each set of photodetector reflection information. Thereby a signature based on all or selected parts of the scanned part of the scan area can be created. Where less than the entire scan area is being included in the signature, the signature generation unit 3610 can simply ignore any data received from other parts of the scan area when generating the signature. Alternatively, where the data from the entire scan area is used for another purpose, such as positioning or gathering of image-type data from the target, the entire data set can be used by the control and signature generation unit 3610 for that additional purpose and then kept or discarded following completion of that additional purpose.

Once a signature has been generated by the control and signature generation unit 3610 it may be transmitted to a database 3612 via a channel 3611. This may take the form of including the signature into the database 3612 after a "record scan" used to populate a database with signatures of valid or genuine articles. In this circumstance, metadata describing the article may be stored in association with the signature, for example details of the nature of the article (e.g. document, such as passport, driving licence, smart card etc; cigarette carton; integrated circuit package, date of manufacture of the article, article owner details, article serial number etc). Alternatively, the signature going to the database 3612 may be the result of a validation scan to be matched against the database to determine whether a scanned article is a member of a set of articles recorded within the database. The signature sent to the database may include a "thumbnail" to aid searching of the database. This will be described in more detail below.

As will be appreciated, the various logical elements depicted in FIG. 36 may be physically embodied in a variety of apparatus combinations. For example, in some situations, all of the elements 3600 to 3610 may be included within a scan apparatus. In other situations, the scan apparatus may include only the laser generator 3600, motor 3602 (if any) and photodetector 3606 with all the remaining elements being located in a separate physical unit or units. Other combinations of physical distribution of the logical elements can also be used. Also, the control and signature generation unit 3610 may be split into separate physical units. For example, the there may be a first unit which actually controls the laser generator 3600 and motor (if any), a second unit which calculates the laser beam current incidence location information, a third unit which identifies the scan data which is to be used for generating a signature, and a fourth part which actually calculates the signature.

It will be appreciated that some or all of the processing steps carried out by the ADC 3608 and/or control and signature generation unit 3610 may be carried out using a dedicated processing arrangement such as an application specific integrated circuit (ASIC) or a dedicated analog processing circuit. Alternatively or in addition, some or all of the processing steps carried out by the beam ADC 3608 and/or control and signature generation unit 3610 may be carried out using a programmable processing apparatus such as a digital signal processor or multi-purpose processor such as may be used in a conventional personal computer, portable computer, handheld computer (e.g. a personal digital assistant or PDA) or a smartphone. Where a programmable processing apparatus is used, it will be understood that a software program or programs may be used to cause the programmable apparatus to carry out the desired functions. Such software programs may be embodied onto a carrier medium such as a magnetic or optical disc or onto a signal for transmission over a data communications channel.

Where the database 3612 contains a library of previously recorded signatures, the signature generation unit 3610 or an intermediary (such as a user PC or other terminal) located in the channel 3611 can be programmed so that in use it accesses the database 3612 and performs a comparison to establish whether the database 3612 contains a match to the signature of the article that has been read by the scanner. The system may also be programmed to allow a signature to be added to the database if no match is found. This mode of use may be reserved for use by authorised users and may be omitted from systems that are to be used in the field exclusively for verification purposes.

Thus there has now been described the logical elements of a system to generate a signature from an article surface. By using such a technique, an individual article can be identified repeatedly at different locations and its validity as being that same article can be checked.

Figure 37:
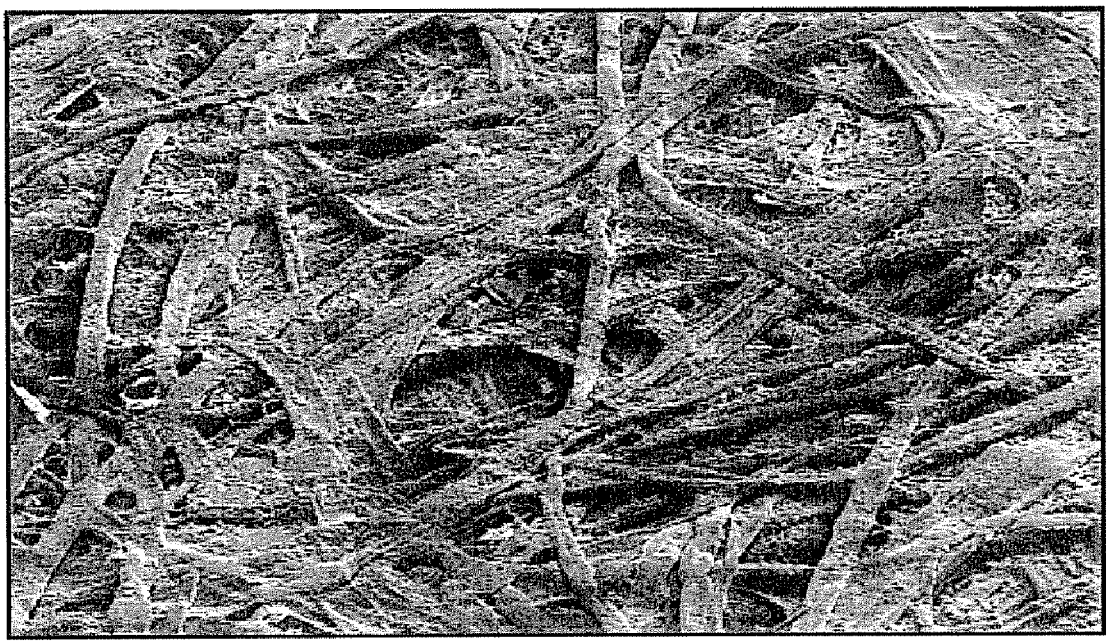
FIG. 37 is a microscope image of a paper surface with the image covering an area of approximately 0.5×0.2 mm.

By way of example, FIG. 37 shows a microscope image of a paper surface with the image covering an area of approximately 0.5×0.2 mm. This figure is included to illustrate that macroscopically flat surfaces, such as from paper, are in many cases highly structured at a microscopic scale. For paper, the surface is microscopically highly structured as a result of the intermeshed network of wood fibres that make up paper. The figure is also illustrative of the characteristic length scale for the wood fibres which is around 10 microns. This dimension has the correct relationship to the optical wavelength of the coherent beam to cause diffraction and hence speckle, and also diffuse scattering which has a profile that depends upon the fibre orientation. It will thus be appreciated that if a reader is to be designed for a specific class of goods, the wavelength of the laser can be tailored to the structure feature size of the class of goods to be scanned. It is also evident from the figure that the local surface structure of each piece of paper will be unique in that it depends on how the individual wood fibres are arranged. A piece of paper is thus no different from a specially created token, such as the special resin tokens or magnetic material deposits of the prior art, in that it has structure which is unique as a result of it being made by a process governed by laws of nature. The same applies to many other types of article.

Figure 38:
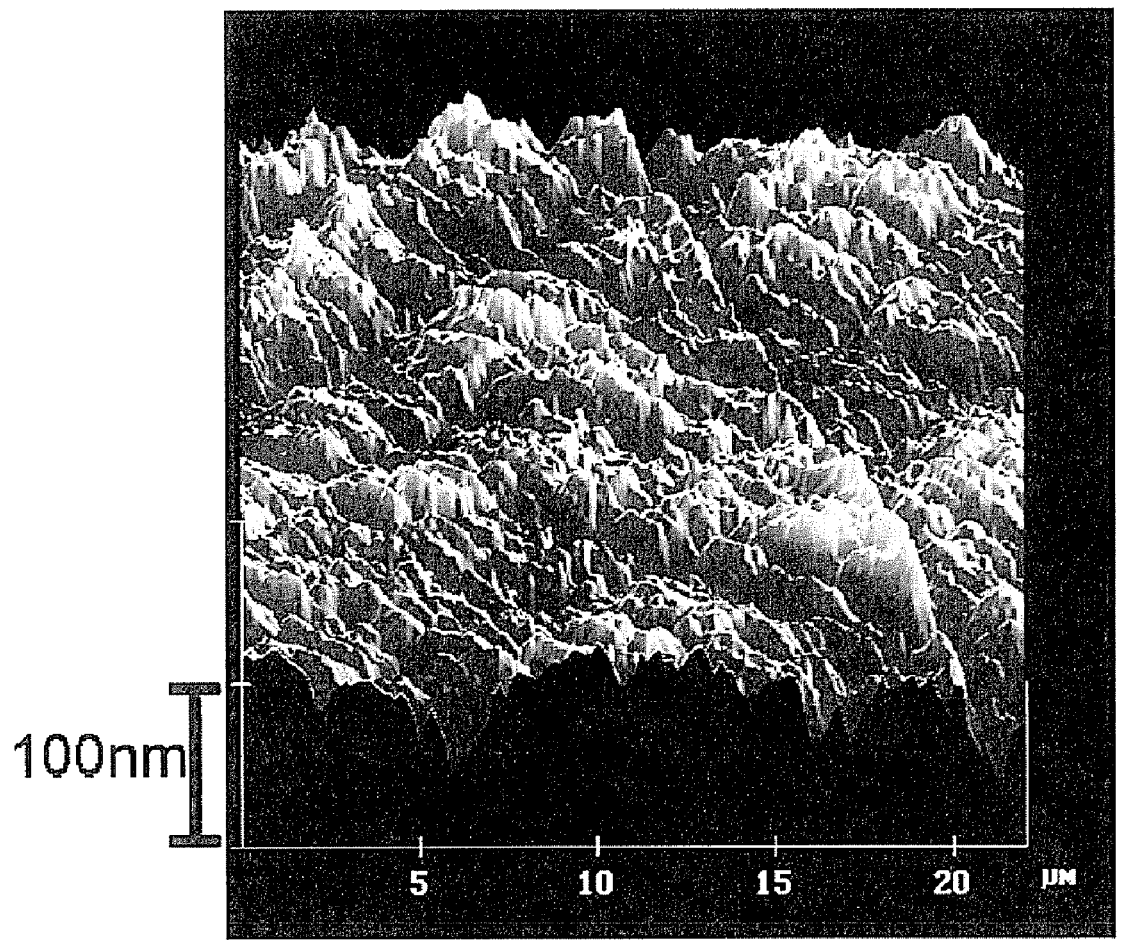
FIG. 38 is a microscope image of a plastic surface with the image covering an area of approximately 0.02×0.02 mm.

FIG. 38 shows an equivalent image for a plastic surface. This atomic force microscopy image clearly shows the uneven surface of the macroscopically smooth plastic surface. As can be surmised from the figure, this surface is smoother than the paper surface illustrated in FIG. 37, but even this level of surface undulation can be uniquely identified using the signature generation scheme of the present examples.

In other words, the inventor has discovered that it is essentially pointless to go to the effort and expense of making specially prepared tokens, when unique characteristics are measurable in a straightforward manner from a wide variety of every day articles. The data collection and numerical processing of a scatter signal that takes advantage of the natural structure of an article's surface (or interior in the case of transmission) is now described.

Figure 39A:
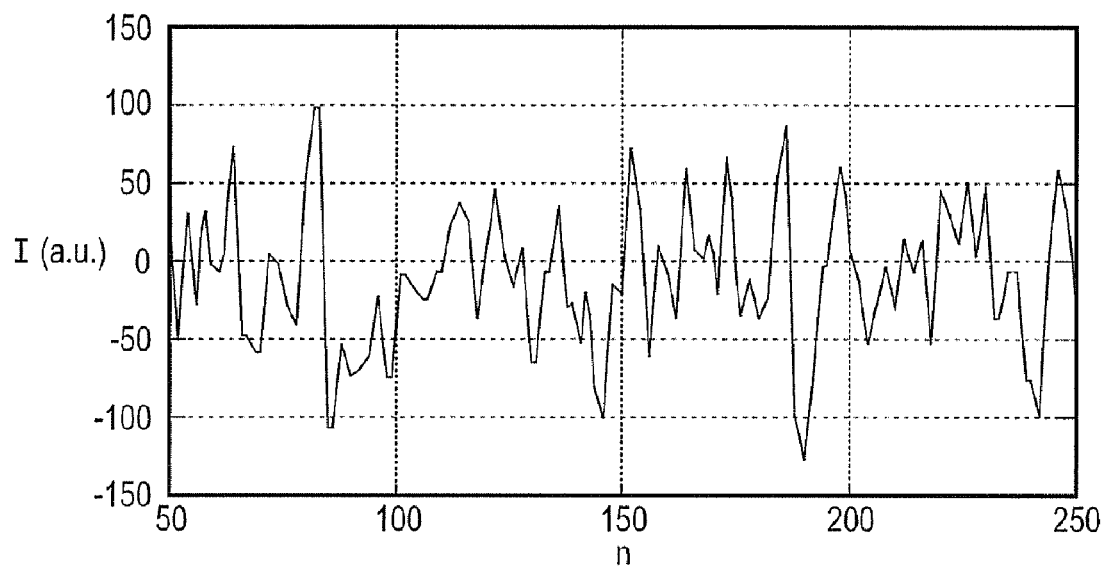
FIG. 39A shows the photodetector data from a single photodetector after linearisation with the encoder signal and averaging the amplitude.

An example of a possible data output from the scan, for a single detector channel, after linearisation is shown in FIG. 39A. This could, for example be the data from FIG. 16 following linearisation and shown on a larger scale. Linearisation may take the form of a number of techniques. One example is use of a rotary encoder on the motor, as discussed above with reference to FIG. 10. In addition, the average of the intensity has been computed and subtracted from the intensity values. The processed data values thus fluctuate above and below zero. If such marks are used and have equal spacing, then a detector channel would read, if the movement of the sensor relative to the marks is purely linear, a periodic waveform having a constant period. Any non-linearities in the period of the waveform thus indicate non-linearities in the motion of the scan head relative to the marks (and hence to the target surface). Thus, the all of the scan data can be adjusted so as to make the signal from the alignment marks have a constant period.

Other linearisation techniques could include using some other feedback measuring the linearity of the relative motion of the sensor to the target. In some systems, processing of the captured data may be used to linearise the data, for example matching to an expected target pattern and/or a block-based analysis of the data (as will be discussed in greater detail below).

Figure 39B:
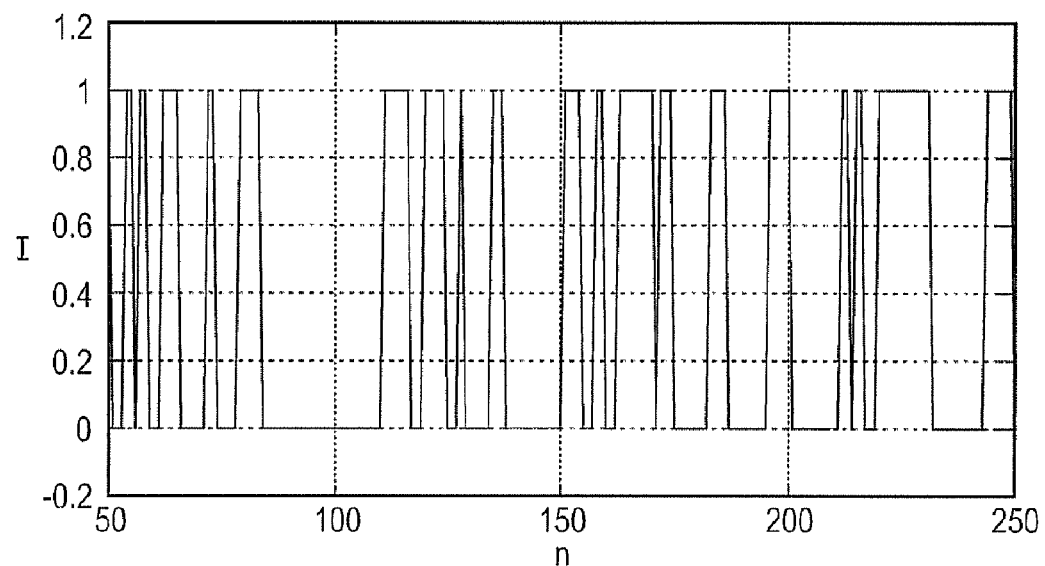
FIG. 39B shows the data of FIG. 39A after digitisation according to the average level.

FIG. 39B shows the data of FIG. 39A after digitisation. The digitisation scheme adopted in the present example is a simple binary one in which any positive intensity values are set at value 1 and any negative intensity values are set at zero. It will be appreciated that multi-state digitisation could be used instead, or any one of many other possible digitisation approaches. The main important feature of the digitisation is merely that the same digitisation scheme is applied consistently.

Figure 40:
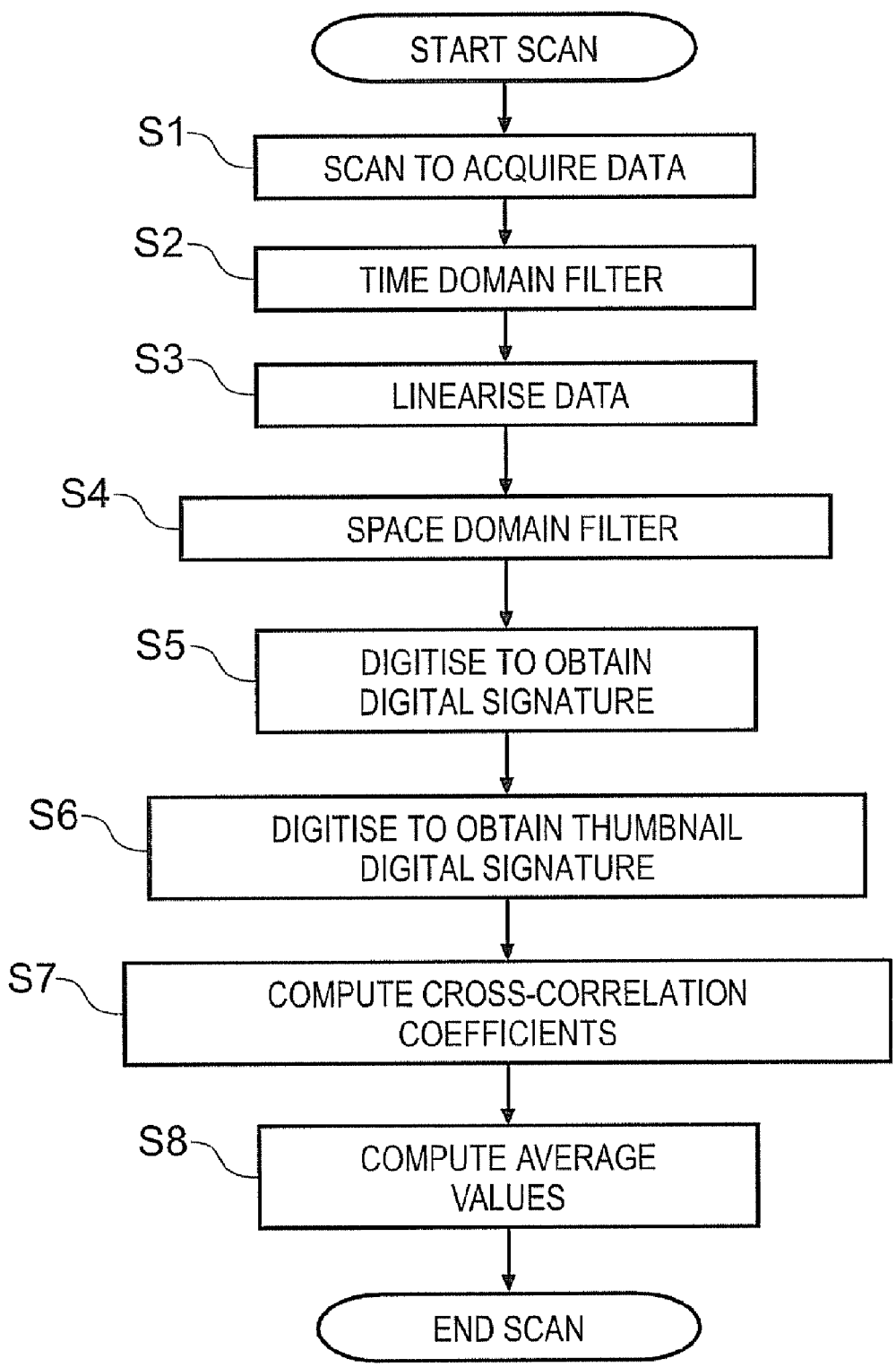
FIG. 40 is a flow diagram showing how a signature of an article is generated from a scan.

FIG. 40 is a flow diagram showing how a signature of an article can be generated from a scan.

Step S1 is a data acquisition step during which the optical intensity at each of the photodetectors is acquired at a number of locations along the entire length of scan. Simultaneously, the encoder signal is acquired as a function of time. It is noted that if the scan motor has a high degree of linearisation accuracy (e.g. as would a stepper motor), or if non-linearities in the data can be removed through block-wise analysis or template matching, then linearisation of the data may not be required. Referring to FIG. 36 above, the data is acquired by the signature generator 3610 taking data from the ADC 3608. The number of data points per photodetector collected in each scan is defined as N in the following (referred to as n with reference to FIG. 10 above). Further, the value $a_k(i)$ is defined as the i-th stored intensity value from photodetector k, where i runs from 1 to N. An examples of a raw data set obtained from such a scan is illustrated in FIG. 16.

Step S2 is an optional step of applying a time-domain filter to the captured data. In the present example, this is used to selectively remove signals in the 50/60 Hz and 100/120 Hz bands such as might be expected to appear if the target is also subject to illumination from sources other than the coherent beam. These frequencies are those most commonly used for driving room lighting such as fluorescent lighting.

Step S3 performs alignment of the data. In some examples, this step uses numerical interpolation to locally expand and contract $a_k(i)$ so that the encoder transitions are evenly spaced in time. This corrects for local variations in the motor speed and other non-linearities in the data. This step can be performed by the signature generator 3610.

In some examples, where the scan area corresponds to a predetermined pattern template, the captured data can be compared to the known template and translational and/or rotational adjustments applied to the captured data to align the data to the template. Also, stretching and contracting adjustments may be applied to the captured data to align it to the template in circumstances where passage of the scan head relative to the article differs from that from which the template was constructed. Thus if the template is constructed using a linear scan speed, the scan data can be adjusted to match the template if the scan data was conducted with non-linearities of speed present.

Step S4 applies a space-domain band-pass filter to the captured data. This filter passes a range of wavelengths in the x-direction (the direction of movement of the scan head). The filter is designed to maximise decay between samples and maintain a high number of degrees of freedom within the data. With this in mind, the lower limit of the filter passband is set to have a fast decay. This is required as the absolute intensity value from the target surface is uninteresting from the point of view of signature generation, whereas the variation between areas of apparently similar intensity is of interest. However, the decay is not set to be too fast, as doing so can reduce the randomness of the signal, thereby reducing the degrees of freedom in the captured data. The upper limit can be set high; whilst there may be some high frequency noise or a requirement for some averaging (smearing) between values in the x-direction (much as was discussed above for values in the y-direction), there is typically no need for anything other than a high upper limit. In terms of the order of the filter, it is generally desirable to minimise the occurrence of ringing which can cause oscillations in the captured data. Therefore a low order filter may be used. In some examples a zeroth order filter may be used. In one example, where the speed of travel of the laser over the target surface is 20 mm per second, the filter may have an impulse rise time of 1 ms and an impulse fall time of 5 ms.

Instead of applying a simple filter, it may be desirable to weight different parts of the filter. In one example, the weighting applied is substantial, such that a triangular passband is created to introduce the equivalent of realspace functions such as differentiation. A differentiation type effect may be useful for highly structured surfaces, as it can serve to attenuate correlated contributions (e.g. from surface printing on the target) from the signal relative to uncorrelated contributions.

Step S5 is a digitisation step where the multi-level digital signal (the processed output from the ADC) is converted to a bi-state digital signal to compute a digital signature representative of the scan. The digital signature is obtained in the present example by applying the rule: $a_k(i)$>mean maps onto binary '1' and $a_k(i)$<=mean maps onto binary '0'. The digitised data set is defined as $d_k(i)$ where i runs from 1 to N. The signature of the article may advantageously incorporate further components in addition to the digitised signature of the intensity data just described. These further optional signature components are now described.

Step S6 is an optional step in which a smaller 'thumbnail' digital signature is created. In some examples, this can be a realspace thumbnail produced either by averaging together adjacent groups of m readings, or by picking every cth data point, where c is the compression factor of the thumbnail. The latter may be preferable since averaging may disproportionately amplify noise. In other examples, the thumbnail can be based on a Fast Fourier Transform of some or all of the signature data. The same digitisation rule used in Step S5 is then applied to the reduced data set. The thumbnail digitisation is defined as $t_k(i)$ where i runs 1 to N/c and c is the compression factor.

Step S7 is an optional step applicable when multiple detector channels exist. The additional component is a cross-correlation component calculated between the intensity data obtained from different ones of the photodetectors. With 2 channels there is one possible cross-correlation coefficient, with 3 channels up to 3, and with 4 channels up to 6 etc. The cross-correlation coefficients can be useful, since it has been found that they are good indicators of material type. For example, for a particular type of document, such as a passport of a given type, or laser printer paper, the cross-correlation coefficients always appear to lie in predictable ranges. A normalised cross-correlation can be calculated between $a_k(i)$ and $a_l(i)$, where k≠l and k,l vary across all of the photodetector channel numbers. The normalised cross-correlation function is defined as:

$$\Gamma(k, l) = \frac{\sum_{i=1}^{N} a_k(i) a_l(i)}{\sqrt{\left(\sum_{i=1}^{N} a_k(i)^2\right)\left(\sum_{i=1}^{N} a_l(i)^2\right)}}$$

Another aspect of the cross-correlation function that can be stored for use in later verification is the width of the peak in the cross-correlation function, for example the full width half maximum (FWHM). The use of the cross-correlation coefficients in verification processing is described further below.

Step S8 is another optional step which is to compute a simple intensity average value indicative of the signal intensity distribution. This may be an overall average of each of the mean values for the different detectors or an average for each detector, such as a root mean square (rms) value of $a_k(i)$. If the detectors are arranged in pairs either side of normal incidence as in the reader described above, an average for each pair of detectors may be used. The intensity value has been found to be a good crude filter for material type, since it is a simple indication of overall reflectivity and roughness of the sample. For example, one can use as the intensity value the unnormalised rms value after removal of the average value, i.e. the DC background. The rms value provides an indication of the reflectivity of the surface, in that the rms value is related to the surface roughness.

The signature data obtained from scanning an article can be compared against records held in a signature database for verification purposes and/or written to the database to add a new record of the signature to extend the existing database and/or written to the article in encoded form for later verification with or without database access.

A new database record will include the digital signature obtained in Step S5 as well as optionally its smaller thumbnail version obtained in Step S6 for each photodetector channel, the cross-correlation coefficients obtained in Step S7 and the average value(s) obtained in Step S8. Alternatively, the thumbnails may be stored on a separate database of their own optimised for rapid searching, and the rest of the data (including the thumbnails) on a main database.

Figure 41:
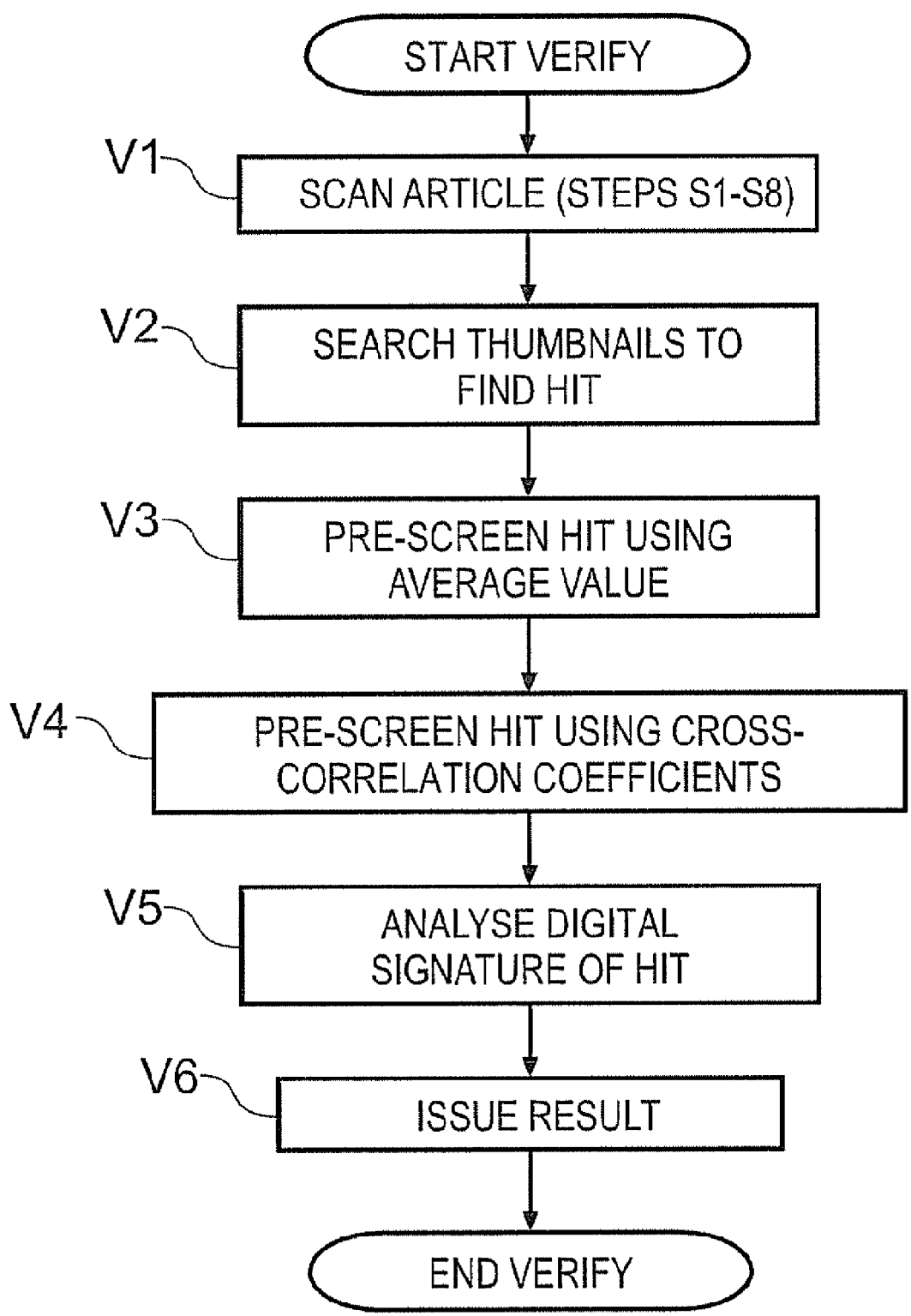
FIG. 41 is a flow diagram showing how a signature of an article obtained from a scan can be verified against a signature database.

FIG. 41 is a flow diagram showing how a signature of an article obtained from a scan can be verified against a signature database.

In a simple implementation, the database could simply be searched to find a match based on the full set of signature data. However, to speed up the verification process, the process of the present example uses the smaller thumbnails and pre-screening based on the computed average values and cross-correlation coefficients as now described. To provide such a rapid verification process, the verification process is carried out in two main steps, first using the thumbnails derived from the amplitude component of the Fourier transform of the scan data (and optionally also pre-screening based on the computed average values and cross-correlation coefficients) as now described, and second by comparing the scanned and stored full digital signatures with each other.

Verification Step V1 is the first step of the verification process, which is to scan an article according to the process described above, i.e. to perform Scan Steps S1 to S8. This scan obtains a signature for an article which is to be validated against one or more records of existing article signatures Verification Step V2 seeks a candidate match using the thumbnail derived from the Fourier transform amplitude component of the scan signal, which is obtained as explained above with reference to Scan Step S6. Verification Step V2 takes each of the thumbnail entries and evaluates the number of matching bits between it and $t_k(i+j)$, where j is a bit offset which is varied to compensate for errors in placement of the scanned area. The value of j is determined and then the thumbnail entry which gives the maximum number of matching bits. This is the 'hit' used for further processing. A variation on this would be to include the possibility of passing multiple candidate matches for full testing based on the full digital signature. The thumbnail selection can be based on any suitable criteria, such as passing up to a maximum number of, for example 10, candidate matches, each candidate match being defined as the thumbnails with greater than a certain threshold percentage of matching bits, for example 60%. In the case that there are more than the maximum number of candidate matches, only the best 10 are passed on. If no candidate match is found, the article is rejected (i.e. jump to Verification Step V6 and issue a fail result).

This thumbnail based searching method employed in the present example delivers an overall improved search speed, for the following reasons. As the thumbnail is smaller than the full signature, it takes less time to search using the thumbnail than using the full signature. Where a realspace thumbnail is used, the thumbnail needs to be bit-shifted against the stored thumbnails to determine whether a "hit" has occurred, in the same way that the full signature is bit-shifted against the stored signature to determine a match. The result of the thumbnail search is a shortlist of putative matches, each of which putative matches can then be used to test the full signature against.

Where the thumbnail is based on a Fourier Transform of the signature or part thereof, further advantages may be realised as there is no need to bit-shift the thumbnails during the search. A pseudo-random bit sequence, when Fourier transformed, carries some of the information in the amplitude spectrum and some in the phase spectrum. Any bit shift only affects the phase spectrum, however, and not the amplitude spectrum. Amplitude spectra can therefore be matched without any knowledge of the bit shift. Although some information is lost in discarding the phase spectrum, enough remains in order to obtain a rough match against the database. This allows one or more putative matches to the target to be located in the database. Each of these putative matches can then be compared properly using the conventional real-space method against the new scan as with the realspace thumbnail example.

Verification Step V3 is an optional pre-screening test that is performed before analysing the full digital signature stored for the record against the scanned digital signature. In this pre-screen, the rms values obtained in Scan Step S8 are compared against the corresponding stored values in the database record of the hit. The 'hit' is rejected from further processing if the respective average values do not agree within a pre-defined range. The article is then rejected as non-verified (i.e. jump to Verification Step V6 and issue fail result).

Verification Step V4 is a further optional pre-screening test that is performed before analysing the full digital signature. In this pre-screen, the cross-correlation coefficients obtained in Scan Step S7 are compared against the corresponding stored values in the database record of the hit. The 'hit' is rejected from further processing if the respective cross-correlation coefficients do not agree within a predefined range. The article is then rejected as non-verified (i.e. jump to Verification Step V6 and issue fail result).

Another check using the cross-correlation coefficients that could be performed in Verification Step V4 is to check the width of the peak in the cross-correlation function, where the cross-correlation function is evaluated by comparing the value stored from the original scan in Scan Step S7 above and the re-scanned value:

$$\Gamma_{k,l}(j) = \frac{\sum_{i=1}^{N} a_k(i)a_l(i+j)}{\sqrt{\left(\sum_{i=1}^{N} a_k(i)^2\right)\left(\sum_{i=1}^{N} a_l(i)^2\right)}}$$

If the width of the re-scanned peak is significantly higher than the width of the original scan, this may be taken as an indicator that the re-scanned article has been tampered with or is otherwise suspicious. For example, this check should beat a fraudster who attempts to fool the system by printing a bar code or other pattern with the same intensity variations that are expected by the photodetectors from the surface being scanned.

Verification Step V5 is the main comparison between the scanned digital signature obtained in Scan Step S5 and the corresponding stored values in the database record of the hit. The full stored digitised signature, $d_k^{db}(i)$ is split into n blocks of q adjacent bits on k detector channels, i.e. there are qk bits per block. In the present example, a typical value for q is 4 and a typical value for k is in the range 1 to 2, making typically 2 to 8 bits per block. The qk bits are then matched against the qk corresponding bits in the stored digital signature $d_k^{db}(i+j)$. If the number of matching bits within the block is greater or equal to some pre-defined threshold $Z_{thresh}$, then the number of matching blocks is incremented. A typical value for $Z_{thresh}$ is 7 on a two detector system. For a 1 detector system (k=1), $Z_{thresh}$ might typically have a value of 3. This is repeated for all n blocks. This whole process is repeated for different offset values of j, to compensate for errors in placement of the scanned area, until a maximum number of matching blocks is found. Defining M as the maximum number of matching blocks, the probability of an accidental match is calculated by evaluating:

$$p(M) = \sum_{w=n-M}^{n} s^w(1-s)^{n-wn}{}_wC$$

where s is the probability of an accidental match between any two blocks (which in turn depends upon the chosen value of $Z_{threshold}$), M is the number of matching blocks and p(M) is the probability of M or more blocks matching accidentally. The value of s is determined by comparing blocks within the database from scans of different objects of similar materials, e.g. a number of scans of paper documents etc. For the example case of q=4, k=2 and $Z_{threshold}$=7, we find a typical value of s is 0.1. If the qk bits were entirely independent, then probability theory would give s=0.01 for $Z_{threshold}$=7. The fact that we find a higher value empirically is because of correlations between the k detector channels (where multiple detectors are used) and also correlations between adjacent bits in the block due to a finite laser spot width. A typical scan of a piece of paper yields around 314 matching blocks out of a total number of 510 blocks, when compared against the data base entry for that piece of paper. Setting M=314, n=510, s=0.1 for the above equation gives a probability of an accidental match of $10^{-177}$. As mentioned above, these figures apply to a four detector channel system. The same calculations can be applied to systems with other numbers of detector channels.

Verification Step V6 issues a result of the verification process. The probability result obtained in Verification Step V5 may be used in a pass/fail test in which the benchmark is a pre-defined probability threshold. In this case the probability threshold may be set at a level by the system, or may be a variable parameter set at a level chosen by the user. Alternatively, the probability result may be output to the user as a confidence level, either in raw form as the probability itself, or in a modified form using relative terms (e.g. no match/poor match/good match/excellent match) or other classification. In experiments carried out upon paper, it has generally been found that 75% of bits in agreement represents a good or excellent match, whereas 50% of bits in agreement represents no match.

By way of example, it has been experimentally found that a database comprising 1 million records, with each record containing a 128-bit thumbnail of the Fourier transform amplitude spectrum, can be searched in 1.7 seconds on a standard PC computer of 2004 specification. 10 million entries can be searched in 17 seconds. High-end server computers can be expected to achieve speeds up to 10 times faster than this.

It will be appreciated that many variations are possible. For example, instead of treating the cross-correlation coefficients as a pre-screen component, they could be treated together with the digitised intensity data as part of the main signature. For example the cross-correlation coefficients could be digitised and added to the digitised intensity data. The cross-correlation coefficients could also be digitised on their own and used to generate bit strings or the like which could then be searched in the same way as described above for the thumbnails of the digitised intensity data in order to find the hits.

In one alternative example, step V5 (calculation of the probability of an accidental match) can be performed using a method based on an estimate of the degrees of freedom in the system. For example, if one has a total of 2000 bits of data in which there are 1300 degrees of freedom, then a 75% (1500 bits) matching result is the same as 975 (1300×0.75) independent bits matching. The uniqueness is then derived from the number of effective bits as follows:

$$p(m) = \sum_{w=n-m}^{n} s^w(1-s)^{n-wn}{}_wC$$

This equation is identical to the one indicated above, except that here m is the number of matching bits and p(m) is the probability of m or more blocks matching accidentally.

Figure 42A:
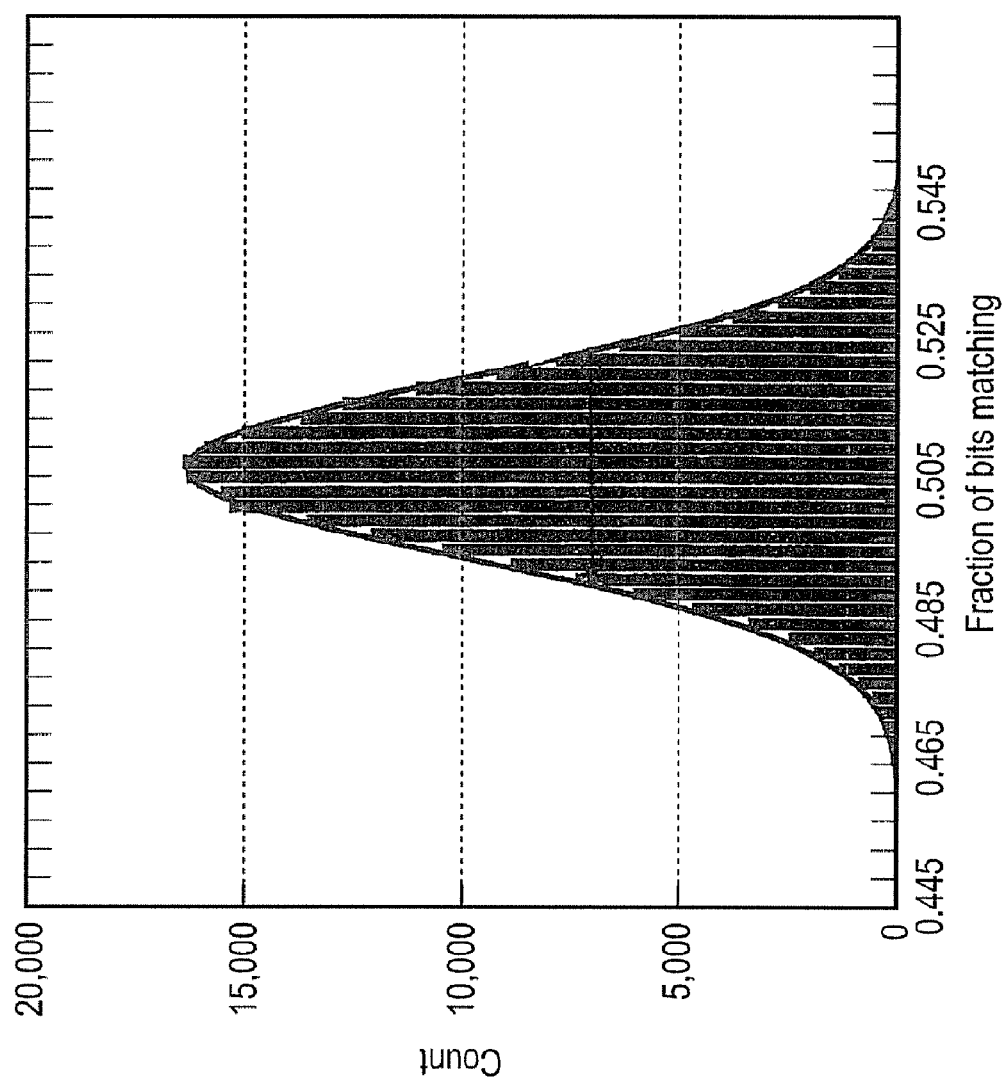
FIG. 42a is a plot illustrating how a number of degrees of freedom can be calculated.

The number of degrees of freedom can be calculated for a given article type as follows. The number of effective bits can be estimated or measured. To measure the effective number of bits, a number of different articles of the given type are scanned and signatures calculated. All of the signatures are then compared to all of the other signatures and a fraction of bits matching result is obtained. An example of a histogram plot of such results is shown in FIG. 42*a*. The plot in FIG. 42*a* is based on 124,500 comparisons between 500 similar items, the signature for each item being based on 2000 data points. The plot represents the results obtained when different items were compared.

From FIG. 42*a* it can clearly be seen that the results provide a smooth curve centred around a fraction of bits matching result of approximately 0.5. For the data depicted in FIG. 42*a*, a curve can be fitted to the results, the mean μ of which curve is 0.504 and the standard deviation σ of which is 0.01218. From the fraction of bits matching plot, the number of degrees of freedom N can be calculated as follows:

$$N = \mu \frac{1-\mu}{\sigma^2}$$

In the context of the present example, this gives a number of degrees of freedom N of 1685.

Figure 42B:
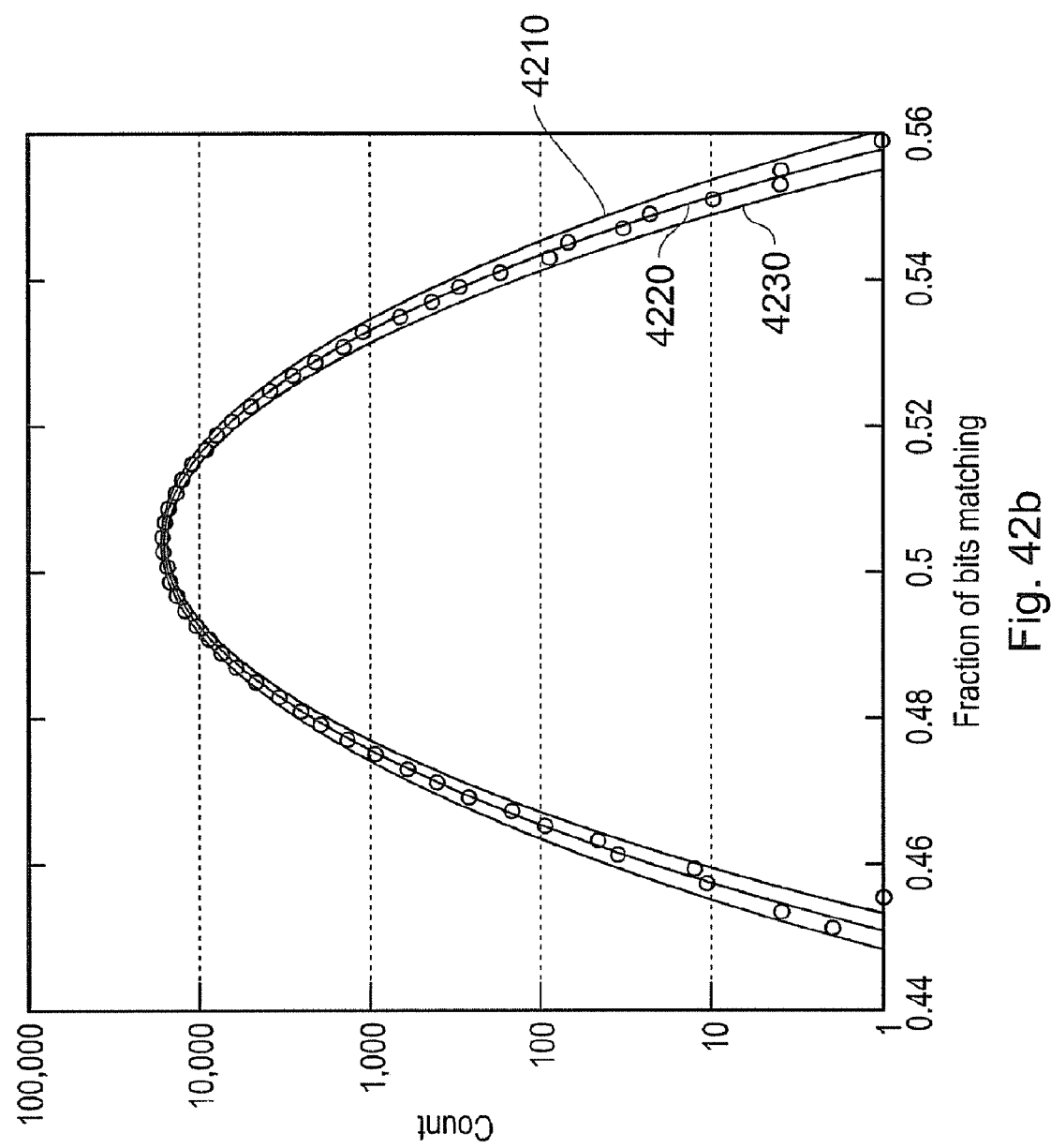
FIG. 42b is a plot illustrating how a number of degrees of freedom can be calculated.

The accuracy of this measure of the degrees of freedom is demonstrated in FIG. 42*b*. This figure shows three binomial curves plotted onto the experimental of fraction of bits matching. Curve 4210 is a binomial curve with a turning point at 0.504 using N=1535, curve 4220 is a binomial curve with a turning point at 0.504 using N=1685, and curve 4230 is a binomial curve with a turning point at 0.504 using N=1835. It is clear from the plot that the curve 4220 fits the experimental data, whereas curves 4210 and 4230 do not.

For some applications, it may be possible to make an estimate of the number of degrees of freedom rather than use empirical data to determine a value. If one uses a conservative estimate for an item, based on known results for other items made from the same or similar materials, then the system remains robust to false positives whilst maintaining robustness to false negatives.

Figure 43:
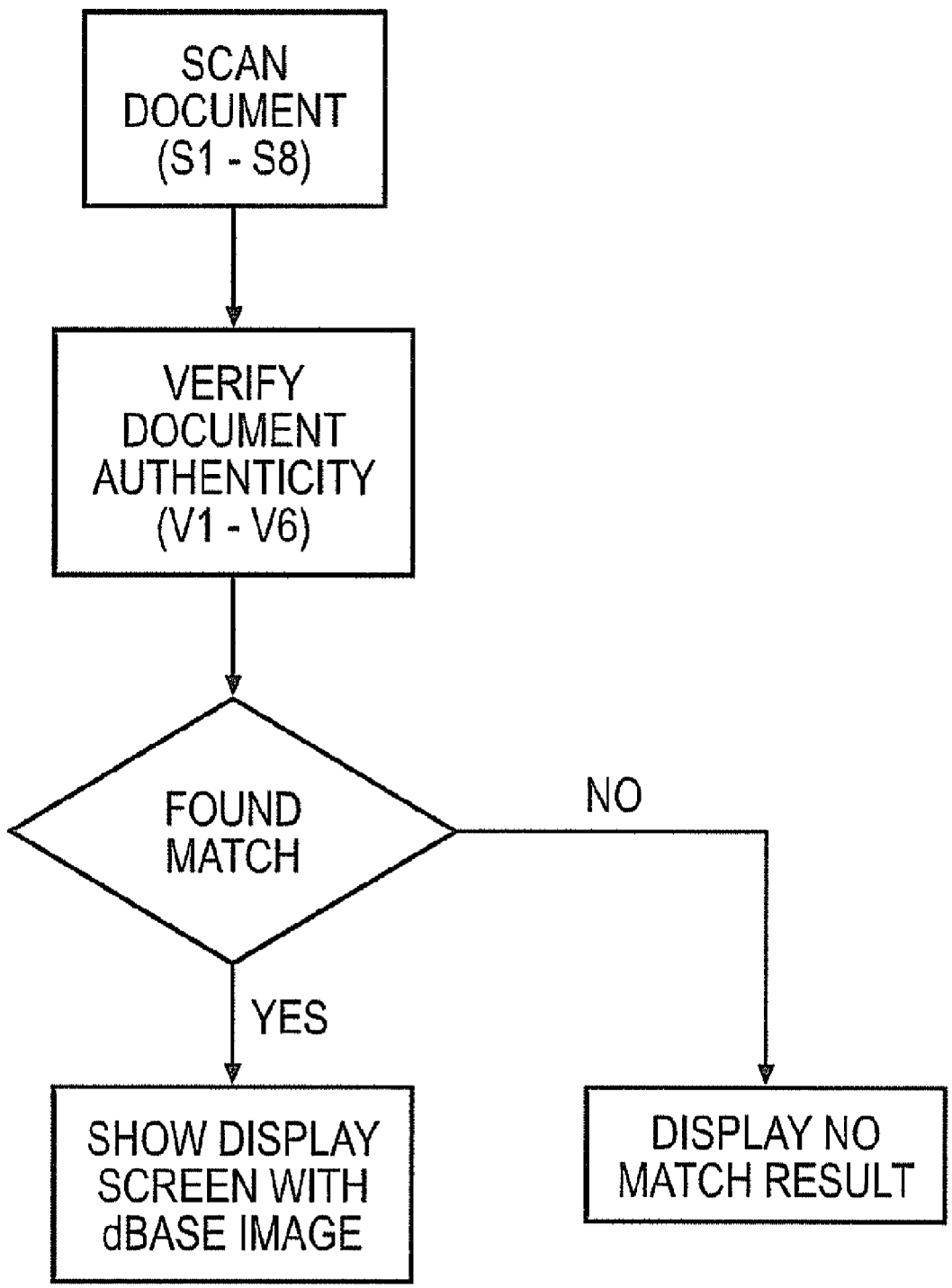
FIG. 43 is a flow diagram showing the overall process of how a document is scanned for verification purposes and the results presented to a user.

FIG. 43 is a flow diagram showing the overall process of how a document is scanned for verification purposes and the results presented to a user. First the document is scanned according to the scanning steps of FIG. 40. The document authenticity is then verified using the verification steps of FIG. 41. If there is no matching record in the database, a "no match" result can be displayed to a user. If there is a match, this can be displayed to the user using a suitable user interface. The user interface may be a simple yes/no indicator system such as a lamp or LED which turns on/off or from one colour to another for different results. The user interface may also take the form of a point of sale type verification report interface, such as might be used for conventional verification of a credit card. The user interface might be a detailed interface giving various details of the nature of the result, such as the degree of certainty in the result and data describing the original article or that article's owner. Such an interface might be used by a system administrator or implementer to provide feedback on the working of the system. Such an interface might be provided as part of a software package for use on a conventional computer terminal.

It will thus be appreciated that when a database match is found a user can be presented with relevant information in an intuitive and accessible form which can also allow the user to apply his or her own common sense for an additional, informal layer of verification. For example, if the article is a document, any image of the document displayed on the user interface should look like the document presented to the verifying person, and other factors will be of interest such as the confidence level and bibliographic data relating to document origin. The verifying person will be able to apply their experience to make a value judgement as to whether these various pieces of information are self consistent.

Thus there have now been described methods for scanning an article to create a signature therefrom and for comparing a resulting scan to an earlier record signature of an article to determine whether the scanned article is the same as the article from which the record signature was taken. These methods can provide a determination of whether the article matches one from which a record scan has already been made to a very high degree of accuracy.

From one point of view, there has thus now been described, in summary, a system in which a digital signature is obtained by digitising a set of data points obtained by scanning a coherent beam over a paper, cardboard or other article, and measuring the scatter. A thumbnail digital signature is also determined, either in realspace by averaging or compressing the data, or by digitising an amplitude spectrum of a Fourier transform of the set of data points. A database of digital signatures and their thumbnails can thus be built up. The authenticity of an article can later be verified by re-scanning the article to determine its digital signature and thumbnail, and then searching the database for a match. Searching is done on the basis of the Fourier transform thumbnail to improve search speed. Speed is improved, since, in a pseudo-random bit sequence, any bit shift only affects the phase spectrum, and not the amplitude spectrum, of a Fourier transform represented in polar co-ordinates. The amplitude spectrum stored in the thumbnail can therefore be matched without any knowledge of the unknown bit shift caused by registry errors between the original scan and the re-scan.

In some examples, the method for extracting a signature from a scanned article can be optimised to provide reliable recognition of an article despite deformations to that article caused by, for example, stretching or shrinkage. Such stretching or shrinkage of an article may be caused by, for example, water damage to a paper or cardboard based article.

Also, an article may appear to a scanner to be stretched or shrunk if the relative speed of the article to the sensors in the scanner is non-linear. This may occur if, for example the article is being moved along a conveyor system, or if the article is being moved through a scanner by a human holding the article. An example of a likely scenario for this to occur is where a human scans, for example, a bank card using a swipe-type scanner.

In some examples, where a scanner is based upon a scan head which moves within the scanner unit relative to an article held stationary against or in the scanner, then linearisation guidance can be provided within the scanner to address any non-linearities in the motion of the scan head. Where the article is moved by a human, these non-linearities can be greatly exaggerated To address recognition problems which could be caused by these non-linear effects, it is possible to adjust the analysis phase of a scan of an article. Thus a modified validation procedure will now be described with reference to FIG. 44a. The process implemented in this example uses a block-wise analysis of the data to address the non-linearities.

The process carried out in accordance with FIG. 44a can include some or all of the steps of time domain filtering, alternative or additional linearisation, space domain filtering, smoothing and differentiating the data, and digitisation for obtaining the signature and thumbnail described with reference to FIG. 40, but are not shown in FIG. 44 so as not to obscure the content of that figure.

Figure 44A:
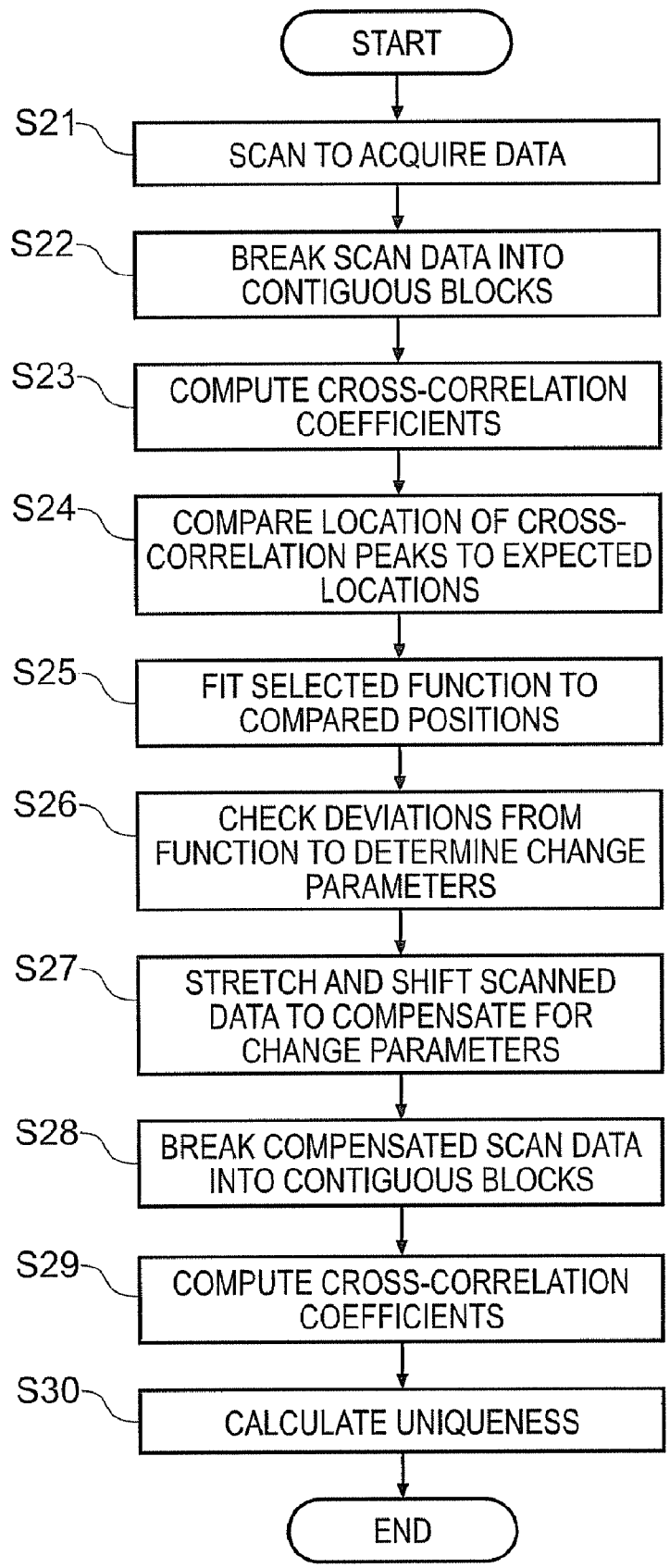
FIG. 44a is a flow diagram showing how the verification process of FIG. 40 can be altered to account for non-idealities in a scan.

As shown in FIG. 44a, the scanning process for a validation scan using a block-wise analysis starts at step S21 by performing a scan of the article to acquire the date describing the intrinsic properties of the article. This scanned data is then divided into contiguous blocks (which can be performed before or after digitisation and any smoothing/differentiation or the like) at step S22. In one example, a scan area of 1600 mm$^2$ (e.g. 40 mm×40 mm) is divided into eight equal length blocks. Each block therefore represents a subsection of the scanned area of the scanned article.

For each of the blocks, a cross-correlation is performed against the equivalent block for each stored signature with which it is intended that article be compared at step S23. This can be performed using a thumbnail approach with one thumbnail for each block. The results of these cross-correlation calculations are then analysed to identify the location of the cross-correlation peak. The location of the cross-correlation peak is then compared at step S24 to the expected location of the peak for the case where a perfectly linear relationship exists between the original and later scans of the article.

As this block-matching technique is a relatively computationally intensive process, in some examples its use may be restricted to use in combination with a thumbnail search such that the block-wise analysis is only applied to a shortlist of potential signature matches identified by the thumbnail search.

Figure 45A:
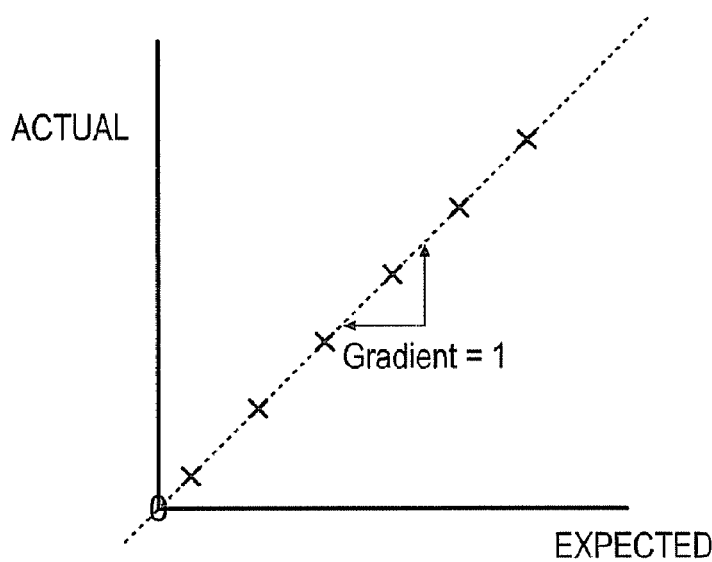
FIG. 45A shows an example of cross-correlation data gathered from a scan.
Figure 45B:
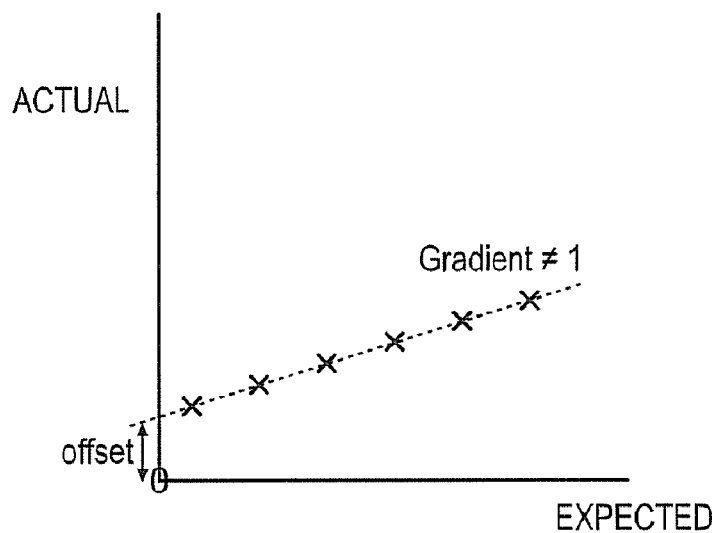
FIG. 45b shows an example of cross-correlation data gathered from a scan where the scanned article is distorted.
Figure 45C:
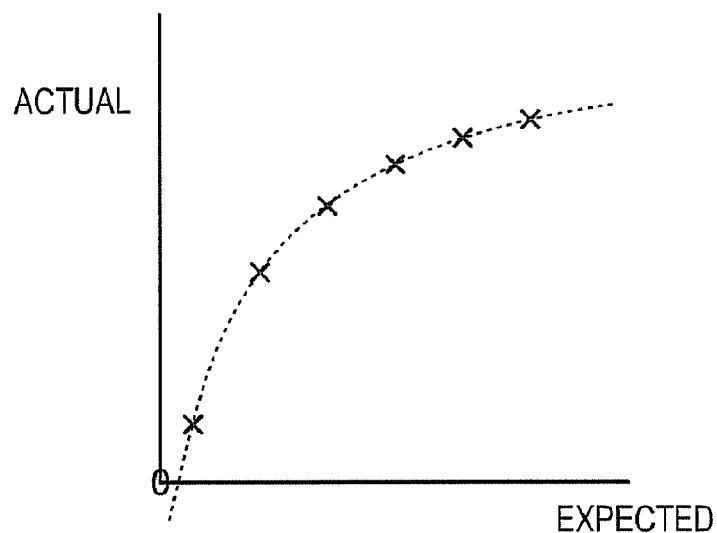
FIG. 45C shows an example of cross-correlation data gathered from a scan where the scanned article is scanned at non-linear speed.

This relationship can be represented graphically as shown in FIGS. 45A, 45B and 45C. In the example of FIG. 45A, the cross-correlation peaks are exactly where expected, such that the motion of the scan head relative to the article has been perfectly linear and the article has not experienced stretch or shrinkage. Thus a plot of actual peak positions against expected peak results in a straight line which passes through the origin and has a gradient of 1.

In the example of FIG. 45B, the cross-correlation peaks are closer together than expected, such that the gradient of a line of best fit is less than 1. Thus the article has shrunk relative to its physical characteristics upon initial scanning. Also, the best fit line does not pass through the origin of the plot. Thus the article is shifted relative to the scan head compared to its position for the record scan.

In the example of FIG. 45C, the cross correlation peaks do not form a straight line. In this example, they approximately fit to a curve representing a y$^2$ function. Thus the movement of the article relative to the scan head has slowed during the scan. Also, as the best fit curve does not cross the origin, it is clear that the article is shifted relative to its position for the record scan.

A variety of functions can be test-fitted to the plot of points of the cross-correlation peaks to find a best-fitting function. Thus curves to account for stretch, shrinkage, misalignment, acceleration, deceleration, and combinations thereof can be used. Examples of suitable functions can include straight line functions, exponential functions, a trigonometric functions, $x^2$ functions and $x^3$ functions.

Once a best-fitting function has been identified at step S25, a set of change parameters can be determined which represent how much each cross-correlation peak is shifted from its expected position at step S26. These compensation parameters can then, at step S27, be applied to the data from the scan taken at step S21 in order substantially to reverse the effects of the shrinkage, stretch, misalignment, acceleration or deceleration on the data from the scan. As will be appreciated, the better the best-fit function obtained at step S25 fits the scan data, the better the compensation effect will be.

The compensated scan data is then broken into contiguous blocks at step S28 as in step S22. The blocks are then individually cross-correlated with the respective blocks of data from the stored signature at step S29 to obtain the cross-correlation coefficients. This time the magnitude of the cross-correlation peaks are analysed to determine the uniqueness factor at step S29. Thus it can be determined whether the scanned article is the same as the article which was scanned when the stored signature was created.

Accordingly, there has now been described an example of a method for compensating for physical deformations in a scanned article, and/or for non-linearities in the motion of the article relative to the scanner. Using this method, a scanned article can be checked against a stored signature for that article obtained from an earlier scan of the article to determine with a high level of certainty whether or not the same article is present at the later scan. Thereby an article constructed from easily distorted material can be reliably recognised. Also, a scanner where the motion of the scanner relative to the article may be non-linear can be used, thereby allowing the use of a low-cost scanner without motion control elements.

Figure 44B:
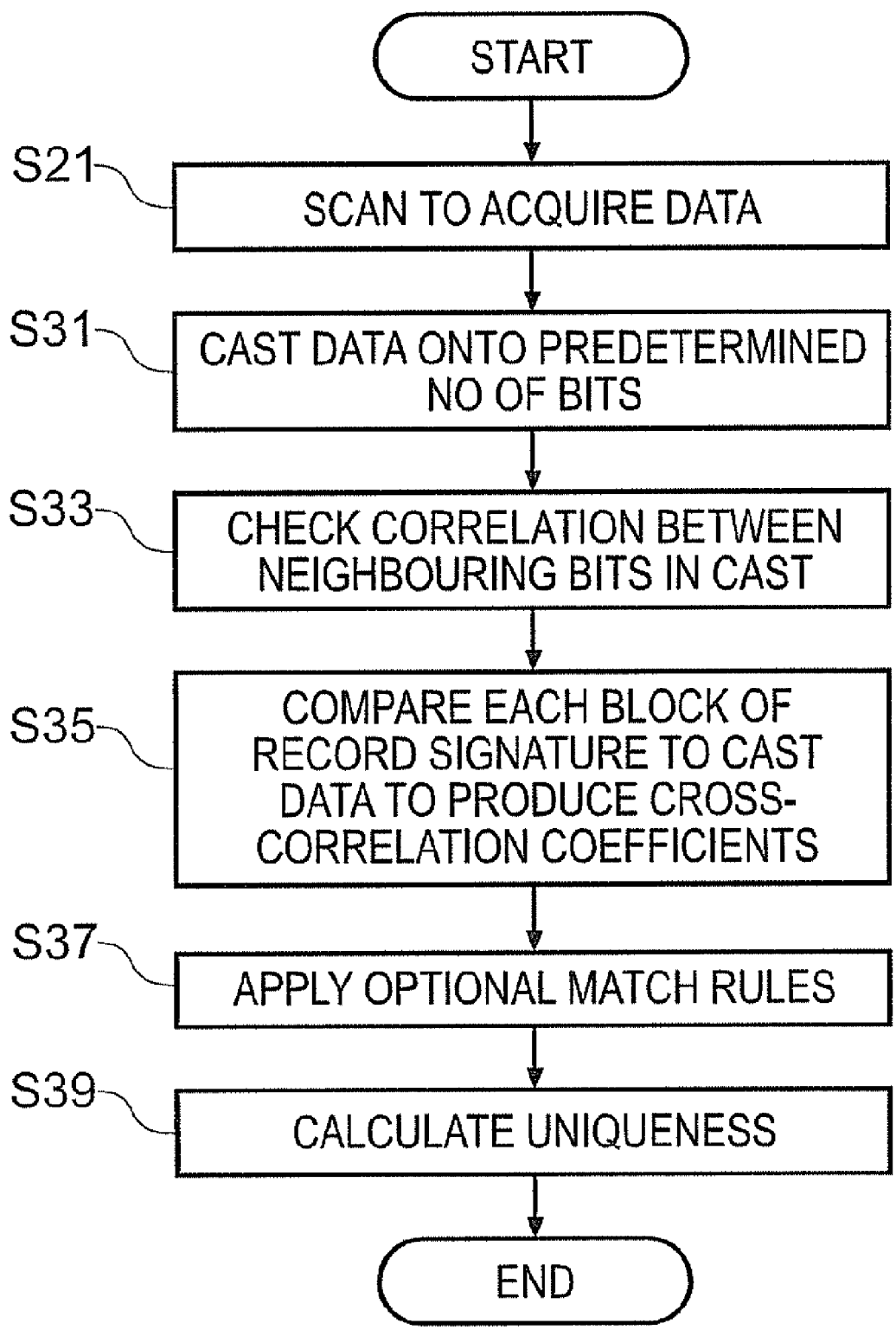
FIG. 44b is a flow diagram showing another example of how the verification process of FIG. 40 can be altered to account for non-idealities in a scan.

An alternative method for performing a block-wise analysis of scan data is presented in FIG. 44*b*

This method starts at step S21 with performing a scan of the target surface as discussed above with reference to step S21 of FIG. 44*a*. Once the data has been captured, this scan data is cast onto a predetermined number of bits at step S31. This consists of an effective reduction in the number of bits of scan data to match the cast length. In the present example, the scan data is applied to the cast length by taking evenly spaced bits of the scan data in order to make up the cast data.

Next, step S33, a check is performed to ensure that there is a sufficiently high level of correlation between adjacent bits of the cast data. In practice, it has been found that correlation of around 50% between neighbouring bits is sufficient. If the bits are found not to meet the threshold, then the filter which casts the scan data is adjusted to give a different combination of bits in the cast data.

Once it has been determined that the correlation between neighbouring bits of the cast data is sufficiently high, the cast data is compared to the stored record signature at step S35. This is done by taking each predetermined block of the record signature and comparing it to the cast data. In the present example, the comparison is made between the cast data and an equivalent reduced data set for the record signature. Each block of the record signature is tested against every bit position offset of the cast data, and the position of best match for that block is the bit offset position which returns the highest cross-correlation value.

Once every block of the record signature has been compared to the cast data, a match result (bit match ratio) can be produced for that record signature as the sum of the highest cross-correlation values for each of the blocks. Further candidate record signatures can be compared to the cast data if necessary (depending in some examples upon whether the test is a 1:1 test or a 1:many test).

After the comparison step is completed, optional matching rules can be applied at step S37. These may include forcing the various blocks of the record signature to be in the correct order when producing the bit match ration for a given record signature. For example if the record signature is divided into five blocks (block 1, block 2, block 3, block 4 and block 5), but the best cross-correlation values for the blocks, when tested against the cast data returned a different order of blocks (e.g. block 2, block 3, block 4, block 1, block 5) this result could be rejected and a new total calculated using the best cross-correlation results that keep the blocks in the correct order. This step is optional as, in experimental tests carried out, it has been seen that this type of rule makes little if any difference to the end results. This is believed to be due to the surface identification property operating over the length of the shorter blocks such that, statistically, the possibility of a wrong-order match occurring to create a false positive is extremely low.

Finally, at step S39, using the bit match ratio, the uniqueness can be determined by comparing the whole of the scan data to the whole of the record signature, including shifting the blocks of the record signature against the scan data based on the position of the cross-correlation peaks determined in step S35. This time the magnitude of the cross-correlation peaks are analysed to determine the uniqueness factor at step S39. Thus it can be determined whether the scanned article is the same as the article which was scanned when the stored record signature was created The block size used in this method can be determined in advance to provide for efficient matching and high reliability in the matching. When performing a cross-correlation between a scan data set and a record signature, there is an expectation that a match result will have a bit match ratio of around 0.9. A 1.0 match ratio is not expected due to the biometric-type nature of the property of the surface which is measured by the scan. It is also expected that a non-match will have a bit match ratio of around 0.5. The nature of the blocks as containing fewer bits than the complete signature tends to shift the likely value of the non-match result, leading to an increased chance of finding a false-positive. For example, it has been found by experiment that a block length of 32 bits moves the non-match to approximately 0.75, which is too high and too close to the positive match result at about 0.9 for many applications. Using a block length of 64 bits moves the non-match result down to approximately 0.68, which again may be too high in some applications. Further increasing the block size to 96 bits, shifts the non-match result down to approximately 0.6, which, for most applications, provides more than sufficient separation between the true positive and false positive outcomes. As is clear from the above, increasing the block length increases the separation between non-match and match results as the separation between the match and non-match peaks is a function of the block length. Thus it is clear that the block length can be increased for greater peak separation (and greater discrimination accuracy) at the expense of increased processing complexity caused by the greater number of bits per block. On the other hand, the block length may be made shorter, for lower processing complexity, if less separation between true positive and false positive outcomes is acceptable.

Another characteristic of an article which can be detected using a block-wise analysis of a signature generated based upon an intrinsic property of that article is that of localised damage to the article. For example, such a technique can be used to detect modifications to an article made after an initial record scan.

For example, many documents, such as passports, ID cards and driving licenses, include photographs of the bearer. If an authenticity scan of such an article includes a portion of the photograph, then any alteration made to that photograph will be detected. Taking an arbitrary example of splitting a signature into 10 blocks, three of those blocks may cover a photograph on a document and the other seven cover another part of the document, such as a background material. If the photograph is replaced, then a subsequent rescan of the document can be expected to provide a good match for the seven blocks where no modification has occurred, but the replaced photograph will provide a very poor match. By knowing that those three blocks correspond to the photograph, the fact that all three provide a very poor match can be used to automatically fail the validation of the document, regardless of the average score over the whole signature.

Also, many documents include written indications of one or more persons, for example the name of a person identified by a passport, driving licence or identity card, or the name of a bank account holder. Many documents also include a place where written signature of a bearer or certifier is applied. Using a block-wise analysis of a signature obtained therefrom for validation can detect a modification to alter a name or other important word or number printed or written onto a document. A block which corresponds to the position of an altered printing or writing can be expected to produce a much lower quality match than blocks where no modification has taken place. Thus a modified name or written signature can be detected and the document failed in a validation test even if the overall match of the document is sufficiently high to obtain a pass result.

The area and elements selected for the scan area can depend upon a number of factors, including the element of the document which it is most likely that a fraudster would attempt to alter. For example, for any document including a photograph the most likely alteration target will usually be the photograph as this visually identifies the bearer. Thus a scan area for such a document might beneficially be selected to include a portion of the photograph. Another element which may be subjected to fraudulent modification is the bearer's signature, as it is easy for a person to pretend to have a name other than their own, but harder to copy another person's signature. Therefore for signed documents, particularly those not including a photograph, a scan area may beneficially include a portion of a signature on the document.

In the general case therefore, it can be seen that a test for authenticity of an article can comprise a test for a sufficiently high quality match between a verification signature and a record signature for the whole of the signature, and a sufficiently high match over at least selected blocks of the signatures. Thus regions important to the assessing the authenticity of an article can be selected as being critical to achieving a positive authenticity result.

In some examples, blocks other than those selected as critical blocks may be allowed to present a poor match result. Thus a document may be accepted as authentic despite being torn or otherwise damaged in parts, so long as the critical blocks provide a good match and the signature as a whole provides a good match.

Thus there have now been described a number of examples of a system, method and apparatus for identifying localised damage to an article, and for rejecting an inauthentic an article with localised damage or alteration in predetermined regions thereof. Damage or alteration in other regions may be ignored, thereby allowing the document to be recognised as authentic.

In some scanner apparatuses, it is also possible that it may be difficult to determine where a scanned region starts and finishes. Of the examples discussed above, this may be most problematic a processing line type system where the scanner may "see" more than the scan area for the article. One approach to addressing this difficulty would be to define the scan area as starting at the edge of the article. As the data received at the scan head will undergo a clear step change when an article is passed though what was previously free space, the data retrieved at the scan head can be used to determine where the scan starts.

In this example, the scan head is operational prior to the application of the article to the scanner. Thus initially the scan head receives data corresponding to the unoccupied space in front of the scan head. As the article is passed in front of the scan head, the data received by the scan head immediately changes to be data describing the article. Thus the data can be monitored to determine where the article starts and all data prior to that can be discarded. The position and length of the scan area relative to the article leading edge can be determined in a number of ways. The simplest is to make the scan area the entire length of the article, such that the end can be detected by the scan head again picking up data corresponding to free space. Another method is to start and/or stop the recorded data a predetermined number of scan readings from the leading edge. Assuming that the article always moves past the scan head at approximately the same speed, this would result in a consistent scan area. Another alternative is to use actual marks on the article to start and stop the scan region, although this may require more work, in terms of data processing, to determine which captured data corresponds to the scan area and which data can be discarded.

In some examples, a drive motor of the processing line may be fitted with a rotary encoder to provide the speed of the article. This can be used to determine a start and stop position of the scan relative to a detected leading edge of the article. This can also be used to provide speed information for linearization of the data, as discussed above with reference to FIG. 40. The speed can be determined from the encoder periodically, such that the speed is checked once per day, once per hour, once per half hour etc.

In some examples the speed of the processing line can be determined from analysing the data output from the sensors. By knowing in advance the size of the article and by measuring the time which that article takes to pass the scanner, the average speed can be determined. This calculated speed can be used to both locate a scan area relative to the leading edge and to linearise the data, as discussed above with reference to FIG. 40.

Another method for addressing this type of situation is to use a marker or texture feature on the article to indicate the start and/or end of the scan area. This could be identified, for example using the pattern matching technique described above.

Thus there has now been described an number of techniques for scanning an item to gather data based on an intrinsic property of the article, compensating if necessary for damage to the article or non-linearities in the scanning process, and comparing the article to a stored signature based upon a previous scan of an article to determine whether the same article is present for both scans.

Further examples of physical arrangements for scanner apparatuses will now be discussed with reference to FIGS. 46 and 47. These represent alternative scanner configurations which can be configured to operate in accordance with the above described principles and methods.

Figure 46:
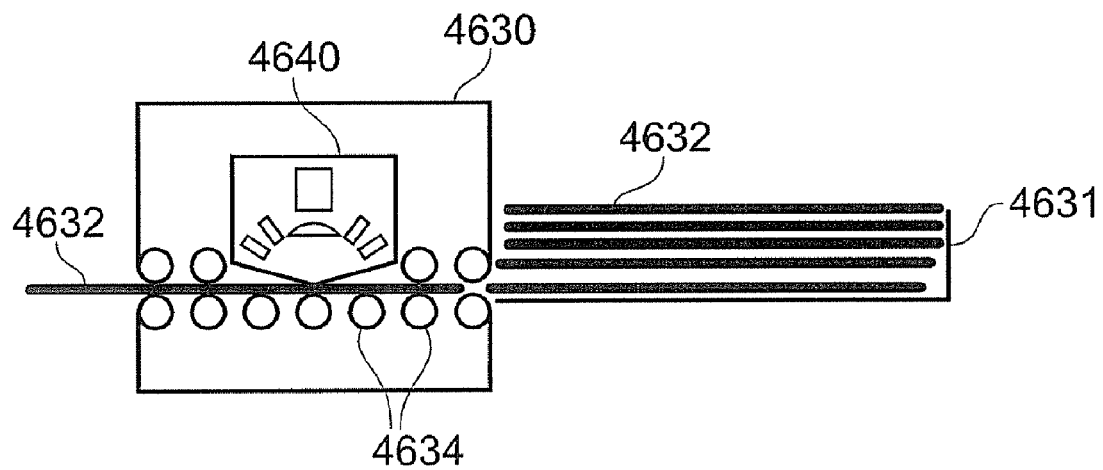
FIG. 46 shows a schematic sectional view though an example scanner apparatus.

FIG. 46 shows an example of an alternative physical configuration for a reader where a document feeder is provided to ensure that article placement is consistent. In this example, a housing 4630 is provided, having an article feed tray 4631 attached thereto. The tray 4631 can hold one or more articles 4632 for scanning by the reader. A motor can drive feed rollers 4634 to carry an article 4632 through the device and across a scanning aperture of an scanning optics subassembly 4640 including a laser source, one or more photodetectors and any focusing and/or rasterising optics which may be required. Thus the article 4632 can be scanned by the scanning optics subassembly 4640 in a manner whereby the relative motion between optics subassembly and article is created by movement of the article. In one example, the article may be stopped with a scan area aligned to the scanning aperture of the scanning optics subassembly for carrying out of a rasterised scan as described with reference to FIGS. 23 to 28 above. In an alternative example where the article continues to move past the scanning aperture, the motion of the scanned item can be controlled using the motor with sufficient linearity that the use of linearisation processing may be unnecessary. In such an example, the scanning optics subassembly may be configured to perform a rasterised scan using the motion of the article to provide translational movement in one direction. Alternatively, a scan-line type system could be used, as described above. The apparatus could follow any conventional format for document scanners, photocopiers or document management systems. Such a scanner may be configured to handle line-feed sheets (where multiple sheets are connected together by, for example, a perforated join) as well as or instead of handing single sheets.

Thus there has now been described an apparatus suitable for scanning articles in an automated feeder type device. Depending upon the physical arrangement of the feed arrangement, the scanner may be able to scan one or more single sheets of material, joined sheets or material or three-dimensional items such as packaging cartons.

Figure 47:
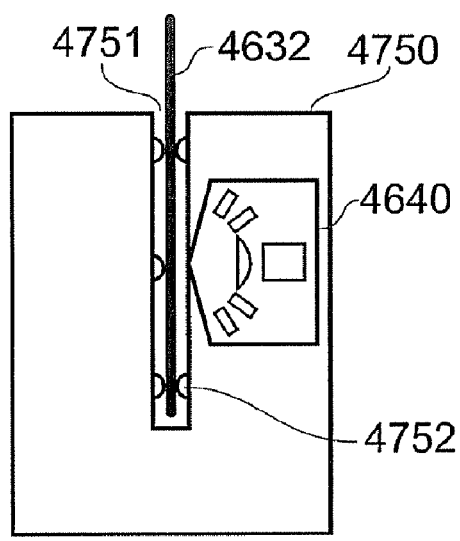
FIG. 47 shows a schematic sectional view though an example scanner apparatus.

FIG. 47 shows an example of a further alternative physical configuration for a reader. In this example, the article is moved through the reader by a user. As shown in FIG. 47, a reader housing 4750 can be provided with a slot 4751 therein for insertion of an article for scanning. A scanning optics subassembly 4640 can be provided with a scanning aperture directed into the slot 4751 so as to be able to scan an article 4632 placed in the slot. Additionally, guide elements 4752 may optionally be provided in the slot 4751 to assist in guiding the article to the correct focal distance from the optics sub-assembly 4640 and/or to correctly locate the article through the slot. In such an example, the scanning optics subassembly may be configured to scan a scan area presented to the scanning aperture when the card is article is correctly located therein, for example using a rasterising system. In some examples, the scanner may be configured to scan the article during an insertion or removal operation of the article. Alternatively, the scanner may be configured to scan the article whilst it is moved through the slot, such as in a conventional magnetic swipe card reader. Such a scanner may be used for scanning cards or smartcards such as payment cards and/or loyalty cards, for example in a point of sale terminal. In this context, the scanner could also include apparatus for reading a conventional magnetic strip and/or embedded smart card of the article.

Thus there have now been described an arrangement for manually initiated scanning of an article. This could be used for scanning bank cards and/or credit cards. Thereby a card could be scanned at a terminal where that card is presented for use, and a signature taken from the card could be compared to a stored signature for the card to check the authenticity and un-tampered nature of the card. Such a device could also be used, for example in the context of reading a military-style metal ID-tag (which tags are often also carried by allergy sufferers to alert others to their allergy). This could enable medical personnel treating a patient to ensure that the patient being treated was in fact the correct bearer of the tag. Likewise, in a casualty situation, a recovered tag could be scanned for authenticity to ensure that a casualty has been correctly identified before informing family and/or colleagues.

An example of an implementation of the above-described security system will now be described with reference to FIGS. 48 to 50.

As the scan system can be provided with a limited ability to capture details of surface printing (as discussed above), it is possible to include a barcode within the scan area. The barcode could be used as an alignment mark for positioning of the scanner. A suitable barcode might be the standard PDF417 2-D barcode or the standard DataMatrix 2-D barcode. Assuming that the barcode itself is not used for generation of the signature, the barcode can be printed onto the article after a database population scan has taken place. Therefore, the barcode can include the article signature or some other article identifier. At a later validation scan, the scanner can read the barcode to retrieve the signature or the identifier. Therefore, with the signature read from the article encoded thereonto, it is possible to validate the article against the record signature without access to a database of signatures. Thereby an article can be validated in a location remote from a connection to a database of authentic signatures.

Alternatively, if the scanner has database access, the signature encoded onto the article can be sued to retrieve an authentic signature from the database, such that the authenticity check can be performed as a 1:1 check, as it will be known in advance what signature is expected. Thus the authenticity check can be performed much more quickly than in a circumstance where the expected signature is unknown and a 1:many check must be performed though a database of signatures.

The implementation of such a system may advantageously be arranged to print the barcode to the article as soon as possible after creating the record signature therefore. This can aid ensuring that the printed barcode is the correct one for the particular article in question. This could be of relevance in an environment where articles are being scanned in very quick succession.

Figure 48:
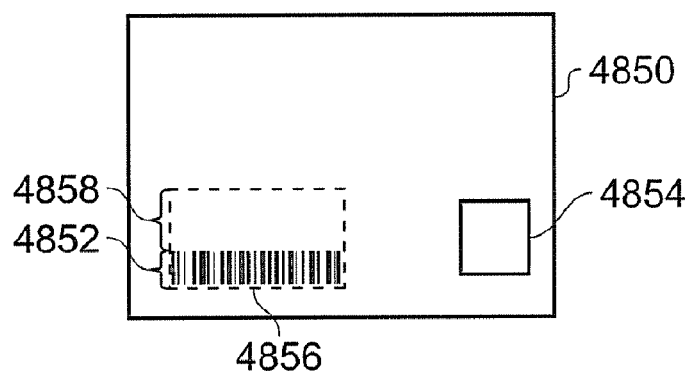
FIG. 48 is a schematic plan view of an ID card bearing a barcode label that encodes a digital signature obtained from an intrinsic measured surface characteristic.

FIG. 48 shows an ID card 4850 bearing a barcode. The ID card may also bear an independent security element 4854 such as a photograph, hologram or contain some biometric information specific to an individual. The barcode is shown as part of a scan area 4856. This is illustrated with a dashed line, since it can be featureless on the ID card. The scan area is subdivided between a lower area 4852 containing the barcode and a blank upper area 4858. The ID card 4850 is designed to be scanned by a reader apparatus such as that illustrated in FIG. 47 above. In this example, the barcode encodes the signature obtained by scanning the blank upper area.

In other words, the barcode was originally applied at the time of manufacture of the ID card by scanning the blank upper area of the card according to the method of the invention and then printing the barcode onto the lower area 4852. The ID card is thus labelled with a signature characteristic of its intrinsic structure, namely the surface structure in the upper area 4858.

It is noted that the barcode may itself be used for and/or template matching linearisation for the scan. Indeed (as mentioned above), a barcode, or even dummy markings, may be printed on the card solely for the purpose of linearisation and/or template matching and not used for the encryption at all. In that case, verification could be performed using reference to a database or by taking data from another part of the card, for example by taking data from a chip (so-called smart card).

Where the barcode includes the actual signature for the item, validation of that item can be carried out without a connection to a database of signatures. In fact if all items to be validated are marked using a barcode in this manner, a database of signatures may be omitted entirely. Such a system might be advantageous where privacy concerns relating to the maintenance of such a database could be a problem. Such a system might also be advantageous where it might be desired to validate an item in a location from where access to a database is not available.

Where the article includes information describing the bearer, such as a passport, identity card, driving licence or bank/credit/loyalty card, an OCR operation could be carried out on the capture data to read the bearer information. This bearer information might be a name or might be an identifier number such as a passport number. Using the bearer information, an expected signature for the article can be retrieved, and used to check against the signature calculated from the scan data. It may be considerably quicker to find a name or number in a database and to retrieve a signature associated therewith than to check a determined signature against all stored signatures in the database. Thus the signature-based validation process is a 1:1 check rather than a 1:many check.

Other systems which could achieve a 1:1 search strategy could use bearer information embedded in a different carrier of the card to retrieve the expected signature. This could include a magnetic strip on the article or a microchip embedded in the article, as will be discussed in greater detail below.

It will be appreciated that this basic approach can be used to mark a wide variety of articles with a label that encodes the articles own signature obtained from its intrinsic physical properties, for example any printable article, including paper or cardboard articles or plastic articles.

Given the public nature of the barcode or other label that follows a publicly known encoding protocol, it may be advisable to make sure that the signature is in some way protected before being encoded into the barcode. This may be performed by digitally signing the signature or applying an asymmetric encryption algorithm for creation of the barcode, i.e. a one-way function is used, such as according to the well known RSA algorithm.

In one example, the label can represent a public key based encryption of the signature in a public key/private key encryption system. If the system is used by a number of different customers, it may be advisable that each customer has its own private key, so that disclosure of a private key will only affect one customer. The label is thus encoded with the public key and the private key is located securely with the authorised persons.

In one example, to avoid a forger creating a fake item, and then scanning it and creating a signature, which signature is then encoded in a barcode on the fake item (such that the item validates against itself but would not validate against a database) the signature in the barcode can be protected to make forgery in this manner much more difficult, or even impossible. For example, the barcode could additionally contain a digitally signed hashing result from the signature. Thus, when checking the signature for the article, the signature encoded in the barcode can be checked against the digitally signed hash result from the signature. If this check is failed, or if the digital signature used for signing the hash function is incorrect or not recognised, the article can be rejected as fake.

In some examples, the encryption could be symmetric. In this case the key could be held securely in tamper-proof memory or crypto-processor smart cards on the document scanners. Alternatively, symmetric encryption could be used to encrypt the actual data (the signature) and an asymmetric encryption system to encrypt the symmetric encryption key.

A further perceived advantage of the labelling approach is that a novice user would be unaware of the verification being carried out without special knowledge. It would be natural for the user to assume that the reader apparatus was simply a barcode scanner, and it was the barcode that was being scanned.

In one example, for CD's, DVD's or other content bearing disks, the signature is on the disk and forms part of a decryption key for the data on the disk. The disk player then reads the speckle signature from the disk when reading the data.

As noted above, the labelling scheme could be used to allow articles to be verified without access to a database purely on the basis of the label.

However, it is also envisaged that the labelling scheme could be used in combination with a database verification scheme. In an example where the article would not normally carry bearer identification (such as where the article is a saleable product), the barcode could encode a thumbnail form of the digital signature and be used to allow a rapid pre-screen prior to screening with reference to a database. This could be a very important approach in practice, since potentially in some database applications, the number of records could become huge (e.g. millions) and searching strategies would become critical. Intrinsically high speed searching techniques, such as the use of bitstrings, could become important As an alternative to the barcode encoding a thumbnail, the barcode (or other label) could encode a record locator, i.e. be an index or bookmark, which can be used to rapidly find the correct signature in the database for further comparison.

Another variant is that the barcode (or other label) encodes a thumbnail signature which can be used to get a match with reasonable but not high confidence if a database is not available (e.g. temporarily off-line, or the scanning is being done in an unusually remote location without internet access). That same thumbnail can then be used for rapid record locating within the main database if the database is available, allowing a higher confidence verification to be performed.

Figure 49:
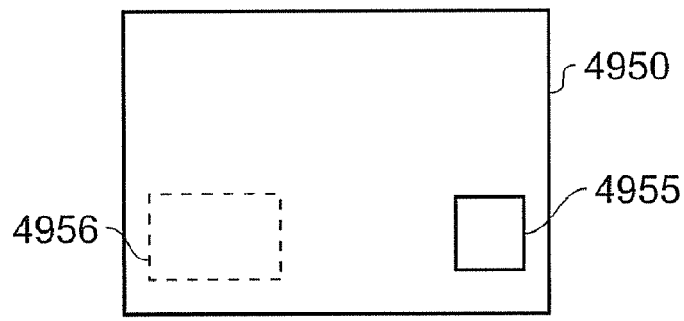
FIG. 49 is a schematic plan view of an ID card with a chip carrying data that encodes a digital signature obtained from an intrinsic measured surface characteristic.

FIG. 49 is a schematic plan view of an ID card 4950 which is a so-called smart card that incorporates a data carrying chip 4954. The data carried by the chip 4954 can include signature encoding data that encodes a digital signature obtained from an intrinsic measured surface characteristic of the ID card 4950 obtained from a scan area 4956 which is featureless in this example as indicated by the dotted lines, but could be decorated in any desired way, or contain a photograph, for example.

In other examples, the data carrying chip 4954 can carry other data which may identify the expected signature of the article 4950. This may include bearer information for the bearer of the card. The bearer information could be used to search a database to return an expected signature for the article. The expected signature can then be compared to a signature created by scanning the article and a validation result returned. This example provides that the signature verification is a 1:1 check, with the database search being based on a search for a well-defined data string (e.g. name of bearer) in a conventional manner. This could be expected to result in a faster overall time from scan to validation result than where the signature check is a 1:many signature check using the signature and/or signature thumbnail to search the database.

Figure 50:
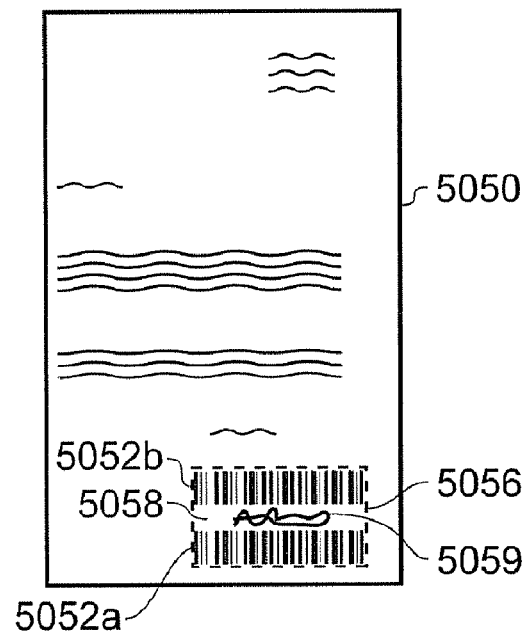
FIG. 50 is a schematic plan view of a warranty document bearing two barcode labels that encode a digital signature obtained from an intrinsic measured surface characteristic.

FIG. 50 is a schematic plan view of a warranty document 5050. The scan area 5056 includes two barcode labels 5052a, 5052b arranged one above the other which encode a digital signature obtained from an intrinsic measured surface characteristic, similar to the ID card example of FIG. 48. The barcodes 5052a, 5052b are arranged above and below a digital signature scan area 5058 for a person's signature 5059 as schematically illustrated. The area 5058 may be covered with a transparent adhesive covering for tamper protection.

Many other commercial examples will be envisaged, the above FIGS. 48 to 50 given by way of example only.

In the context of a processing line system, such as those described with reference to FIGS. 18, 29, 30 and 31 above, multiple scan units may be used in parallel and/or in series with a first scan unit or units used for signature generation.

For example, multiple scanners may be stacked in a parallel arrangement (much like the arrangement of FIG. 30) to enable more data to be gathered. Each system in the stack may be operable to read multiple points on the target simultaneously. Using extra scanners enables more data to be obtained for signature generation. Such a system may be used where there is a high likelihood of surface degradation of the target surface. By basing the signature on a larger surface area, the signature will be reproducible from later scans even after high levels of surface damage.

Where a processing line scanner is based on a modular system, whereby a single scan head module needs to be installed to scan passing items, the scan module can be easily mounted to an existing processing line. In an example where only a few lines from the available scan area are used to generate the signature, if these lines are selected to be those toward the centre of a scan area, there can be provided a significant margin of error in positioning the scanner on the processing line. Taking the example of a scanner operable to read a scan area 22 mm wide using 22 sensors, each detecting reflections from a 1 mm strip of the surface, if the signature is based on the central two lines, the sensor module can be placed up to 10 mm away from the intended position before it becomes impossible to capture data from the desired part of the target. By taking data from those all of the sensors it is possible to determine, using a pattern matching system, to establish which lines of the sensor module are aligned to the intended scan lines. The signature can then be based on the output from the relevant signals. This enables the system to be set up by unskilled fitters, unaware of the positioning accuracy with which the system will operate.

In some processing line environments, it may be desirable to re-scan at least some items to ensure that the database is being populated with reproducible signatures, or to ensure that no items have gone missing during the length of the processing line. To address such a requirement, a second scan unit can be integrated at a second point in the processing line. In a processing line where it is difficult to ensure accurate alignment of the items to the scan heads, it may be appropriate to implement a system where the signature population scanner uses only a small number of scan lines, all from toward the centre of the scan area. Thus, the second scanner can monitor a larger number of scan lines to allow a degree of positioning alteration between the first and second scans. In the example of 22 scan lines, each 1 mm wide, the first (database population) scanner may use, for example, the central two lines, and the second (verification) scanner may use more lines (up to all 22—in dependence upon the speed of the processing line and the data processing abilities of the attached signature generation processor(s)) so as to allow for the "correct" two lines to be shifted by up to 10 mm from the centre of the second scan area.

In a system where multiple scan systems are used at the same part of a processing line, the scanners may be arranged at least partially in series with one another. Such an arrangement can provide exact instantaneous processing line speed information. This arrangement might therefore also be useful for a scanner where the movement of the item relative to the scanner is expected to be highly non-linear, such as a scanner where the motion is provided by a human operator or by motion of a self-propelled item such as a vehicle.

An example of such a system is shown in FIG. 51. Here, two scan heads (not shown) are arranged in series, such that each reads the same scan width on a target article. For simplicity, only five, well spaced, scan points are indicated for each scan head, although it will be appreciated that more scan points may be used, and the scan points may be arranged closer together.

The first scan head reads from a set of scan points 5110a-e and the second scan head reads from a set of scan points 5120a-e. Assuming that an article 5130 moves directly between the two scan heads, the part of an article scanned by scan point 5110a will scanned shortly thereafter by scan point 5120a. Thus, as shown in FIG. 51a, when the article is at a first position, the portion of the article shown by dashed line 5135 will be scanned by the first scan head at scan points 5110a-e. Once the article has moved in the direction of arrow 5140 by a distance equal to the spacing between the scan heads, the portion of the article shown by dashed line 5135 will be scanned by the second scan head at scan points 5120a-e as shown in FIG. 51b.

FIG. 51c shows the output from a sensor detecting reflections from scan point 5110a and FIG. 51d shows the output from a sensor detecting reflections from scan point 5120a. Thus, as the article moves past the scan heads, the signal received from scan point 5110a will be substantially repeated at scan point 5120a, after a time delay. This is illustrated by matching region "M" in FIG. 51d, which matches the signal in FIG. 51c. The time delay "dt" between this matching region M being detected at scan point 5110a and scan point 5120a. The time delay dt may be determined by, for example, performing a cross-correlation between the output of the respective sensors to find the location of the cross-correlation peak. The peak location gives the value of dt.

By also knowing the spacing between the scan heads, the instantaneous speed of the article can be determined. The speed can be measured multiple times during the passage of the item past the scan heads, and the determined speed profile of the article can be used for linearisation of the capture data. One speed measurement can be made for each scan position in the x-direction, and thus a very detailed speed profile can be determined. Alternatively, it may be sufficient to make a speed calculation every few scan positions in the x-direction, which would reduce the processing load of determining the speed profile.

If the article moves not only in the x-direction, but in the y-direction as well, then this motion can also be detected by the system of FIG. 51, enabling an x-y velocity profile for the article to be established. Considering the example, where the article moves in the y-direction such that the part of the article read at scan point 5110a is later read by scan point 5120b, a cross-correlation between the sensors corresponding to these two scan points will provide a cross-correlation peak, the position of which provides both x- and y-direction speed indications, thus enabling an x-y velocity profile for the article to be created.

Although FIG. 51 shows the scan regions of two scan heads overlapping completely, the scan heads could be offset in the y-direction, thus enabling both collection of item speed information and providing scanning of an enlarged portion of the article in the y-direction, as provided by the detectors in parallel system described above.

Where a processing line system is to scan items for which alignment of a scan to the scan area is to be performed by pattern matching, as discussed above, a scanner on the processing line could be used to generate the pattern template against which scans of the items will be aligned. This could be performed by scanning a few tens, hundreds or thousands of different articles of the type for which the pattern is to used. These scan results could then be averaged together to create a template. During "live" scanning of the items, the scan data could be monitored (i.e. compared to the template) to ensure that the scanner has not moved relative to the position which it had for the creation of the template. In one example, every $100^{th}$ item scan could be used for such monitoring.

With reference to FIG. 20 above, there was described the possibility of scanning a circular target area. One example of an item which could have a circular target area is a security seal, such as might be used to ensure that equipment has not been tampered with or used, or to ensure that an area has not been entered. Such security seals are routinely used to seal closed containers, lorries and vans used for distribution of goods in the retail chain. By having an intact seal at the end of journey, it can be established that the contents of the container, lorry or van have not been tampered with, altered or reduced (for example by theft from the lorry). Also, it can be established that no additional contents have been added to the payload, such as might occur if a criminal attempted to hide in a lorry to evade searchers or if a person was attempting to gain access to a location to which they did not have rights of access.

Figure 52:
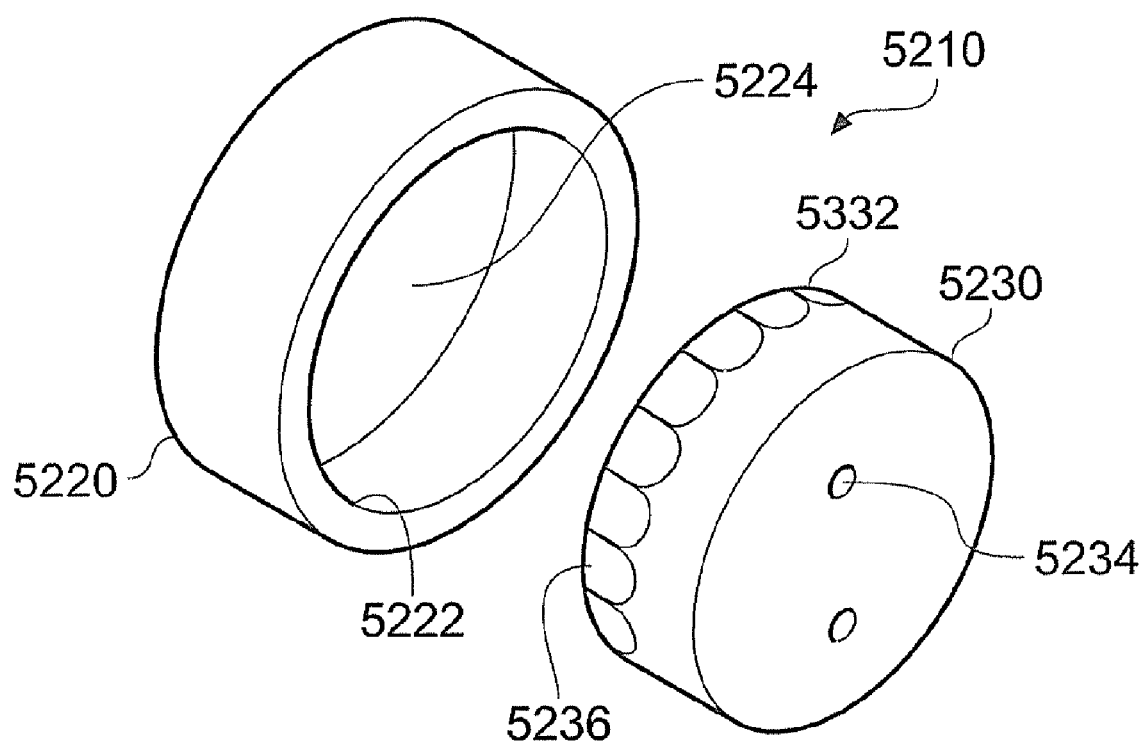
FIG. 52 shows a schematic illustration of a security seal.

An example of such a security seal is shown in FIG. 52. The security seal 5210 of the present example is a two-part seal having a cap portion 5220 and an insertable portion 5230. The insertable portion 5230 has engagement members 5232 which interface with an engagement ring 5222 of the cap portion 5220 when the insertable portion 5230 is inserted into the cap portion 5220. In the present example, it is impossible to remove the insertable portion 5230 from the cap portion 5220 without damaging the engagement members 5232. Thus, a securing cord (not shown) id passed around an item to be secured, such as a locking handle for a shipping container or lorry, or a door handle to a room, can have its two free ends passed through the holes 5234 in the insertion member 5230, which free ends can be secured together, for example by tying, clamping or adhering. The securing cord could be, for example, a fabric, plastic or metal cord.

When the seal is to be removed, for example to allow access to a shipping container at its destination, or to allow access to a previously secured room or building, the seal can be cut around the circumference of the cap portion 5220, to enable the inside of the seal to be seen without causing damage by trying to remove the insertable portion 5232. Thus the insides of the seal can be observed and subjected to a scan to ensure that the seal that was removed is the same as the seal that was applied. Portions of the seal 5210 which could be secured by a scan of their surface include an interior surface 5224 of the cap portion 5220 and an interior surface 5236 of the insertable portion 5230. Also, where the securing cord is joined by, for example, clamping the ends of the securing cord, the clamp could be secured by such a scan. By comparing a signature generated from the seal before use to a signature generated after use, it can be determined whether the seal is the same. In some examples, a random pattern may be embossed into the interior surface of one or both portions prior to use and generation of the record signature. Such a pattern could be created by scraping the surface with a hard tool, such as a screwdriver or knife.

Such a seal could have a serial number embossed or printed thereon in a region which will be subjected to scanning. The scan data could be used to read the serial number, either by optical character recognition or by pattern matching. This serial number could then be used to search a database for an expected signature in the manner described above. Thereby the signature check for the seal could be performed on a 1:1 basis, resulting in greater speed of verification than if the signature itself were used to search the database in a 1:many search.

With reference to FIGS. 13 to 15 above, the detector optics could have an alternative configuration based on use of a lightpipe array. An example of such a system is shown in FIGS. 53a to 53e.

Figure 53A:
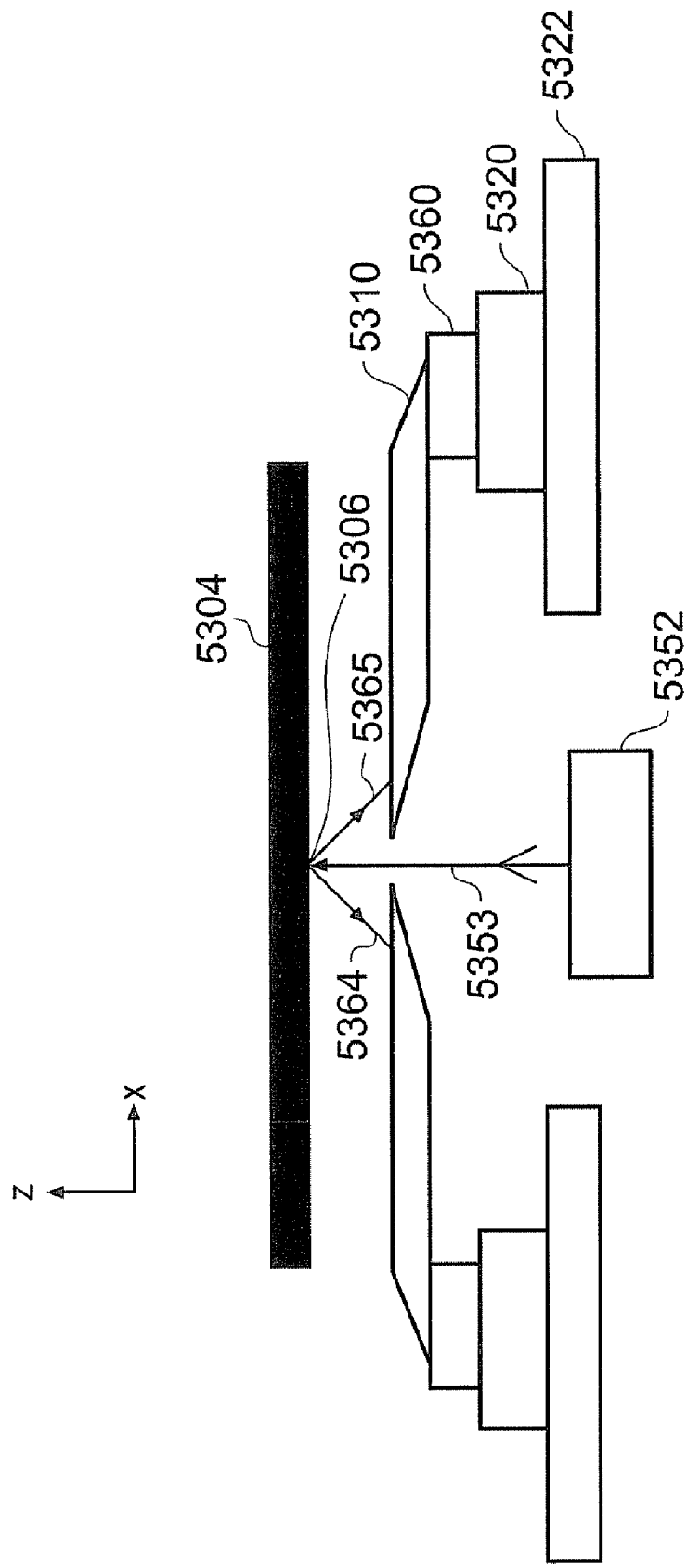
FIGS. 53*a* to 53*e* illustrate a scanner apparatus detector optics system using a lightpipe.

FIG. 53a shows schematically a scanner apparatus using a lightpipe based light collection system. In this system, a light source 5352, such as that discussed above with reference to element 952 in FIGS. 9 and 11 above. The light source 5352 causes a linearly focussed coherent beam 5353 to be directed to a target surface of an article 5304. In FIG. 53a, the focus of the coherent beam is arranged to be point focussed in the x-direction when the target surface is at the correct range in the z-direction, and to be linearly focussed in the y-direction (normal to plane of the Figure). The coherent beam 5353 is therefore incident onto the target surface of the article 5304 at a line, represented by point 5306 in FIG. 53a.

Some of the reflected light 5364 and 5365 from the point 5306 is collected by lightpipes and directed to sensors. The reflected light 5365 enters a lightpipe 5310 and is carried therealong before being output to a sensor array 5320. Optionally, an interference 5360 (as discussed above with reference to FIGS. 13 to 15) may be included to remove interference from background illumination of the article surface. The sensor array 5320 may be a multi-element 1-D photodiode array such as that discussed with reference to FIGS. 13 to 15 above. The sensor array 5320 may be attached to a processing board 5322 for processing the output of the sensors in the array. Such a processing circuit is described above with reference to FIGS. 21 and 22.

The light is captured at a desired numerical aperture by dimensioning the lightpipe such that the light which is captured and transported by the lightpipe corresponds to light from the desired numerical aperture.

Figure 53B:
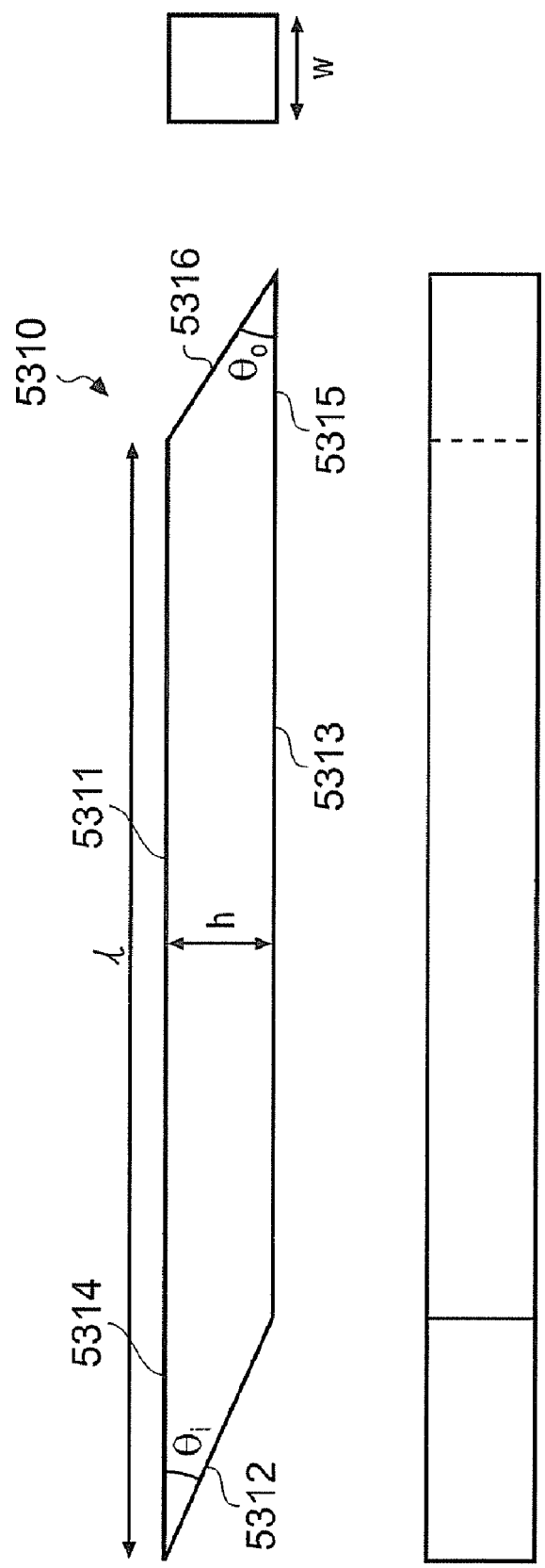

FIG. 53b shows the lightpipe 5310 in greater detail. As can be seen the lightpipe has a length l, a height h and a width w. There is also a light entry portion 5314 through which light reflected from the target surface is received. This light entry portion is on one of the long faces 5311 of the lightpipe. The end 5312 of the lightpipe adjacent the light entry portion 5314 is angled at an angle $\theta_i$ from the long face 5311. In some examples the angle $\theta_i$ is set such that the light to be carried along the lightpipe is reflected off the internal surfaces of the lightpipe by total internal reflection.

At the other end of the lightpipe, the long face 5313 opposite the long face 5311 includes a light exit portion 5315. The end 5316 of the lightpipe adjacent the light exit portion 5315 is angled at an angle $\theta_o$ from the long face 5313. In some examples the length l is set such that the light which it is desired to collect bounces off the long face 5313 immediately prior to reflecting from the end 5316. In some examples, the angle $\theta_o$ is set such that the end 5316 requires a reflective finish to be applied in order to ensure that the light which it is desired to collect is reflected out of the lightpipe through the light exit portion. It will be appreciated that some light carried by the lightpipe will reflect differently and therefore leave the lightpipe at a different angle, but this light is not the light which it is desired to collect. The lightpipe provides that the cone of light which is to be collected has the same divergence leaving the lightpipe as it had when it entered the lightpipe.

In one example, the lightpipe has a length l of 21 mm, a width w of 1 mm and a height h of 1 mm. In that example, the angle $\theta_i$ is 22.5 degrees and the angle $\theta_o$ is 37 degrees. In some examples, the lightpipe can be made from PMMA (polymethylmethacrylate) and can be made by injection moulding. Where injection moulding is used to make the lightpipe, it is desirable for the break-off point from the mould to be at a three-way vertex of the lightpipe so as to minimise the light scattering effect of the rough broken portion. In one example, by casting the lightpipe in a v-oriented mould, the break-off point can be made as small as 100 μm×100 μm. If the mould used to cast the lightpipes has a polished internal surface, this is transferred to the moulded plastic such that there is no need to polish the lightpipe after casting in order to facilitate the total internal reflection.

Figure 53C:
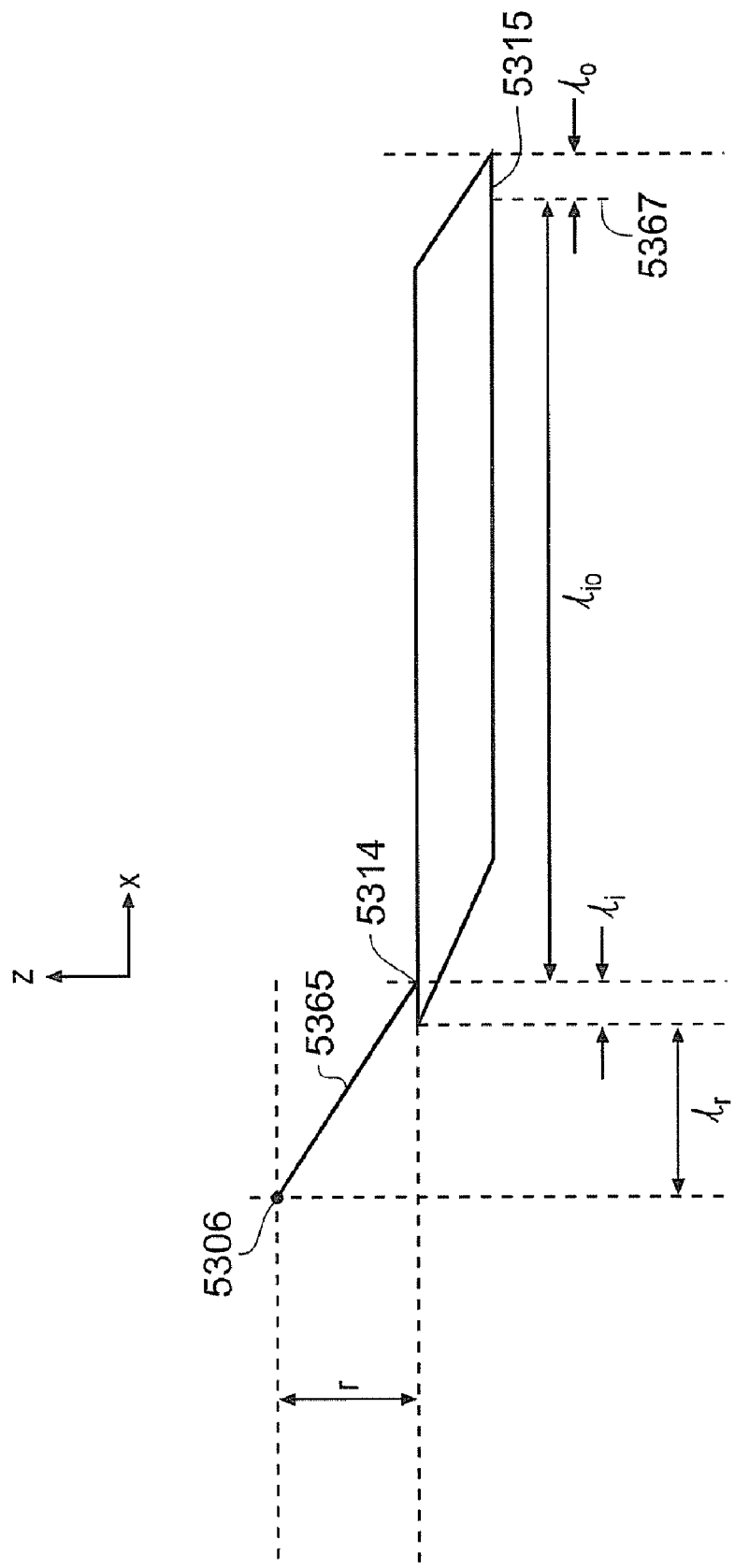

The lightpipe of this example is further illustrated in FIG. 53c. In FIG. 53c, the incident laser line 5306 on the target surface is indicated by point 5306. The reflected light 5365 is then received at the light entry portion 5314 of the lightpipe. The light then leaves the lightpipe through the light exit portion 5315 as indicated by line 5367. The lines 5365 and 5367 in FIG. 53c illustrate only the central axis of the light collected and carried by the lightpipe.

In this example, the central axis of the incoming light 5365 enters the lightpipe at a distance $l_i$ from the end of the lightpipe, and exits a distance $l_o$ from the other end of the lightpipe. The light is therefore carried for a distance of $l_{io}$. The range from the target surface to the lightpipe in the z-direction is therefore r for an x-direction offset from the incident line 5306 of $l_r$. This ration is related to the angles of the ends of the lightpipe and the desired internal reflection angles within the lightpipe. In the present example, the range r is 3.5 mm for an x-direction offset $l_r$ of 2.5 mm. The length $l_i$ is 1 mm, the length $l_o$ is 0.7 mm and the length $l_{io}$ is 21.6 mm.

The reading range of a scanner incorporating the lightpipe can be adjusted by using a relaying lens to focus the reflected light from the surface onto the location of spot 5306 in FIG. 53b. In some examples, a longer reading range could be achieved by mounting a conventional camera lens to a reader system such that the range r of the lightpipe corresponds to the position which would be held by the film plane if that lens were in a camera.

In some examples, all of the surfaces of the lightpipe can be provided with a reflective surface. This allows more freedom of the angles from which the incident light is collected but increases the cost of the lightpipe. It will be appreciated that where total internal reflection is used to convey light through the lightpipe, the light entry and exit portions are no different to the long faces 5311 and 5313. However, where the surfaces are to be mirror finished, the light entry and exit portions require that a gap is left in the mirror finish for the light to enter and leave the lightpipe.

Where a number of lightpipes are to be arranged adjacent one another, such as where a multi-element 1-D sensor array is to be used, the lightpipes can simply be located adjacent one another. However, it has been found that the lightpipes cannot be joined by adhesive or any means which creates a liquid-type bond between the lightpipes if total internal reflection is to be relied upon for carrying the light down the lightpipe. This illustrates that whilst the lightpipes should preferably have optically smooth surfaces to effect the total internal reflection, some surface roughness is required to keep the light in the lightpipe. This if it is desired to adhere the lightpipes together, the surfaces must be mirrored to ensure that the light is carried successfully. If the cost and processing of mirroring the surfaces is preferred to be avoided, the lightpipes can be held together mechanically, for example with a clamp.

Figure 53D:
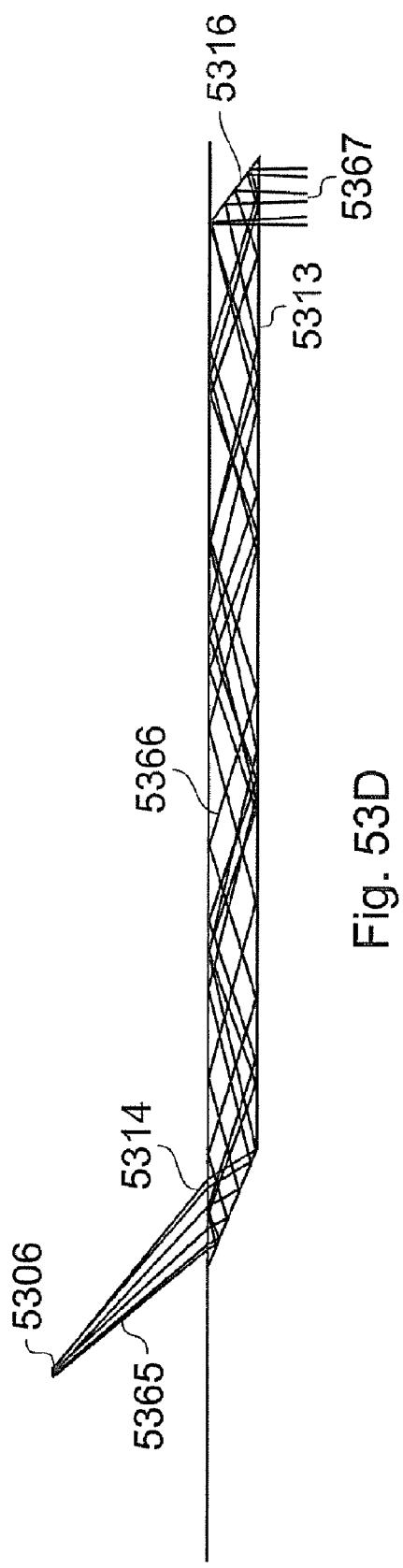
Figure 53E:
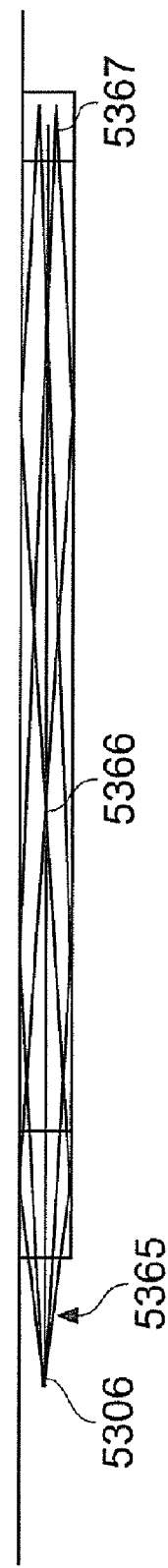

The passage of the light along the lightpipe is illustrated in the raytrace type FIGS. 53d and 53e. In these figures only the light which it is desired to collect is illustrated. It can clearly be seen that the light is carried along the lightpipe and that it reflects off the surface 5313 immediately prior to reflecting off the end surface 5316 to be directed out of the light exit portion. It can also be seen the divergence of the light leaving the lightpipe is the same as that entering the lightpipe.

If the optional interference filter 5360 is used in the detector, this can have a very narrow passband, as discussed above. Also, an interference filter with a narrow passband is very sensitive to the direction of incident light, as light which approaches the filter at an angle other than the normal to the filter appears to have a different wavelength. Thereby, the interference filter can exclude light carried by the lightpipe which is outside of the desired angular range to achieve the desired numerical aperture for capture. Additionally, if the captured data is to be used in a conventional imaging type way, for example for pattern matching, as discussed above, the crosstalk between the different sensors in the sensor array can be reduced by the angular exclusion of an interference filter.

The use of a lightpipe in a scanner system as described above provides a reduced degree of positional misplacement sensitivity compared to a lens-based system. In particular, if the article is misplaced in the z-direction or if the light is incident upon the wrong part of the target (which are effectively the same thing optically) then the same amount of light is captured as if that error had not occurred. The light captured will be reflected from a part of the target other than the intended part, but as a relatively large area of the target is scanned to create the signature, almost all of the parts of the target which it was intended to capture will be captured, just shifted in space slightly. As the signature matching in fact requires a bit-shift between a candidate signature and a record signature, this shift should have no effect on the accuracy of a signature match.

With reference to FIGS. 13 to 15 and 53 above, the detector optics could have an alternative configuration based on use of fibreoptic lightguides and a distributed sensor array. An example of such a system is shown in FIGS. 54a to 54c.

Figure 54A:
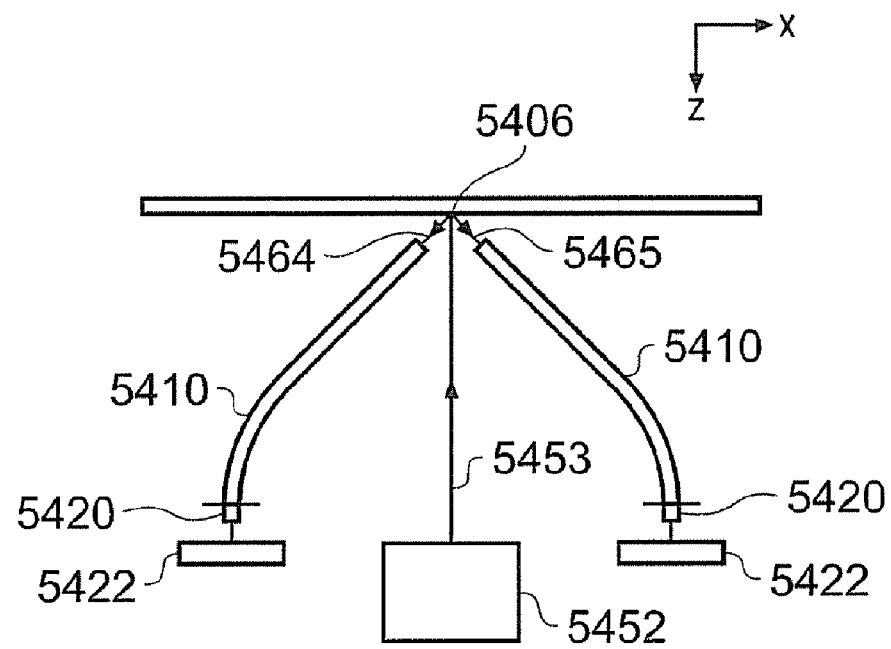
FIGS. 54*a* to 54*c* illustrate a scanner apparatus detector optics system using fibreoptic lightguides.
Figure 54B:
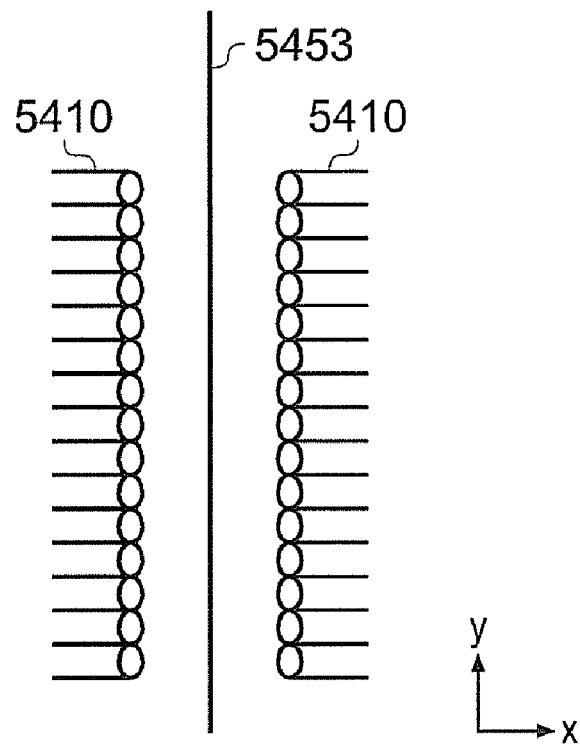
Figure 54C:
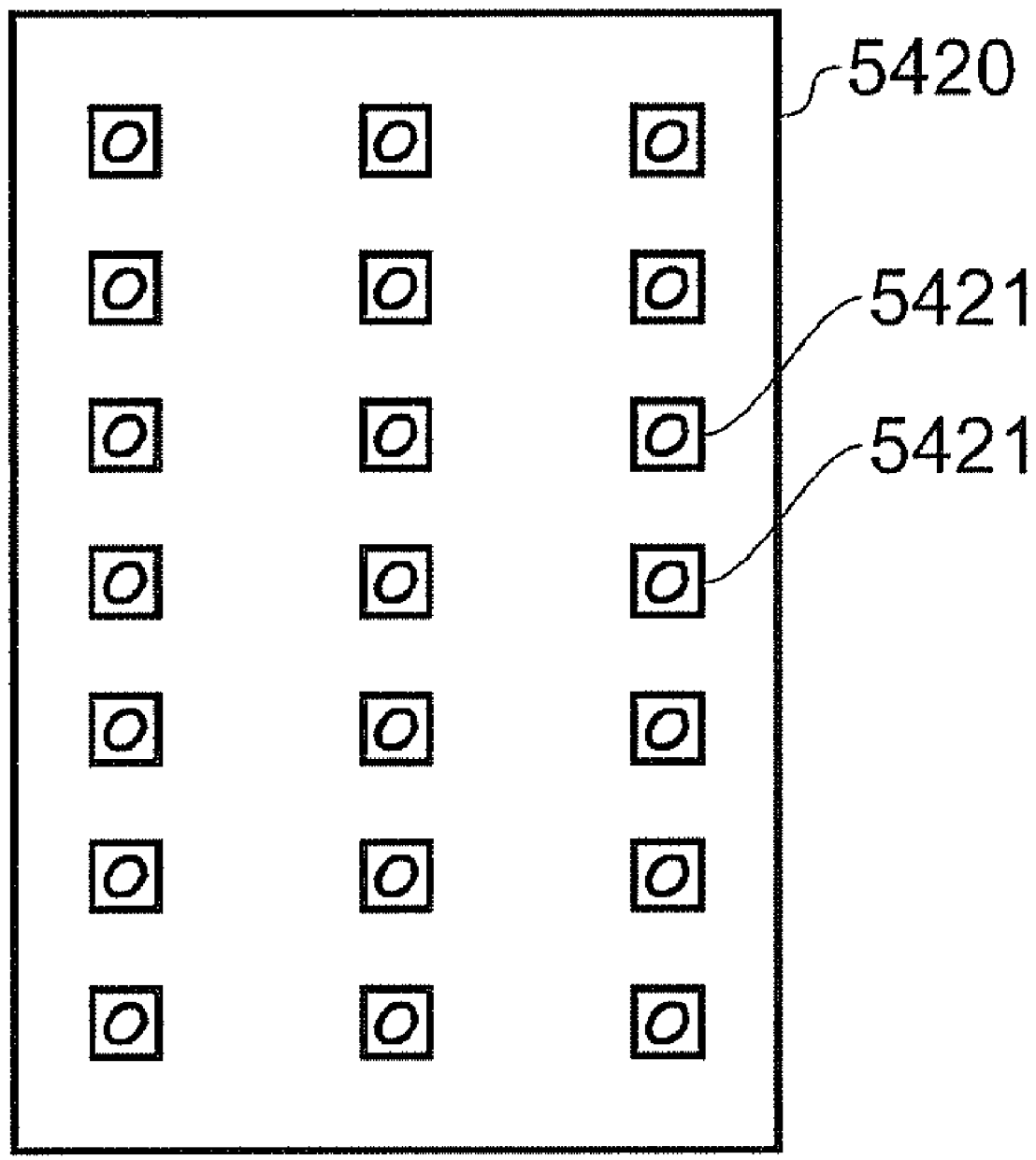

FIG. 54a shows schematically a scanner apparatus using a fibreoptic lightguide based light collection system. In this system, a light source 5452, such as that discussed above with reference to element 952 in FIGS. 9 and 11 above. The light source 5452 causes a linearly focussed coherent beam 5453 to be directed to a target surface of an article 5404. In FIG. 54a, the focus of the coherent beam is arranged to be point focussed in the x-direction when the target surface is at the correct range in the z-direction, and to be linearly focussed in the y-direction (normal to plane of the Figure). The coherent beam 5453 is therefore incident onto the target surface of the article 5404 at a line, represented by point 5406 in FIG. 54a.

Some of the reflected light 5464 and 5465 from the point 5406 is collected by fibreoptic lightguides and directed to sensors. The reflected light 5465 enters a fibreoptic lightguide 5410 and is carried therealong before being output to a sensor array 5420. In the present example the fibreoptic lightguides 5410 comprise a set of such lightguides arranged adjacent one another extending along axis normal to the page of FIG. 54a such that reflected light from a number of positions along the indicence line 5406 of the light beam 5453 onto the target surface 5404 (this is shown in greater detail in FIG. 54b). Optionally, an interference filter (not shown) (as discussed above with reference to FIGS. 13 to 15) may be included to remove interference from background illumination of the article surface. The sensor array 5420 may be a multi-element 1-D photodiode array such as that discussed with reference to FIGS. 13 to 15 above. Alternatively, as the fibreoptics lightguides do not have to remain directly adjacent one another, the sensor array 5420 may comprise a number of individual sensors mounted to some form of supportive substrate. The sensor array 5420 may be attached to a processing board 5422 for processing the output of the sensors in the array. Such a processing circuit is described above with reference to FIGS. 21 and 22. In the example of the sensor array being a number of individual sensors, the sensors may be mounted directly to the processing board 5422.

The light is captured at a desired numerical aperture by selecting an appropriately dimensioned fibreoptic lightguide positioned at an appropriate distance from the intended position of the target surface. The skilled reader of this specification will appreciate that a fibreoptic lightguide of a given diameter will have an effective numerical aperture dependent upon the distance of the end of the fibreoptic from the light source (in this case the point of reflection from the target surface). Thereby the light which is captured and transported by the fibreoptic lightguide corresponds to light from the desired numerical aperture.

FIG. 54b shows an example of how the scanner apparatus of FIG. 54a appears from the viewpoint of the target surface 5404. Thus there is visible the line of point-focussed light 5453 and the two arrays of fibreoptic lightguides 5410. Thereby, the adjacent relationship of the fibreoptic lightguides at the light entry end thereof can be seen.

FIG. 54c shows an example of the sensor array 5420. In the present example, the sensor array comprises a number of individual photodiodes 5421 spaced apart from one another. One fibreoptic lightguide 5410 can be connected to each individual photodiode 5421 so as to provide for capture of the light carried by each fibreoptic lightguide. The fibreoptic lightguides can be connected to the photodiodes in any pattern so long as that pattern is known to the processing circuit which analyses the captured light and resultant data so that the data can be assembled in order. By providing a spacing between the photodiodes, the possibility of any inter-channel interference or crosstalk which may occur if the photodiodes are placed directly adjacent one-another can be avoided.

In the present example, the fibreoptic lightguides are approximately 1 mm in diameter and are made from PMMA (poly-methyl-methacrylate). In other examples, the lightguides may have different diameters to provide different options for distance from target and numerical aperture of light capture, and/or may be made of other materials such as other transparent or translucent plastics or from glass.

The number of fibreoptic lightguides 5410 used in the scanner apparatus can be adjusted to provide a trade-off between greater translational inaccuracy in positioning of the target relative to the sensor (i.e. mispositioning in the y-direction) (by having a larger number of lightguides), and size of the scanner unit (by having a smaller number of lightguides). An outer housing for the scanner apparatus could be made in any convenient size and shape for an application in which it is to be deployed.

Thus there has now been described examples of further scanner apparatuses which may be used to capture scan information describing a target surface in accordance with the presently described systems.

In some examples it may be possible to determine a class signature for a material type of which an article is made. This will now be discussed in greater detail with reference to FIGS. 55 to 61.

Figure 55A:
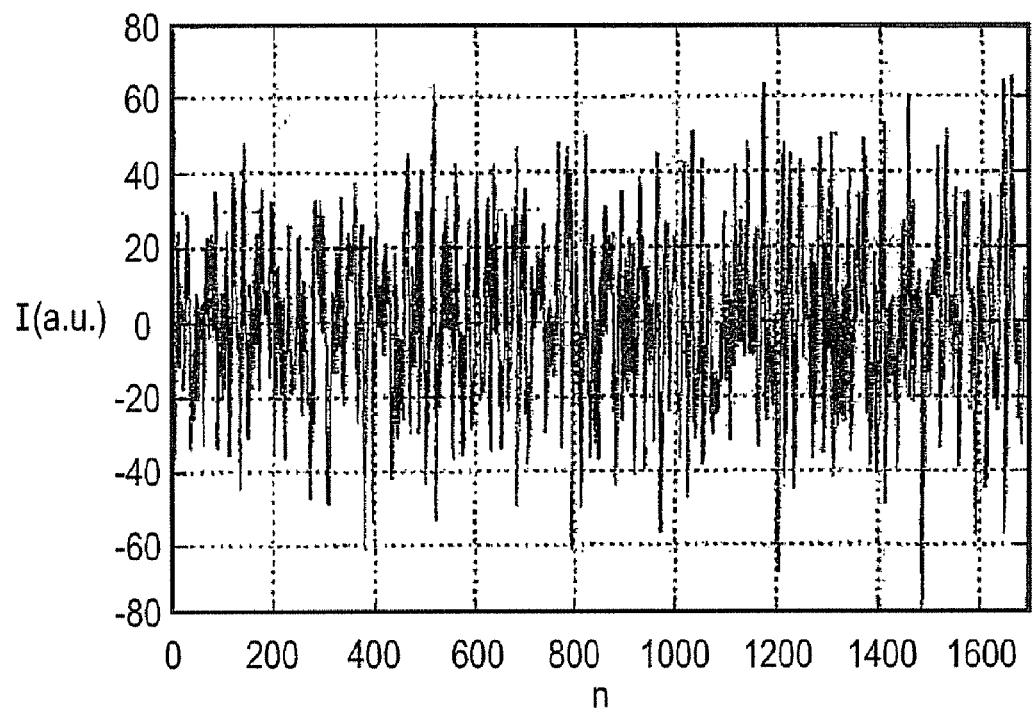
FIG. 55A shows data a set of data points taken from a single photodetector after linearisation with the encoder signal.

One example of a material which can produce a class signature is paper. For papers, the class signature is related to repeated patterns in the surface, such as might be produced by a grid on which the paper was carried during production, such as a drying grid. FIG. 55A shows data a set of data points taken from a single photodetector of a scanner as described above, for example with reference to FIG. 9, after linearisation. The point number of the x-axis corresponds to data points sampled from a standard A4 sheet of paper placed in the reading volume and scanned by the coherent beam.

Figure 55B:
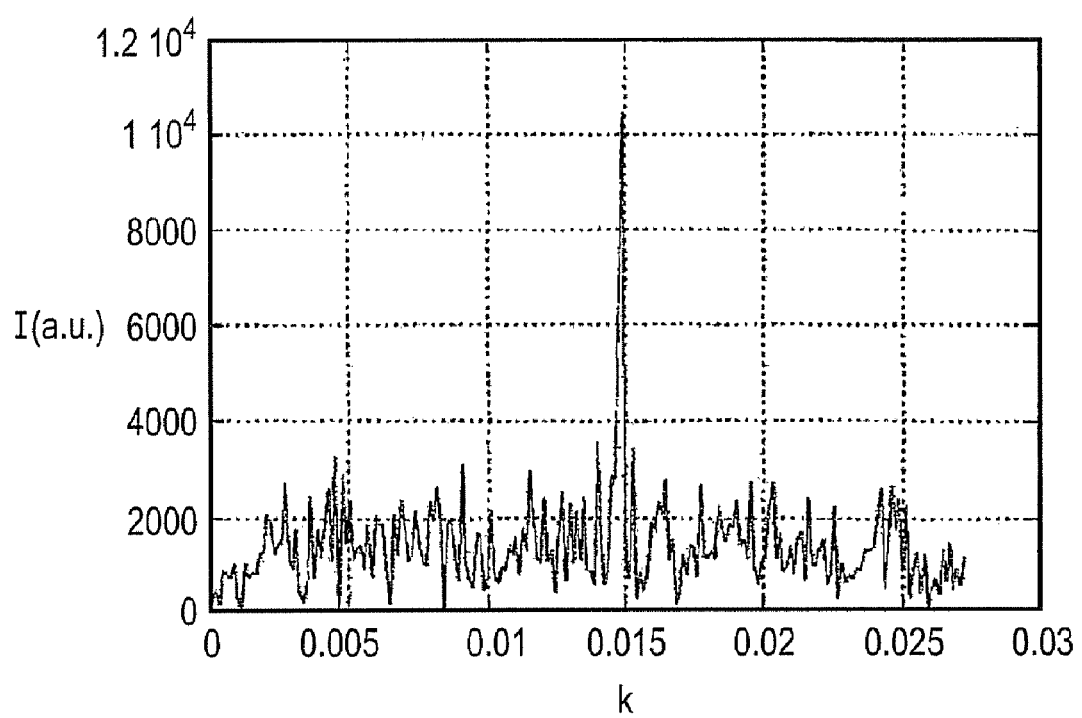
FIG. 55B shows a FT of the set of data points shown in FIG. 55A.

FIG. 55B shows a Fourier transform (FT) of the linearised set of data points shown in FIG. 55A.

While the data points in FIG. 55A appear to be largely random, one notices in FIG. 55B a strong peak at a wavelength of 422 μm. The same class signature has been derived at different places on the surface of the same paper sheet, and for different sheets taken from the same ream. A similar scan and FT using a sheet of paper from a different manufacturer yielded a peak wavelength of 287 μm, indicating how the peak wavelength can be used to provide a class signature that can discriminate between papers made on different meshes.

The wavelength of the FT peak is found to depend upon the direction in which the paper is oriented with respect to the coherent beam scan direction. For example, the first paper sheet yielded a peak wavelength of 422 μm when scanned in the 'portrait' orientation, and a peak wavelength of 274 μm when scanned in the 'landscape' orientation. Additionally, one side of the paper often gives a stronger FT peak than the other side. This is believed to be due to the stronger surface corrugations arising on the side of the paper which was in contact with the mesh during the paper's manufacture.

Robustness tests have been performed on paper in order to see if natural and intentional degradation and damage to the paper causes the class signature to change or become unreadable. In particular, paper sheets have been crumpled and subjected to strong surface rubbing. No strong change was found in the class signature, although more noise appeared at the lower wavelength end of the spectra. We have also exposed the paper to high pressure steam in a medical autoclave. While the FT peak was still clearly visible after autoclaving, its wavelength was found to have reduced by 1.7% from 426 μm to 418 μm. This is attributed to shrinking of the paper fibres upon drying out from the steam. Visual inspection of the paper showed it to have strongly degraded in the autoclave. However, this degree of damage is not expected for normal applications.

Figure 56A:
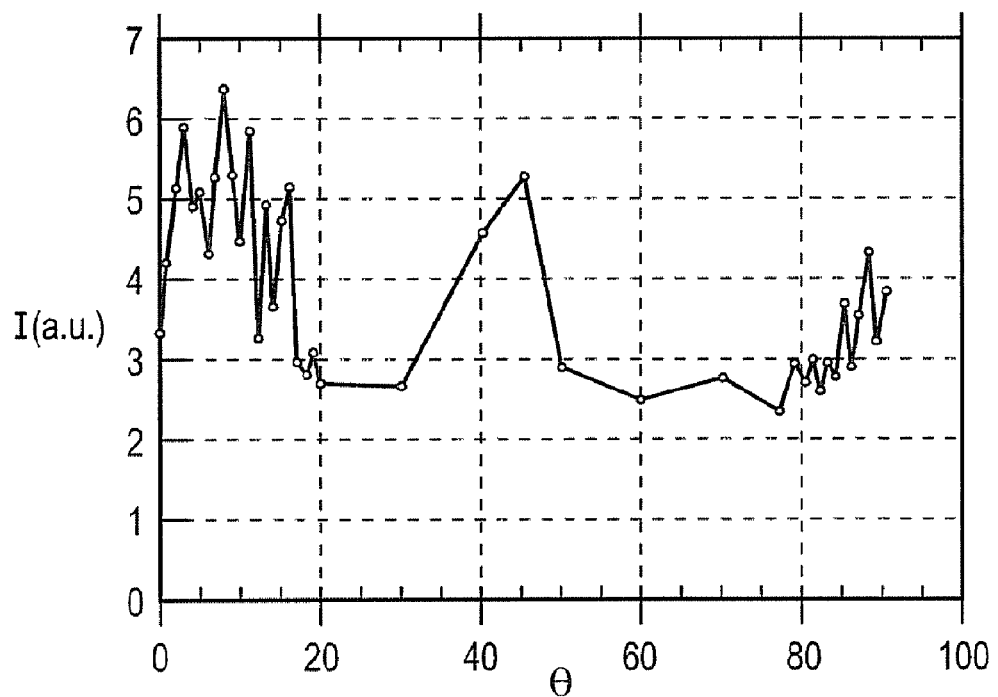
FIG. 56A shows how the amplitude of an FT peak varies as paper is rotated with respect to a scan direction.

FIG. 56A shows how the amplitude of an FT peak varies as the paper is rotated through 90° with respect to the scan direction. The indentations of the paper are believed to form a rectangular grid of dimensions 408 μm×274 μm. At 0° the beam scanning direction is normal to the 408 μm periodically spaced grid indentations. Strong signals appear at about 0°, 45° and 90°. The 90° signal arises when the scanning direction is normal to the 274 μm periodically spaced grid indentations.

Figure 56B:
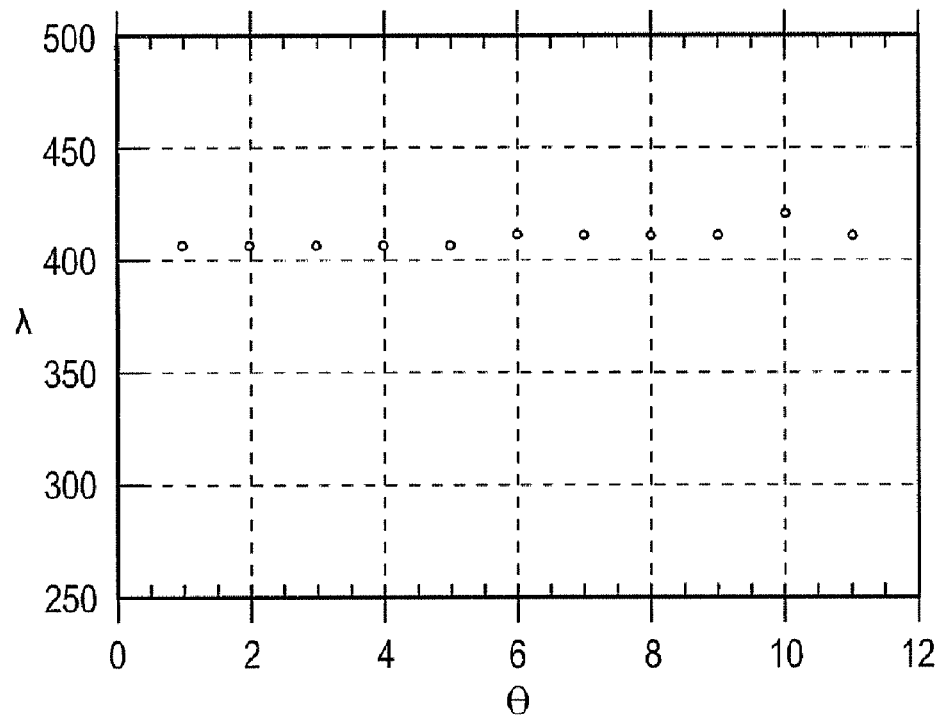
FIG. 56B shows how the wavelength of a strongest FT peak varies with angle as paper is rotated with respect to a scan direction.

FIG. 56B shows how the wavelength of the strongest FT peak varies with angle from as the paper is rotated with respect to the scan direction. The wavelength of the strongest FT peak is pretty much constant at around 408 μm as the angle is rotated from 0° to about 10°. It has been found that the peak in the FT corresponding to the class signature is best detected when the scanning laser direction is within approximately ±10° of the long axes of the surface ripples coming from the fabrication mesh. This is because the projection of the elongated laser spot (approximately 2 mm long) becomes comparable to the spacing between ripples once the rotation angle exceeds about 10°.

Figure 57:
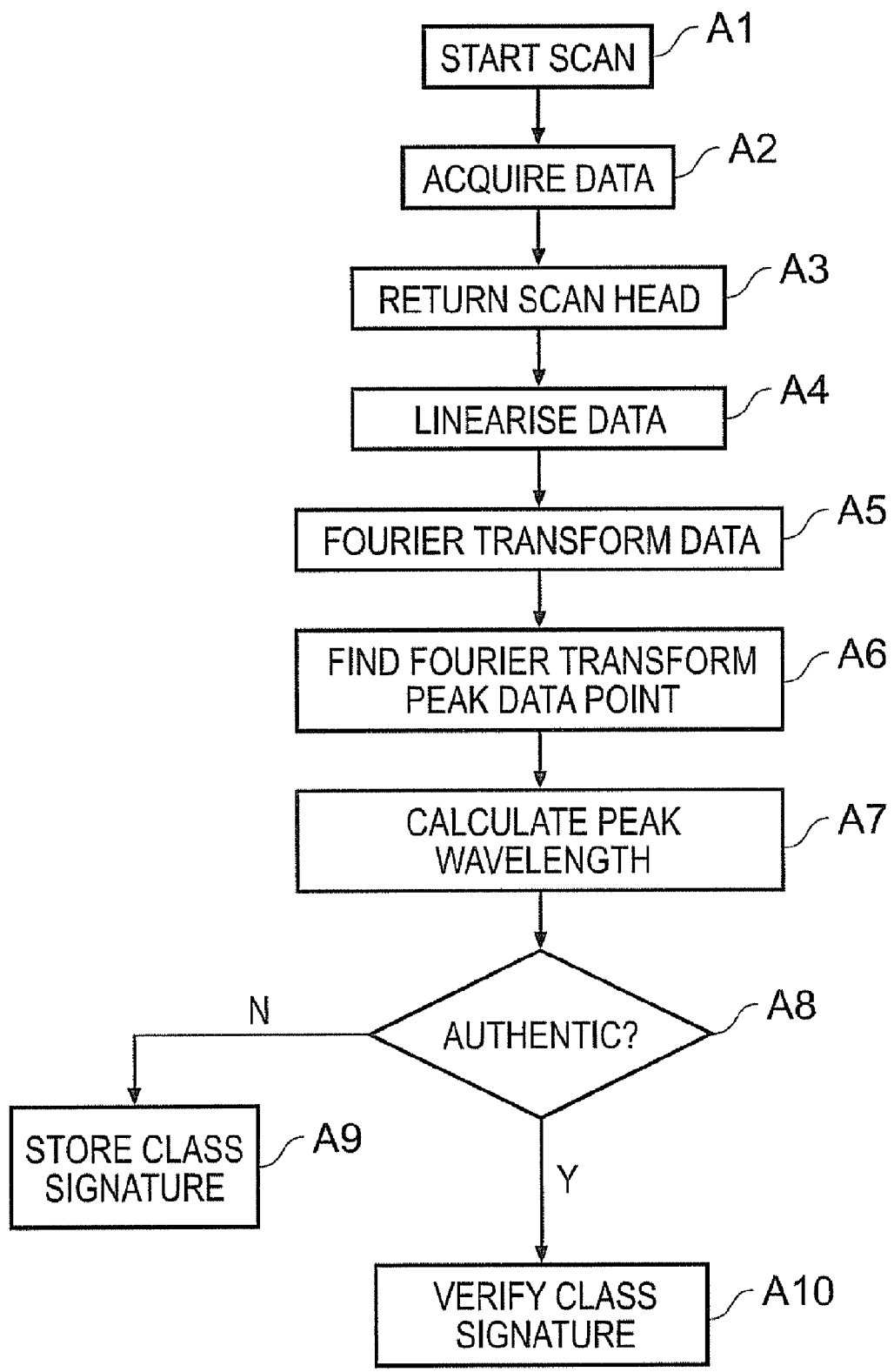
FIG. 57 shows a flow diagram showing how a class signature is measured from an article and authenticated or recorded.

FIG. 57 is a flow diagram showing how a class signature can be measured from an article and authenticated or recorded.

Step A1 is the initial step during which the scan motor is started. The scan motor is programmed to move at speed v.

Step A2 is a data acquisition step during which the optical intensity at each of the photodetectors is acquired approximately every 1 ms during the entire length of scan. In the present example, only one point on the target surface is monitored. The time interval between sample points is Δt. Simultaneously, the encoder signal is acquired as a function of time. It is noted that if the scan motor has a high degree of linearisation accuracy (e.g. as would a stepper motor) then an encoder signal need not be acquired. The number n of data points per detector channel collected in each scan is defined as N in the following. Further, the value $a_k(i)$ is defined as the i-th stored intensity value from photodetector k, where i runs from 1 to N. An example of a raw data set obtained from such a scan are illustrated in FIG. 16.

Step A3 is a return scan head step. The scan motor is reversed to reset the scanning mechanism to its initial position in preparation for a subsequent scanning operation.

Step A4 is an optional linearisation step. If performed, this step applies numerical interpolation to locally expand and contract $a_k(i)$ so that the encoder transitions are evenly spaced in time. This corrects the set of data points for local variations in the motor speed.

Step A5 is a FT step in which an FT amplitude spectrum $A_k(i)$ of the Fourier Transform of $a_k(i)$ is calculated. This step applies a fast Fourier transform (FFT) to individual ones of the k sets of data points. Optionally, an averaged FT amplitude spectrum can be calculated from respective of the k individual amplitude spectra.

Step A6 is an identification step in which the value of i which maximises $A_k(i)$, excluding i=0 (the DC component), is identified. This index, $i_{peak}$, is identified in the PC 34 under computer program control.

Step A7 is a calculating step in which the wavelength associated with $i_{peak}$ is determined according to the equation $\lambda_{peak}=2\pi/(i_{peak} \times v\Delta t)$. The peak wavelength $\lambda_{peak}$ is then used as the class signature.

Step A8 is a decision point. If an article is having its class signature recorded the next step will be Step A9. Whereas if an article is being authenticated by a measurement of its class signature the next step will be Step A10.

Step A9 is a step of storing a class signature. A record comprising the class signature value $\lambda_{peak}$ associated to a description of the paper is stored in a database. The database may be remotely located from the optical reader apparatus, and the record may be securely encrypted prior to transmission therebetween.

Step A10 is a step of verifying a class signature. In this step, $\lambda_{peak}$ is compared with all entries in the database, until a match is found to within a predefined error margin. The record entry description for the matching paper type can then be output, if any is found. If no matching entry is found, the search may optionally be extended to other databases. Optionally, a negative result output may be returned. Optionally, whether or not any class match is found, an analysis may subsequently be performed to determine whether a characteristic signature from the article matches a predetermined characteristic signature in order to attempt to uniquely identify the article.

Thus a system for determining and using a class signature for an article has now been described.

Some of the above examples relate to a linear scanner in which the article is scanned in one direction only. In some such a scanners the article needs to be aligned in a controlled and reproducible manner. A rotary scanner which addresses this restriction by scanning all possible directions will now described.

Figure 58B:
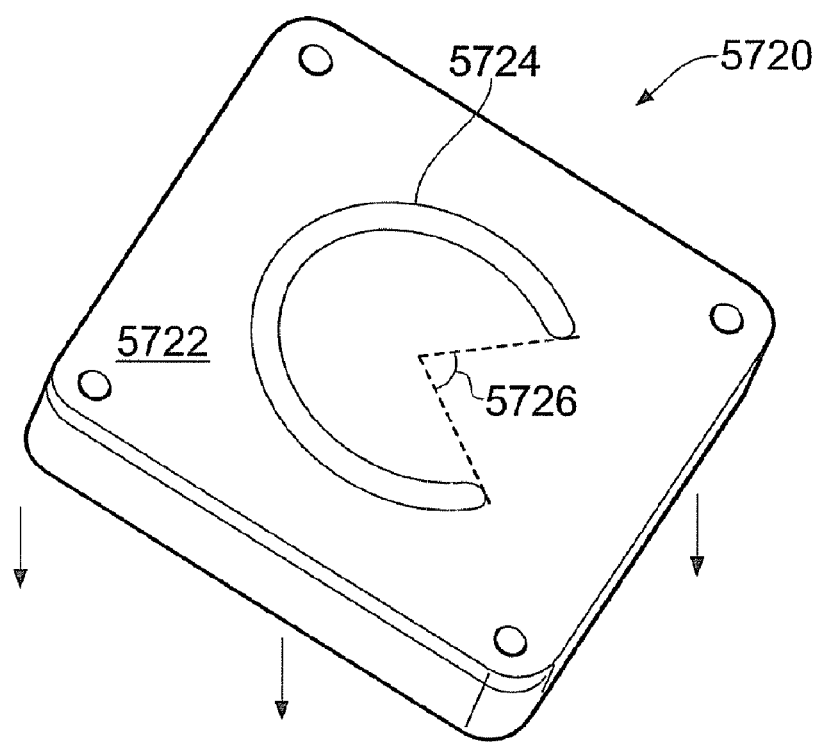
FIG. 58B shows a lid for fitting to the housing of the rotary scanner shown in FIG. 58A.
Figure 58A:
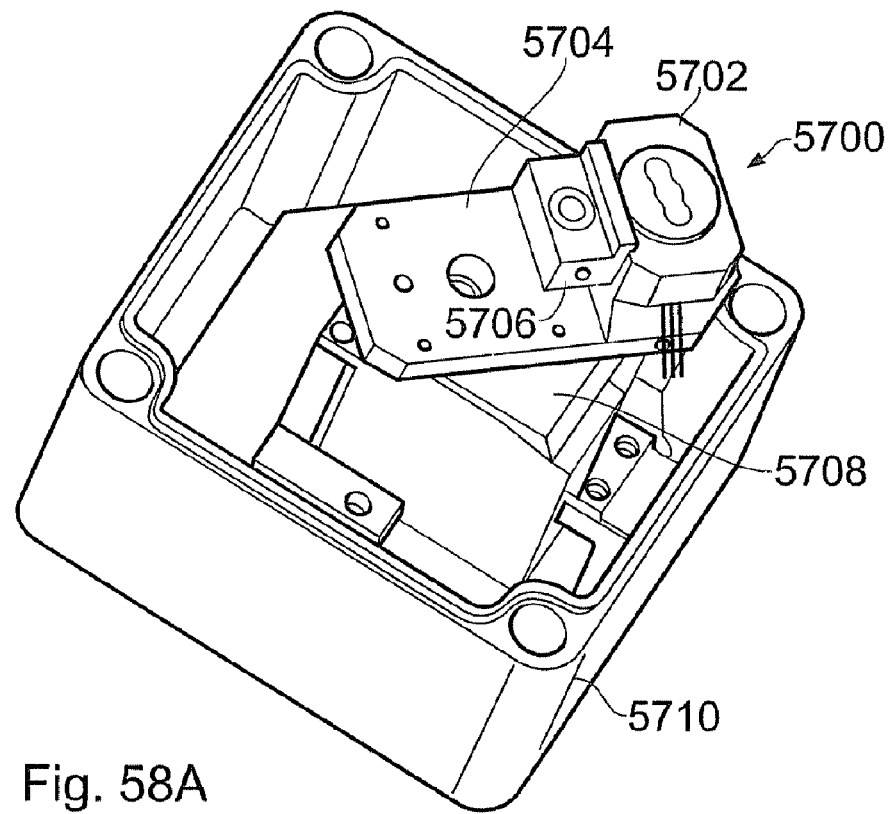
FIG. 58A shows a rotary scanner for use in a rotary scanning apparatus for determining a class signature from an article.

FIG. 58A shows a rotary scanner 5700 for use in a rotary scanning apparatus for determining a class signature from an article made of paper or cardboard. The scanner 5700 comprises a scan head 5702 rotatably mounted in a housing 5710. The scan head 5702 is mounted on a rotating arm 5704 adjacent a position encoder module 5706. The rotating arm is operably coupled to a drive motor 5708.

FIG. 58B shows a lid 5720 for fitting to the housing 5710 of rotary scanner 5700 shown in FIG. 58A. The lid 5720 comprises a flat face portion 5722 having an arcuate slot 5724 defined therein. The arcuate slot 5724 subtends an angle of 360° minus the angle 5726. In this embodiment, the arcuate slot 5724 subtends an angle of 270°. This allows the scan head 5702 to scan over approximately 270 degrees of an arc, thus sampling all possible orientations of the paper.

The rotary scanning apparatus shown in FIGS. 58A and 58B can be incorporated into scanning system similar to the linear scanning apparatus previously described. In this case, the linear scanning apparatus sensing system is replaced by the rotary version of FIGS. 58A and 58B, whilst the data processing apparatus is reprogrammed to implement the method described below in relation to FIG. 59.

There are two principal advantages of this arrangement. Firstly, there is no need to know the relative orientation of the paper and the scanner, since the fit between the observed set of spectra and the database of paper types can be done for different starting angles, until a match is obtained. This means that the scanner can be dropped down anywhere on the paper surface and a class signature reported. Secondly, a greater level of security is provided, since the class signature can now be composed of a combination of features taken from different scan directions. For example, the transformed set of data points forming the class signature could be used to pick out the two distinct periodicities of a rectangular mesh structure. Another example would be to determine the order of rotational symmetry of a mesh, such as to identify a hexagonal mesh of a given periodicity and distinguish it from a square mesh of the same periodicity.

Figure 59A:
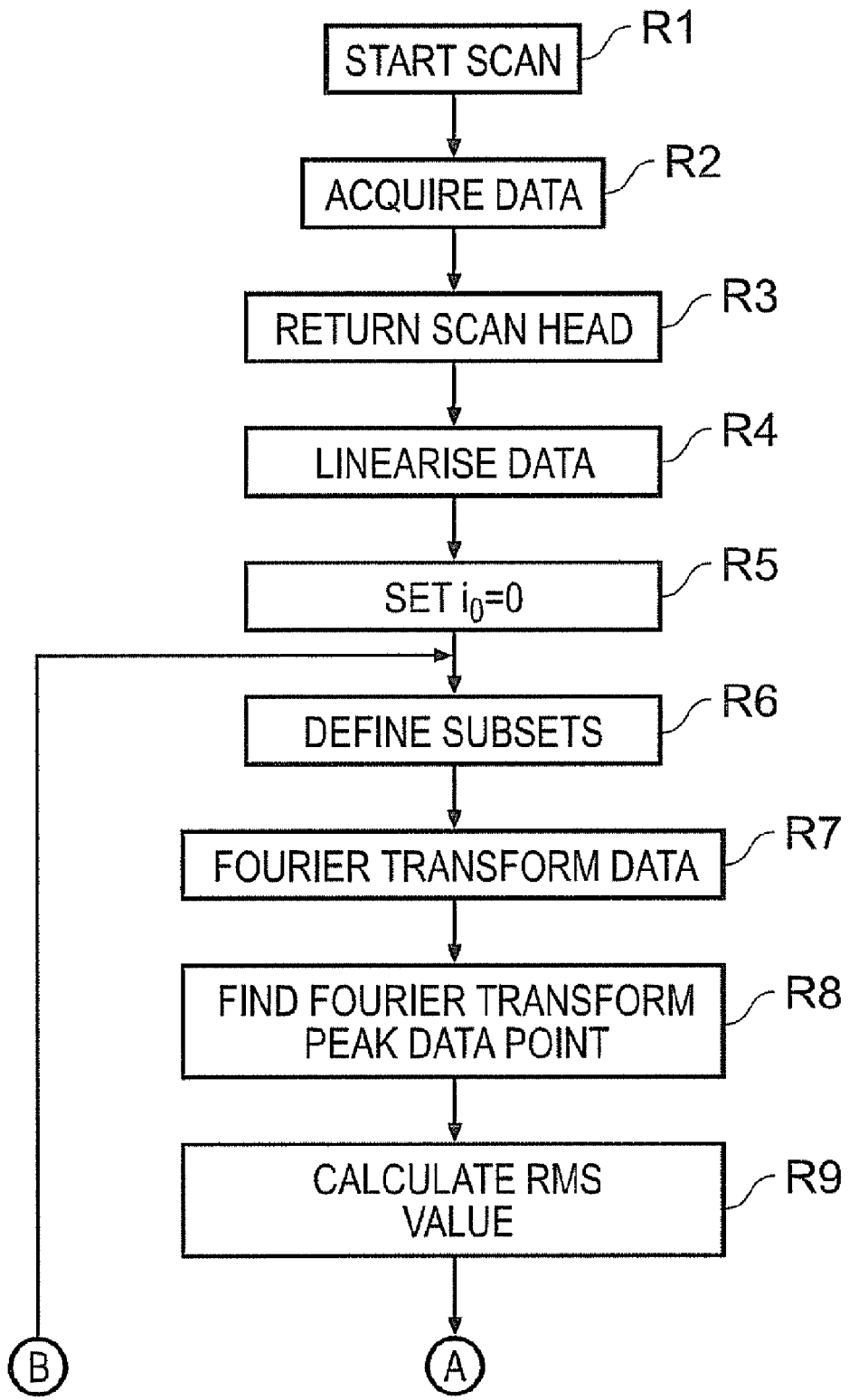
FIGS. 59A and 59B together illustrate a flow diagram showing how a class signature is measured from an article using a rotary scan and authenticated or recorded.
Figure 59B:
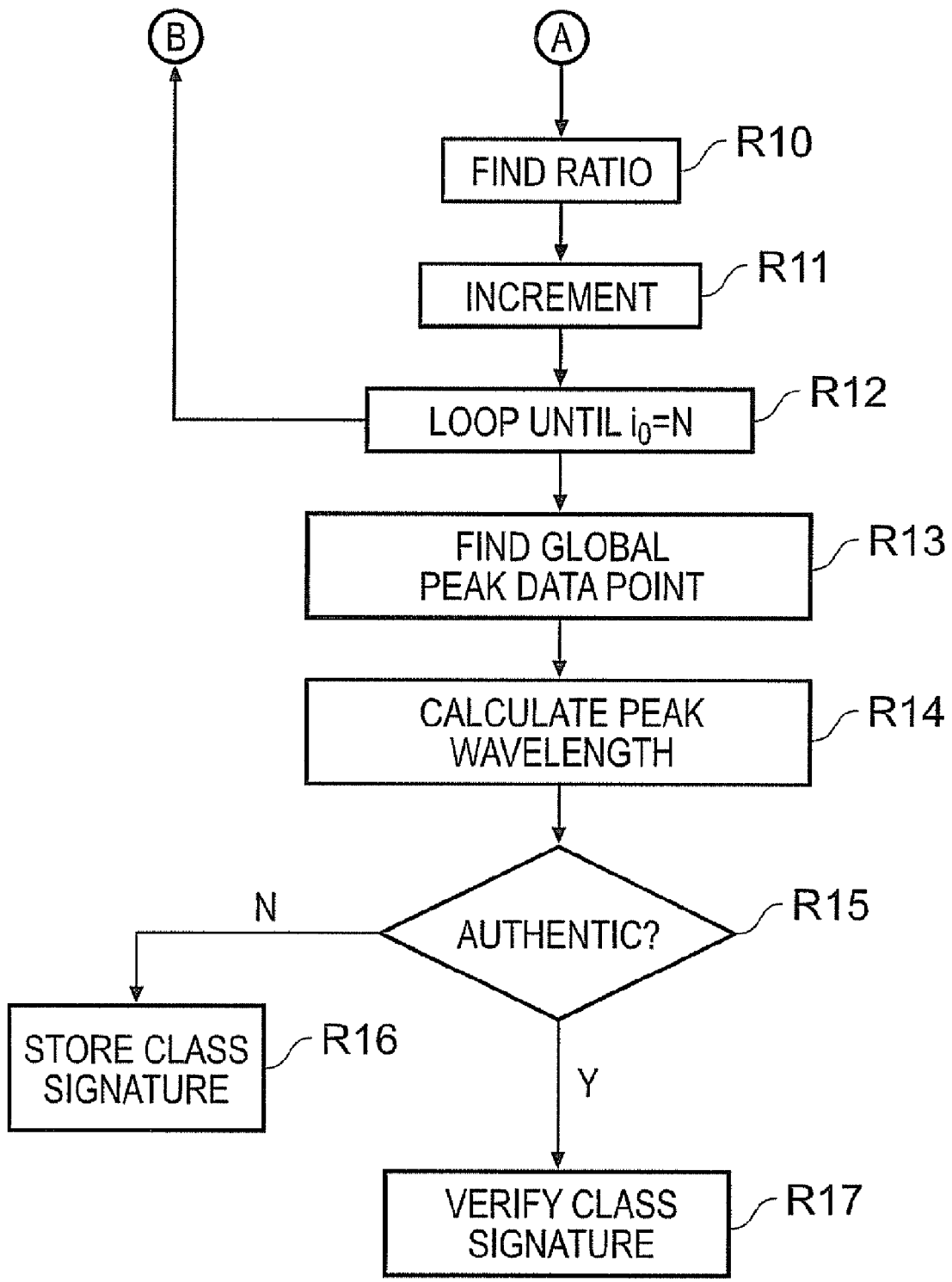

FIGS. 59A and 59B together illustrate a flow diagram showing how a class signature is measured from an article using a rotary scan and authenticated or recorded.

Step R1 is the initial step during which the scan motor is started. The scan motor is programmed to move at speed v.

Step R2 is a data acquisition step during which the optical intensity at each of the photodetectors is acquired approximately every 1 ms during the entire length of scan. The time interval between sample points is Δt. Simultaneously, the encoder signal is acquired as a function of time. It is noted that if the scan motor has a high degree of linearisation accuracy (e.g. as would a stepper motor) then an encoder signal need not be acquired. An encoder signal may be provided by detecting when the position encoder module 5706 passes markings provided on the lid 5720 adjacent the slot 5724. The number n of data points per detector channel collected in each scan is defined as N in the following. Further, the value $a_k(i)$ is defined as the i-th stored intensity value from photodetector k, where i runs from 1 to N.

Step R3 is a return scan head step. The scan motor is reversed to reset the scanning mechanism to its initial position in preparation for a subsequent scanning operation.

Step R4 is an optional linearisation step. If performed, this step applies numerical interpolation to locally expand and contract $a_k(i)$ so that the encoder transitions are evenly spaced in time. This corrects the set of data points for local variations in the motor speed.

Step R5 is an initialisation step at which $i_0$ is set to zero.

Step R6 is a step in which subsets of the data points are created from the whole scan. Subsets $b_k(i)$ of $a_k(i)$ which run from $I=i_0-\Delta i$ to $i_0+\Delta I$ are created. As indicated above in connection with FIG. 55B, $\Delta I$ should correspond to approximately 10° of the arc of the scanner.

Step R7 is a FT step in which an FT amplitude spectrum $B_k(i)$ of the Fourier Transform of $b_k(i)$ is calculated. This step applies a fast Fourier transform (FFT) to individual of the k sets of data points. Optionally, an averaged FT amplitude spectrum can be calculated from respective of the k individual amplitude spectra should multiple detectors be provided in the scanner head 5702. Because of the shorter sequences of data used in each transform, the FT peaks are broader and less intense than for the linear scan. Nevertheless, under certain conditions, the set of spectra form a good class signature for the paper.

Step R8 is an identification step in which the value of i which maximises $B_k(i)$, excluding i=0 (the DC component), is identified. This index will be referred to as $i_{peak}$.

Step R9 is a step at which the root mean square (r.m.s.) value of $B_k(i)$ is determined. Calculate the r.m.s value of $B_k(i)$, using:

$$\text{rms} = \sqrt{\frac{1}{2\Delta i + 1} \sum_{i=0}^{i=2\Delta i} (B_k(i))^2}$$

For a given angular scan $\phi$ we find the maximum peak height in the amplitude spectrum and divide it by the r.m.s. value of the amplitude spectrum. This ratio will be referred to as the peak significance, since it indicates how much higher the peak is than the rest of the spectrum. Peak significances below about three to four mean there is no clearly defined peak. Peak significances above about four indicate a well defined peak. If the peak significance is above about three to four, the wavelength at the centre of the peak is measured. If the peak significance is less than about three to four, the data is discarded and the next value of $\phi$ is assessed. Thus a graph of peak wavelength against $\phi$ can be plotted but limited to the parts of the arc where a well defined peak exists. This plot forms the class signature for that scanned paper.

FIG. 56A shows for a real measurement from a sheet of paper the ratio of the amplitude of the strongest peak in the amplitude spectrum to the r.m.s. value of the amplitude spectrum. A clearly significant peak can be seen in the angular range 0-15 degrees, with weaker peaks appearing around 45 degrees and 90 degrees. Focusing on the strongest peak close to zero degrees, FIG. 56B shows the wavelength of this peak as a function of angle. A roughly constant wavelength of 408 μm is found, which forms the class signature for this sheet of paper. The slightly upward curvature in the dependence of wavelength on angle which can be seen in FIG. 56B is due to the 1/cos(angle) projection of the wavelength as the scan direction varies.

Step R10 is a ratio determining step. The ratio $B(i_{peak})$/rms) is calculated.

Step R11 is an incrementing step at which $i_0$ is incremented.

Step R12 is a loop testing step which causes step R6 to be performed again unless $i_0=N$. If $i_0=N$ then step R13 is performed.

Step R13 is a global peak data point determining step at which $i_{peak}$ the value of $i_0$ which maximises the ratio $B(i_{peak})$/rms) is determined.

Step R14 is a calculating step in which the wavelength associated with $i_{peak}$ is determined according to the equation $\lambda_{peak}=2\pi/(i_{peak}\times v\Delta t)$. The peak wavelength $\lambda_{peak}$ is then used as the class signature.

Step R15 is a decision point. If an article is having its class signature recorded the next step will be Step R16. Whereas if an article is being authenticated by a measurement of its class signature the next step will be Step R17.

Step R16 is a step of storing a class signature. A record comprising the class signature value $\lambda_{peak}$ associated to a description of the paper is stored in a database. The database may be remotely located from the optical reader apparatus, and the record may be securely encrypted prior to transmission therebetween.

Step R17 is a step of verifying a class signature. In this step $\lambda_{peak}$ is compared with all entries in the database, until a match is found to within a predefined error margin. The record entry description for the matching paper type can then be output, if any is found. If no matching entry is found, a search may optionally be conducted against other databases. Optionally, a negative result may be output. Optionally, whether or not any class match is found, the an analysis may subsequently be performed to determine whether a characteristic signature from the article matches a predetermined characteristic signature in order to attempt to uniquely identify the article.

Figure 60:
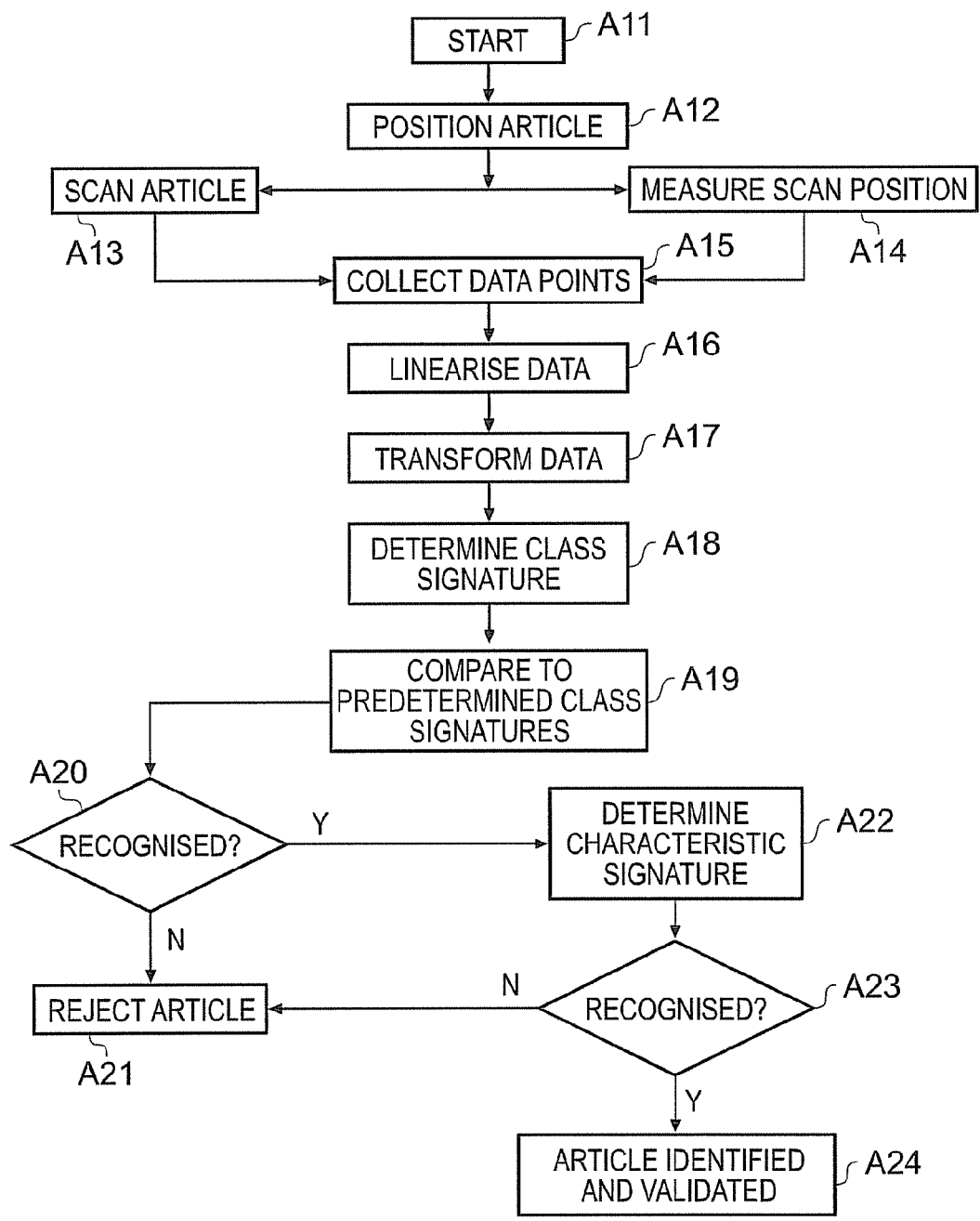
FIG. 60 is a flow diagram showing how an apparatus using a class signature operates.

FIG. 60 is a flow diagram showing how an example of an apparatus making use of an item class signature may operate.

Step A11 is the start of the process.

Step A12 is a step of positioning an article to be analysed in a reading volume. This step can be performed manually or automatically. For example, a sheet feeder may be used to position paper/cardboard articles in the apparatus reading volume or a hand-held scanner can be placed on the article.

Step A13 is a step of scanning the article. In one example this involves moving the beam with respect to the article using a linear scan. However, a rotary scan of the type described with reference to FIGS. 58 and 59 may be used to perform this step.

Step A14 is a step of measuring the scan position relative to the reading volume. Information relating to the position of the scanner over the time period of the scan is recorded.

Step A15 is a data collection step during which the set of data points are sequentially populated. Each set of data points from each detectors receiving reflected light from a given scan point are averaged to create an averaged set of data points.

Step A16 is a linearisation step. The set of data points is linearised prior to determining a class signature by using the relative measured position information obtained at step A14 to modify the set of data points in order to ensure that consecutive data points in the set are equally-spaced with respect to time or position of their acquisition during the scan.

Step A17 is a transform step. In this step a fast Fourier transform (FFT) is applied to the averaged set of data points. An FFT, or other transform, may be used to provide a transformed data set comprising one or more peaks.

Step A18 involves determining the class signature. The amplitude peaks of the transform found in step A17 are thresholded to derive a digital signal. This digital signal is used as the class signature.

Step A19 is a comparison step. The class signature is compared to a database of predetermined class signatures stored in a database.

Step A20 is a decision step. If no match for the class signature is found in the database, the apparatus proceeds to step A21. Otherwise, where a match is found for the class signature, the apparatus proceeds to implement step A22 in order to verify the characteristic signature.

Step A21 is a rejection step at which the apparatus can alert an operator of the apparatus that the class signature of the article has not been recognised. The operator may subsequently decide how to act upon this notification.

Step A22 is a step of determining a characteristic signature. This step may comprise steps of determining a characteristic signature such as are described above. However, prior to searching the database for all characteristic signatures in the database to compare to the measured characteristic signature, a subset of the predetermined characteristic signatures can be selected to search. This choice of subset can be performed using the class signature, such that only signatures for articles having the same class signature are searched. This speeds up the search for a match to the measured characteristic signature. Additionally, in this example, the apparatus can use the same sets of data points obtained during the scan to derive both the class and characteristic signatures.

Step A23 is another decision step. If no match for the characteristic signature is found in the database, the apparatus proceeds to step A21 as described above.

Step A24 is a step that is reached if both the class and characteristic signatures are recognised. At this step various indicia or actions may occur. For example, an indication that the paper/cardboard article has been validly identified may be displayed to an operator of the apparatus, an automatic lock release may be activated, etc. as desired.

FIG. 60A-G show bespoke screens which can be used to create class signatures on different papers. The screens can be used in a standard paper-making process. Imprints may be provided to provide a desired class signature. Such imprints may incorporate one-dimensional or two-dimensional pattern variations. The patterns imprinted may be periodic with a periodicity that is less than, or equal to, the length of a scan in order to ensure that a scanner detects the desired frequency components of the pattern.

The bespoke screens can be used to replace standard paper making screens.

Various techniques and materials for making screens are well known in the art and these may also be used for bespoke screens. For example, screens may be made using wires, plates etc., formed of stainless steel, polymer materials etc.

Figure 61A:
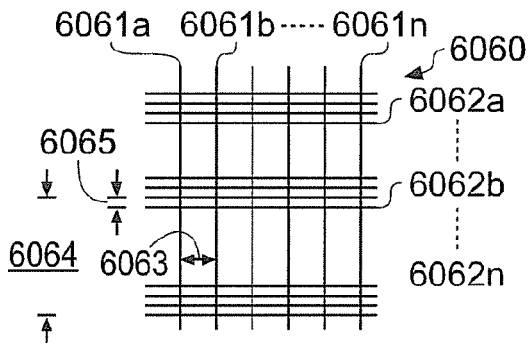
FIGS. 61A to 61G schematically show various bespoke screens embodying the invention.

FIG. 61A shows a first example of a bespoke screen 6060. The bespoke screen 6060 comprises a grid of wires 6061a-n spaced at regular intervals 6063 in a first direction (y-axis). Spaced groups of regularly spaced individual wires 6062a-n are provided at regular intervals 6064 in a second direction (x-axis) transverse to the first direction. The imprint left by this screen 6060 thus has a single frequency component in the first direction. It also has two frequency components in the second direction. The first component reflects the spacing of the groups of wires 6064 and the second the inter-wire spacing 6065.

Figure 61B:
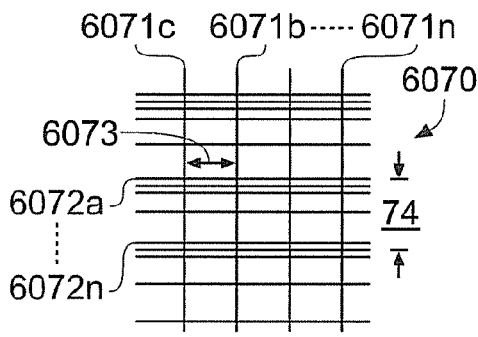

FIG. 61B shows another example of a bespoke screen 6070. The bespoke screen 6070 comprises a grid of wires 6071a-n spaced at regular intervals 6073 in a first direction (y-axis). Spaced groups of wires 6072a-n are provided at regular intervals 6074 in a second direction (x-axis) transverse to the first direction. The groups of wires 6072a-n provided in the second direction are spaced according to a chirped pattern in which the spacing between the individual wires in the group increases linearly.

The imprint left by this screen thus has a single frequency component in the first direction. It also has a spread frequency signal in the second direction which derives from the chirped spatial modulation applied to the wires in the groups 6072a-n, as well as a frequency component derived from the spacing 6074 between the groups in the second direction.

Figure 61C:
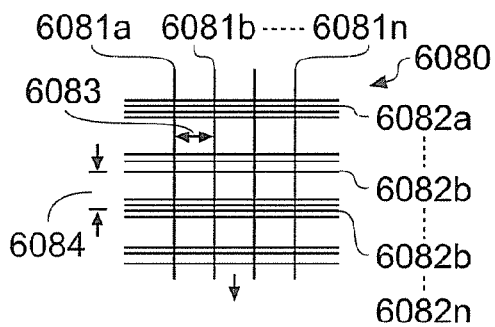

FIG. 61C shows another example of a bespoke screen 6080. The bespoke screen 6080 comprises a grid of wires 6081a-n spaced at regular intervals in a first direction (y-axis). Various groups of wires 6082a-n are provided at regular intervals 6084 in a second direction (x-axis) transverse to the first direction. Where one such group may have been placed, in this embodiment a group 6082c incorporating a more closely packed group of wires is provided.

The imprint left by this screen has a single frequency component in the first direction. It also has a three component frequency signal in the second direction. The first component reflects the spacing of the groups of wires 6084 and the second the inter-wire spacing. However, a third component is also present at a frequency higher than the first component. The third component derives from the closer packing of the wires in the group 6082c.

By detecting the third frequency component, use during paper manufacture of a group of wires having the spacing of the group 6082c can be detected. This can be used to encode a binary signal. Other group inter-wire spacings may also be provided to enable the encoding of a sequence of binary digits or byte. As is well-known, such bytes can be used to encode various information.

Figure 61D:
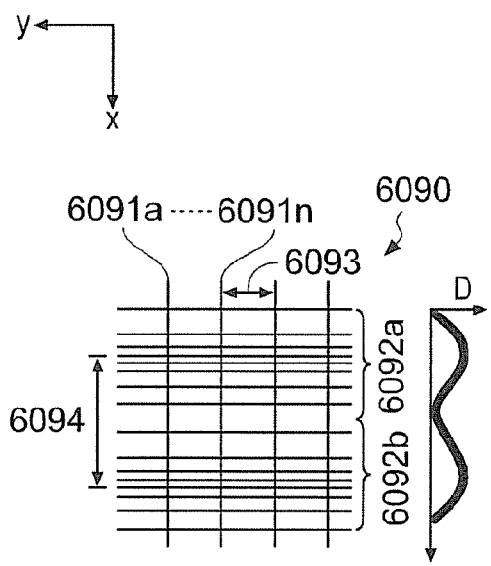

FIG. 61D shows another example of a bespoke screen 6090. The bespoke screen 6090 comprises a grid of wires 6091a-n spaced at regular intervals 6093 in a first direction (y-axis). Spaced groups of wires 6092a-n are provided at regular intervals 6094 in a second direction (x-axis) transverse to the first direction. The wires 192a-n in the groups are spaced according to a sinusoidally varying pattern.

The imprint left by this screen has a single frequency component in the first direction. It also has a spread frequency signal in the second direction which derives from the sinusoidal spatial modulation applied to the wires in the groups 6092a-n. In various embodiments, the sinusoidal spatial modulation acts as a carrier frequency that can itself be modulated to provide various encoding schemes. For example, phase shift keying modulation may be applied to the carrier sinusoid and encoded into the pattern to be applied to paper by appropriate spacing of the wires.

Figure 61E:
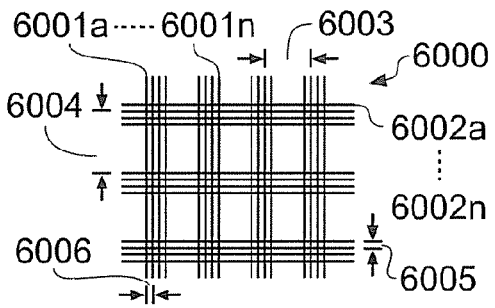

FIG. 61E shows another example of a bespoke screen 6000 according. The bespoke screen 6000 comprises a grid of groups of wires 6001a-n spaced at regular intervals 6003 in a first direction (y-axis). Wires in the groups 6001a-n are themselves spaced at regular intervals 6006. Spaced groups of regularly spaced wires 6002a-n are also provided at regular intervals 6004 in a second direction (x-axis) transverse to the first direction.

The imprint left by this screen 6000 has two frequency components in the first direction and two frequency components in the second direction. The first component in the first direction reflects the spacing 6003 of the groups of wires 6001a-n and the second the inter-wire spacing 6006. The first component in the second direction reflects the spacing 6004 of the groups of wires 6002*a-n* and the second the inter-wire spacing 6005.

Figure 61F:
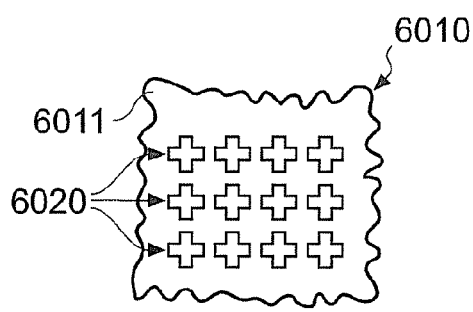

FIG. 61F shows another example of a bespoke screen 6010. The bespoke screen 6010 comprises a plate 6011 comprising a plurality of cross-shaped perforations 6012 spaced in a regular two dimensional pattern. Such a screen may be formed by etching or punching a sheet material.

Figure 61G:
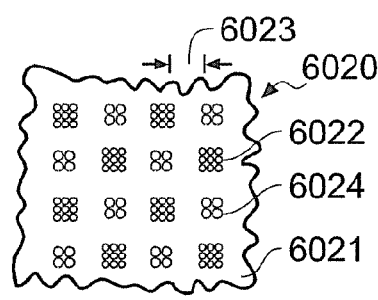

FIG. 61G shows another example of a bespoke screen 6020. The bespoke screen 6020 comprises a plate 6021 comprising a repeating pattern of perforations 6022, 6024 spaced in a regular two dimensional pattern. The pattern comprises a repeating sequence of alternating groups of circular perforations 6022, 6024 of different sizes and numbers set out in a grid arrangement spaced at regular intervals 6023. The first group of circular perforations 6022 consists of a 3×3 array of circular holes grouped together. The second group of circular perforations 6024 consists of a 2×2 array of circular holes grouped together. The first and second groups 6022, 6024 occupy approximately the same surface area of the plate 6021.

The imprint left by the screen 6020 has a frequency component deriving from the grid interval 6023 plus a more complex response arising from the groups of perforations 6022, 6024. Such a response can be measured and used to provide a class signature for paper/cardboard articles made using the bespoke screen 6020.

It will be appreciated that the imprints made by the illustrated screens are all amenable to functional analysis to determine a class signature, using Fourier transforms or other kinds of transform analysis.

Thus a variety of examples of systems an apparatus for exploiting a class signature have now been described.

Figure 62:
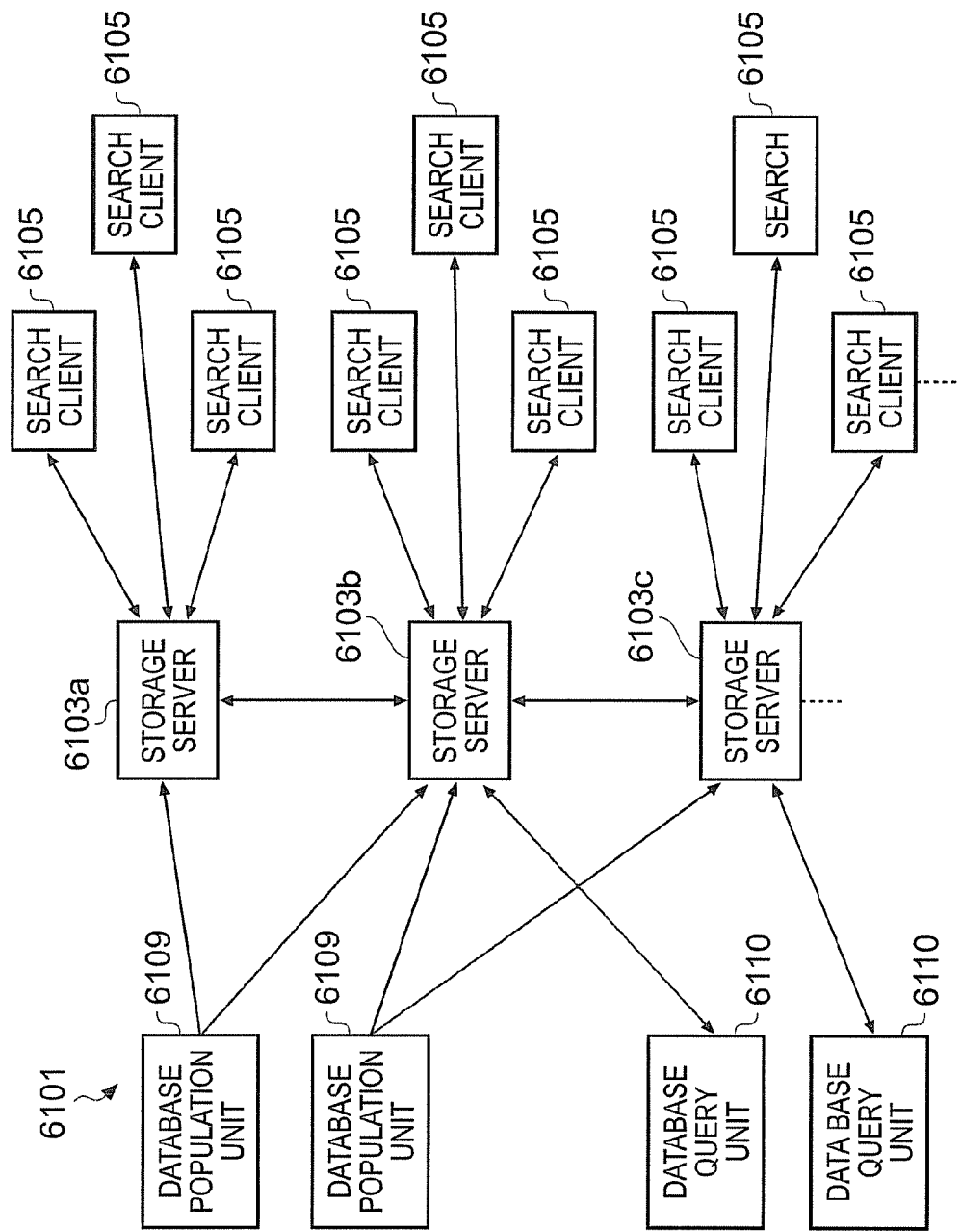
FIG. 62 shows schematically a database structure for storing record signatures.

In the above examples, there are various discussions of storing a signature determined from an article to a database for later reference. There are also various discussions of comparing a signature determined from an article to a stored signature within a database. With reference to FIG. 62, there will now be described an example of a database structure which may be used to implement a central signature database in which signatures can be stored and against the content of which signatures can be validated.

A database to store and retrieve signatures derived from an article surface in the manner described above is inherently difficult to create using commonplace database techniques. This is because the signature itself is essentially a random sequence. Thus it is not possible to utilise a hierarchical search based upon indices described in index tables. There are, in some examples at least, the thumbnails for the signatures—however as these are still essentially random, they present the same problems as the full signature.

Also, every scanning of a given target surface will produce a very slightly different signature. The different signatures generated by the same surface are, as is discussed in detail above, much more similar than the signatures from different surfaces but it is still the case that an exact 100% match would be highly unusual if not impossible. It is clear therefore that the match required in the database search is a fuzzy match.

As a result of these factors, it is becomes apparent that the only way to search a database for a signature match is to test every record in the database against a candidate signature. As noted above, the effect of this can be minimised if the thumbnail signatures are used to draw up a shortlist of possible matches and the full signatures are only tested for the signatures on the shortlist. However, even using the thumbnails, this search process is likely to be very computationally intensive.

However, with the benefit of modern microprocessor architectures, the search process can be carried out very efficiently provided that the data through which the search is to be conducted is held in fast access storage, such as the RAM of a conventional computer system. If the amount of data to search through has to be held partially in slower storage, such as a hard disk drive, there can quickly arise a situation where time taken to transfer the data from the hard disk to RAM can take longer than the time taken by the processor to carry out the search. It is thus clear, that to provide the fastest possible response time, the entire database needs to be held in fast access storage such as system RAM all of the time. It is desirable for database search results to be returning in the least possible time, as delays in receiving database search results may disincentivise users of the security system to rely upon it.

A fundamental problem with implementing such a system in modern computers is that the world's best known and most used consumer and enterprise operating system, Microsoft™ Windows™, is notoriously unstable, with so-called crashes occurring at regular intervals. Whilst current versions of Windows™ are much more reliable than previous versions, they still do not have the stability required to be relied upon for a RAM based database search system which is required to return search results as fast as possible. Other operating systems, such as Unix™ and Unix-like systems (Irix™, Linux™, FreeBSD™ etc) provide higher reliability than Windows™ in most circumstances. However this is still not sufficient for to be relied upon for a RAM based database search system which is required to return search results as fast as possible.

At the other end of the scale, there are dedicated specialist database architectures with proprietary operating systems which provide up to Class 5 reliability (99.999% availability) such as those used by telecoms operators to track calls made by telephone system users. Such systems tend to be somewhat expensive and, as they tend to concentrate on ensuring absolutely complete transaction logging, may not provide the speed required for use in the presently discussed systems.

As will be appreciated, the database architecture adopted can be based upon the requirements of the database in terms of size of database, desired availability of database, desired search speed and other factors. Thus, not withstanding the above discussion, for a small system where only a small number of signatures is to be used (up to a few hundred for example) and where availability is not of prime importance (i.e. these is not going to be a user stood waiting for a result in order to gain access to an event or location, or to complete a purchase), a simple system using a single computer having the entire database stored in RAM and running a Windows™ or Unix™-type operating system may be sufficient.

However, for a large system where many thousands or even millions of signatures are to be stored reliably and searched quickly, an architecture such as that illustrated in FIG. 62 may be adopted.

FIG. 62 schematically illustrates a database architecture 6101. The database architecture 6101 includes a set of storage servers 6103 (6103*a*, 6103*b*, 6103*c*) which, in the present example, are located within a single addressable logical domain. The storage servers 6103 need not be co-located, and may be distributed between different racks, rooms, buildings, regions and/or countries. In the present example the storage servers 6103 are each computer systems which are servers in the conventional sense, i.e. they may have one or more of a server operating system, a server class processor architecture, redundant power supply and redundant storage. These storage servers 6103 between them hold the entire database in non-volatile memory, such as in redundant storage such as RAID based system. In some examples, each database record (a signature, associated thumbnail and any metadata) is held by more than one of the storage servers 6103. In one example the database may include 5 storage servers with each database record being held by two or three of the storage servers.

As noted above, the highly entropic nature of the signature combined with potentially high bit error rates during re-scanning means that brute force searching is the only way to perform a 1-to-many match. Thus, each storage server 6103 has associated therewith a number of search clients 6105. In one example, each storage server has between 2 and 10 search clients associated therewith. The search clients 6105 need not be included within the storage server domain as they do not need to be individually addressable by any computer other the associated storage server 6103. The search clients 6105 need not be based on specialist server hardware or software, and can in fact be any computer system capable of running a search query with sufficient speed. In some examples, a search server 6105 can be a simple computer with a processor (such as an Intel Pentium™, Intel Core™ AMD Athlon64™, AMD Sempron™, AMD Turion™ or VIA C3™ architecture processor), a large quantity of RAM (e.g. 1, 2, 4 or more GB), a small amount of non-volatile storage for storing an operating system and query processing software and a network interface to enable it to communicate with the storage server. The primary requirement for a search client 6105 is the capability to process the signature comparisons sufficiently quickly.

Each search client 6105 stores within local RAM a subset of the database records held by the associated storage server. These locally held records are then searched through when a search query is received. To provide greater reliability, each record held by the storage server may be sent to multiple ones of the associated search servers. Each search client may also store its database subset in local non-volatile storage (such as a hard disk drive), thus allowing the search client to be brought online rapidly after a software crash on that client. In the event of the client suffering a hard disk drive failure the database records can be resent from the storage server to the search client.

The database architecture shown in FIG. 62 can be populated as follows. A database population unit 6109 provides new signatures to a number of the storage servers 6103. The database population unit 6109 may be, for example, some form of production line scanner whether for articles such as packets, boxes or cartons, or for articles such as identity or entitlement documents. As shown in FIG. 62, each database population unit sends new records to a subset of the storage servers 6103. If only one database population unit 6109 is to be used, the storage servers 6103 to which the records are sent may include all of the storage servers or a changing subset thereof. Alternatively, a recipient storage server may pass the record on to other storage servers with or without keeping a copy for itself.

The database may be searched by sending queries from a database query unit 6111. In the present example each database query unit 6111 sends a query to a single storage server 6103, from where it is distributed to all other storage servers. In the present example, where the storage servers are located in a single logical domain, a query may in fact be addressed to the domain, where it is handled by the storage servers. Each storage server then passes the query on to its associated search servers. Thus it is clear that due to the replication of each database record across more than one storage server, and due to the possible replication of each record from each storage server across more than one search clients, that each database record is in fact considered by at least two (and possibly more) search servers in response to each query. It is noted that this duplication of effort is potentially wasteful, however it is presently considered to be more efficient to duplicate search effort in this way than to spend the time and management effort required to implement a system where one search client is the "primary" repository of a record and all other search clients holding that record are "secondary" or "hot-standby" repositories of that record and to check whether the primary repository is available, and in dependence upon the primary status to designate a secondary repository to handle the query.

In examples where each record includes a thumbnail of the signature in that record, a query may send both a thumbnail and signature with a coordinating storage server carrying out the role of creating a shortlist of records based on the thumbnail search result and then performing a targeted search of the shortlist entries. In other examples, a query may include only the thumbnail, with the full signature being sent for search against the shortlist only one the shortlist is received at the database query unit. In still further examples, a search clients may carry out the full signature comparison immediately if a thumbnail match is found. Thus, there is never really an actual "shortlist" compiled but the processing which takes place provides the same effect as if one were. In other examples the query may include only the signature and the search server may be tasked with creating the thumbnail for searching. In this example, where the thumbnail is never used outside of the storage and search environment, the thumbnail generation algorithm can be chosen independently of the signature generation apparatus. Thus a common signature generation apparatus can be used with both systems that use a simple subset thumbnail and systems that use a Fourier transform thumbnail with no modification to the signature generation apparatus.

Where the thumbnail search is being used, if a shortlist of possible hits is compiled, as the database may have no index, the shortlist can include an identity of the search clients which found each potential match so as to speed the subsequent full signature search. In some examples, the database may in fact include an index based on metadata associated with each record and/or assign a unique record number to each record. The metadata may include a creation data for the article, a serial number for the article (such as a passport, ID card, or bank card number), a batch number for the article (such as for a manufactured item such as a carton of cigarettes), an identifier of the owner of the article (for example for a passport, ID card or bank card), an article type (where the database contains records for multiple article types) etc. Such indexed data can then be used to identify the records which are present on the shortlist such that the full signature scan can be targeted at the specific records which were identified in the shortlist.

In some examples, it may be desirable to guarantee the authenticity of a signature within the database (to prevent a fraudster populating the database with signatures for fraudulent articles). To facilitate this, each article signature may be signed using a digital signature at the time of article signature creation. Thus a system used for creating article signatures could have a security signature module, for example a signature dongle in the case of the article signature generation system having a conventional computer connectivity port.

In some examples it may be desirable to ensure that the signing of the article signature is performed using the private key of an asymmetric public/private key pair. Thereby the corresponding public key can be used at the database to check the digital signature of the article signature to verify the authenticity of the article signature with the benefit all of the advantages of asymmetric key pair signing.

In some examples it may be desirable to ensure that the key or certificate used for digitally signing the article signature is stored locally to the signature generating apparatus. This could, for example, include storing the signature in a computer used for the signature generation process or by including the signature on a token securely installed within the laser scanner apparatus. Thereby the only way for a fraudster to populate the database with signatures of fraudulent items would be to steal a genuine signature generation apparatus.

In some examples the public key held at the database may itself need to be signed by one or more trusted third parties to ensure that the public key in use is a genuine key, and not one which has been inserted into the database by a fraudster. Thereby a fraudster could neither hack into the database system to insert a public key corresponding to the private key of a fraudulent signature generation apparatus, nor exert in nefarious manner pressure on a human database administrator to insert such a public key into the database. In one example a public key for use in the database in verifying the authenticity of signatures received from a remote signature generation apparatus may need to be independently authenticated by three or four independent trusted third parties. Such third parties may include trusted certification authorities.

In some examples, the article signature can be further protected by encrypting it, at the time of creation for transfer to the database. It may then be stored encrypted or decrypted for storage. This encryption could take the form of creating a symmetric encryption algorithm key for an article signature, or by using a one time pad based system.

In some examples, to provide maximum security and confidence in the content of the database, a manual audit process may be instituted. Under such a process, an independent auditor may visit a signature generation apparatus (for example at a production line where articles are produced and then scanned) to ensure that the signature generation apparatus is present and intact (i.e. has not been tampered with, misaligned or damaged). Thereby it can be determined that all signatures created by a signature generation apparatus and used to populate the database are in fact genuine signatures of genuine articles.

Figure 63:
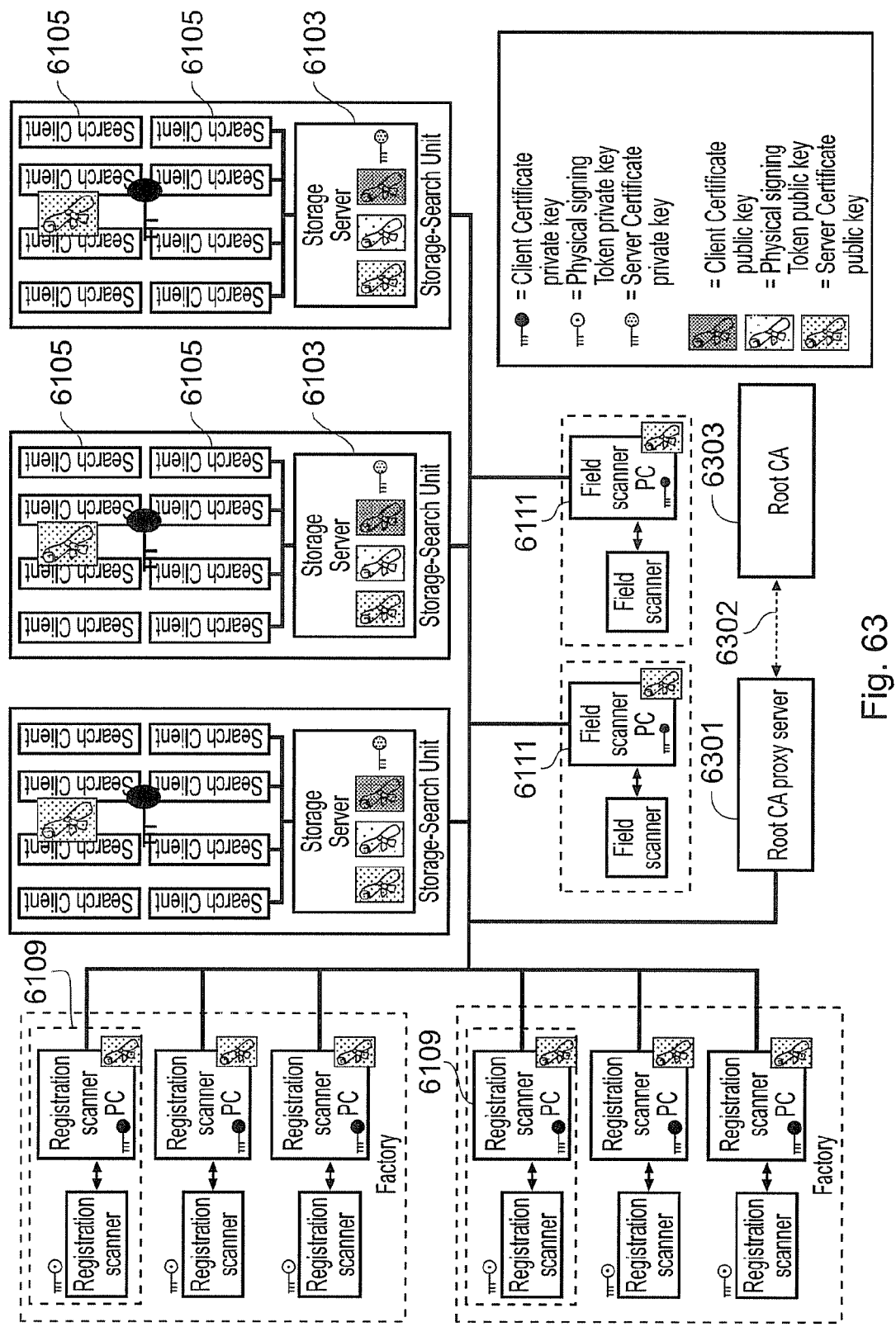
FIG. 63 shows schematically a database structure for storing record signatures.

FIG. 63 shows another example of a complete database system including population engines, storage engines and retrieval engines. This figure also shows how a data security scheme could be implemented to protect the data stored in the databases.

In FIG. 63, the components which correspond to those of FIG. 62 are marked with like numbers. At a factory or other production facility, a number of database population units 6109 are present. In the present example, these are illustrated as being a scanner unit connected to a computer which performs the signature generation from the data captured by the scanner unit. The scanner and the computer can be linked by any appropriate interface, which may include a pci-based standard (including pci, pci-X or pci-E), USB or IEEE1394 although other connectivity standards could be used.

Each database population unit 6109 is linked to a set of storage-search units. This connection may be a network connection such as the Internet. Each storage-search unit includes a storage server 6103 and a number of search clients 6105 which can operate as discussed with reference to FIG. 62 above. The storage search units can be connected to the respective storage-search units by a network connection, such as the Internet.

As discussed above, each storage server hosts a standard database application such as a SQL Server. The Storage Servers of the present example act as a communication hub for all other components as well as providing the long term storage of record scans.

Also connected to the storage-search units are database query units 6111. In the present example each database query unit includes a field scanner unit with an associated field scanner computer which may be a PC or a PDA. These database query units may be used by inspectors to query the authenticity of any given item which may correspond to a type of item recorded in the database structure. These database query units may be point of sale scanners if the secured objects include financial instruments or payment/loyalty cards. The database query units may alternatively or additionally include mobile units used by brand protection officers if, for example, warehouse stock or shipment stock is being inspected for authenticity.

These database query units 6111 may have an intermittent connection to the storage servers. For example, a brand protection officer may use a portable scanner unit to scan a large number of items from a cargo shipment and then later connect the portable scanner unit to the network to upload the test signatures for comparison to the record signatures in the database. This may be useful from a practical viewpoint, as there will be zero delay waiting for scan results while performing the inspection as the scan results are only intended to be found later. This may also be useful from a pragmatic viewpoint as, if a brand protection officer cannot say at the time of performing the checks whether or not the products are authentic, the risk of personal attack against that officer by persons handling fraudulent items may be significantly reduced.

These various groups of components outlined above all communicate via one or more networks, which may be an open or public network such as the Internet. In order to protect the data records and the system components a cryptographic data transfer system may be implemented. In the present example, this is performed using PKI (public-key-infrastructure) cryptography. In the present example, there are no anonymous logins to the system, such that every machine is known and so both server certificates and client certificates are used for all transactions and data transfers. The server certificate authenticates the server to its client and allows exchange of a session key to encrypt the transaction; the client certificate authenticates the client to the server.

In addition to these software certificates, each registration scanner at the database population units 6109 can contain a physical signing token which the registration scanner PC can use to digitally sign each group of record scans before upload to the storage-search units.

The various types of certificates and keys and their distribution between the system elements are illustrated in FIG. 63.

The digital certificates are generated by a root certification authority (CA) 6303 which may be a CA private to the authentication system implementer or administrator or may be a commercial CA which also issues certificates for other, unrelated systems and software. TO provide additional protection for the present system, it is possible to protect the root CA from the open network by using a root CA proxy server 6301 and a secure channel 6302 linking the two. The secure channel may be a secured network link, a dedicated connection such as parallel or serial line, or a non-connected link whereby transfer between the root CA 6301 and the root CA proxy server 6301 takes place using portable physical media such as writable optical media or solid-state-storage media.

In the present example, it is assumed that the users of field scanners are trusted, since the purpose of the authentication system of the present examples is to inform the users of field scanners whether an item is authentic, although the possibility that their scanners or PC may be tampered with unbeknown to them is considered.

All client machines (the database population units, database query units and search clients) additionally authenticate themselves to the storage servers using client certificates. The certificate request is generated directly on the client machine, so there is never any need to export a private key. The server operating system can be configured to require client certificates before a connection can be made and a web service consumed. However, any client certificate which is correctly signed by a recognised Root CA will be allowed access to the web service.

An extra level of protection can be implemented in the system of the present example by defining a server-side policy for client certificates within a web application running on the storage server. As soon as the web service is requested, the web application checks the name of the client certificate and compares it against a store of authorised clients. Thus, compromise of the Root CA is not sufficient to allow unauthorised client access to the server; it will also be necessary to inject the falsely signed certificate name into the storage server's list of recognised clients.

It is understood that (albeit complex) methods exist for extracting private keys from operating systems such as Windows™. Should an attacker obtain a client-side private key, no mission-critical threat would exist. The client-side certificates are primarily to limit the volume of communication with the servers to machines that are part of the network and to help the system operator or administrator to enforce its commercial policies.

It is also understood that a database must ultimately have an administrator who owns the tables, and who could potentially be compromised, allowing false data to be inserted into the storage server database. In order to protect against this threat, registration scans are digitally signed in the factory by the registration scanner PC using a physical signing token. The public key certificate for each physical signing token (one token per registration scanner) is then signed by the Root CA, before being stored in the storage server's database. When a search is completed, the storage server checks that the digital signature on the stored scan is correct and that it has a signing chain back to the Root CA. False records will be identified at this point as being incorrectly signed.

Therefore, in the present example, the physical signing token applied to the registration scans should be physically associated with the production line. Authenticity of an article is defined in this system as the article having originated from a known production line. The physical signing token is therefore embedded inside the registration scanner and securely attached, such as with epoxy resin. A direct connection (such as a USB or other serial or parallel line) from the registration scanner PC accesses the physical signing token inside the registration scanner.

An attacker who wishes to steal a physical signing token must therefore take the entire registration scanner head, which would be a highly visible event. In the event that this did happen, two actions could be taken to ensure security of the system. Firstly, the client certificate of that registration scanner PC would be revoked on all storage servers, thus preventing the registration scanner PC attached to the stolen registration scanner from communicating with the storage servers. Secondly, the public key certificate of the physical signing token would be revoked from the time of discovery of the theft onwards, thus preventing any matches that were made to scans taken from the stolen registration scanner from being validated.

The design of system of the present example has attempted to push all vulnerabilities to two points the registration scanners and the root CA.

The registration scanners must be considered to be valuable assets. It is the physical signing token embedded in the registration scanner which ultimately confers authenticity on a stored scan. A possible attack is therefore to steal the entire registration scanner and Line PC in a way which is not noticed and then to set them up on a production line manufacturing counterfeits. Most, if not all, such attacks would be based on use of confidence tricksters or other fraudsters managing to fool staff at a production location. As such, it is presently believed that from a technologic viewpoint this particular part of the system is as secure as is necessary to protect the system.

The Root CA can protected from network-borne attack (especially key extraction attacks) by removing it completely from the network as described above. All requests to generate certificates can uploaded to the root CA proxy server 6301, and then a physical memory device is used to physically transfer the requests to the root CA for signing. Once a request is given to the Root CA, it will only be processed if the administrator of the machine authorises it. This administrator thus becomes an important trusted party. Should this person be compromised, there are two consequences: Thus most, if not all, such attacks would be based on compromise of a person or persons in a position of authority. As such, it is presently believed that from a technologic viewpoint this particular part of the system is as secure as is necessary to protect the system.

Thus there have now been described various examples of how a database system for storing and searching article signatures may be implemented.

Authenticity verification systems such as those described variously above have many applications, amongst which are security and confidence screening of items for fraud prevention and item traceability.

In e-commerce systems and similar systems, a document or entitlement token indicating entitlement to value, goods or services can be issued at a time and/or location which is remote from an access point to the value, goods or services. To provide security against fraud and other interruptions in the successful operation of such systems, the document or entitlement token can be independently validated to ensure that a claimer of the entitlement is in fact so entitled.

Suitable systems for effecting this security provision will be described in the following examples, making reference to various real-world applications in which the security provision can be applied.

One example, is where a person uses an on-line shopping facility to purchase a ticket for access to an event or for travel. In this example, the user can be provided with an image of the ticket to his access terminal. The user can then print the ticket using a printer associated with the access terminal for use in accessing the event or for travelling. The user can then cause the ticket to be scanned to create a signature to identify the ticket, which signature is returned to the ticket issuer in order to validate the ticket. The signature can be based upon an intrinsic property of the printed ticket, which cannot be duplicated by photographic duplication of the ticket or by printing a further copy of the ticket. The ticket issuer can store the signature in a signature database of validated ticket signatures. When the user presents the ticket to obtain access to the event or to travel, the ticket can be scanned to create a signature to identify the ticket. This new signature can then be compared to the signatures in the database to determine whether the presented ticket has been validated. In the event of a non-validated ticket being presented, access to the event or to travel can be withheld.

Figure 64:
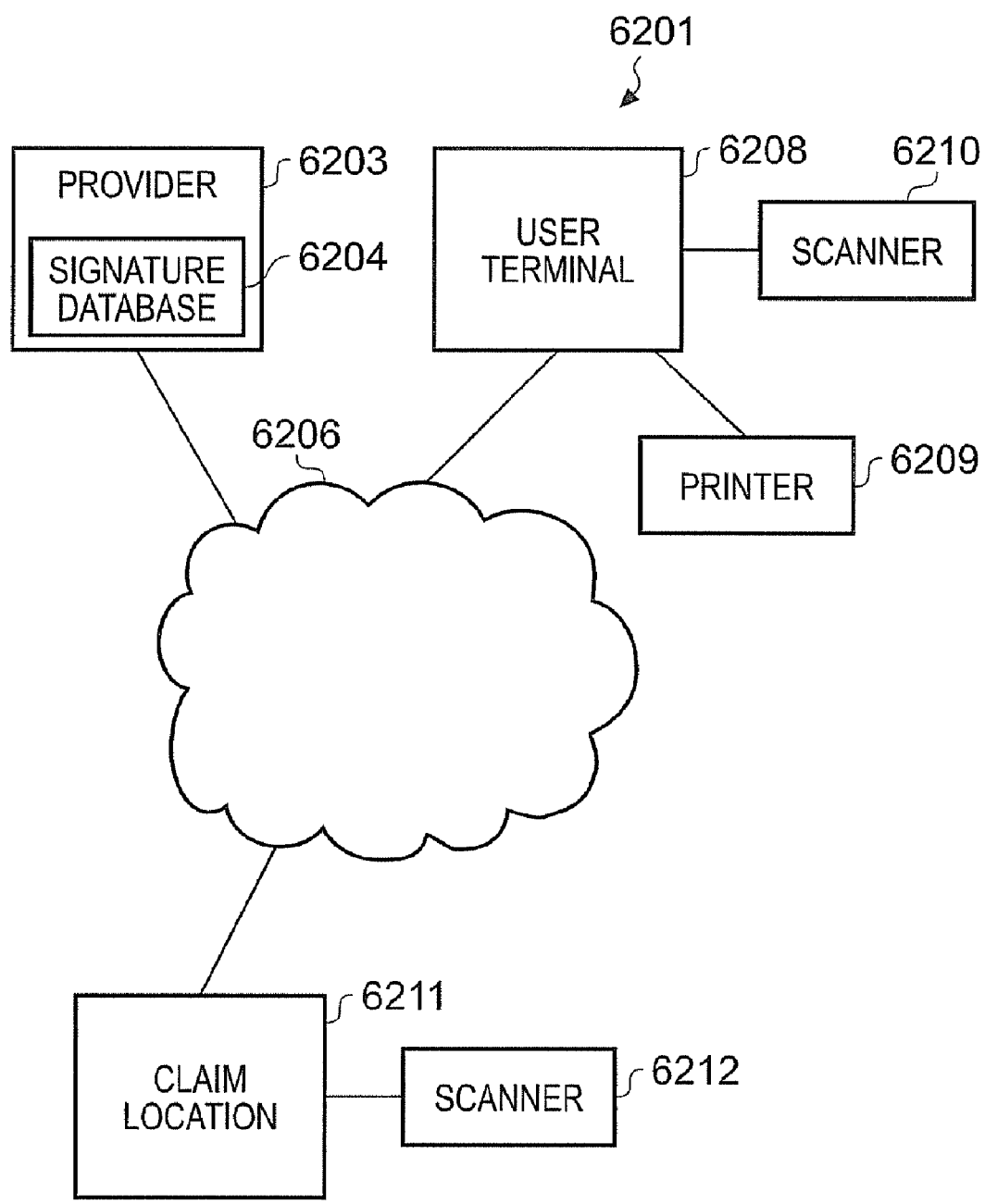
FIG. 64 shows schematically a system for verifying the authenticity of an entitlement token.

This process is illustrated in FIG. 64. As shown in FIG. 64, an e-commerce environment 6201, includes a provider 6203, which has authority to issue a ticket for access to an event (such as a sports match or concert), or for travel (for example by railway train). By communicating with the provider 6203 via a network 6206 such as the Internet, a user at a user terminal 6208 can purchase a ticket from the provider 6203. This purchase mechanism can be any conventional system for allowing a remote user to purchase goods or services through a shopping or ordering portal. Such online remote ordering systems are used by many businesses, charities and governments. The process of purchasing the ticket can, for example, be performed using an online shopping basket system where a user views one or more tickets which he can select for purchase. In the context of an event ticket, different ones of the tickets may offer access to different events, or to different viewing locations at the event. In the context of a ticket for travel, different tickets may be offered for a given journey, depending upon route used and quality/class of travel.

In response to the ticket purchase, the provider 6203 sends a ticket image data file to the user terminal 6208, for output on a printer 6209 associated with the terminal. The ticket may be printed onto a special ticket printing sheet (such as a paper or card sheet preconfigured to have certain ticket information printed at predetermined printing locations thereon) or may be a conventional printing sheet such as a sheet of plain paper. The printed ticket is then scanned by scanner 6210, to create a signature based on an intrinsic property of the printed ticket. The scanner 6210 can be a scanner as described above with reference to any of FIGS. 1 to 60. In one example, the scanner 6210 is integral with the printer 6209 as described with reference to FIGS. 34 and 35 above. Thus in the present example, the signature is based upon the physical surface of the sheet onto which the signature is printed, measured at a microscopic level. This signature is thus unique to that printed ticket, and another printed copy of the ticket would have a different signature if scanned in the same way.

The signature is then sent from the user terminal 6208 to the provider 6203, where it is stored in a signature database 6204. Thereby the printed ticket is validated and can be recognised as a valid ticket by the provider.

When the user attends the event for which the ticket is issued, or uses the ticket for travel, he can present the printed ticket at a claim location 6211. The claim location can be co-located with the service provider, or may be remote therefrom. For example, one service provider may sell tickets to a number of events, each of which events may take place at a different location. Alternatively, in the case of tickets for travel, one provider may issue tickets for travel to or from a number of different locations. Upon presentation of the printed ticket at the claim location 6211, the printed ticket can be scanned using a scanner 6212 to create a signature for the printed ticket as presented. This signature is generated in the same way and using the same property of the ticket as the signature created using scanner 6210. This new signature is then compared to the signatures stored in the signature database 6204. If the new signature matches one of the stored signatures, which will be the case if the printed ticket has been validated as described above, then a positive authentication result is returned. The user can then be provided with access to the event or to the travel to which the printed ticket provides entitlement.

As the printed ticket is authenticated against a single printed instance of the ticket image, further copies of the ticket image will fail the validation test as they will have been printed onto a sheet having a different intrinsic property to that of the sheet of the validated printed ticket. Thereby, fraud on the part of the user to create extra tickets to obtain event access or travel without payment can be prevented.

Thus there has now been described an example of a system for allowing an entitlement token such as a ticket to be generated at a location convenient for a purchaser of the entitlement token, and for the issuer of the entitlement token to be able to validate the token for later authentication when the entitlement token is presented for access to value, goods or services. Thereby fraudulent reproduction or reuse of an entitlement token can be prevented without subjecting the purchaser to a need to travel to an inconvenient location to obtain the token.

Another example of a remote purchase system allows a user to purchase tickets for air travel. As is well known, the air travel industry typically uses a two-stage ticketing process. The first stage in the process is the actual ticket, which entitles the user to fly on a given journey or journeys. The second stage is the boarding pass, which is typically provided to a traveller (often in exchange for the ticket) when that traveller "checks-in" for a journey. Some ticketing authorities and airlines are now issuing so-called "e-tickets". This consists of a data file transferred, typically via email, to the purchaser of a ticket. The purchaser can then print out the ticket for presentation for "check-in" at an airport. In some instances, only the reference number from the e-ticket is required for "check-in", the physical printout merely representing a convenient carrier medium for the reference number.

Also, some airlines and airports now permit remote check-in. In these circumstances, a ticket holder can check-in, usually using an internet portal, before arrival at an airport. Thereby standing in check-in queues at the airport can be avoided. In such cases, the ticket may be a physical "paper" ticket or an e-ticket. In this scheme, the ticket holder prints out the boarding pass using a printer associated with a computer terminal used to access the internet check-in portal. A physical security check can be performed upon arrival of the ticket holder at the airport, by requiring the ticket holder to present their ticket or reference number in addition to the self-printed boarding pass. However, such checks are often not performed until a passenger reaches a boarding gate for an aircraft. Thus a holder of a fraudulently produced boarding pass may be able to access areas of an airport reserved for departing travellers only. This may include access to, for example, shopping facilities where sales tax or value added tax is not applied, thus enabling the bearer of such a boarding pass to commit a tax fraud.

Thus, in the present example, a user can access a remote check-in portal and exchange either value (for example by transfer from a bank account or credit card account—effectively cutting out the ticketing stage) or entitlement (for example a ticket reference number) for a boarding pass. Once the necessary purchase or exchange processes have been completed between the prospective traveller at the computer terminal from which the remote check-in portal is accessed and the ticketing/check-in authority at a remote online business server, the ticketing/check-in authority can electronically transmit a boarding card image or data template to the computer terminal. This can be done as a direct data transfer, for example using http, shttp, https, or ftp, or by indirect data transfer, such as by email. Once the boarding card image is received by the prospective traveller, he can print off the boarding card for use in travel.

In the present example, the printed boarding card is then scanned to determine a signature therefor. This can be performed as part of the printing process, for example using an apparatus as discussed with reference to FIG. 34 or 35 above, or after the printing process using a separate scanner. The signature can then be uploaded to the ticketing/check-in authority or to any other certification authority which the ticketing/check-in authority might wish to use in order to validate the printed boarding pass.

Subsequently, when the prospective traveller arrives at the airport from which his journey is to start, he can be required to present his boarding pass to gain access to the flight, and optionally to one or more areas reserved for access only to travellers. Upon presentation of the boarding pass, it can be scanned to create a new signature. This new signature can then be submitted to the certification authority where the validation signature was stored. The certification authority can then compare the new signature to the database using one or more of the techniques referred to above, especially with reference to FIG. 41, to determine whether the presented boarding pass is the original boarding pass which was printed. A positive authentication result can indicate that the prospective traveller should be granted access to the aircraft. A negative authentication result can indicate that the prospective traveller should not be granted access to the aircraft, and optionally a law enforcement agency or similar can be contacted to address the attempted unauthorised passage through a security cordon.

Thus there have now been described a number of examples of systems which can use a signature for an article which is based upon an intrinsic property of that article to provide further security and/or confidence to a transaction system where remote access is provided to confidential information or to an ordering system, or for tracking or authentication of entitlement tokens.

Although the above examples have been described in the context of printing an entitlement token onto paper, the token could be printed onto an alternative substrate, such as cardboard, plastic or metal. Alternatively, the token could be "printed" in the form of writing token data to a magnetic strip or embedded chip of a plastic card, such as the plastic cards commonly used for bank cards and credit cards. This could be performed using a scanner such as those discussed with reference to FIG. 47 above, which scanner could optionally be additionally equipped with a writing head such that the writing and scanning could take place simultaneously in the same device. The plastic card could be scanned, optionally including at least a surface portion including the magnetic strip or embedded chip, to create the signature for validation of that entitlement. In this way, one physical card could hold more than one entitlement token. The card could then be rescanned when presented to redeem an entitlement, and the signature created at the rescanning could be used to verify that the card from which the entitlement was claimed was the same card as that to which the entitlement was originally written. A database of entitlements could be updated each time that an entitlement is added to the card or used from the card, such that the database can have a record of entitlements active on the card at any given time.

The scanned validation signature may also be encoded onto an entitlement token using, for example, a barcode as discussed with reference to FIGS. 48 to 50 above.

Thus there have now been described a number of examples of systems which can use a signature for an article which is based upon an intrinsic property of that article to provide further security and/or confidence to a transaction system where remote access is provided to confidential information or to an ordering system, or for tracking or authentication of entitlement tokens.

Following on from the above example of an entitlement token in the sense of a ticket, boarding pass or the like, a system for securing another form of entitlement token will now be described with reference to FIGS. 65 and 66.

In many healthcare systems, it is common for patients to visit a doctor in order to obtain a prescription for various drugs needed to treat their ailments. Often the prescription takes the form of a paper document that is prescribed by the doctor adding information relating to the patient (e.g. personal information such as name, address, existing allergies etc.) and to the drugs to be dispensed (e.g. drug/medicament type, dose, dosing regime etc.), and is also signed by the doctor for validation purposes.

Having obtained a valid prescription, following a diagnosis by the doctor and subsequent prescribing, the patient may be required to take the prescription from the doctor's surgery to a pharmacy, or other dispensary, in order to exchange the prescription for one or more prescribed drugs. Such a pharmacy may be located at a location that is remote from the doctor's surgery, and so may mean that presentation of the prescription can only be made a significant amount of time after the prescription is produced. During the period between production and presentation, a prescription may be tampered with or substituted to fraudulently gain access to controlled drugs. This is a particular problem for paper-based prescriptions which are fairly easy to modify or forge, especially if a fraudster has access to authentic prescription paper.

Figure 65:
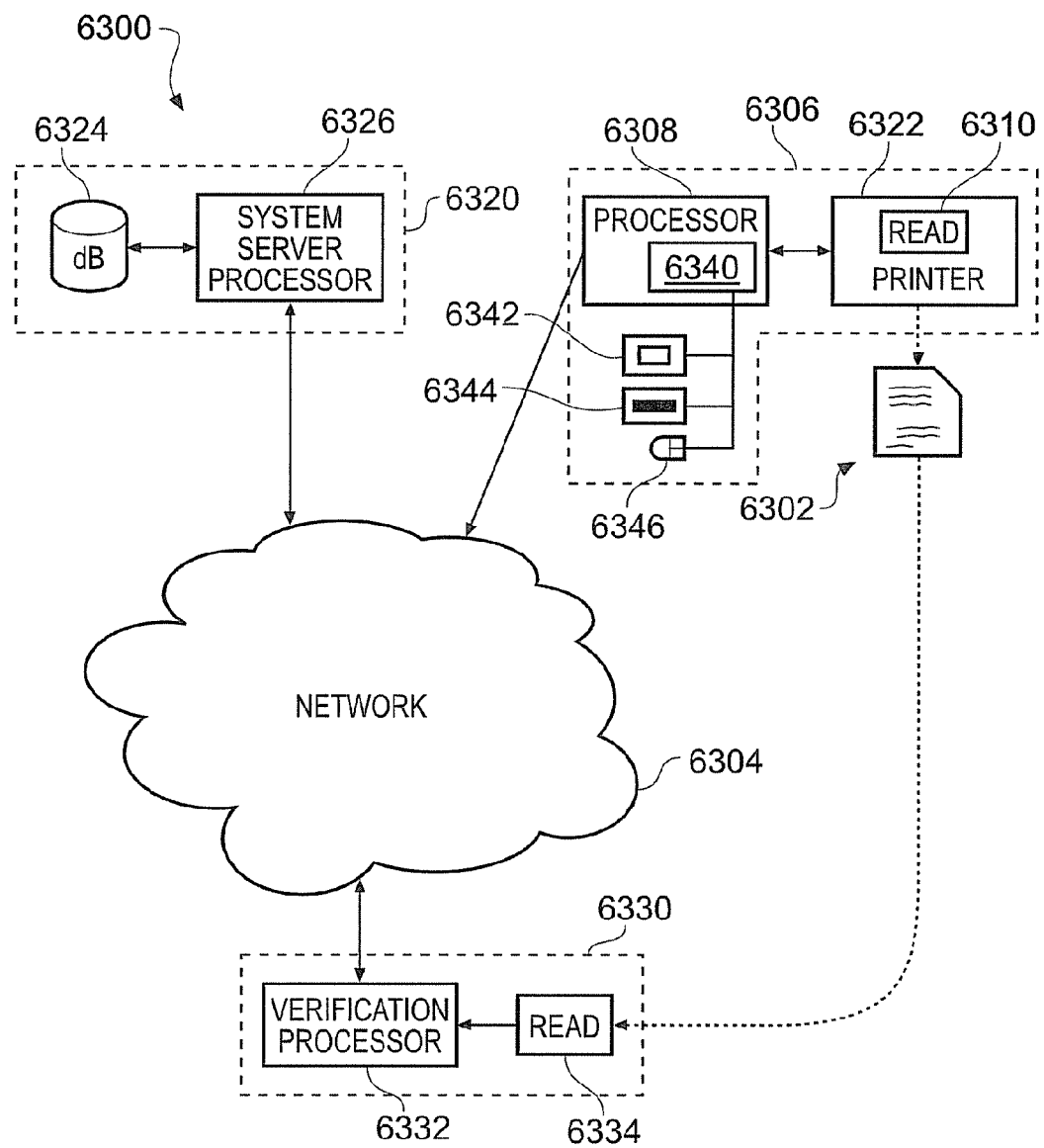
FIG. 65 shows a system for verifying the authenticity of prescriptions.

FIG. 65 shows a system 6300 for verifying the authenticity of medicament entitlement tokens, such as a prescription 6302. The system 6300 comprises a token provider terminal 6306, a system server 6320 and a verification terminal 6330 operably connected together through a network 6304. The network 6304 can, for example, be based upon publicly available dedicated fixed or mobile telephone services, private telecommunications links, etc. operating according to any one or more desired transmission protocol (e.g. Internet (TCP/IP), short message service (SMS) messaging, international standard dialing network (ISDN) etc.). In operation, the network 104 provides one or more communications channels between devices to which it is operably coupled.

The token provider terminal 6306 is provided at a first location, such as, for example, a doctor's surgery. The token provider terminal 6306 comprises a processor 6308 that is operable to provide a user interface 6340 that enables a user of the token provider terminal 6306 to prescribe the prescription 6302. The user interface 6340 presents a prescription template (not shown) to the user on a display device 6342. Using input devices, such as keyboard 6344 and mouse 6346, the user can fill in the prescription template presented on the display device 6342. For example, a doctor can add patient related data such as patient name, age and address as well as medicament related data such as drug type, quantity and dosing regime to be prescribed to the patient to fill in the template.

Once the prescription template has been filled in, the processor 6308 is operable to format the data necessary to produce the prescription 6302. The formatted data may be used to complete a pre-printed prescription form (e.g. possibly having printed thereon the surgery details, doctor's name, a prescription identity number, etc.) which has space available for printed patient and medicament related data. The formatted data is spooled by the processor 6308 to a printing device 6322, where it is printed onto paper or the pre-printed prescription form to produce the prescription 6302.

In this example, the printing device 6322 also contains a reader apparatus 6310. FIGS. 34 and 35 illustrate the construction of such a printing device 6322 in further detail. The reader apparatus 6310 is operable to use an illumination and data gathering system such as those described in detail above to create a signature for the prescription document.

The processor 6308 is operable to generate a first signature from the acquired data. The process for doing this is described in more detail below in connection with FIG. 66.

Once the first signature has been generated the processor 6308 can transmit it to the server system 6302 via the network 6304. Since the signatures generated by the system 6330 depend upon the intrinsic physical properties of the (e.g. paper) substrate forming the prescription 6302, and not necessarily upon any information written on the prescription 6302, data that is transmitted over the network 6304 is privacy neutral: i.e. the signature data on its own does not reveal information regarding the patient or the medicaments to be dispensed.

Optionally, the token provider terminal 6306 can be operable to provide additional information relating to the prescription 6302 to the server system 6320 via the network 6304. For example, information entered at the user interface 6340 could be transmitted along with the signature, for example, in encrypted form. Such information may be patient anonymous: e.g. medicine type, dosage, prescription creation date/time, prescription expiry date/time, location, patient age, number, pre-existing medical conditions etc. This information may be used anonymously at the system server 6320, or elsewhere, to derive useful medical statistics, such as, for example, for studying the geographical dispensing pattern of certain types of drugs for use in epidemiological studies. In another example, where a patient is directly or indirectly identifiable (e.g. by assignation of patient numbers), the system server 6320 could be used automatically to check prescriptions for any medical contraindications, and issue warnings to the token provider terminal 6306 if any occur.

In another optional mode of operation, the token provider terminal 6306 is operable to generate a bearer identification signature based upon an identification token. The bearer identification signature may be generated using the reader apparatus 6310, or by another reader device provided at the first location. The bearer identification signature can be transmitted to the server system 6320 over the network 6304.

It is envisaged that the bearer identification signature be generated from a token that is unique to the bearer, who in this case could be the patient for whom the prescription 6302 is produced. Such bearer tokens may include, for example, a passport, an identification (ID) card, a medical insurance card etc. These can be scanned by a doctor at the first location where the prescription is prepared and again when the prescription 6302 is presented, so linking the patient/bearer token to the prescription using a pair of signatures in a way that is also privacy neutral. This mode provides an extra level of security as it can be mad a requirement that the original bearer token be presented with the prescription 6302 in order to obtain any benefit, such as dispensing of drugs.

In the optional modes of operation where a patient may be required to present a form of identification to a doctor in order to be given a prescription, the mere fact that a identification is needed may in itself be enough to deter fraud since anyone wishing to redeem a prescription could be compelled to present their own identification at a pharmacy for scanning. If a presented identification fails to match the prescription the bearer would already have either identified themselves, where their identification was genuine, or have presented false identification. Such cases could be recorded. Where the identification is a photo-identification such a mode of system operation is particularly effective as a deterrent. Moreover, the identification need not necessarily be identified using speckle analysis (i.e. the ways of identifying the prescription and the identification need not be the same techniques). For example, identification could be checked using a simple bar code reader.

The system server 6320 is operable to store a plurality of signatures transmitted over the network 6304 from one or more token provider terminals 6306. The system server 6320 comprises a database 6324 for storing and managing the signatures. The database 6324 in this embodiment may, for example, be one such as that described with reference to FIGS. 62 and 63 above, or one provided by Oracle™ database software and a redundant array of independent disks (RAID) storage device for added data integrity. The server system 6302 may also be operable to store and compare further information received over the network 6304 or bearer identification signatures.

The verification terminal 6330 is operably coupled to the network 6304 at a second location remote from the first location. The verification terminal 6330 is also operable to verify the authenticity of a prescription presented at the second location by generating a second signature from the presented medicament entitlement token based upon a speckle pattern generated by illuminating the presented prescription with coherent radiation. The signature is generated from data obtained by scanning the presented prescription using a reader apparatus 6334 of the type discussed above with reference to FIGS. 7, 8, 9, 17, 18, 19, 20, 23, 26, 27, 28, 30, 31, 46, 47, 53 or 54, although other types of reader apparatus may be used instead.

The verification terminal 6330 comprises a verification processor 6332. The verification processor 6332 acquires data from the reader apparatus 6334 as a set of data points obtained as point samples of one or more speckle pattern. Once sufficient data has been acquired, the verification processor 6332 is operable to generate the second signature from the acquired data. Optionally, the verification terminal 6332 may also be used to generate bearer identification signatures from a bearer token, in addition to the second signature, for verifying the identity of a person presenting the prescription 6302. The process for generating the signatures was described in more detail above.

The second signature, and optionally a bearer identification signature, is/are transmitted by the verification terminal 6330 to the system server 6320 via the network 6304. The system server 6320 is operable to compare the transmitted second signature with signatures stored in the database 6324. If there is no match between the second signature and a signature stored in the database 6324, then it is assumed that the prescription 6302 is not authentic. If there is a match, the prescription 6302 is assumed to be authentic.

Where a bearer identification signature is also transmitted, the system server 6320 is operable to compare the bearer identification signature with bearer identification signatures stored in the database 6324. If there is no match between the bearer identification signature and a signature stored in the database, then it is assumed that the bearer of the prescription is not entitled to use the prescription 6302. If there is a match, the bearer may be assumed to be entitled to use the prescription 6302, possibly subject to a visual check of the bearer token by an operator at the second location, or by cross-checking prescription or patient information held in the database 6324 with information on the presented prescription or the bearer's credentials.

The process of matching signatures to determine whether a signature matches one stored in the database 6324 is described in detail below, in connection with FIG. 64.

The system server 6320 is operable to generate a response message and to transmit it to the verification terminal 6330 over the network 6304. The content of the response message indicates whether or not the prescription 6302 is authentic, and optionally, whether the bearer is entitled to use that prescription 6302. The content of the message can be presented to a user of the verification terminal 6330, for them to take appropriate action: e.g. honouring an authentic prescription, cancelling or destroying a non-authentic prescription and, if appropriate, informing the relevant law enforcement authorities.

The server system 6320 may additionally be operable to fully or partially invalidate prescriptions. For example, where a prescription relates to the dispensing of more than one medicament and not all of the item are available, a pharmacist may dispense available items and use the verification terminal 6330 to indicate to the server system 6320 that the corresponding prescription remains only partially valid. In this way when the prescription is presented again in respect of the remaining items, the server system 6320 can indicate to the verification terminal 6330 in the message only those items that remain to be dispensed.

Also, if certain data is stored in the database 6324 with a corresponding signature (e.g. data relating to the originating doctor, and date/time of submission to the database), then it is easy to block a prescription beyond any specified date. For example, an antibiotic prescription for a bacterial infection might be specified to be dispensed within a week of the prescription being produced, whereas a repeat prescription for a chronic condition, e.g. asthma, may be allowed to be dispensed up to several months from production of the prescription.

Additionally, a one-to-one correspondence may be determined between issued prescriptions and dispensed drugs or medicines. This provides an audit trail can be generated in a manner which provides useful information but remains privacy neutral as there is no need to store patient data in the database in order to create the audit trail.

The verification terminal 6330 or server system 6320 may be operable automatically to track an inventory at the second location. For example, the verification terminal 6330 could alert a pharmacist when supplies of a drug fall below a certain level or if drugs in stock have not been dispensed by their use by date. In another example, the server system 6320 could be used to track inventory, thereby freeing up resources at verification terminals. Such a server system 6320 could be used, for example, by drug companies to perform geographical analysis of product stock levels/dispensing levels etc., which could then be used for marketing purposes or to spot disease trends/patterns. Where inventory tracking is used, the verification terminal 6330 or server system 6320 may be further operable automatically to place an order to a supplier over the network for replacement stock when the stock of one or more items in the inventory falls to or below a predetermined amount, e.g. by ordering drugs from a particular pharmaceutical supplier in batches if necessary.

The processor 6308 or verification processor 6332 may be provided as part of a suitably configured personal computer (PC) provided at the first or second location. By configuring one or more PCs in this way, existing equipment can be used without requiring the provision of specialist hardware other than the addition of various reader apparatus into the system.

Moreover, since digitised signatures may only comprise a relatively small amount of data (e.g. 200 bits to 8 kilobits), verification at the system server 6320 may be a fairly rapid process. In addition, the bandwidth of communications channels provided by the network 6304 can be relatively low. For example, a 56 k dial-up modem may be used by a token provider terminal 6306 or a verification terminal 6330 to connect to the network 6304, thereby enabling the use of inexpensive standard equipment at the first and second locations.

In some examples, the central database may be omitted and the signature of the prescription may be written thereonto using a barcode, numerical sequence, magnetic strip or smart-card chip. As discussed above, the signature may be encrypted and/or signed before being written to the prescription. The prescription can then be authorised by reading the prescription to create a signature at a dispensary location and comparing the stored signature to the new signature, with a match indicating that the prescription is authentic.

Figure 66:
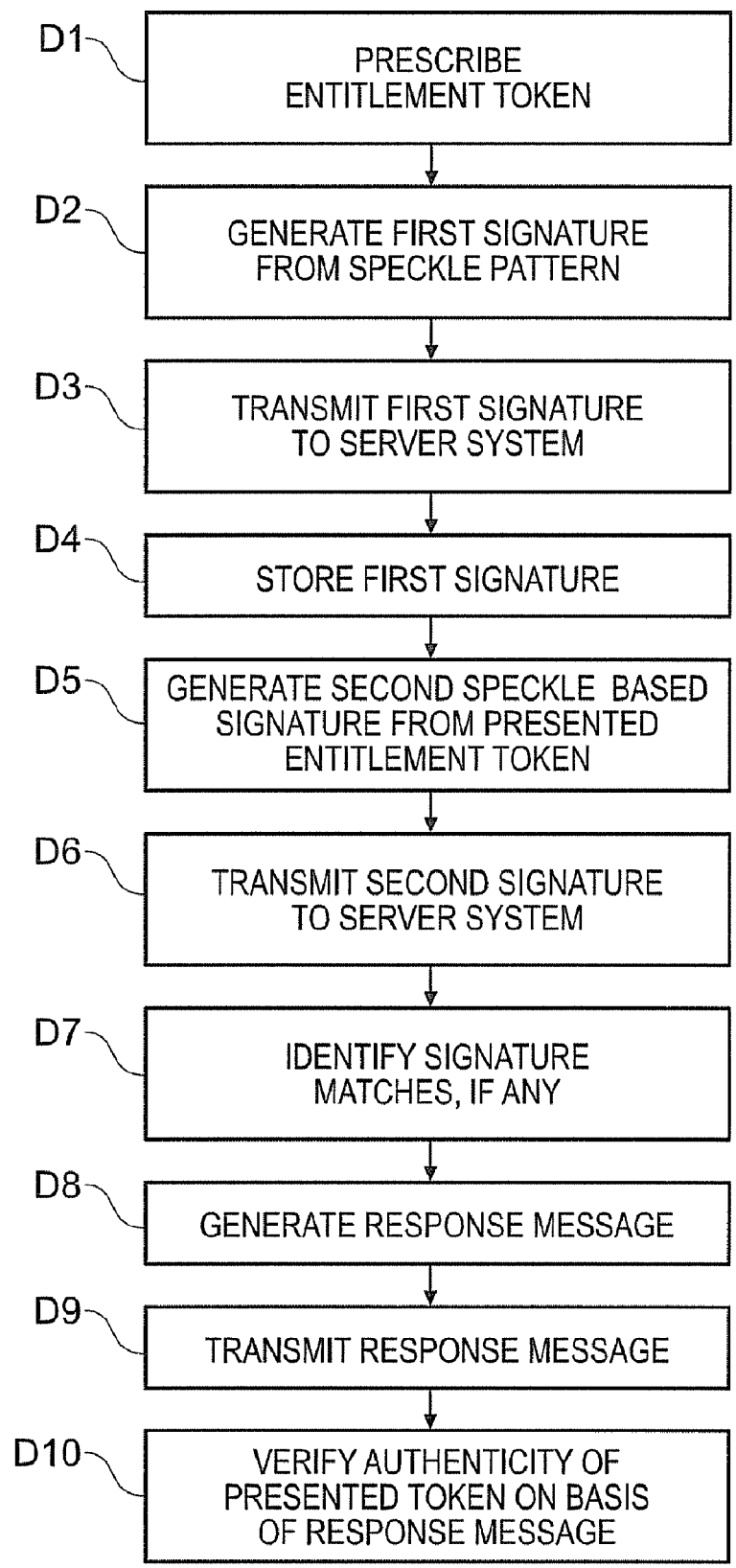
FIG. 66 shows a method for verifying the authenticity of prescriptions.

FIG. 66 shows a method for verifying the authenticity of prescriptions.

At step D1, the method comprises prescribing a medicament entitlement token, such as prescription 6302, at a first location. The medicament entitlement token may be prescribed at the first location, for example, by a doctor operating a user interface to input prescription information for filling in a prescription, or by the doctor producing a hand-written prescription. There does not need to be any externally generated data provided from a location external to the first location for prescribing to occur. In other words, all the prescribing steps needed to produce the medicament entitlement token can be taken at the first location only.

At step D2, a first signature is generated at the first location based upon a speckle pattern generated by illuminating the medicament entitlement token with coherent radiation.

At step D3, the first signature is transmitted to a system server.

At step D4, the signature is stored at the system server.

At step D5, a second signature is generated from a presented medicament entitlement token at a second location remote from the first location. The second signature is based upon a speckle pattern generated by illuminating the presented medicament entitlement token with coherent radiation.

At step D6, the second signature is transmitted to the system server.

At step D7, the step of identifying whether the second signature matches any signatures stored by the server system is performed.

At step D8, a response message is generated identifying whether or not the second signature matches a stored signature.

At step D9, the response message is transmitted to the second location.

At step D10, the step of verifying that the presented token is authentic at the second location is performed where the response message indicates there is a match between the second signature and a stored signature.

The method steps D1 to D10 may be implemented by the system 100 shown in FIG. 65. For example: steps D1 to D3 may be performed by the token provider terminal 6306 shown in FIG. 65; steps D4, D7, D8 and D9 by the system server 6320; and steps D5, D6 and D10 by the verification terminal 6330.

Thus there has now been described a method and apparatus for ensuring the validity of a prescription for the dispensing of a medicament. This can be used to assist in the control of access to medicinal substances such as drugs.

Remaining broadly in the field of entitlement, in many e-commerce and similar situations, transfer of entitlement to value, goods or services is often performed at a location remote from an entity which administers the value or provides the goods or services. In such transactions, payment for the entitlement to the value, goods or services is often made from the remote location. It is therefore desirous that such transactions are subjected to a high level of security, to minimise the risks of fraud on the part of both the end user and the service provider or goods supplier.

To address such issues of remote access to entitlement to value, goods or services, systems can be implemented such as security mechanisms for paying for items in a remote access system such as an on-line access or ordering facility. In these circumstances, a numerical indicator of authority to transfer value from the purchaser to the supplier may be given. Typically this may include a credit or debit card number, and may be supplemented by a numeric PIN (Personal Identification Number) or alphanumeric password. This system does not however offer a guarantee that the purchaser actually has possession of the credit or debit card, although restrictions on a delivery address based on an invoicing address for the credit or debit card may be used as a further safeguard.

In e-commerce systems and similar systems, entitlement to value, goods or services can be transferred at a time and/or location which is remote from a physical possession transfer of the value, goods or services. Thus a vendor or merchant may wish to ensure that payment is being made genuinely by the true holder of a bank or credit card account before shipping goods or issuing a token indicating entitlement to services. In this regard, it is worth noting that under certain regulatory regimes as regards credit cards, liability for fraudulently made transactions can be the responsibility of the vendor rather than the credit card issuer. For example, under UK law, any transaction performed where the card is not physically presented to the vendor for authorisation is categorised as a "Cardholder Not Present" or "Card Not Present" transaction. In such circumstances, an "authorisation" performed on the card account by an issuing bank does not guarantee to the person accepting payment from the card that the bank will release the funds to that person. Such an "authorisation" means only that the card has not been reported lost or stolen, and that the card holder has sufficient funds available in their account to pay for the transaction. Should a transaction be fraudulently made in a Card Not Present situation, and the cardholder subsequently challenge the validity of the transaction, the value of the transaction can and often is charged to the vendor who accepted the fraudulent payment by the issuing bank. Thus a vendor may desire a higher level of security that a person making a Card Not Present transaction is in fact the account holder and that the card that is being used for payment is in the possession of that account holder.

Thus, in the present example, a system, apparatus and method for increasing fraud resistance in the successful operation of such systems is presented. According to this system, method and apparatus, a physical credit card can be independently validated to ensure that a purchaser using the card to make a purchase is in possession of the card at the time of making the purchase.

Suitable systems for effecting this security provision will be described in the following examples, making reference to various real-world applications in which the security provision can be applied.

One example is where a person uses an on-line shopping facility to purchase a ticket for access to an event or for travel using a conventional credit card. In this example, the user places an order for the ticket using an online portal provided for the purpose by a ticket vendor or supply agency. During the purchase process, the purchaser is requested to provide a scan of their credit card being used for payment for the ticket. This is in addition to a request for any other security information that the vendor may request, such as name and address details of the cardholder, the card number, expiry date etc and/or a password or personal identification number associated with the card or the purchaser's account with the vendor. Data gathered from the scan of the credit card can be used to create a signature based upon an intrinsic property of the credit card which cannot be duplicated by creating a new card having the same appearance as the original card. The signature can then be sent to a card authorisation entity to be compared with a signature generated from a previous scan of the user's credit card stored by the card authorisation entity. The previous scan used to create the database signature can be taken by the card issuer upon creating the card for sending out to the account holder, or after receipt of the card by the card holder upon attendance by the card holder with their card at an authorised premises where the identity of the card holder can be checked before the database signature is created. Thus it can be verified by the vendor, prior to accepting the transaction, that the physical card is in the possession of the person making the transaction. Thereby the vendor can be more confident that the transaction can be accepted, particularly if the "traditional" checks have been performed and it has been established that the card has not been reported lost or stolen. The clear implication of positive results from these two checks is that, as the account holder is in possession of the card (not lost or stolen) and the card is present for the making of the transaction (matching signature), the account holder must be the individual placing the order and thus the chances of the transaction being fraudulent are significantly reduced compared to merely knowing that the card is not reported lost or stolen.

Figure 67:
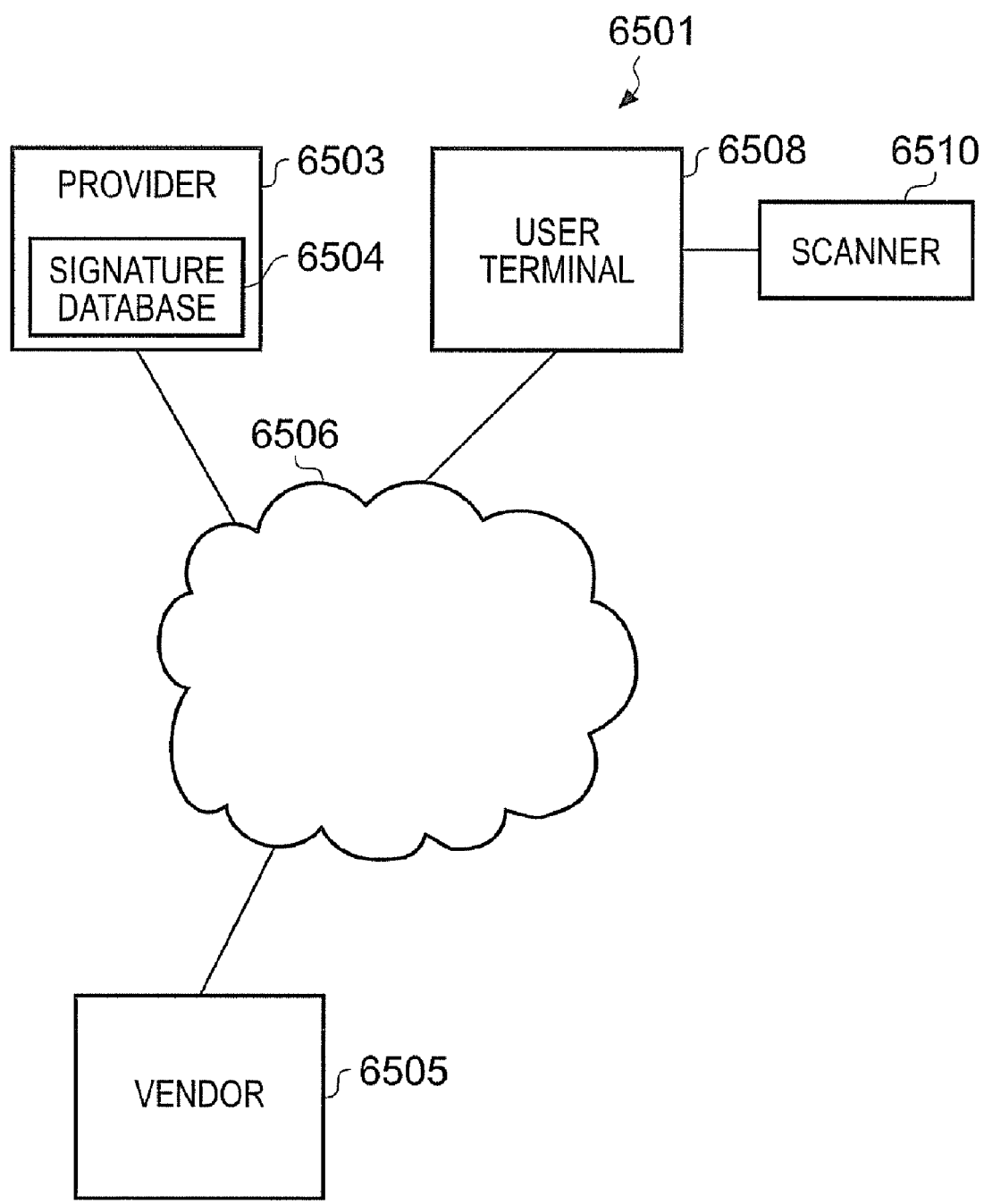
FIG. 67 is a schematic overview of a distributed transaction environment such as an e-commerce environment.

This process is illustrated in FIG. 67. As shown in FIG. 67, an e-commerce environment 6501 includes a user terminal 6508 by means of which a user can access a purchase mechanism for goods or services from a vendor 6505 via a network 6506 such as the Internet. This purchase mechanism can be any conventional system for allowing a remote user to purchase goods or services through a shopping or ordering portal. Such online remote ordering systems are used by many businesses, charities and governments. The process of purchasing the goods or services can, for example, be performed using an online shopping basket system where a user views one or more items which he can select for purchase.

Once one or more items have been selected by the user, a purchase operation can be performed in which the user enters details to authorise a transaction for purchase of the selected goods or services. This may include entering details of a credit card or debit card using which the user wishes perform the transaction, as well as details such as a requested delivery time and location for the items. The transaction processing of the present example, also includes the user scanning their credit or debit card at the user terminal 6508 using a scanner 6510 in data communication with the terminal. The scanner 6510 may be a separate unit operable to communicate with the user terminal 6508 via a cable or wireless connection or may be integral to the user terminal 6508.

The scan of the user's credit or debit card is used to generate a signature for based on an intrinsic property of the card. The scanner 6510 can be a scanner as described above with reference to any of FIGS. 7, 8, 9, 17, 18, 19, 20, 23, 26, 27, 28, 30, 31, 46, 47, 53 or 54. Thus in the present example, the signature is based upon the physical surface of the card, measured at a microscopic level. This signature is thus unique to that card, and a copy of the card would have a different signature if scanned in the same way, as discussed above with reference to FIGS. 1 to 63. This signature is then transmitted from the user terminal 6508 to a provider 6503, in some examples via the vendor 6505. This transmitted signature can be encrypted to prevent third parties copying the signature during transmission. This encryption can be effected using conventional data encryption techniques such as a public key encryption and, in the case of an internet transaction, may use a secure socket layer encryption scheme. The provider 6503, which can be a bank or an entity authorised to provide funds clearing services on behalf of one or more banks, can have a database 6504 of signatures taken from issued credit and debit cards. A signature received by the provider as part of an online transaction can be checked against the database 6504. If a match is found in the database, then it can be determined that an issued credit or debit card is being used for the transaction. Further, the database can contain information describing the cardholder such that a cross-check can be performed to ensure that the supplied card details from the user match the cardholder details in the database. The provider can, in the case of a positive match result, indicate to the vendor 6505 that the card is genuine such that the vendor can base a decision on whether to allow the transaction to go ahead on that information.

Thus, it can be established that a credit or debit card offered for payment in a remote transaction is not lost or stolen, and that sufficient funds are available for the payment, and that the user initiating the transaction is in possession of the physical card against which the other checks have been performed. Thereby a large degree of certainty that fraudulent behaviour is not occurring during a card not present transaction can be achieved.

As the card is authenticated against a signature generated from that same card at an earlier time, copies of the card will fail the validation test as they will have been made using a material sheet having a different intrinsic property to that of the sheet of the validated card. Thereby, fraud on the part of persons acquiring details of the card to obtain goods or services using someone else's account can be prevented.

Thus there has now been described an example of a system for a card to be used at a location convenient for a purchaser of goods or services, and for a merchant relying on the genuine nature of the card for payment for goods or services to be able to validate the card for authentication when the card is used in a card not present type transaction. Thereby fraudulent reproduction of a credit or debit card can be prevented without subjecting the purchaser to a need to travel to an inconvenient location to make a purchase.

In the above, it has been described that a database 6504 of signatures for issued cards be pre-existent at the provider 6503. These signatures can be obtained by a card issuer upon issue of the card to a user. Thus where cards are distributed by postal means, the signature can be taken by the issuing authority prior to shipment of the card to the cardholder. To provide an additional layer of security, the cardholder can be requested to scan the card at a user terminal and to transmit a signature generated from that scan to the provider 6503 in order to validate the card for use. In such an example, only if the signature transmitted from the user terminal for validation matches the signature in the database would the card be activated for use by the cardholder. Such a provision would prevent fraud by staff of the issuing authority sending out a card different to the card which had been scanned, thus enabling the staff member to keep the scanned card for their own use or for sale to a third party to use in making transactions against the account of the cardholder without the cardholder's permission.

In another example, the scan of the card to create the signature for the database 6504 could be made in the presence of both a representative of the issuing authority and the cardholder. In such a circumstance the scanned area of the card could include a signature space on the card where the cardholder has already written their signature. Thus the scan of the card for a later remote transaction includes a check that the card has not been tampered with to alter or replace the signature.

Figure 68A:
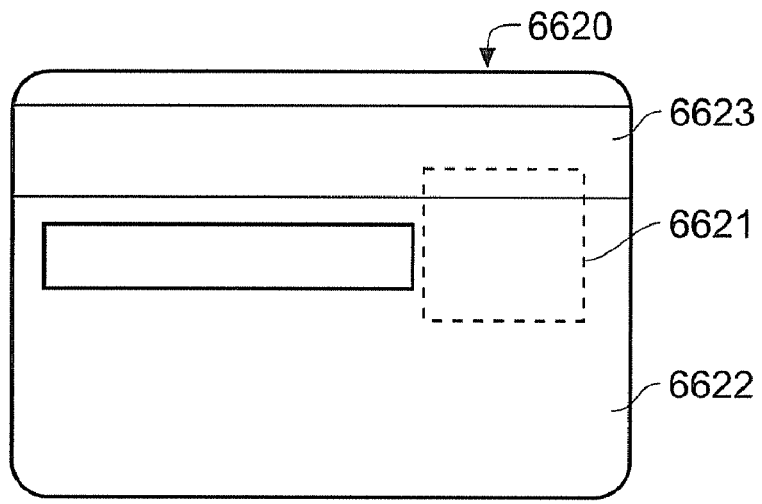
FIGS. 68A, 68B and 68C are a schematic plan views of different types of credit or bank card.
Figure 68B:
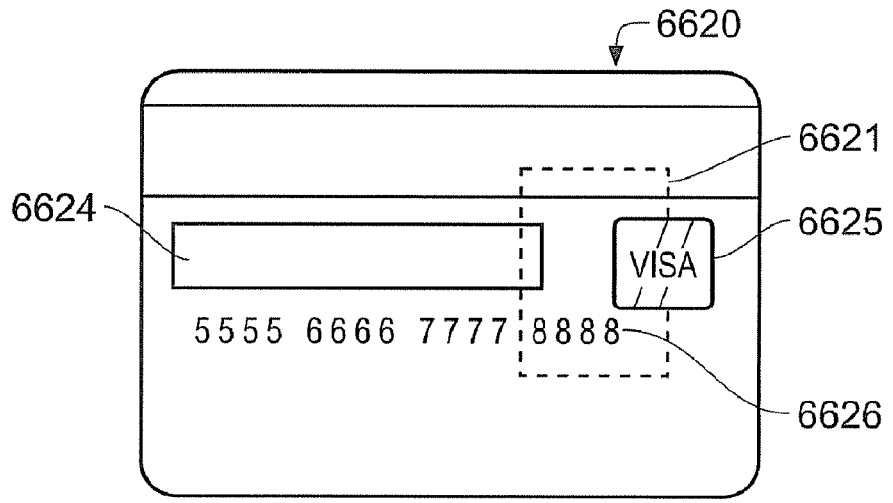
Figure 68C:
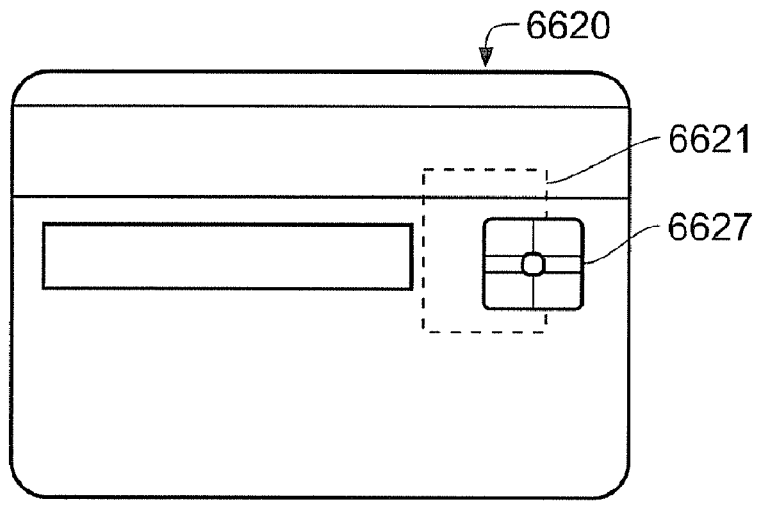

In either of the above examples for taking the initial "validation" scan of the card, the scanned area may include different portions of the card. Examples of this are shown in FIGS. 68A, 68B and 68C where various examples of cards 6620 are depicted. In these figures, a scan area 6621 is depicted using a dashed line as there is no requirement for this area to be marked or indicated on the card in any way. As shown in FIG. 68A, the scanned area 6621 may include a portion of surface of the card with no coverings or printings 6622, and a portion of a magnetic strip 6623 provided on the card for reading using a conventional magnetic strip reader. As shown in FIG. 68B, the scanned area 6621 may include a portion of a signature region 6624, as discussed above, and a portion of one or more numerals, letters, images or logos 6625, 6626 imprinted onto or into the card. As shown in FIG. 68C, the scanned area 6621 may include a portion of the card onto or into which a memory chip 6627 has been embedded (such as in a so-called "smart-cards").

In addition to the examples of credit and debit cards given above, a variety of other payment authorisation tokens or value tokens may be used for remote transactions. Examples of other token types include loyalty cards (where a card holder receives "points" or other value indicators which can be used to claim shopping discounts, special offers or selected products), vouchers certificates, coupons etc, all of which can in certain circumstances be used to purchase goods and/or services, or to obtain discounts from the purchase of goods and/or services.

Thus there have now been described a number of examples of systems which can use a signature for a payment authorisation article which is based upon an intrinsic property of that article to provide further security and/or confidence to a transaction system where remote access is provided to authorise payment using the article.

In many applications where data is stored centrally for a number of users, there can be concerns over the privacy of that data. For example, a bank may have a need to store details of a customer's general financial circumstances, a medical agency may have a need to store details of a patient's medical history, or a company may have a need to store details of an employee. This data can often be accessed by persons working for the entity in a relatively uncontrolled fashion, thereby creating problems such as the recent well-publicised leaks of financial information relating to bank customers in the UK from bank call centres located outside of the UK.

These and other privacy concerns can make it difficult for a bank or other financial service provider to obtain new customers and can also lead to situations where important medical information is withheld by a patient out of a fear of that information being distributed more widely than necessary.

Where data describing a person or other legal entity is stored by a third party, there can be concerns as to the accessibility of that data by unauthorised or ill-intentioned persons. For example, banks and other financial service providers may store a great deal of information regarding debt, credit history, income and personal data about a large number of their customers. Law enforcement agencies may store details of convicted individuals, witnesses, informants, and undercover operatives. Medical agencies may store details of patients such as medical history, lifestyle information and treatment preferences. Employers may store details of employees such as salary, disciplinary record and personal circumstances.

Thus a large number of organisations may store a great deal of information about an individual, which information that individual may wish to keep private. Also, some of the information so stored may be covered by laws concerning the maintenance of records about individuals. Thus the inappropriate, inadvertent or malicious release of such information may both create antipathy towards the organisation storing the data from users of that organisation, and constitute civil or criminal wrongs actionable by legal actions with penalties including payment of damages, payment of fines and/or imprisonment.

In the following discussion, a system and method for preventing unauthorised access to such information is presented.

In many cases where an organisation stores data describing an individual there is often no need for any member of that organisation to access the data when the individual is not present. In other situations, the individual may not be physically present but may be conducting a telephone or online transaction or discussion with the organisation. In other situations, there may be a limited number of persons at the organisation who need full access to the data, with others merely needing to see only some of the data or simply that the data exists without seeing the data content.

All of these situations can be handled by the system of the present examples where access to the data is controlled by an access token in the possession of the individual.

An example of a first system for using an access token for access to information will now be described with reference to FIG. 69. In this system, a user at a user terminal 6700 can desire or require access to information linked to a particular individual. The user terminal can be any form of conventional computing apparatus, such as a personal computer, workstation or handheld computers The individual to whom the information is linked can be the user, or can be an individual with whom the user has a personal or professional relationship. An example of this latter situation would be where a bank employee (the user) needs to access financial information of a customer (the individual) in order to determine whether some product or service can be made available to that customer. Another example is where a medical professional (the user) needs to access medical records for a patient (the individual).

In order to access the information, an access token possessed by the individual can be scanned using a scanner 6702. The scanner (perhaps in combination with the attached user terminal) creates a signature for the access token based upon an intrinsic property thereof. The scanner may be an integral part of the user terminal. The signature can be generated based upon an optical scanning technique such as that described above.

Once the signature is generated, it is used to retrieve data from a database 6706 where the desired information is stored. The database may be controlled by a database administrator entity 6708 which may be tasked with running queries on the database and controlling access thereto (this entity may be distinct from a human user designated as a systems administrator for the database). In the present example, the database administrator entity is accessed via a network 6704, which may be a private network, an organisation intranet or the internet. The network may include cabled and/or wireless interconnects.

The signature is sent to the database administrator entity 6708 to be used as the search query. Thus the database administrator entity 6708 causes a comparison to be performed between the supplied signature and signatures associated with respective ones of the data records in the database. This comparison process can use a search speed enhancing system such as the thumbnail system described above. If a match is found between the signature form the access token and a signature in the database, the data record or records associated with that signature are made available at the user terminal If no match is found in the database between the supplied signature and any of the stored signatures, then no data is made available. In examples where communication between the database administrator entity 6708 and user terminal 6700 is carried out over a public network, either or both of the signature and the data records can be encrypted for transmission, for example using a public key encryption system. In examples where the data link between the database administrator entity and user terminal uses an html type interface, a secure socket layer connection may be established to provide the encryption.

In the present example, the only way to access the database for reading is by using a signature generated from an access token. Thus, the data cannot be accessed without the access token being present at a desired point of access. Thus, taking the banking example above, the bank employee can access the customer data at a time when it is required (such as when the customer enters a bank to request information or some product or service). However, the bank employee cannot access the customer information at any other time. Thus the customer is protected from bank employees looking up his or her details and causing them to be disclosed without the permission of the customer. In the medical example above, the patient's details can be accessed by a medical professional treating the patient, but cannot be accessed by any other person with access to the medical information database, thus overcoming potential data privacy concerns of the patient as regards the centralised computer storage of medical data.

In one example, the system can allow data to be written to the database without the access token being present. Thus, a user can add data records to the database for individuals whose access token signature is already recorded in the database. Where no access token signature is recorded in the database, the individual does not already have any associated records and thus a new record is required. Thus in this circumstance, a new individual should be added to the database as outlined below. Otherwise, if a signature is already present in the database, then further data may be added without the access token being present. For example, a bank employee may be able to add to a customer record the fact that a financial transfer was defaulted on, or that information in support of a loan application has been provided to the bank. The information content can also be added. For a medical records system, the result of a test which is performed remotely from the patient could be entered where the result becomes available. A suitable example might be where a fluid or tissue sample has been taken from the patient for later laboratory analysis.

On the other hand, in some systems, it might be desirous that data can only be entered when the access token is present. For example, in a record of criminal data, it might be the case that it should only be possible to enter criminal details such as those of an arrest, charge, caution, conviction or acquittal when the individual described in the records is present. Thus, in such a system the access token should be present to add data to the database.

In some examples, it may be necessary or appropriate for a "back-door" to be present such that persons having sufficient authority can access the database without the access token of the individual described by the records. This could be achieved by providing an additional access token for the records to which additional access is required. This additional access token could be associated with one or more records such that all of the records to which access is required could be provided by a single access token. If the access were required for, for example, a criminal investigation, the additional access token could be time-limited such that after the end of a predetermined period the data could no longer be accessed. The "back-door" access could also be provided using some other form of user authentication, thereby bypassing the access token system altogether.

It might also be desirable to provide some form of systems administrator access to the database to allow signatures from new access tokens to be included into the database to replace lost, damaged or stolen access tokens.

The access token used for providing the secure access to the database can be any item from which it is possible to create the necessary signature. This could include a dedicated information access token, such as a medi-tag type item such as those often worn by diabetics and those with strong allergies to allow medical personnel to apply appropriate medical treatment even if the person is not able to describe their medical condition. Such a tag-type might therefore be particularly appropriate to medical information access. Other tag-types could also be used, and different ones of tag-types may be more or less appropriate to various different possible applications. For example an item which is normally carried such as bank or credit card could be used as an access token, regardless of whether the information related to banking information. Alternatively, a completely non-obvious access token could be used. Examples could include a business card or other similar item. Use of such a non-obvious access token would reduce the chances of a person stealing or finding the access token from using it to gain access to the owner's data. Thereby the "steal me" problem commonly associated with obviously important items and documents (such as bank cards and packages marked "private and confidential") can be avoided.

Thus there has now been described a system, apparatus and method for providing secure access to sensitive information stored in a database. This secure access provides reliable access to the information whilst reducing concerns over data access and privacy.

Figure 70:
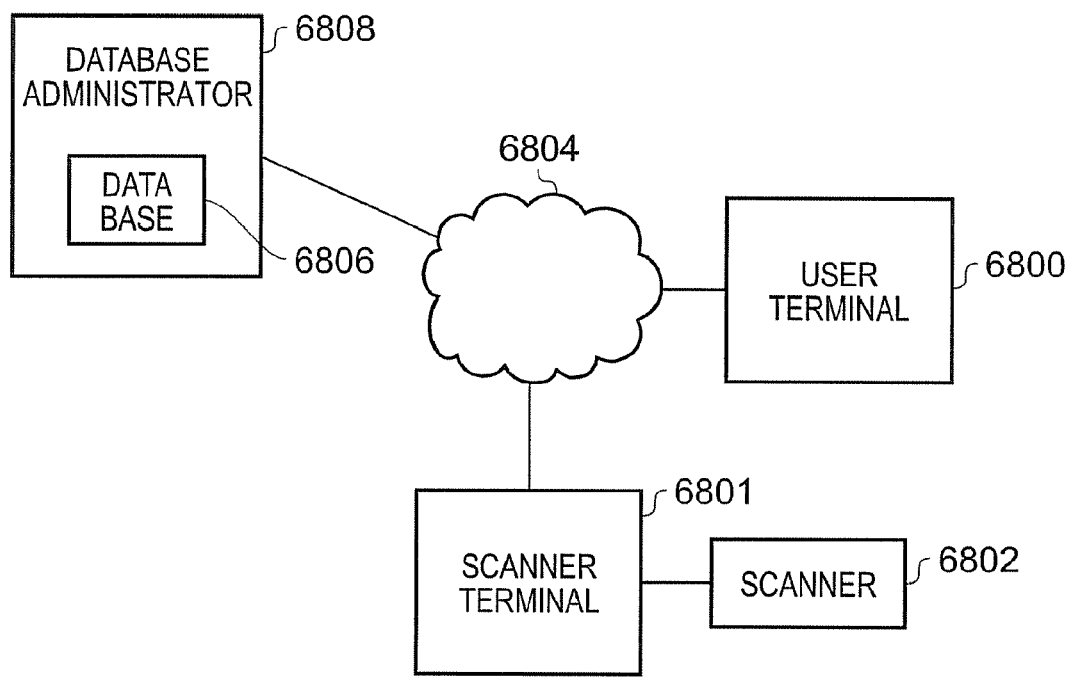
FIG. 70 shows schematically another example of a system for accessing data.

Another example of a system for using an access token to access information is shown in FIG. 70. In this example, the access token scanner is located remote from a user terminal on which the information is to be viewed or accessed.

In the system of this example, a user at a user terminal 6800 can desire or require access to information linked to a particular individual. The user terminal can be any form of conventional computing apparatus, such as a personal computer, workstation or handheld computers The individual to whom the information is linked is, in the present example, not present at the user terminal 6800. An example of the circumstances in which this could occur would be when a bank customer wishes to obtain a loan or other bank service without physical attendance at a bank branch. Such a transaction could involve a telephone conversation between the customer and bank staff. Thus in that example the user terminal 6800 would be present at a premises of the bank and the user would be a member of staff of the bank.

In order to access the information, an access token possessed by the individual (for example the bank customer) can be scanned using a scanner 6802 associated with a scanner terminal 6801 which is co-located with the individual (for example bank customer). The scanner (perhaps in combination with the attached scanner terminal) creates a signature for the access token based upon an intrinsic property thereof. The scanner may be an integral part of the scanner terminal. The signature can be generated based upon an optical scanning technique such as that described above.

Once the signature is generated, it is used to retrieve data from a database 6806 where the desired information is stored. The database may be controlled by a database administrator entity 6808 which may be tasked with running queries on the database and controlling access thereto (this entity may be distinct from a human user designated as a systems administrator for the database). In the present example, the database administrator entity is accessed via a network 6804, which may be a private network, an organisation intranet or the internet. The network may include cabled and/or wireless interconnects.

The networks used to connect the scanner terminal with the user terminal, and the user terminal with the database may be separate networks. For example the scanner terminal and user terminal may communicate via the internet, and the user terminal and database may communicate via a private network.

The signature is sent to the database administrator entity 6808 to be used as the search query. Thus the database administrator entity 6808 causes a comparison to be performed between the supplied signature and signatures associated with respective ones of the data records in the database. This comparison process can use a search speed enhancing system such as the thumbnail system described above. If a match is found between the signature form the access token and a signature in the database, the data record or records associated with that signature are made available at the user terminal 6800. If no match is found in the database between the supplied signature and any of the stored signatures, then no data is made available. In examples where communication between the database administrator entity 6808, the user terminal 6800 and the scanner terminal 6801 is carried out over a public network, either or both of the signature and the data records can be encrypted for transmission, for example using a public key encryption system. In examples where the data links between the database administrator entity, the user terminal and/or the scanner terminal use an html type interface, a secure socket layer connection may be established to provide the encryption.

In the context of the remote banking example, this system allows a bank employee to gain access to private data about a customer, which data is necessary for a service or product to be made available to that customer, without the customer having to physically attend a bank premises. Other examples for the applicability of this arrangement could include allowing a patient to receive the results of a medical test without attending medical premises.

Figure 69:
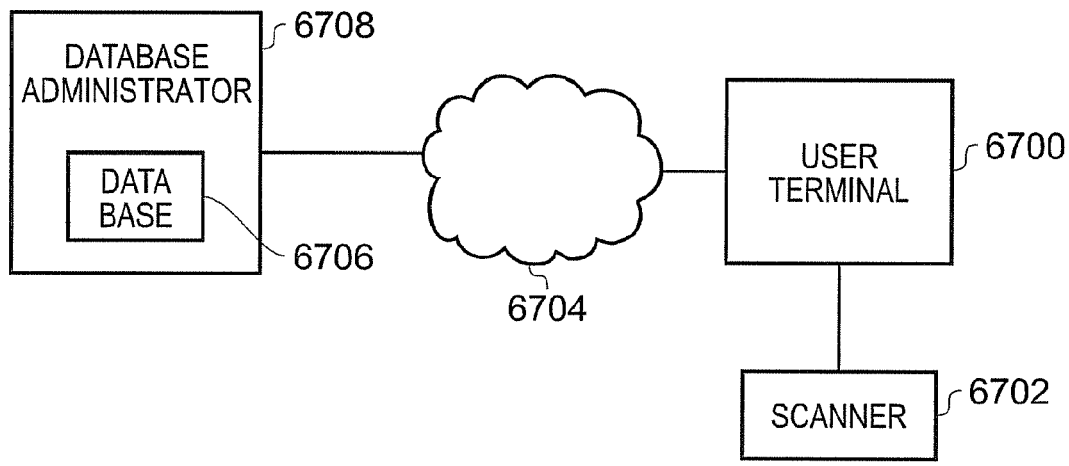
FIG. 69 shows schematically an example of a system for accessing data.

The above-described options and alternatives for writing information to the database, "back-door" systems administrator, regulatory or investigative access, and different types of access tokens apply equally to the example of FIG. 69.

Figure 71:
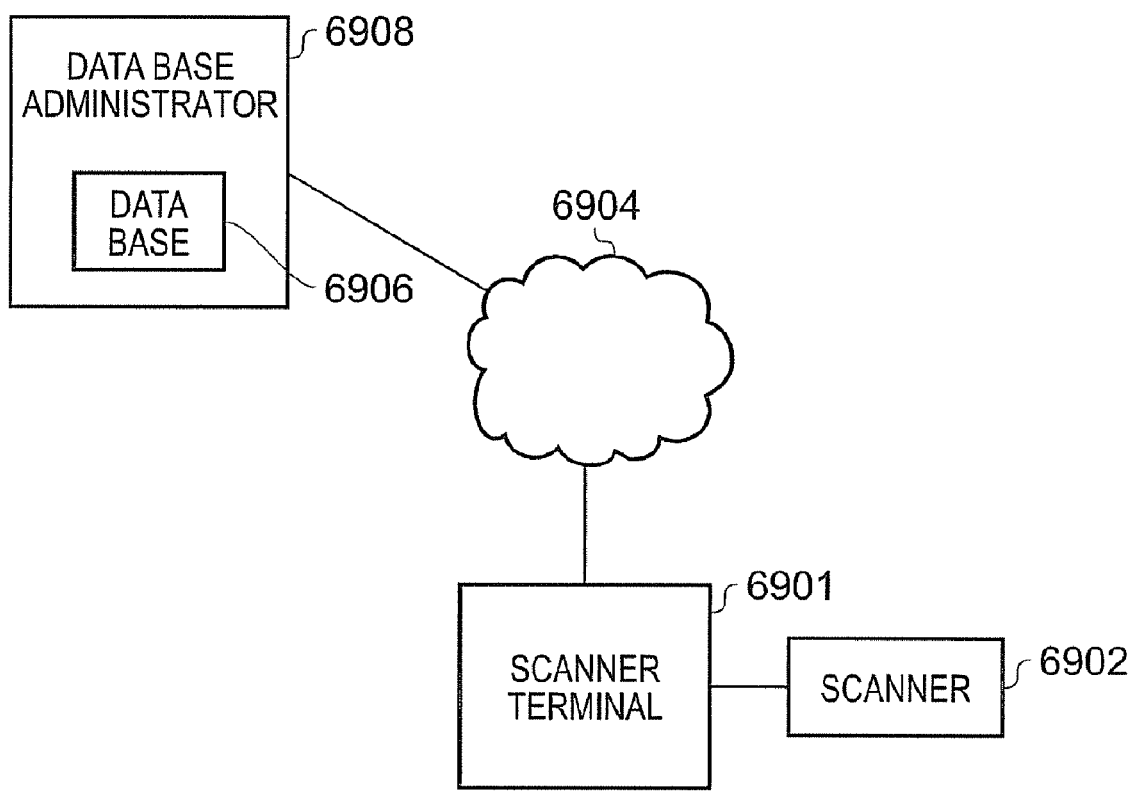
FIG. 71 shows schematically another example of a system for accessing data.

With reference to FIG. 71, there will now be described another example of a system for using an access token to access information. In this example, the user uses the access token to access the information in the database without interacting with a representative of the entity which stores or uses the information.

In the system of this example, a user at a scanner terminal 6901 can desire or require access to information linked to an access token in the user's possession. Typically this information will relate to the user. The scanner terminal 6901 can be any form of conventional computing apparatus, such as a personal computer, workstation or handheld computer. An example of when this might be desired is if the user wishes to check the information stored about them. In the context of a banking facility, the user may wish to check account balances, view a transfer history or view other banking information. In some circumstances, a bank may also allow a customer to transfer money or to make bill payments without direct contact with a member of bank staff. Such transactions would thus result in data being written to as well as read from the database.

In order to access the information, an access token possessed by the user (for example the bank customer) can be scanned using a scanner 6902 associated with the scanner terminal 6901. The scanner (perhaps in combination with the attached scanner terminal) creates a signature for the access token based upon an intrinsic property thereof. The scanner may be an integral part of the scanner terminal. The signature can be generated based upon an optical scanning technique such as that described above.

Once the signature is generated, it is used to retrieve data from a database 6906 where the desired information is stored. The database may be controlled by a database administrator entity 6908 which may be tasked with running queries on the database and controlling access thereto (this entity may be distinct from a human user designated as a systems administrator for the database). In the present example, the database administrator entity is accessed via a network 6904, which may be a private network, an organisation intranet or the internet. The network may include cabled and/or wireless interconnects.

The signature is sent to the database administrator entity 6908 to be used as the search query. Thus the database administrator entity 6908 causes a comparison to be performed between the supplied signature and signatures associated with respective ones of the data records in the database. This comparison process can use a search speed enhancing system such as the thumbnail system described above. If a match is found between the signature form the access token and a signature in the database, the data record or records associated with that signature are made available at the scanner terminal 6901. If no match is found in the database between the supplied signature and any of the stored signatures, then no data is made available. In examples where communication between the database administrator entity 6908 and scanner terminal 6901 is carried out over a public network, either or both of the signature and the data records can be encrypted for transmission, for example using a public key encryption system. In examples where the data link between the database administrator entity and scanner terminal uses an html type interface, a secure socket layer connection may be established to provide the encryption.

In the context of the remote banking example, this system allows a bank customer to gain access to private data held about them by the bank, access to which data is desired by that customer, without the customer having to physically attend a bank premises or speak to bank staff. Other examples for the applicability of this arrangement could include allowing a patient to receive the results of a medical test without attending medical premises.

The above-described options and alternatives for writing information to the database, "back-door" administrator, regulatory or investigative access, and different types of access tokens apply equally to the example of FIG. 69.

In some examples, it may be desirable not to use the signature itself for database access. Instead, the signature of the access token can be used to encrypt another access key. It is possible to use an access key that has some in-built redundancy (or redundancy can be added to a non-redundant key) and error correction code can be added to it. This "padded" key including the error correction code can be exclusive-ORed with the signature from the access token. This redundancy and error correction code survives the XORing with the biometric signature. To recreate the access key at the database, a second XORing with the expected biometric signature, can be performed. Any low level errors that were introduced by an imperfectly read biometric signature can be compensated using the error correction code, to leave a perfectly reformed access key.

In summary, the process involves the following steps:
1. Take an access key
2. Add some redundancy and error correction bits
3. XOR with the biometric signature
4. Transmit (over the internet) to the database
5. XOR with the expected biometric signature
6. Do error correction using the redundancy and error correction bits
7. Left with access key, which can be used to locate information in the database.

One advantage of using a system such as this is that it is possible to deliver an error-free access key to the database. Many databases and prefer or require perfect, error-free access keys, although in the other examples above this can be sidestepped by using the signature matching as the access key, such that the signature matching result represents a perfect, error free access key.

Thus there have now been described various examples of systems, apparatus and methods for providing reliable, secure, limited access to information such as information which may be considered to be private or sensitive by a person or organisation described by the data. Thereby such data can be stored by organisations that need access to it, but only accessed by the organisation when the entity described by or in the information gives permission using a non-reproducible access token.

In many applications where secure transmission of data is required, data encryption can be used to impede unauthorised access to that data. Conventional encryption schemes work on one of two methods: symmetric and asymmetric key methods.

Symmetric key systems use the same key for encryption and decryption of data. Thus the key must be distributed between participants in an exchange of encrypted data. If the key is not distributed securely, it is possible for third parties to obtain a copy of the key and to use that copy to access all data encrypted using the key.

Asymmetric key systems work on a one way encryption scheme where a public key is used to encrypt data, which can then only be decrypted using a private key which is kept by the recipient of the data. Thus the public key can be freely distributed and anything encrypted using the key can only be decrypted using the private key. However in such a system, it can still be desirable that the public key is distributed such that a person receiving the public key can be certain that it comes from the intended recipient of a secure communication. If this is not the case, there is a possibility of a third party creating a public key which appears to belong to someone else and using that public key and its corresponding private key to access encrypted data intended for the apparent originator of the key.

As discussed above, key distribution for encryption is a field in which reliable and secure provision for the distribution is greatly desirable. In the following examples, there will be discussed systems, apparatus and methods for secure distribution of encryption key as well as examples for the secure distribution of data other than encryption keys, such other data may include identification information such as logon information, and database query information.

Figure 72:
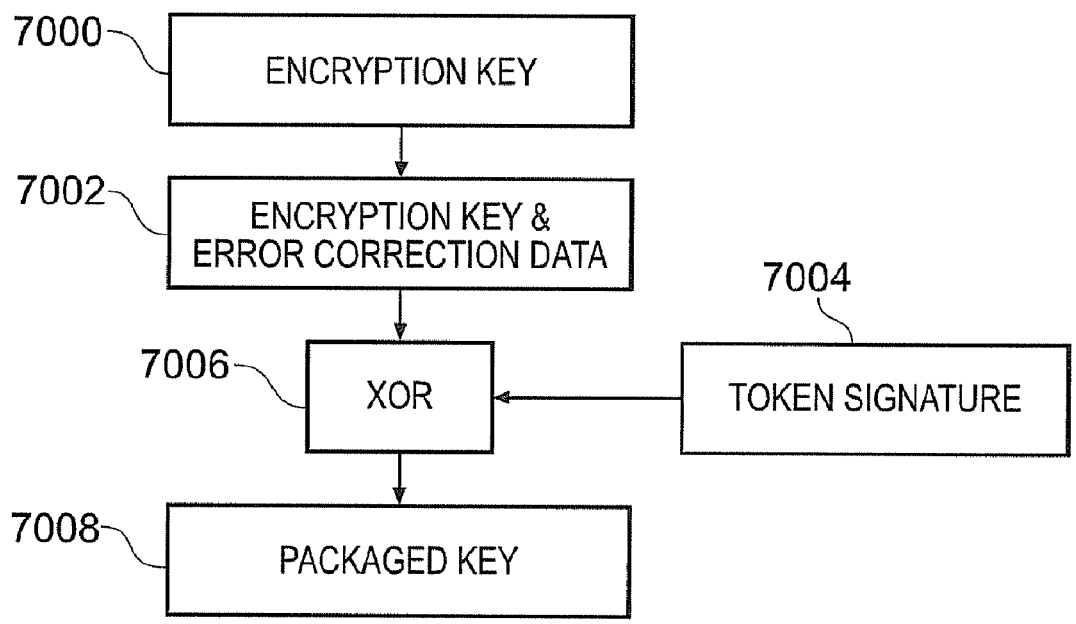
FIG. 72 shows schematically a system for packaging an encryption key.

With reference to FIG. 72, an encryption key 7000 can be packaged for secure transmission such that only the holder of a unique security token can retrieve the key. To achieve this, in the present example, error correction bits are added to the key at 7002. In some examples, additional random data may be added to the key before the error correction bits are added. Then, a signature 7004 calculated from a scan of a security token, for example as discussed above, is exclusive-ORed 7006 with the key plus error correction data 7002. This exclusive OR operation is performed on a bitwise basis to create a packaged key 7008.

Thus the encryption key has been packaged in such a manner than an authorised recipient can retrieve it, but such that a third party intercepting the packaged key cannot obtain the key therefrom.

Figure 73:
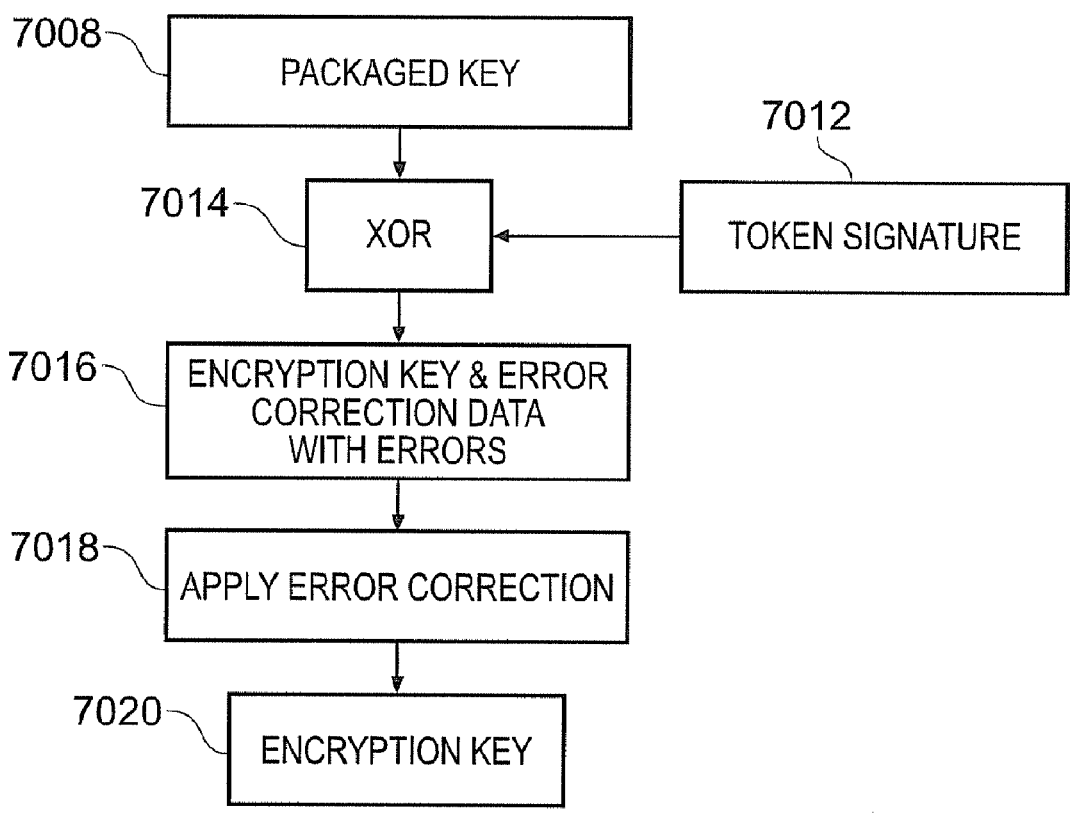
FIG. 73 shows schematically a system for unpacking of a packaged encryption key.

With reference to FIG. 73, a method for unpacking the key by an authorised recipient will now be described. The packaged key 7008 is bitwise exclusive-ORed 7014 with a signature 7012 calculated from a scan of the security token, for example as discussed above, to obtain the encryption key with the error correction bits 7016. This recovered encryption key with error correction bits may include errors relative to the original encryption key with error correction bits 7002 as the signatures used for packaging and unpacking may not be identical, even though they are made from the same security token using the same method. Thus the error correction bits are used to correct 7018 any such errors which may have occurred in the key, so as to reproduce the encryption key 7020 which is identical to the encryption key 7000 originally packaged for transmission.

The error correction coding strength and system used can be selected based upon an expected error rate in the security token signatures.

In examples where additional random data is added to the key, or where the key inherently contains redundant information, the operation of the error correction coding can be enhanced.

The error correction coding and redundant information allow a biometric type signature, such as one generated as set out above, to be used with a non-error tolerant system such as an encryption key. It is a fundamental behaviour of biometric based identification systems that the probability of the same item producing exactly the same biometric signature more than once, even when the same procedure is used on the same item, is extremely small. Thus the differences between two biometric signatures of the same item can be allowed for to create an error free system for securing an error intolerant system.

In some examples, the packaged key may be transmitted alone such that the key is distributed as a stand-alone item. This could be used for distribution of a key from a public/private key pair in a manner which enables the recipient to be certain of the originator of the key. In other examples, the packaged key may be transmitted with data which has been encrypted using the key, such that the recipient of the data is provided with the decryption key for use in decrypting that data. Such systems allow the easy use of short usage life encryption keys, with each key being used for as little as one data packet before being discarded in favour of a new key. Such frequent changes in encryption keys provide no inconvenience to a data recipient in such cases as the security token allows the new keys to be accessed and used without needing user input for tracking of new keys.

In some examples, either the signature used for packaging or the signature used for unpacking may be a previously created signature stored by the packaging or unpacking entity. In some examples, an entity may maintain a large database of signatures, the database containing signatures relating to many different security tokens. Thus, for example, a financial services entity (such as a bank) may store signatures for security tokens of many customers, allowing the entity to enter into secure encrypted communications with its customers on an individual basis.

In the system, method and apparatus of the present examples any item can be used as the security token, in particular, the token can be primarily two-dimensional and can be optically opaque or translucent. The use of such articles is set out in more detail above.

The security token used for providing the secure access to the key can be any item from which it is possible to create the necessary signature. For example an item which is normally carried such as a bank, credit or loyalty card could be used as an access token, regardless of whether the information related to information about that bank or loyalty scheme. Alternatively, a completely non-obvious access token could be used. Examples could include a business card or other similar item. Use of such a non-obvious access token would reduce the chances of a person stealing or finding the access token from using it to gain access to the owner's data. Thereby the "steal me" problem commonly associated with obviously important items and documents (such as bank cards and packages marked "private and confidential") can be avoided.

Thus encryption keys can be securely distributed to allow an intended recipient to extract the key for use, while any third party receiving the key cannot obtain the actual key.

In some examples a database access request may be made, using a database logon as necessary and a suitable query. The response from the database may be transmitted using a packaged key with appended encrypted data as described above. In one example, a signature based upon an intrinsic characteristic of a database access token may be used as the database logon and/or query. The submitted signature can be used as the logon and search query by associating each data record in the database with a signature, and making the signature a searchable field. In some examples, the signature may be on the only searchable field with the possible exceptions of systems administrator access, regulatory inspection access and legal or criminal investigation access. In addition or alternatively, the signature submitted for search and/or logon purposes may in fact be used to package a database access key much as outlined above for packaging of an encryption key. The access key could then be recovered error free from the packaged key using a copy of the signature stored for an access mechanism for the database. The resulting database record could then be returned using the signature of the security token to package an encryption key for decrypting the returned data.

In some examples, the database access token and the security token could be the same physical article. Different signatures could be generated from the article by scanning different areas of the article, and/or by scanning at different resolutions.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

From the above detailed description it will be understood how an article made of material, such as paper, cardboard, plastic, metal or ceramic, can be identified by exposing the material to coherent radiation, collecting a set of data points that measure scatter of the coherent radiation from intrinsic structure of the material, and determining a signature of the article from the set of data points.

It will also be understood that the scan area is essentially arbitrary in terms of its size or location on an article.

Moreover, it will be understood how this can be applied to identify a product by its packaging, a document or an item of clothing, by exposing the article to coherent radiation, collecting a set of data points that measure scatter of the coherent radiation from intrinsic structure of the article, and determining a signature of the product from the set of data points.

From the above description of the numerical processing, it will be understood that degradation of the beam localisation (e.g. beam cross-section enlargement in the reading volume owing to sub-optimum focus of the coherent beam) will not be catastrophic to the system, but merely degrade its performance by increasing the accidental match probability. The apparatus is thus robust against apparatus variations giving a stable gradual degradation in performance rather than a sudden unstable failure. In any case, it is simple to perform a self test of a reader, thereby picking up any equipment problems, by performing an autocorrelation on the collected data to ascertain the characteristic minimum feature size in the response data.

A further security measure that can be applied to paper or cardboard, for example, is to adhesively bond a transparent seal (e.g. adhesive tape) over the scanned area. The adhesive is selected to be sufficiently strong that its removal will destroy the underlying surface structure which it is essential to preserve in order to perform a verification scan. The same approach can be applied to deposition of transparent polymer or plastic films on a card, or its encapsulation with similar materials.

As described above, the reader may be embodied in an apparatus designed specifically to implement the invention. In other cases, the reader will be designed by adding appropriate ancillary components to an apparatus principally designed with another functionality in mind, such as a photocopier machine, document scanner, document management system, POS device, ATM, air ticket boarding card reader or other device.

Many other variations of the invention will be envisaged by the skilled person in addition to those specifically mentioned above.

The invention claimed is:

1. An apparatus for determining a signature from an article in a reading volume of the apparatus, the apparatus comprising:
    a source operable to generate a coherent beam;
    a beam directing member operable to direct the coherent beam into the reading volume;
    a detector arrangement for collecting signals created by scatter of the coherent beam within the reading volume, wherein different ones of the signals relate to scatter from different parts of the reading volume, the detector arrangement having a numerical aperture greater than approximately 0.1 to cause a speckle component of the collected signals to be at least partially averaged out over the cone angle of collection; and
    a processor operable to determine a signature for an intrinsic structure of an article in the reading volume from the collected signals.

2. The apparatus of claim 1, wherein the detector arrangement is operable to collect signals from each of a plurality of different parts of the reading volume simultaneously, and wherein each such signal is captured at the same numerical aperture.

3. The apparatus of claim 1, wherein each signal includes information describing the surface of an article at a point of incidence of the coherent beam onto the article.

4. The apparatus of claim 1, wherein the reading volume has a depth from the beam directing member in the range 0 m to 10 m.

5. The apparatus of claim 1, wherein the beam directing member comprises a focussing member operable to focus the coherent beam at a distance within in the reading volume.

6. The apparatus of claim 1, wherein the beam directing member is operable to raster the coherent beam through the reading volume.

7. The apparatus of claim 1, wherein the beam directing member is operable to cause the coherent beam to be linearly focussed in the reading volume.

8. The apparatus of claim 1, wherein the detector arrangement comprises at least one photodetector.

9. The apparatus of claim 1, wherein the detector arrangement comprises a photodetector operable to detect a signal reflected back along the path of the coherent beam.

10. The apparatus of claim 1, wherein the detector arrangement comprises a plurality of photodetectors, each operable to detect signals reflected at respectively different angles to the path of the coherent beam.

11. The apparatus of claim 10, wherein detector arrangement is operable to provide light captured over the same numerical aperture to each photodetector.

12. The apparatus of claim 11, wherein the detector arrangement comprises a lightpipe or a fibre optic lightguide.

13. The apparatus of claim 12, wherein the lightpipe or fibreoptic lightguide is operable to deliver light to a sensor with the same angle of divergence as was possessed by light incident into the lightpipe.

14. The apparatus of claim 10, wherein the detector arrangement includes an interference filter.

15. The apparatus of any of claim 10, wherein the detector arrangement uses a common optical system to carry light to a plurality of sensors.

16. The apparatus of claim 1, wherein the processor is operable to include in the signature a contribution from a comparison between signals received from a single detector channel.

17. The apparatus of claim 16, wherein the comparison involves a cross-correlation.

18. The apparatus of claim 1, configured to read reflected signals from an article moving through the reading volume.

19. The apparatus of claim 1, further comprising a database of previously recorded signatures, wherein the apparatus is operable to access the database and perform a comparison to establish whether the database contains a match to the signature of an article that has been placed in the reading volume.

20. The apparatus of claim 19, wherein the apparatus is operable in to allow the signature to be added to the database if no match is found.

21. The apparatus of claim 1, wherein the processor is further operable to determine a thumbnail signature of the article.

22. The apparatus of claim 21, further operable to store the signature with its thumbnail digital signature in a database.

23. The apparatus of claim 22, wherein the signature is stored with its thumbnail signature in the database conditional on there being no match between it and any signature already stored in the database.

24. The apparatus of claim 23, further comprising:
    a database of previously recorded signatures and their thumbnail signatures; and a comparator operable to search the database to seek at least one candidate match by performing a comparison between the determined thumbnail signature and the previously recorded thumbnail signatures; and to determine for any candidate match whether there is a match by performing a comparison between the determined signature and the at least one previously recorded signatures.

25. The apparatus of claim 24, wherein the comparator is further operable to determine for each match a confidence level based on degree of similarity between the determined signature and the previously recorded signature found to have a match.

26. The apparatus of claim 24, wherein the comparator is further operable to split the determined signature into blocks of contiguous data and to perform a comparison operation between each block and respective blocks of the stored signature.

27. The apparatus of claim 26, wherein the comparator is further operable to compare an attribute of a comparison result from each block comparison to an expected attribute of the block comparison to determine a compensation value for use in determining a comparison result; and wherein the comparison unit is further operable to determine a similarity result between the determined signature and the stored signature, using the compensation value to adjust the determined signature.

28. The apparatus of claim 27, wherein the comparator is further operable to apply the compensation value to adjust the determined signature to compensate for damage to the access token and/or a non-linearity in the determination of the determined signature.

29. The apparatus of claim 27, wherein the comparator is further operable to apply the compensation value to adjust the determined signature to compensate for a non-linearity in the relationship between the different parts of the reading volume.

30. The apparatus of claim 26, wherein the comparator is further operable to compare an actual cross-correlation peak location of a comparison result between a block of the determined signature and the corresponding block of the stored signature to an expected cross correlation peak location to determine the compensation value for use in determining a comparison result.

31. The apparatus of claim 30, wherein the comparator is further operable to determine the compensation value by estimating a function of best fit to the cross-correlation peak locations for each of the block comparisons, the function of best fit representing an average deviation from the expected cross-correlation peak locations.

32. The apparatus of claim 26, wherein the comparator is further operable to calculate a similarity result for each compared block.

33. The apparatus of claim 32, wherein the comparator is further operable to compare the similarity result for at least one predetermined block to a predetermined similarity threshold.

34. The apparatus claim 33, wherein a comparator is further operable to return a negative comparison result in the event of the similarity result for the at least one predetermined block being below a predetermined similarity threshold, regardless of a similarity result for the signatures as a whole.

35. The apparatus of claim 1, wherein the detector arrangement comprises at least two detector modules, each operable to collect signals from each of a plurality of different parts of the reading volume simultaneously, and wherein at least one signal collected by a first detector module and at least one signal collected by a second detector module originate from a common part of the reading volume, and wherein each such signal is captured at the same numerical aperture.

36. The apparatus of claim 35, wherein each detector module corresponds to a set of detector channels, and wherein the processor is operable to utilise when generating the signature a comparison between signals received at different detector channel sets.

37. The apparatus of claim 1, wherein processor includes an analog to digital converter and a processing unit.

38. The apparatus of claim 1, wherein the processor is operable to determine the signature on the basis of a subset of the data collected by the detector arrangement.

39. Use of the apparatus of claim 1 in order to populate a database with signatures by reading a succession of articles.

40. Use of the apparatus of claim 1 in order to verify authenticity of an article.

41. Use of the apparatus of claim 1 in order to ascertain whether an article has been tampered with.

42. Use of the apparatus of claim 1 in order to validate an entitlement token.

43. A method of verifying an article, the method comprising:
determining a signature for the article using an apparatus according to claim 1;
comparing the signature so determined to a record signature for an article; and
determining a verification result in dependence upon a similarity between the signature and the record signature.

44. A method for determining a signature from an article in a reading volume, the method comprising:
generating a coherent beam;
directing the coherent beam into the reading volume;
collecting signals created by scatter of the coherent beam within the reading volume, wherein different ones of the signals relate to scatter from different parts of the reading volume, using a detector arrangement having a numerical aperture greater than approximately 0.1 to cause a speckle component of the collected signals to be at least partially averaged out over the cone angle of collection; and
determining a signature for an intrinsic structure of an article in the reading volume from the collected signals.

45. The method of claim 44, wherein each signal includes information describing the surface of an article at a point of incidence of the coherent beam onto the article.

46. The method of claim 44, wherein the reading volume has a depth from the beam directing member in the range 0 m to 10 m.

47. The method of claim 44, further comprising rastering the coherent beam through the reading volume.

48. The method of claim 44, further comprising linearly focussing the coherent beam in the reading volume.

49. The method of claim 44, further comprising including in the signature a contribution from a comparison between signals received from a single detector channel.

50. The method of claim 44, further comprising accessing a database of previously recorded signatures and performing a comparison to establish whether the database contains a match to the signature of an article that has been placed in the reading volume.

51. The method of claim 44, further comprising determining a thumbnail signature of the article.

52. The method of claim 51, further comprising searching a database of previously recorded signatures and their thumbnail signatures to seek at least one candidate match by performing a comparison between the determined thumbnail signature and the previously recorded thumbnail signatures; and determining for any candidate match whether there is a match by comparing between the determined signature and the at least one previously recorded signatures.

53. The method of claim 50, further comprising splitting the determined signature into blocks of contiguous data and performing a comparison operation between each block and respective blocks of the stored signature.

54. The method of claim 44, further comprising providing light captured over the same numerical aperture to each photodetector.

55. The method of claim 44, further comprising capturing reflected light using a lightpipe.

56. The method of claim 44, further comprising passing captured light through an interference filter.

57. A method for verifying the authenticity of an article, the method comprising:
   determining a signature from an article using an apparatus operable to direct a coherent beam into a reading volume where the article is arranged, operable to collect signals created by scatter of the coherent beam within the reading volume, wherein different ones of the signals relate to scatter from different parts of the reading volume, a detector arrangement having a numerical aperture greater than approximately 0.1 to cause a speckle component of the collected signals to be at least partially averaged out over the cone angle of collection, and operable to determine a signature for an intrinsic structure of an article in the reading volume from the collected signals;
   storing the signature so determined in a database;
   determining a signature from an article using an apparatus operable to direct a coherent beam into a reading volume where the article is arranged, operable to collect signals created by scatter of the coherent beam within the reading volume, wherein different ones of the signals relate to scatter from different parts of the reading volume, a detector arrangement having a numerical aperture greater than approximately 0.1 to cause a speckle component of the collected signals to be at least partially averaged out over the cone angle of collection, and operable to determine a signature for an intrinsic structure of an article in the reading volume from the collected signals; and
   comparing the signature so generated to the signature stored in the database to determine whether the same article was the source of both signatures.

58. The system of claim 57, wherein the first determining step is carried out at a manufacture location for an article.

59. The system of claim 57, wherein the second determining step is carried out at a location other than the manufacture location for the article.

60. The system of claim 57, wherein the first determining step further comprises digitally signing the signature.

61. The system of claim 60, wherein the storing step further comprises checking the digital signature to determine the authenticity of the article signature and completing the storing step in dependence upon the authenticity result.

62. The system of claim 57, wherein at least one of the first and second determining steps is carried out using the apparatus of claim 1.

63. The system of claim 57, wherein at least one of the first and second determining step comprises the method of claim 44.

* * * * *